(12) United States Patent
Takamatsu et al.

(10) Patent No.: US 10,988,092 B2
(45) Date of Patent: Apr. 27, 2021

(54) VEHICULAR CIRCUIT BODY

(71) Applicant: YAZAKI CORPORATION, Tokyo (JP)

(72) Inventors: Masahiro Takamatsu, Shizuoka (JP); Koichi Uezono, Shizuoka (JP); Kousuke Kinoshita, Shizuoka (JP); Atsushi Nakata, Shizuoka (JP); Yasuyuki Saito, Shizuoka (JP); Kazuyuki Oiwa, Shizuoka (JP); Terumitsu Sugimoto, Shizuoka (JP); Taku Furuta, Shizuoka (JP); Noriaki Sasaki, Shizuoka (JP); Yukinari Naganishi, Shizuoka (JP); Sadaharu Okuda, Shizuoka (JP); Kunihiko Yamada, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/231,407

(22) Filed: Dec. 22, 2018

(65) Prior Publication Data

US 2019/0118743 A1    Apr. 25, 2019

Related U.S. Application Data

(63) Continuation of application No. PCT/JP2017/023309, filed on Jun. 23, 2017.

(30) Foreign Application Priority Data

Jun. 24, 2016 (JP) .............................. JP2016-125287
Jun. 24, 2016 (JP) .............................. JP2016-125896

(Continued)

(51) Int. Cl.
*B60R 16/02* (2006.01)
*B60R 16/023* (2006.01)
(Continued)

(52) U.S. Cl.
CPC .......... *B60R 16/0239* (2013.01); *B60K 37/00* (2013.01); *B60R 16/02* (2013.01);
(Continued)

(58) Field of Classification Search
CPC . B60R 16/0215; B60R 16/0239; B60R 16/03; B60R 16/02; B60R 16/0315;
(Continued)

(56) References Cited

U.S. PATENT DOCUMENTS 3,715,627 A * 2/1973 D'Ausilio ............ H01R 25/162
                                                361/643
5,324,203 A    6/1994 Sano et al.
(Continued)

FOREIGN PATENT DOCUMENTS

| DE | 41 02 659 A1 | 8/1992 |
| DE | 10 2012 200 979 A1 | 7/2013 |
| DE | 10 2015 216 311 A1 | 3/2016 |
| EP | 0507225 A1 | 10/1992 |
| JP | S64-7712 U | 1/1989 |
| JP | 2-25343 U | 2/1990 |
| JP | 5-71058 U | 9/1993 |
| JP | H06-171438 A | 6/1994 |

(Continued)

OTHER PUBLICATIONS dictionary.cambridge.org, terminal definition (Year: 2020).*
(Continued)

*Primary Examiner* — Steven T Sawyer
(74) *Attorney, Agent, or Firm* — Kenealy Vaidya LLP

(57) ABSTRACT

A vehicular circuit body includes a trunk line that includes a power source line and a communication line, and that is routed in a vehicle body; and a plurality of control boxes that are disposed in a distribution manner along the trunk line. The trunk line includes a first trunk line portion extending in a front-and-rear direction of the vehicle body and a second trunk line portion extending in a leftward-and-rightward direction of the vehicle body. The plurality of control boxes include a branch control box that connects the first trunk line portion and the second trunk line portion, and distributes (Continued)

power from one of the first trunk line portion and the second trunk line portion to the other one.

10 Claims, 120 Drawing Sheets

(30) Foreign Application Priority Data

Jun. 30, 2016 (JP) .............................. JP2016-131167
Sep. 26, 2016 (JP) .............................. JP2016-187627

(51) Int. Cl.
| | | |
|---|---|---|
| *B60R 16/03* | (2006.01) | |
| *H01R 13/64* | (2006.01) | |
| *B60R 16/033* | (2006.01) | |
| *H01B 7/00* | (2006.01) | |
| *H02G 3/08* | (2006.01) | |
| *H04L 12/42* | (2006.01) | |
| *B60K 37/00* | (2006.01) | |
| *H01R 13/62* | (2006.01) | |
| *H04L 12/10* | (2006.01) | |
| *H04L 12/66* | (2006.01) | |
| *H01R 13/44* | (2006.01) | |
| *H01R 9/24* | (2006.01) | |
| *H02G 3/32* | (2006.01) | |
| *H04L 29/08* | (2006.01) | |

(52) U.S. Cl.
CPC ...... *B60R 16/0207* (2013.01); *B60R 16/0215* (2013.01); *B60R 16/0238* (2013.01); *B60R 16/03* (2013.01); *B60R 16/033* (2013.01); *B60R 16/0315* (2013.01); *H01B 7/0045* (2013.01); *H01R 13/44* (2013.01); *H01R 13/62* (2013.01); *H01R 13/64* (2013.01); *H02G 3/081* (2013.01); *H04L 12/10* (2013.01); *H04L 12/42* (2013.01); *H04L 12/66* (2013.01); *H01R 9/2483* (2013.01); *H01R 2201/26* (2013.01); *H02G 3/32* (2013.01); *H04L 67/12* (2013.01)

(58) Field of Classification Search
CPC .............. B60R 16/0207; B60R 16/033; B60R 16/0238; H01B 7/0045; H02G 3/081; H02G 3/32; H04L 67/12; H04L 12/42; H04L 12/10; H04L 12/66; B60K 37/00; H01R 13/62; H01R 13/44; H01R 13/64; H01R 9/2483; H01R 2201/26
See application file for complete search history.

(56) References Cited

U.S. PATENT DOCUMENTS

| | | | |
|---|---|---|---|
| 5,623,169 A | 4/1997 | Sugimoto et al. | |
| 5,675,189 A | 10/1997 | Anma et al. | |
| 5,759,050 A | 6/1998 | Matsuoka et al. | |
| 5,818,673 A | 10/1998 | Matsumaru et al. | |
| 5,990,573 A | 11/1999 | Granitz et al. | |
| 6,127,741 A | 10/2000 | Matsuda et al. | |
| 6,182,807 B1* | 2/2001 | Saito ................. | B60G 17/0185 191/2 |
| 6,291,770 B1* | 9/2001 | Casperson .......... | B60R 16/0207 174/139 |
| 6,494,723 B2 | 12/2002 | Yamane et al. | |
| 6,501,574 B1 | 12/2002 | Unno et al. | |
| 6,650,345 B1 | 11/2003 | Saito et al. | |
| 6,791,207 B2 | 9/2004 | Yoshida et al. | |
| 6,875,923 B2 | 4/2005 | Egawa et al. | |
| 6,935,790 B2 | 8/2005 | Ozaki | |
| 6,945,704 B2 | 9/2005 | Yamaguchi | |
| 7,039,511 B1 | 5/2006 | Kreuz et al. | |
| 7,286,044 B2 | 10/2007 | Yanagida et al. | |
| 7,423,519 B2 | 9/2008 | Yanagida et al. | |
| 7,551,999 B2 | 6/2009 | Uraki | |
| 7,833,033 B2 | 11/2010 | McMahon et al. | |
| 7,852,206 B2 | 12/2010 | Yanagida et al. | |
| 7,931,479 B1* | 4/2011 | De La Reza ............ | H05K 3/32 439/76.2 |
| 8,248,971 B2 | 8/2012 | Goto et al. | |
| 8,304,928 B2 | 11/2012 | Nagasawa et al. | |
| 8,304,929 B2 | 11/2012 | Sweet et al. | |
| 8,929,732 B2 | 1/2015 | Yuki et al. | |
| 9,505,358 B2 | 11/2016 | Ichikawa et al. | |
| 9,825,394 B2 | 11/2017 | Naganishi et al. | |
| 10,266,130 B2 | 4/2019 | Saito et al. | |
| 2001/0023786 A1 | 9/2001 | Maynard et al. | |
| 2002/0113441 A1 | 8/2002 | Obayashi | |
| 2003/0215235 A1 | 11/2003 | Norizuki et al. | |
| 2004/0064539 A1 | 4/2004 | Itoi | |
| 2004/0077207 A1 | 4/2004 | Ice | |
| 2004/0227402 A1* | 11/2004 | Fehr ..................... | B60R 16/0315 307/10.1 |
| 2006/0031590 A1 | 2/2006 | Monette et al. | |
| 2006/0197378 A1 | 9/2006 | Nagasawa et al. | |
| 2007/0102998 A1* | 5/2007 | Jordan ................ | B60R 16/0315 307/9.1 |
| 2009/0015976 A1 | 1/2009 | Hara et al. | |
| 2010/0131816 A1 | 5/2010 | Yamamoto et al. | |
| 2010/0215043 A1 | 8/2010 | Hisada | |
| 2010/0216336 A1* | 8/2010 | Quiter .................. | H01R 4/4809 439/567 |
| 2011/0088944 A1 | 4/2011 | Ogue et al. | |
| 2011/0292663 A1* | 12/2011 | Fredrickson ........ | B60R 16/0239 362/375 |
| 2012/0290692 A1 | 11/2012 | Reich et al. | |
| 2012/0305308 A1 | 12/2012 | Toyama et al. | |
| 2015/0241498 A1 | 8/2015 | Watanabe | |
| 2015/0308998 A1* | 10/2015 | Suzuki .................... | G01M 3/00 73/31.05 |
| 2015/0309163 A1 | 10/2015 | Van Der Velde et al. | |
| 2015/0349471 A1 | 12/2015 | Maki et al. | |
| 2015/0360627 A1 | 12/2015 | Sasaki et al. | |
| 2016/0059708 A1 | 3/2016 | Iwasaki et al. | |
| 2016/0177907 A1 | 6/2016 | Betscher et al. | |
| 2017/0057434 A1 | 3/2017 | Nohara et al. | |
| 2017/0201584 A1 | 7/2017 | Endo | |

FOREIGN PATENT DOCUMENTS

| | | |
|---|---|---|
| JP | 7-335367 A | 12/1995 |
| JP | 8-2290 A | 1/1996 |
| JP | 8-273718 A | 10/1996 |
| JP | 9-134307 A | 5/1997 |
| JP | 9-275632 A | 10/1997 |
| JP | 10-84619 A | 3/1998 |
| JP | 11-154566 A | 6/1999 |
| JP | 2000-59409 A | 2/2000 |
| JP | 2000-78179 A | 3/2000 |
| JP | 2003-32853 A | 1/2003 |
| JP | 2003-175781 | 6/2003 |
| JP | 2003-218904 A | 7/2003 |
| JP | 2003-332981 A | 11/2003 |
| JP | 2004-104564 A | 4/2004 |
| JP | 2004-306697 A | 11/2004 |
| JP | 2005-78962 A | 3/2005 |
| JP | 2006-6069 A | 1/2006 |
| JP | 2006-191727 A | 7/2006 |
| JP | 2006-220857 A | 8/2006 |
| JP | 2007-201932 A | 8/2007 |
| JP | 2007-305379 A | 11/2007 |
| JP | 2008-49982 A | 3/2008 |
| JP | 2008-284981 | 11/2008 |
| JP | 2008-306592 A | 12/2008 |
| JP | 2009-94731 A | 4/2009 |
| JP | 2009-286288 A | 12/2009 |
| JP | 2010-12868 A | 1/2010 |
| JP | 2010-120545 A | 6/2010 |
| JP | 2011-20523 A | 2/2011 |

(56) References Cited

FOREIGN PATENT DOCUMENTS

| | | |
|---|---|---|
| JP | 2011-165354 A | 8/2011 |
| JP | 2014-191997 A | 10/2014 |
| JP | 2015-113101 A | 6/2015 |
| JP | 2015-196447 A | 11/2015 |
| JP | 2015-227089 A | 12/2015 |
| JP | 2016-4686 A | 1/2016 |
| JP | 2016-19176 A | 2/2016 |
| JP | 2016-43882 A | 4/2016 |
| JP | 2016-110811 A | 6/2016 |
| WO | 00/38953 A1 | 7/2000 |
| WO | 00/52836 A1 | 9/2000 |
| WO | 2004/089696 A1 | 10/2004 |
| WO | 2004/103771 A2 | 12/2004 |
| WO | 2007/056696 A2 | 5/2007 |
| WO | 2014/077330 A1 | 5/2014 |
| WO | 2015/186837 A1 | 12/2015 |

OTHER PUBLICATIONS

International Search Report and Written Opinion of the International Search Report for PCT/JP2017/023266 dated Sep. 19, 2017.
International Search Report and Written Opinion of the International Search Report for PCT/JP2017/023307 dated Sep. 19, 2017.
International Search Report and Written Opinion of the International Search Report for PCT/JP2017/023267 dated Sep. 19, 2017.
International Search Report and Written Opinion of the International Search Report for PCT/JP2017/023269 dated Sep. 19, 2017.
International Search Report and Written Opinion of the International Search Report for PCT/JP2017/023303 dated Sep. 19, 2017.
International Search Report and Written Opinion of the International Search Report for PCT/JP2017/023305 dated Sep. 19, 2017.
International Search Report and Written Opinion of the International Search Report for PCT/JP2017/023306 dated Sep. 19, 2017.
International Search Report and Written Opinion of the International Search Report for PCT/JP2017/023309 dated Sep. 19, 2017.
International Search Report and Written Opinion of the International Search Report for PCT/JP2017/023312 dated Sep. 19, 2017.
International Search Report and Written Opinion of the International Search Report for PCT/JP2017/023313 dated Sep. 19, 2017.
International Search Report and Written Opinion of the International Search Report for PCT/JP2017/023314 dated Sep. 19, 2017.
International Search Report and Written Opinion of the International Search Report for PCT/JP2017/023315 dated Sep. 19, 2017.
International Search Report and Written Opinion of the International Search Report for PCT/JP2017/023316 dated Sep. 19, 2017.
The extended European search report for the related European patent application No. 17815536.2 dated May 16, 2019.

* cited by examiner

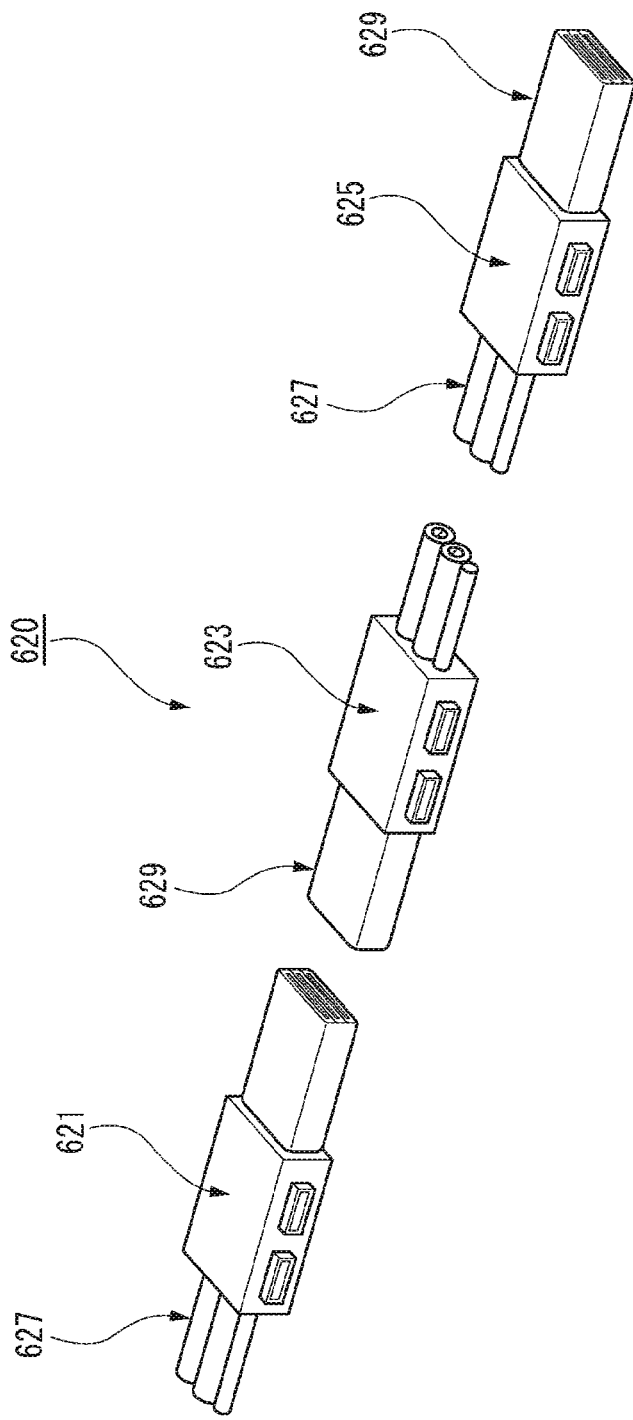

FIG. 67
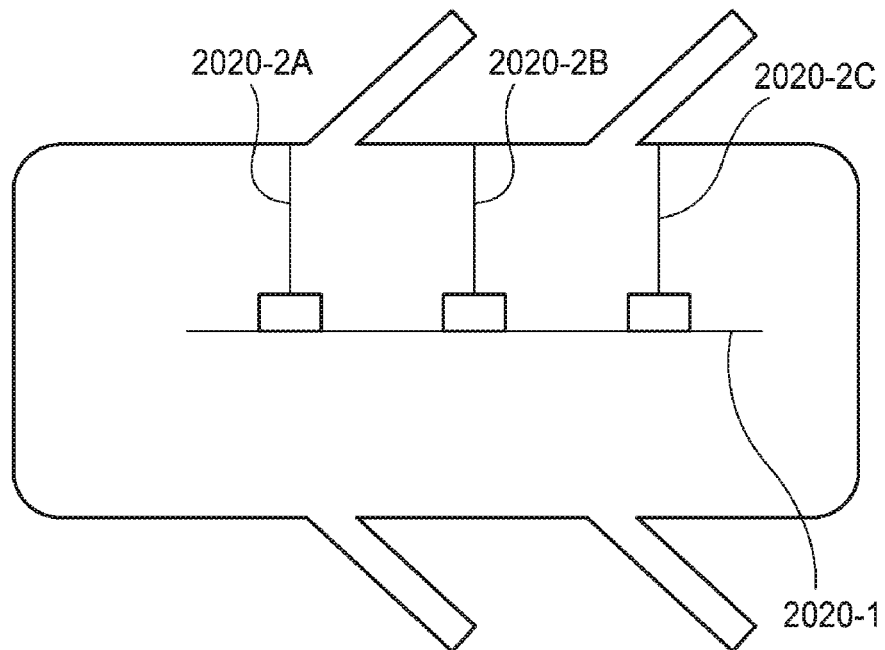
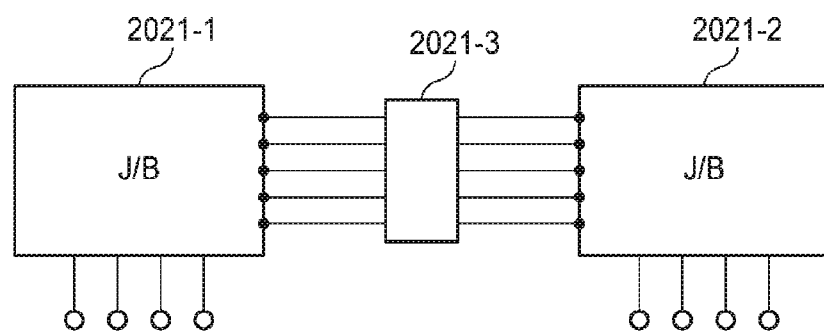
FIG. 68A
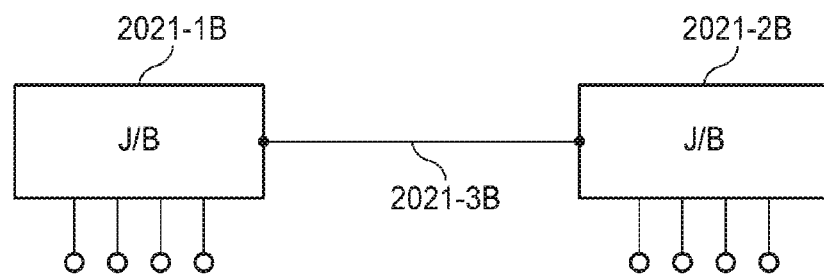
FIG. 68B

FIG. 77A
FIG. 77B
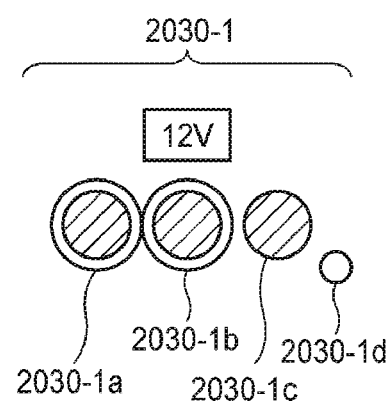
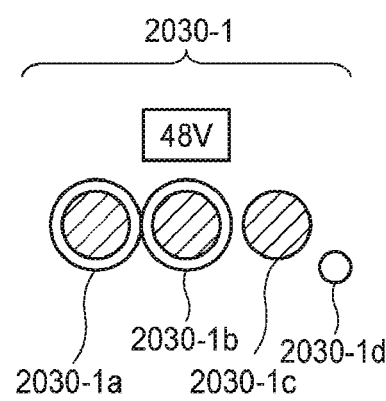
FIG. 78
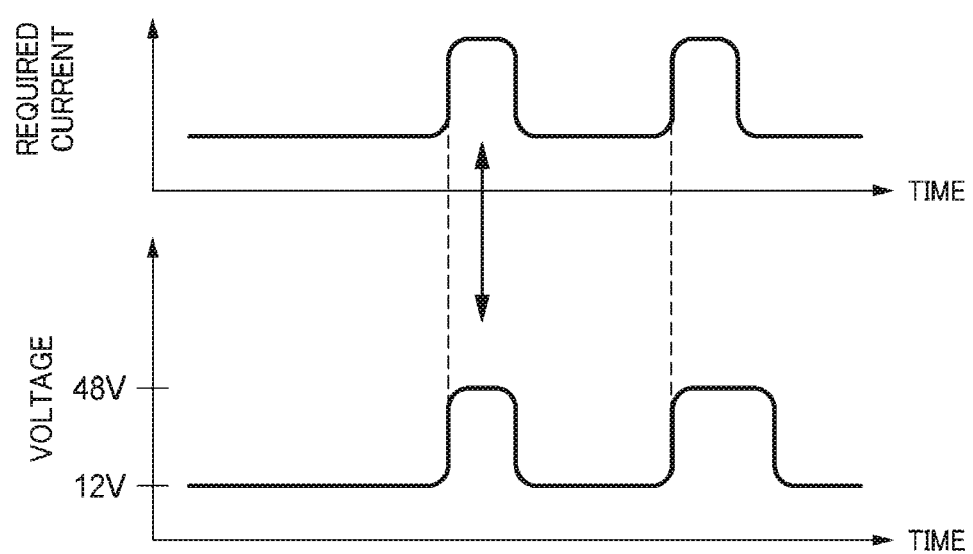

FIG. 91
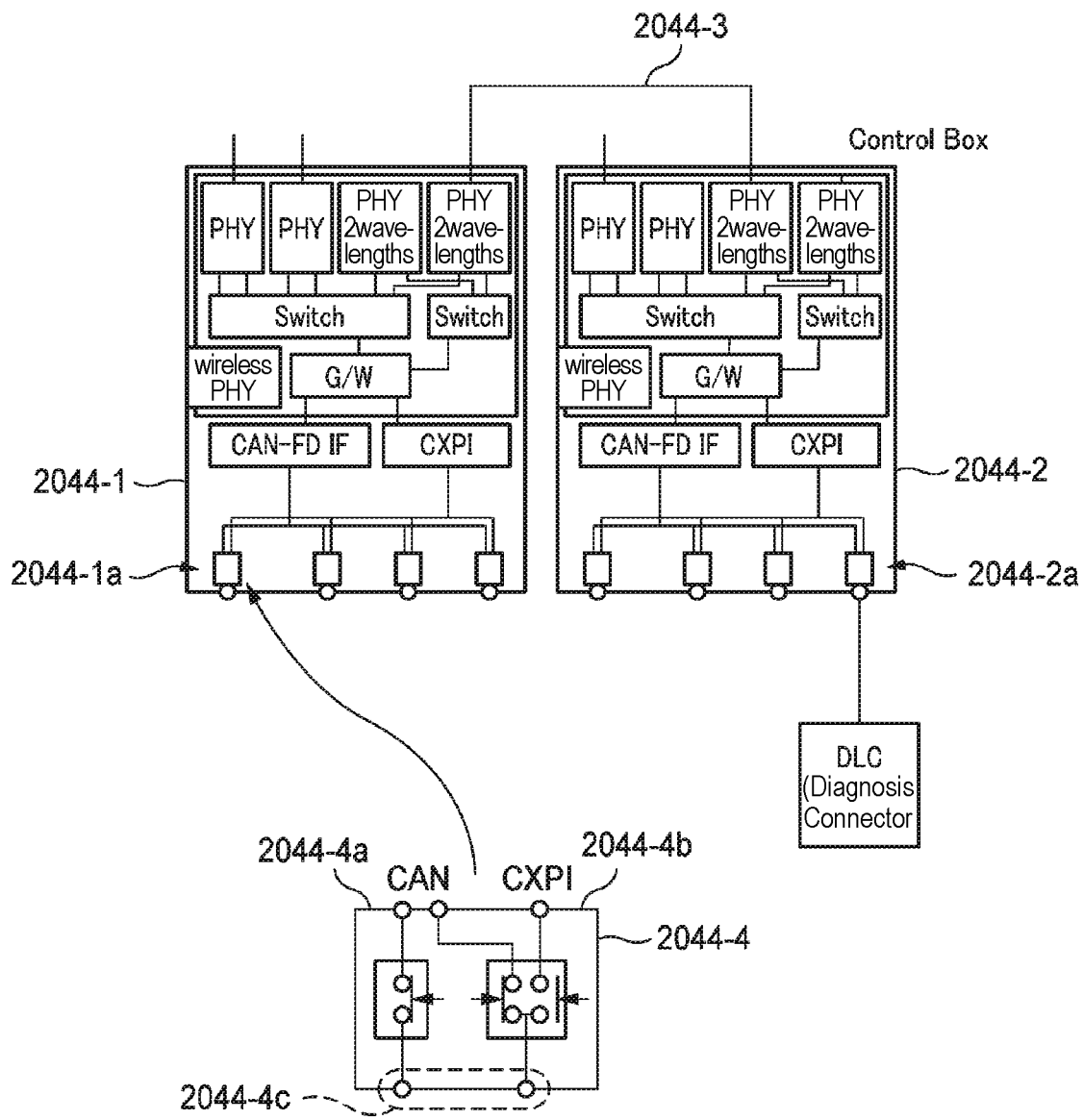
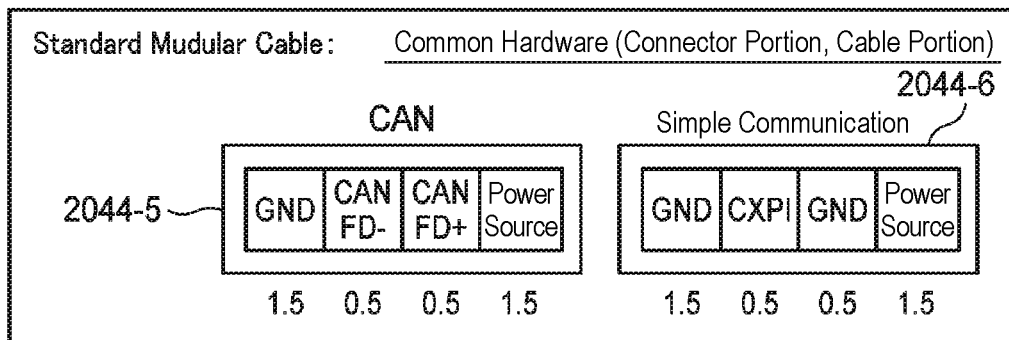

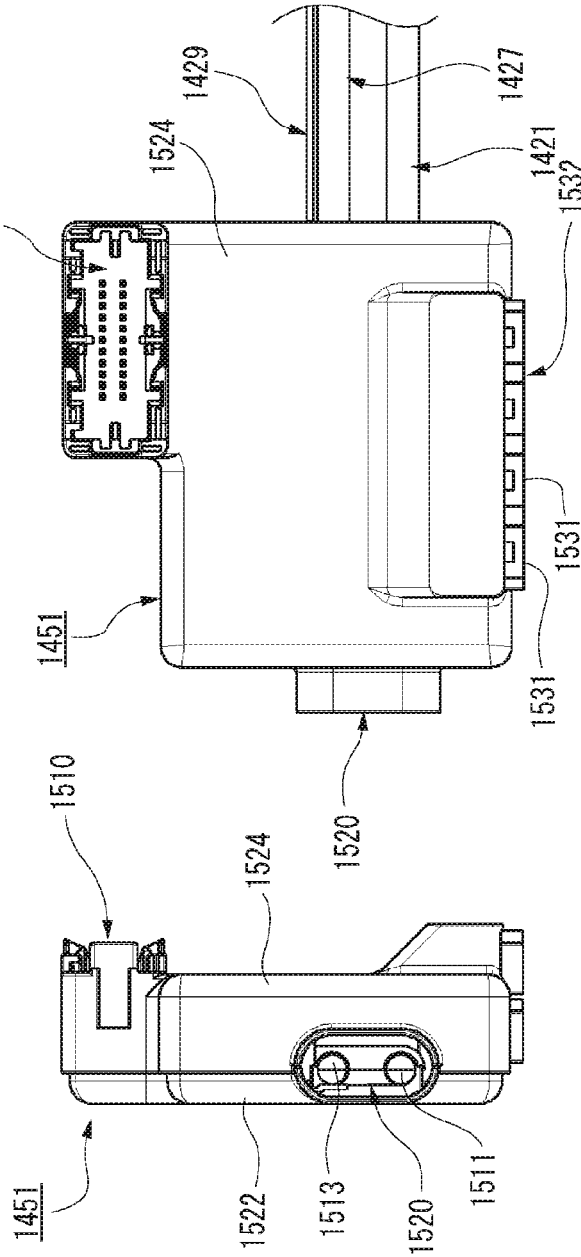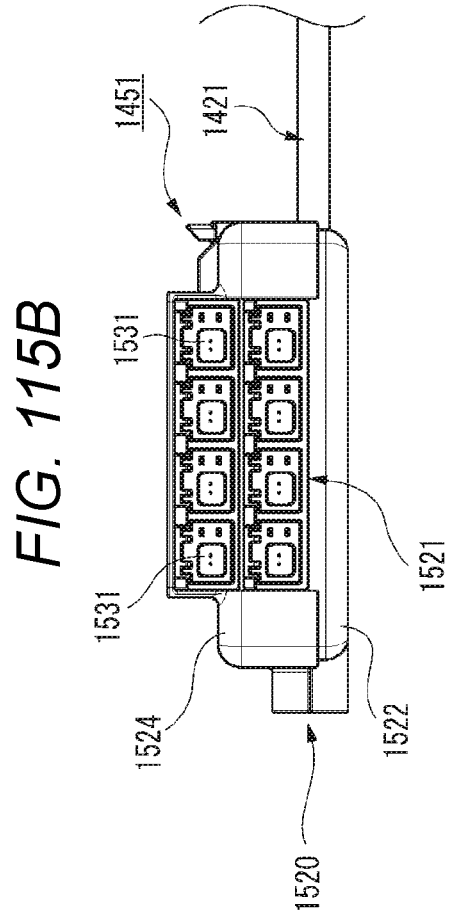

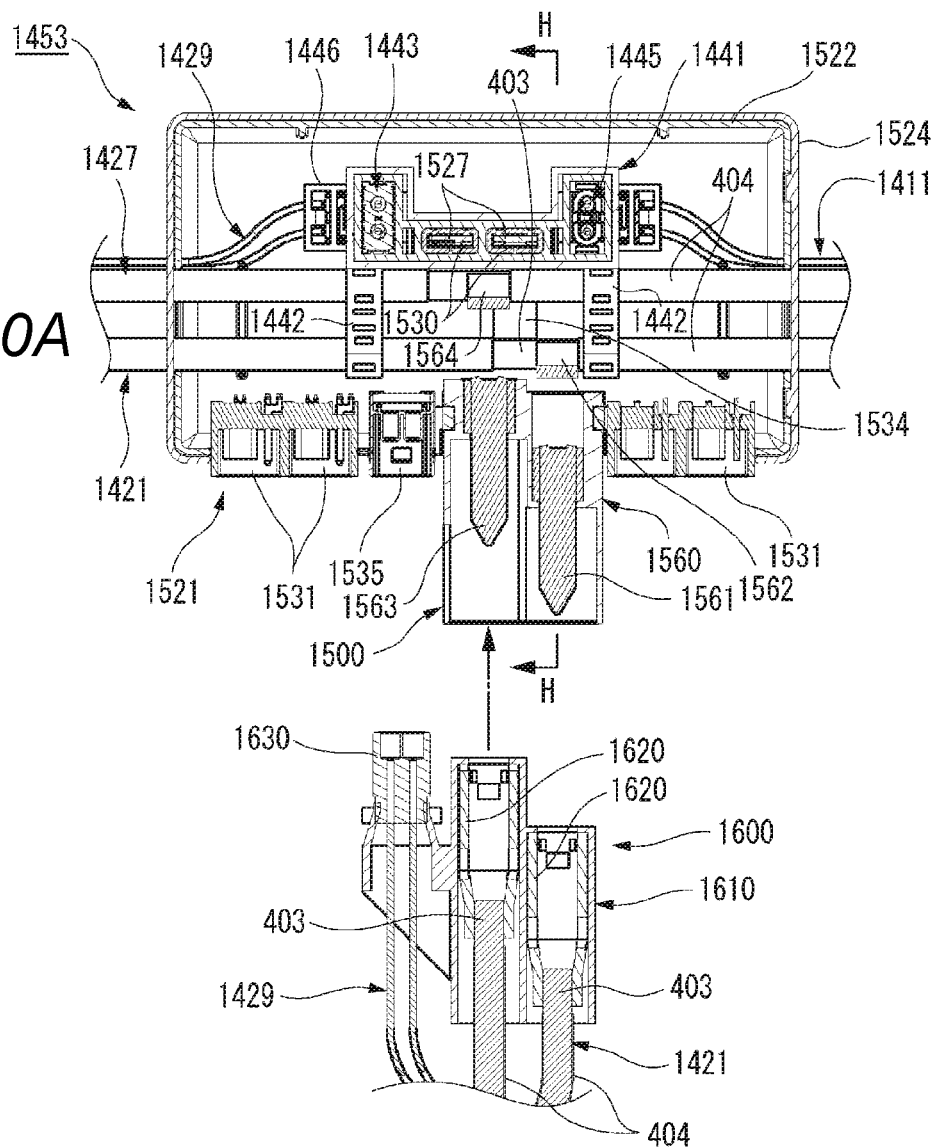
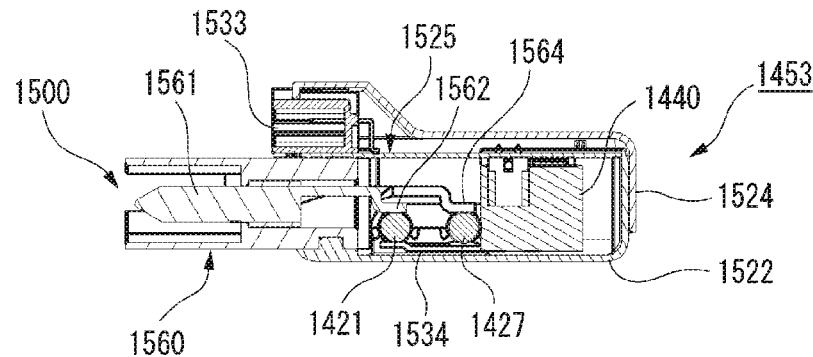
FIG. 120A
FIG. 120B

VEHICULAR CIRCUIT BODY

CROSS REFERENCE TO RELATED APPLICATIONS

This is a continuation of International Application No. PCT/JP2017/023309 filed on Jun. 23, 2017, and claims priority from Japanese Patent Applications No. 2016-125287 filed on Jun. 24, 2016, No. 2016-125896 filed on Jun. 24, 2016, No. 2016-131167 filed on Jun. 30, 2016 and No. 2016-187627 filed on Sep. 26, 2016, the entire contents of which are incorporated herein by reference.

TECHNICAL FIELD

The present invention relates to a vehicular circuit body routed in a vehicle.

BACKGROUND ART

In a vehicle, for example, source power is required to be appropriately supplied to a large number of various electric components from an alternator (generator) or a battery which is a main power source. A system used to supply such source power is also required to have a function of switching between ON and OFF of the supply of power as necessary, or a function of cutting off a current for each system in a case where an excessive current flows through an electric component.

In a general vehicle, a wire harness which is an aggregate of a plurality of electric wires is routed on the vehicle, and a main power source is connected to electric components at each location via the wire harness so that power is supplied thereto. Generally, a junction block is used to distribute source power to a plurality of systems, a relay box is used to control ON and OFF of the supply of power for each system, or a fuse box is used to protect each electric wire or a load of the wire harness.

The vehicle is provided with a plurality of control units for controlling the electric components, and the control units and the electric components are communicably connected to each other via the wire harness.

For example, a wire harness disclosed in Patent Document JP-A-2005-78962 includes a network transmission path and a circuit for providing power, GND and other signals. The wire harness includes a wire harness trunk line, a sub-wire harness, an optional sub-wire harness, and a network hub device.

SUMMARY

In recent years, vehicle systems including such a power source system or communication system have become advanced due to an increase in the number of mounted electric components, complexity of control, or the like. An automatic driving technology is rapidly evolving, and safety requirements for various functions are also increasing in order to cope with this automatic driving.

Along with this, a structure of a wire harness routed on a vehicle body tends to be complicated. Therefore, for example, as in Patent Document JP-A-2005-78962, the wire harness having a complex shape as a whole is formed by combining the wire harness trunk line, the sub-wire harness, and the optional sub-wire harness, and thus connection to various electric components disposed at various locations on a vehicle body can be performed.

Since a diameter of each electric wire forming the wire harness or the number of electric wires increases due to an increase in the number of electric components mounted on a vehicle, there is a tendency that a size of the entire wire harness increases or a weight thereof increases. The types and the number of components of wire harness to be manufactured increase due to a difference between vehicle models mounted with a wire harness or increases in types of optional electric components mounted on a vehicle, and thus it is difficult to standardize components forming the wire harness, and component cost or manufacturing cost increases.

In a work process of manufacturing a wire harness, in order to finish the wire harness in a predetermined routing shape, a bundle of a plurality of electric wires forming the wire harness is pulled around over a long distance along a path which is designated in advance, and thus a lot of work time is required. Since almost all of electric wires are collected at a trunk line portion of the wire harness, the number of bundled electric wires increases, and thus a weight thereof increases.

For example, in a case where a new electric component which is not expected at initial design is mounted on a vehicle, a new electric wire is required to be added to a wire harness in order to secure a path along which a special signal is transmitted between the electric component and another electric component or to supply source power thereto. However, a wire harness has a complex structure or shape, and it is very difficult to add other electric wires to the existing wire harness in the future. Therefore, a new wire harness having differing type or component number is required to be designed so as to be manufactured as a separate product.

The present invention has been made in consideration of the above-described circumstances, and an object thereof is to provide a vehicular circuit body in which a structure for electrical connection between various electric components and a power source on a vehicle and between the electric components, particularly, a configuration of a trunk line portion is simplified and a new electric wire can be easily added.

In order to achieve the above-described object, a vehicular circuit body according to the present invention is characterized in terms of the following (1) to (5).
(1) A vehicular circuit body, comprising:
  a trunk line that includes a power source line having a predetermined current capacity and a communication line having a predetermined communication capacity, and that is routed in a vehicle body; and
  a plurality of control boxes that are disposed in a distribution manner along the trunk line,
  wherein the trunk line includes a first trunk line portion extending in a front-and-rear direction of the vehicle body and a second trunk line portion extending in a leftward-and-rightward direction of the vehicle body, and
  wherein the plurality of control boxes include a branch control box that connects the first trunk line portion and the second trunk line portion, and distributes power from one of the first trunk line portion and the second trunk line portion to the other one.

With this configuration, the trunk line, routed in the vehicle with a predetermined current capacity and a predetermined communication capacity, can be branched to a plurality of trunk lines from a branch control box. This makes it possible to allocate the control boxes that are disposed along the trunk line in a distribution manner to a variety of portions in the vehicle.

Therefore, it is possible to supply power to or easily transmit and receive communication data (signal) to and from accessories disposed at the respective locations of the vehicle via the branch lines connected to the control boxes, and thus it is also possible to shorten the branch lines.

(2) The vehicular circuit body according to the above (1), wherein the first trunk line portion is disposed along a vehicle interior floor of a vehicle, and wherein the second trunk line portion is disposed in an instrument panel of the vehicle.

With this configuration, power distribution from any of the plurality of control boxes to the accessories disposed in the vehicle interior and the vicinity of the vehicle interior can be easily achieved. In addition, because the first trunk line portion extends in a front-and-rear direction of the vehicle body, it is possible to supply power to the trunk line from these control boxes even if the control boxes are disposed at a front and rear portions of the vehicle in a distributed manner.

(3) The vehicular circuit body according to the above (1) or (2), further comprising:

a branch line with one end connected to any one of the plurality of control boxes and the other end directly or indirectly connected to an accessory.

With this configuration, accessories can be connected to the trunk line via the plurality of control boxes disposed along the trunk line in a distributed manner.

In addition, the vehicular circuit body is separately formed of the trunk line which is used in common to a plurality of vehicle models, grades, or options, and the branch line which is changed depending on a plurality of vehicle models, grades, or optional accessories. Therefore, even if the number of vehicle models, grades, or optional accessories increases, only the branch lines having different wirings need to be prepared depending on a plurality of vehicle models, grades, or optional accessories, and thus it is possible to facilitate manufacturing of the vehicular circuit body and to reduce cost.

(4) The vehicular circuit body according to any one of the above (1) to (3), wherein the trunk line is formed of a routing material having at least one kind of conductor among a flat conductor, a round bar conductor, and a stranded wire.

With this configuration, the power source line of the trunk line requires a large sectional area in order to secure a predetermined current capacity. Therefore, in a case where the power source line is formed of a routing material having a flat conductor whose sectional shape is a flat strip shape, bending in a thickness direction is facilitated, and thus work for routing the power source line along a predetermined routing path is facilitated. In a case where the power source line is formed of a routing material having a highly versatile round bar conductor or stranded wire, the power source line can be easily manufactured and be freely bent in all directions. Therefore, the routing property improves.

(5) The vehicular circuit body according to any one of the above (1) to (4), wherein the trunk line further includes an earth line having a predetermined current capacity.

With this configuration, the earth line extends in parallel to the power source line in the trunk line, and thus it is possible to prevent sneaking of power source noise into the communication line.

The power source line and the earth line formed of a routing material having a flat conductor are disposed in a stacking manner such that a surface area of surfaces facing each other is increased and a gap therebetween is reduced, so that it is possible to further improve the noise resistance performance.

It is possible to provide a vehicular circuit body in which a configuration of a trunk line portion is simplified and a new electric wire can be easily added.

As mentioned above, the present invention has been described briefly. Details of the present invention will become more apparent by reading through modes for to carrying out the invention (hereinafter, referred to as "embodiments") described below with reference to the accompanying drawings.

BRIEF DESCRIPTION OF THE DRAWINGS

FIG. 34 is a partial sectional perspective view for explaining a modification example of a vehicular circuit body according to the present embodiment.

FIGS. 61A, 61B and 61C are plan views illustrating three configuration examples of circuit boards built in a control box or the like.

FIG. 67 is a perspective view illustrating an arrangement example of a trunk line and a plurality of branch line sub-harnesses routed on a vehicle body.

FIGS. 68A and 68B are block diagrams illustrating a plurality of control boxes and a communication trunk line connecting the control boxes to each other.

FIGS. 72A, 72B and 72C are block diagrams illustrating specific examples of connection states of a trunk line, a control box, a battery, and the like.

FIGS. 77A and 77B are longitudinal sectional views respectively illustrating configuration examples of different backbone trunk lines.

FIG. 78 is a time chart illustrating an example of a correspondence relationship between a power source current and a power source voltage in a case where special power source control is performed.

FIGS. 85A, 85B and 85C illustrate communication connection states between apparatuses in different situations, in which FIG. 85A is a perspective view, and FIGS. 85B and 85C are block diagrams.

FIG. 91 is a block diagram illustrating a configuration example of a control box which can switch between a plurality of communication protocols.

FIGS. 115A to 115C are respectively a front view, a bottom view, and a left side view illustrating a supply side control box illustrated in FIG. 114A.

FIG. 120A is a sectional view taken along a line E-E in FIG. 116, and FIG. 120B is a sectional view taken along a line H-H in FIG. 120A.

FIG. 121 is a sectional view illustrating a state in which the multi-connector is connected to a branch control box illustrated in FIG. 120A.

FIGS. 122A and 122B are a perspective view and a bottom view of a control box illustrated in FIG. 114A viewed from a bottom side.

FIG. 123 is a perspective view illustrating a state in which an upper case of an intermediate control box illustrated in FIG. 114B is open.

FIG. 124 is a principal portion exploded perspective view for explaining a connection structure example between a circuit board and a floor backbone trunk line portion in the intermediate control box illustrated in FIG. 123.

FIG. 125 is a sectional view taken along a line J-J in FIG. 124.

FIGS. 126A and 126B are sectional views taken along a line I-I in FIG. 123 illustrating states in which the circuit board is separated and assembled.

FIG. 127 is a front view illustrating another embodiment of a backbone control box and proximity thereof.

FIG. 128 is a plan view illustrating a configuration example of principal portions of an on-vehicle device including a vehicular circuit body.

DETAILED DESCRIPTION OF EMBODIMENTS

Figure 1:
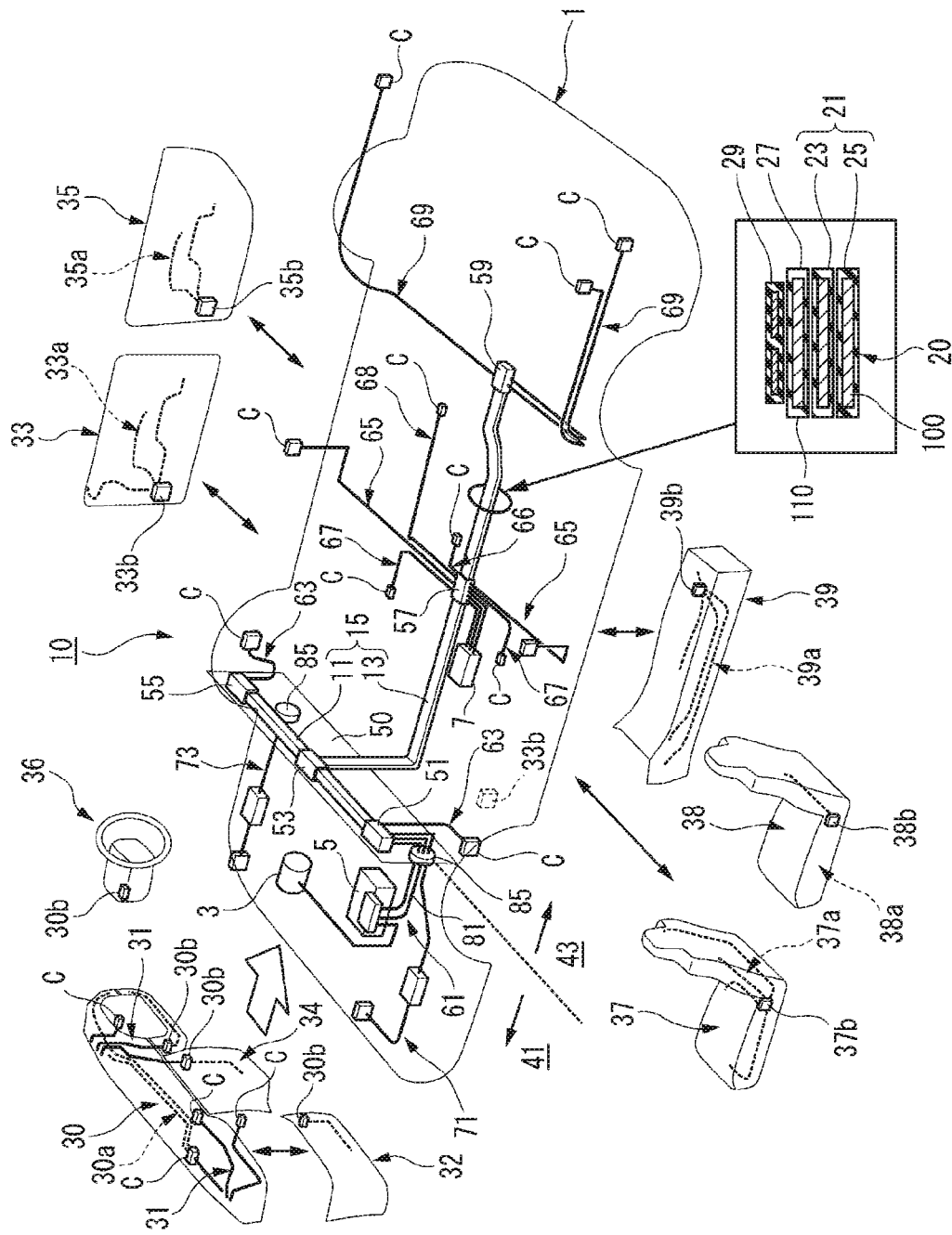
FIG. 1 is an exploded perspective view illustrating a layout and a connection state of each portion, and a summary of each module mounted on a vehicle body in a state in which a vehicular circuit body according to a first embodiment of the present invention is routed on the vehicle body.

Specific embodiments regarding the present invention will be described with reference to the respective drawings.
<Disclosure of the Present Invention and Latent Claims>
[Form-1]
(1) A vehicular circuit body includes:
a trunk line that includes a power source line having a predetermined current capacity and a communication line having a predetermined communication capacity, and that is routed in a vehicle body;
a branch line that is directly or indirectly connected to an accessory; and
a plurality of control boxes that are disposed in a distribution manner along the trunk line and include a control unit for distributing at least one of power from the power source line supplied to the trunk line, and a signal from the communication line, to the branch line connected to the trunk line,
in which the trunk line is formed of a routing material having at least one kind of conductor among a flat conductor, a round bar conductor, and a stranded wire.

According to the vehicular circuit body with the configuration of the above (1), it is possible to provide a vehicular circuit body with a simple structure by using the trunk line having a predetermined current capacity and a predetermined communication capacity and routed in a vehicle body, and the branch line connecting an accessory to the trunk line via a plurality of control boxes which are disposed in a distribution manner along the trunk line.

The vehicular circuit body is separately formed of the trunk line which is used in common to a plurality of vehicle models, grades, or options, and the branch line which is changed depending on a plurality of vehicle models, grades, or optional accessories. Therefore, even if the number of vehicle models, grades, or optional accessories increases, only the branch lines having different wirings need to be prepared depending on a plurality of vehicle models, grades, or optional accessories, and thus it is possible to facilitate manufacturing of the vehicular circuit body and to reduce cost.

The power source line of the trunk line requires a large sectional area in order to secure a predetermined current capacity. Therefore, in a case where the power source line is formed of a routing material having a flat conductor whose sectional shape is a flat strip shape, bending in a thickness direction is facilitated, and thus work for routing the power source line along a predetermined routing path is facilitated. In a case where the power source line is formed of a routing material having a highly versatile round bar conductor or stranded wire, the power source line can be easily manufactured and be freely bent in all directions. Therefore, the routing property improves.

(2) In the vehicular circuit body according to the above (1), the routing material is formed by a plurality of kinds of the conductors combined with each other.

According to the vehicular circuit body with the configuration of the above (2), the routing material is formed by a flat conductor, a round bar conductor, and a stranded wire combined as appropriate, and thus it is possible to provide a trunk line which has good routing property along a routing path of a vehicle and is easily manufactured.

(3) In the vehicular circuit body according to the above (1) or (2), the trunk line between the plurality of control boxes is formed of a routing material having different kinds of conductors.

According to the vehicular circuit body with the configuration of the above (3), the routing material having a conductor suitable for the routing path of the vehicle can be used for each trunk line between the plurality of control boxes.

(4) In the vehicular circuit body according to any one of the above (1) to (3), the trunk line includes a branch portion that branches at least one of the power source line and the communication line into individual lines.

According to the vehicular circuit body with the configuration of the above (4), since the trunk line branches into a plurality of trunk lines in the branch portion, control boxes disposed in a distribution manner in the respective trunk lines can be disposed at respective locations of a vehicle. Therefore, it is possible to easily supply power to or easily transmit and receive communication data (signal) to and from accessories disposed at the respective locations of the vehicle via the branch lines connected to the control boxes, and thus it is also possible to shorten the branch lines.

(5) In the vehicular circuit body according to any one of the above (1) to (4), the trunk line is connected to a sub-power source which is different from a main power source for the power source line.

According to the vehicular circuit body with the configuration of the above (5), the main power source and the sub-power source are disposed in a distribution manner in the power source line of the trunk line. Therefore, a voltage fluctuation in a case where power required in each accessory is high can be reduced by supplying a current from each power source. In a case where the supply of power from one power source is stopped due to vehicle crash, power can be supplied from the other power source, and thus it is possible to configure the power source line which is not disconnected.

Since the main power source and the sub-power source disposed in a vehicle in a distribution manner are connected to each other via the power source line of the trunk line, regenerative energy can be easily recovered in an electric car or a hybrid car, and thus it is possible to improve an energy recovery ratio.

Since a plurality of power sources are provided, power source backup handling can be performed, and thus it is possible to reduce the influence when the power source is abnormal.

(6) In the vehicular circuit body according to any one of the above (1) to (5), the trunk line further includes an earth line having a predetermined current capacity.

According to the vehicular circuit body with the configuration of the above (6), the earth line extends in parallel to the power source line in the trunk line, and thus it is possible to prevent sneaking of power source noise into the communication line.

The power source line and the earth line formed of a routing material having a flat conductor are disposed in a stacking manner such that a surface area of surfaces facing each other is increased and a gap therebetween is reduced, so that it is possible to further improve the noise resistance performance.

[Power Source-1]

In a vehicle, for example, it is necessary to cope with an automatic driving technology, and thus it is necessary to improve reliability of a power source system of a wire harness. For example, even during vehicle crash due to traffic accident, it is preferable that the supply of power to an important on-vehicle apparatus is not stopped, and a problem can be solved by only the vehicle itself. In a vehicular circuit body such as a wire harness, there is the need for reducing component cost or manufacturing cost by simplifying the configuration, or reducing the number of components by using a component in common to various kinds of vehicles.

Therefore, the vehicular circuit body is configured as described in the following (1) to (7).

(1) A vehicular circuit body provided in a vehicle, includes:

a trunk line that extends in at least a front-and-rear direction of the vehicle; and a plurality of control boxes that are provided in the trunk line, in which the trunk line includes power source lines of two systems and a communication line.

With this configuration, since the power source lines of two systems are formed between the control boxes, one power source line is used for backup so as to reduce a probability that the supply of power may be stopped, or power can be stably supplied by increasing a voltage of one system as necessary.

(2) In the vehicular circuit body according to the above (1), the power source lines of two systems transmit power of the same voltage.

With this configuration, the power source lines of two systems can be used together, or one power source line can be used for backup, depending on situations.

(3) In the vehicular circuit body according to the above (1), the power source lines of two systems transmit power of different voltages.

With this configuration, in a case where a load having large power consumption is connected, a large power source current flows, and thus a voltage drop in a supply line path increases. Thus, it is possible to prevent an increase in a power loss by selecting a higher power source voltage.

(4) In the vehicular circuit body according to the above (1) to (3), the plurality of control boxes include a first control box, and a second control box located further toward a downstream side than the first control box with respect to a power source, and in which the first control box transmits power to the second control box by using only one of the power source lines of two systems.

With this configuration, one of the power source lines of two systems is secured as a standby power source system, and in a case where abnormality occurs in a power source line in use, switching to the standby power source system can be performed.

(5) In the vehicular circuit body according to any one of the above (1) to (4), the vehicle circuit body further includes a branch line that is connected to an accessory provided in the vehicle.

With this configuration, it is possible to collectively supply power to the trunk line from a power source, and to distribute the power from the trunk line to each accessory.

(6) In the vehicular circuit body according to the above (5), one end of the branch line is connected to the control box.

With this configuration, it is possible to distribute power to be supplied to an accessory, from the control box.

(7) In the vehicular circuit body according to the above (1) to (6), the power source lines of two systems are provided to extend in parallel.

With this configuration, the power source lines of two systems can be disposed together by connecting the control boxes to each other via a single trunk line.

[Power Source-2]

In vehicles, different numbers or different kinds of electric components (accessories) for each vehicle are connected due to a difference in a vehicle, a difference in a grade, a difference in a destination, and a difference in an optional apparatus. If the number or the kind of electric component is changed, a configuration of a wire harness may be changed. A new kind of electric component which is not expected during design of a vehicle may be added to a vehicle in the future. In this case, preferably, the added electric component can be used by just being connected to an existing wire harness or the like which has already been mounted in the vehicle. It is preferable that a connection position of each electric component can be changed as necessary. It is preferable that the wire harness or the like can be configured by components in common even if the kind of vehicle, or the number or the kind of electric component to be connected is changed.

Therefore, the vehicular circuit body is configured as described in the following (1) and (2).

(1) A vehicular circuit body provided in a vehicle, includes:

a trunk line that extends in at least a front-and-rear direction of the vehicle;

a plurality of control boxes that are provided in the trunk line; and a branch line that connects the control box to an accessory.

Each of the trunk line and the branch line includes a power source line and a communication line.

Each of the plurality of control boxes includes a branch line connection portion connected to a branch line, and a branch line control unit that distributes power from the trunk line to the branch line by controlling the branch line connection portion according to a control program.

The control program can be externally changed according to an accessory connected to the branch line.

With this configuration, appropriate power can be supplied to an accessory via the branch line from the trunk line by changing the control program regardless of the kind of accessory connected to the branch line.

(2) In the vehicular circuit body according to the above (1), the branch line connection portion includes a plurality of connectors connected to ends of the branch lines, and the plurality of connectors have the same shape.

With this configuration, a connector to be connected to a branch line is not required to differ depending on an accessory, and thus it is possible to easily increase the number of accessories or to easily change accessories.

[Communication-1]

In a vehicle, for example, it is necessary to cope with an automatic driving technology, and thus it is necessary to improve reliability of, for example, a communication system of a wire harness. For example, even during vehicle crash due to traffic accident, it is preferable that a communication system used to control an important on-vehicle apparatus can be maintained in a communicable state, and abnormality does not occur in a vehicle control state. In a vehicular circuit body such as a wire harness used as a communication path, there is the need for reducing component cost or manufacturing cost by simplifying the configuration, or reducing the number of components by using a component in common to various kinds of vehicles.

Therefore, the vehicular circuit body is configured as described in the following (1).

(1) A vehicular circuit body provided in a vehicle, includes:

a trunk line that extends in at least a front-and-rear direction of the vehicle; and a plurality of control boxes that are provided in the trunk line.

The trunk line includes a power source line and a communication line.

The communication line is routed so that the plurality of control boxes are connected in a ring form.

With this configuration, even if a failure occurs in any communication line connecting the plurality of control boxes to each other, communication can be continuously performed by using a route in a direction opposite to a location where the failure occurs. Therefore, it is possible to improve the reliability of communication on the trunk line of the vehicular circuit body.

[Communication-2]

Various electric components may be connected to a wire harness of a vehicle. It is preferable to use a component in common or be able to freely change a connection position of a connector or the like of an electric component. Thus, it may be expected that a communication standard generally used is employed, or a plurality of connectors or the like having a normal shape are prepared on a wire harness of a vehicle. However, for example, from the viewpoint of security, there is a case where some connectors are required not to be freely used by a user of a vehicle or a third party unless special permission is given. However, in a case where a communication method based on a standard is employed, or a connector based on a standard is employed, a user or the like may freely use a connector in an unoccupied state, and thus a problem such as security occurs.

Therefore, the vehicular circuit body is configured as described in the following (1) to (5).

(1) A vehicular circuit body provided in a vehicle, includes:

a plurality of control boxes;

a trunk line that connects the plurality of control boxes to each other; and a branch line that directly or indirectly connects a control box to an accessory.

Each of the trunk line and the branch line includes a power source line and a communication line.

Each of the control boxes includes a plurality of branch line connection portions to and from which the communication line of the branch line is attachable and detachable.

The plurality of branch line connection portions are provided with a lock function portion that is physically or electrically brought into a lock state in a case where the branch line is not connected thereto.

With this configuration, even if branch line connection portions of the number larger than the number of connected branch lines at the present time are provided in the control box so that branch lines can be additionally connected in the future, it is possible to prevent a branch line which should not be connected from being connected to a branch line connection portion to which no branch line is connected. Therefore, for example, it is possible to prevent a program rewriting device from being connected to a branch line connection portion to which no branch line is connected for the purpose of rewriting a program of a control unit of a control box with malice.

(2) In the vehicular circuit body according to the above (1), each of the plurality of branch line connection portions includes a connector to and from which an end of the communication line is attachable and detachable, and in which the lock function portion includes a cover member that collectively covers openings of a plurality of the connectors, and a key part that prevents the cover member from being detached from the connectors in a lock state.

With this configuration, in a case where a branch line is not required to be connected to any branch line connection portion at the present time, all connectors of the branch line connection portion are collectively covered by the cover member, and the cover member cannot be detached by the key part. Thus, a branch line can be prevented from being connected to a connector wrongly or with malice.

(3) In the vehicular circuit body according to the above (1), each of the plurality of branch line connection portions includes a connector to and from which an end of the communication line is attachable and detachable. The lock function portion includes a cover member that covers at least a part of an opening of any one of the connectors, and a key part that prevents the cover member from being detached from the connector in a lock state.

With this configuration, the cover member can be attached only to a necessary connector among the plurality of connectors and not be detached. Therefore, in a case where branch lines are not connected to some connectors among the plurality of connectors, the cover member is attached to the connectors, and thus branch lines can be prevented from being connected to the connectors wrongly or with malice.

(4) In the vehicular circuit body according to the above (1), each of the plurality of branch line connection portions includes a connector to and from which an end of the communication line is attachable and detachable, and in which the lock function portion is a seal member which covers an opening of at least one of the connectors, and the seal member includes unsealing display means for identifying unsealing.

With this configuration, since the seal member has the unsealing display means, it is possible to prevent a person with malice from connecting a branch line to a connector. In a case where a branch line is illegally connected to a connector, it is easy for a dealer or the like to find out the face.

(5) In the vehicular circuit body according to the above (1), each of the plurality of branch line connection portions transmits a signal to a connected target object, and determines whether or not transmission and reception of signals to and from the target object are permitted on the basis of a response to the signal from the target object.

With this configuration, even if a branch line which should not be connected to the branch line connection portion is connected thereto, communication cannot be performed with a target object connected to the branch line, and thus it is possible to prevent ill effects from being exerted on a function of a control box or each accessory connected to the branch line through illegal communication.

[Communication-3]

Regarding communication on a vehicle, an interface based on a plurality of standards such as CAN, CXPI, and Ethernet (registered trademark) may be used. The connected electric components may employ different communication standards for each kind of vehicle, for each grade of a vehicle, or for each area on a vehicle body. Since a device such as a special communication cable, connector, or communication interface is separately prepared in order to connect communication apparatuses based on different standards to each other, a configuration of a wire harness may be complicated and connection work may be troublesome.

Therefore, the vehicular circuit body is configured as described in the following (1) and (2).

(1) A vehicular circuit body provided in a vehicle, includes:

a trunk line that extends in at least a front-and-rear direction of the vehicle;

a plurality of control boxes that are provided in the trunk line; and a branch line that directly or indirectly connects a control box to an accessory.

Each of the trunk line and the branch line includes a power source line and a communication line.

The vehicle is divided into a plurality of regions.

At least two control boxes are disposed in regions which are different from each other, each of which includes a gateway conversing communication methods for the communication line of the branch line and the communication line of the trunk line.

A plurality of the gateways can perform communication with each other via the communication line of the trunk line.

With this configuration, since the gateway conversing communication methods for the communication line of the trunk line and the communication line of the branch line is provided in each region of the vehicle, an accessory provided in a region is connected to a control box provided in the region via the branch line, and thus transmission and reception of signals can be performed between the accessory and the trunk line.

(2) In the vehicular circuit body according to the above (1), the gateway changes a communication method to correspond to a communication method used in the accessory which is connected to the gateway via the branch line.

With this configuration, various kinds of accessories can be connected to control boxes provided in the same regions as regions in which the accessories are provided, regardless of a communication method.

[Communication-4]

On a vehicle, for example, it is desirable to connect a plurality of apparatuses transmitting a large volume of data such as video signals captured by various cameras to each other. In such an environment, optical communication may be employed so that a large capacity of communication can be performed at a high speed. However, if the entire on-vehicle system is connected by using an optical communication network, the system is inevitably very expensive.

Therefore, the vehicular circuit body is configured as described in the following (1) and (2).

(1) A vehicular circuit body provided in a vehicle, includes:

a trunk line that extends in at least a front-and-rear direction of the vehicle;

a plurality of control boxes that are provided in the trunk line; and a branch line that directly or indirectly connects a control box to an accessory.

The trunk line includes a power source line and a communication line.

The branch line includes at least one of a power source line and a communication line.

The communication line of the trunk line has a transmission path for an optical signal, and the communication line of the branch line has a transmission path for an electric signal.

With this configuration, since the trunk line connecting the control boxes to each other has the transmission path for an optical signal, it is possible to increase a transmission capacity between the control boxes. Since an optical signal is used, it is hardly influenced by electromagnetic noise generated in the power source line of the trunk line or external apparatuses, and thus it is possible to increase reliability of communication.

(2) In the vehicular circuit body according to the above (1), at least one communication line of the trunk line directly connects two of the plurality of control boxes to each other.

With this configuration, two control boxes are directly connected to each other via a transmission path for an optical signal, and thus transmission and reception of signals can be performed at a high speed.

DESCRIPTION OF EMBODIMENTS

Hereinafter, specific embodiments of a vehicular circuit body of the present invention will be described with reference to the drawings.

First Embodiment (Vehicular Circuit Body)

First, a description will be made on a fundamental configuration of a vehicular circuit body.

FIG. 1 illustrates a layout and a connection state of each portion, and a summary of each module mounted on a vehicle body in a state in which a vehicular circuit body 10 according to a first embodiment of the present invention is routed on the vehicle body.

The vehicular circuit body of the present invention is used to supply power from a main power source such as an on-vehicle battery to an accessory (electric component) at each vehicle body location or used as transmission paths required to transmit and receive signals between electric components (refer to FIG. 1). In other words, a function of the vehicular circuit body of the first embodiment is the same as a general wire harness mounted in a vehicle, but a shape or a structure thereof is greatly different from that of the general wire harness.

Specifically, in order to simplify the structure, a trunk line including a power source line having a predetermined current capacity, a communication line having a predetermined communication capacity, and an earth line is formed of a routing material 20 having a simple shape such as a backbone. The "predetermined current capacity" is, for example, a current capacity which is necessary and sufficient when all electric components mountable on an attachment target vehicle are mounted thereon and are used, and the "predetermined communication capacity" is, for example, a communication capacity which is necessary and sufficient when all electric components mountable on the attachment target vehicle are mounted thereon and are used.

Various accessories (electric components) can be connected via branch lines which are connected to a plurality of control boxes disposed along this trunk line in a distribution manner.

Figure 2:
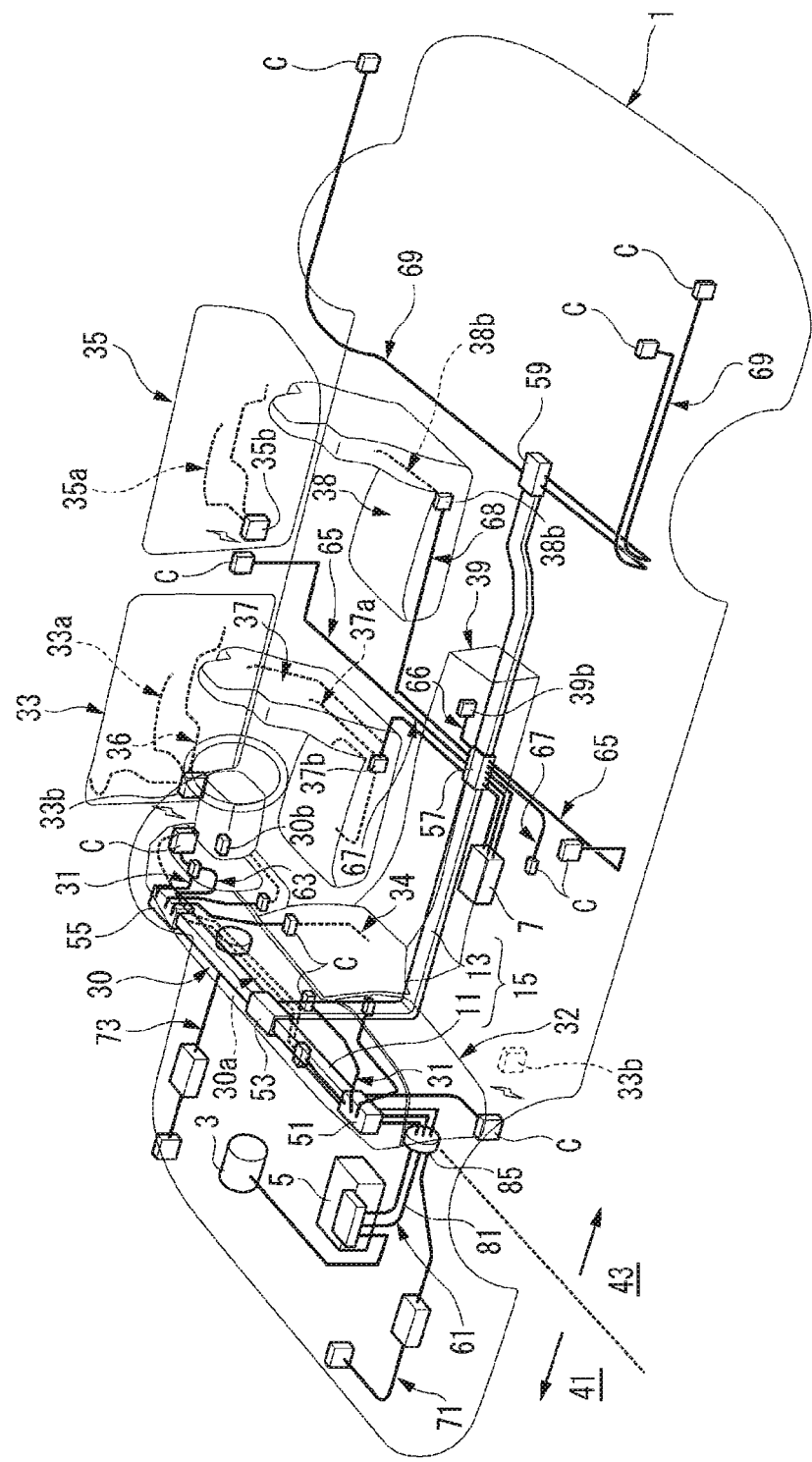
FIG. 2 is a perspective view illustrating a state in which the respective modules illustrated in FIG. 1 are mounted on the vehicle body.

The vehicular circuit body 10 according to the first embodiment illustrated in FIGS. 1 and 2 includes, as fundamental constituent elements, a trunk line (backbone trunk line portion 15) routed in a vehicle body 1 and having a power source line 21 and a communication line 29; branch lines (instrument panel branch line sub-harnesses 31, front door branch line sub-harnesses 63, rear door branch line sub-harnesses 65, a center console branch line sub-harness 66, front seat branch line sub-harnesses 67, rear seat branch line sub-harnesses 68, and luggage branch line sub-harnesses 69) connected to electric components at respective vehicle body locations; and a plurality of control boxes (a supply side control box 51, a branch control box 53, an intermediate control box 57, and control boxes 55 and 59) disposed along the trunk line in a distribution manner and having a control unit for distributing power from the power source line 21 supplied to the trunk line and signals from the communication line 29 to the branch lines connected to the trunk line.

The backbone trunk line portion 15 of the vehicular circuit body 10 according to the first embodiment is broadly divided into an instrument panel backbone trunk line portion 11 and a floor backbone trunk line portion 13.

The instrument panel backbone trunk line portion 11 is linearly disposed in a leftward-and-rightward direction at a location along a surface of a dash panel 50 so as to be substantially in parallel to a reinforcement (not illustrated) at a position above the reinforcement. The instrument panel backbone trunk line portion 11 may be fixed to the reinforcement.

The floor backbone trunk line portion 13 is disposed to extend in a front-and-rear direction of the vehicle body 1 substantially at the center of the vehicle body 1 in the leftward-and-rightward direction along a vehicle interior floor, and linearly extends in an upward-and-downward direction at the location along the surface of the dash panel 50 so that a tip end thereof is connected to an intermediate part of the instrument panel backbone trunk line portion 11. Connection portions of the instrument panel backbone trunk line portion 11 and the floor backbone trunk line portion 13 are in a state of being electrically connectable to each other via a branch portion of the branch control box 53 which will be described later. In other words, the backbone trunk line portion 15 is configured in a shape similar to a T shape by the instrument panel backbone trunk line portion 11 and the floor backbone trunk line portion 13.

The instrument panel backbone trunk line portion 11 is connected to an engine compartment sub-harness 61 via the supply side control box 51 which is disposed on the left of the vehicle body 1 which is an upstream side of the backbone trunk line portion 15. The engine compartment sub-harness 61 has a main power source cable 81 which electrically connects a main battery 5 and an alternator 3 which are main power sources disposed in an engine room (engine compartment) 41 to each other.

Here, the dash panel 50 is disposed at a boundary between the engine room 41 and a vehicle interior 43, and a location where an electrical connection member penetrates through the dash panel 50 is required to be perfectly sealed. In other words, the dash panel 50 is required to have functions of insulating vibration from the engine room 41, reducing vibration or noise from a suspension, and blocking heat, noise, and smell in order to maintain the vehicle interior 43 to be comfortable. Sufficient consideration is also required for the penetration location of the electrical connection member in order to prevent the functions from being impaired.

As described above, principal constituent elements of the vehicular circuit body 10 according to the first embodiment, that is, the instrument panel backbone trunk line portion 11, the floor backbone trunk line portion 13, the supply side control box 51, the branch control box 53, the intermediate control box 57, and the control boxes 55 and 59 are all disposed in a space on a vehicle interior 43 side. The main power source cable 81 connected to the supply side control box 51 provided at the left end of the instrument panel backbone trunk line portion 11 is routed to pass through a grommet 85 which is fitted into a penetration hole of the dash panel 50, and is thus connected to the engine compartment sub-harness 61 inside the engine room 41. Consequently, power from the main power source can be supplied to the supply side control box 51. Since an easily bendable material can be used for the main power source cable 81, a sectional shape thereof can be made a circular shape, or a sectional area thereof can be made smaller than that of the instrument panel backbone trunk line portion 11, sealing using the grommet 85 can be facilitated, and thus it is possible to prevent workability from degrading when routing work is performed.

In a case where various electric components in the engine room 41 are to be connected to the instrument panel backbone trunk line portion 11 in the vehicle interior 43, for example, a sub-harness 71 connected to the supply side control box 51 is provided to pass through the dash panel 50, or a sub-harness 73 connected to the control box 55 is provided to pass through the dash panel 50, and thus a desired electrical connection path can be realized. In this case, since the sub-harnesses 71 and 73 have small sectional areas and are easily bent, a location where the sub-harnesses pass through the dash panel 50 can be easily sealed.

The instrument panel backbone trunk line portion 11 is connected to the instrument panel branch line sub-harnesses (branch lines) 31 and the front door branch line sub-harnesses (branch line) 63 via the supply side control box 51 and the control box 55.

Each of the instrument panel branch line sub-harnesses 31 is electrically connected to a module driver 30b of an instrument panel harness 30a which is electrically connected to a control unit of an electric component such as a meter panel or an air conditioner mounted on an instrument panel module 30, via a module connector C.

Each of the front door branch line sub-harnesses 63 is preferably connected to a module driver 33b of a front door harness 33a which is electrically connected to a control unit of an electric component such as a door lock or a power window mounted on a front door 33, so that noncontact power supply and near-field wireless communication can be performed.

The floor backbone trunk line portion 13 is connected to the rear door branch line sub-harnesses (branch lines) 65, the center console branch line sub-harness (branch line) 66, the front seat branch line sub-harnesses (branch lines) 67, the rear seat branch line sub-harnesses (branch lines) 68, and a sub-battery 7 via the intermediate control box 57.

Each of rear door branch line sub-harnesses 65 is preferably connected to a module driver 35b of a rear door sub-harness 35a which is electrically connected to a control unit of an electric component such as a door lock or a power window mounted on a rear door 35, so that noncontact power supply and near-field wireless communication can be performed.

The center console branch line sub-harness 66 is electrically connected to a module driver 39b of a center console harness 39a which is electrically connected to a control unit of an electric component such as an operation panel of an air conditioner or an audio mounted on a center console 39, via a module connector C.

Each of the front seat branch line sub-harnesses 67 is electrically connected to a module driver 37b of a front seat harness 37a which is electrically connected to a control unit of an electric component such as an electric recliner or a seat heater mounted in a front seat 37, via a module connector C.

Each of the rear seat branch line sub-harnesses 68 is electrically connected to a module driver 38b of a rear seat harness 38a which is electrically connected to a control unit of an electric component such as an electric recliner or a seat heater mounted in a rear seat 38, via a module connector C.

The floor backbone trunk line portion 13 is connected to the luggage branch line sub-harnesses (branch lines) 69 via a control box 59 which is disposed on the rear side of the vehicle body 1 which is a downstream side of the trunk line.

The luggage branch line sub-harnesses 69 are electrically connected to module drivers (not illustrated) of luggage harnesses which are electrically connected to control units of various electric components in a luggage room, via module connectors C.

The module connectors C can collectively connect the power sources and the ground to the control boxes so as to efficiently transmit power and signals to the backbone trunk line portion 15 and the respective accessories.

(Routing Material)

The backbone trunk line portion 15 of the vehicular circuit body 10 according to the first embodiment has the power source line 21, the communication line 29, and the earth line 27, each of which is formed of the routing material 20 including a flat conductor 100.

In the configuration illustrated in FIG. 1, a case where there is the sub-battery (sub-power source) 7 is assumed, and thus the backbone trunk line portion 15 of the vehicular circuit body 10 includes a main power source system (power source line) 23 and a sub-power source system (power source line) 25 as the power source line 21.

The routing material 20 according to the first embodiment employs the flat conductor 100 made of a metal material (for example, a copper alloy or aluminum) whose sectional shape is a flat strip shape, and is formed by stacking the flat conductor 100 whose periphery is covered with an insulating coat 110 in a thickness direction, for the power source line 21, the earth line 27, and the communication line 29 of the backbone trunk line portion 15 (refer to FIG. 1). In other words, the main power source system 23 is stacked on the sub-power source system 25 forming the power source line 21, and, for example, the communication line 29 in which a pair of flat conductors are arranged side by side is stacked on the earth line 27 stacked on the main power source system 23.

Consequently, the routing material 20 allows a large current to pass therethrough, and bending processing in the thickness direction is relatively facilitated. The routing material 20 can be routed in a state in which the power source line 21 and the earth line 27 extend to be adjacent to each other in parallel, and can prevent sneaking of power source noise since the earth line 27 is stacked between the communication line 29 and the power source line 21.

The power source line 21 of the backbone trunk line portion 15 requires a large sectional area in order to secure a predetermined current capacity, but the power source line 21 of the present embodiment is formed of the routing material 20 having the flat conductor 100 whose sectional shape is a flat strip shape so that bending in the thickness direction is facilitated, and thus work for routing the power source line 21 along a predetermined routing path is facilitated.

(Control Boxes)

The vehicular circuit body 10 according to the first embodiment is provided with five control boxes such as the supply side control box 51 disposed at an upstream end (the left end of the instrument panel backbone trunk line portion 11) of the backbone trunk line portion 15, the branch control box 53 disposed in a branch portion (a connection portion between the instrument panel backbone trunk line portion 11 and the floor backbone trunk line portion 13) in the middle of the backbone trunk line portion 15, the intermediate control box 57 disposed in the middle (an intermediate portion of the floor backbone trunk line portion 13) of the backbone trunk line portion 15, and the control boxes 55 and 59 disposed at downstream ends (the right end of the instrument panel backbone trunk line portion 11 and the rear end of the floor backbone trunk line portion 13) of the backbone trunk line portion 15.

Figure 3A:
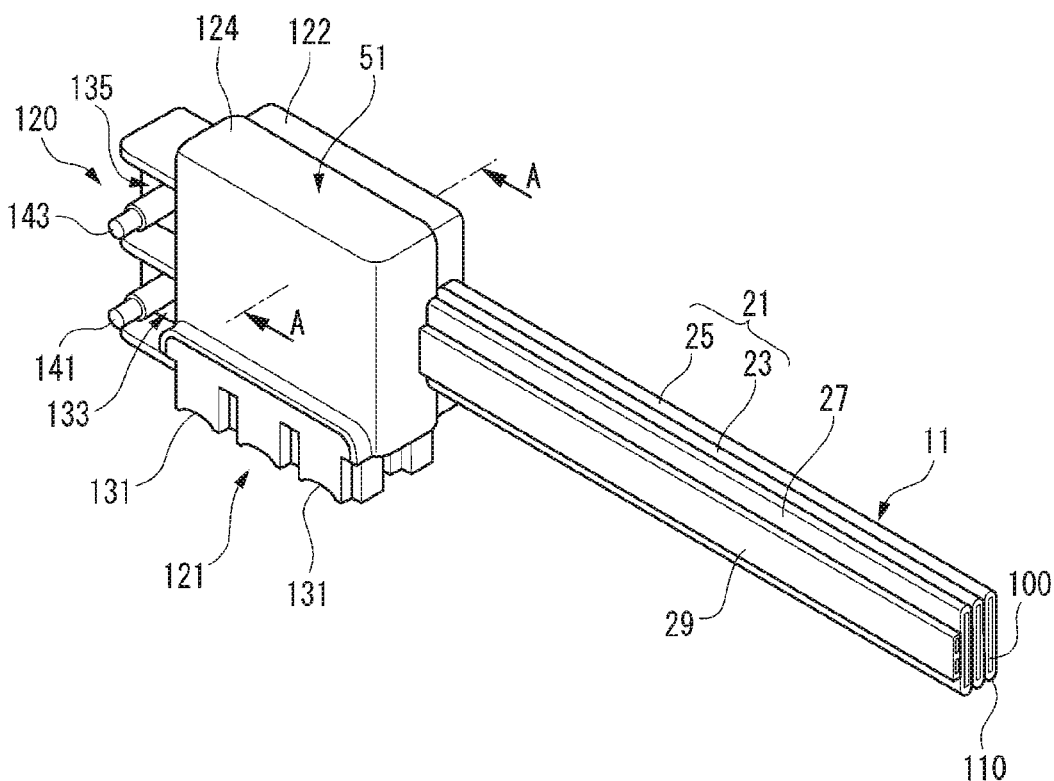
FIG. 3A is a perspective view illustrating a supply side control box illustrated in FIG. 1.

As illustrated in FIG. 3(a), the supply side control box 51 is provided with a main power source connection portion 120 which connects the main power source cable 81 to the instrument panel backbone trunk line portion 11, and a branch line connection portion 121 which connects front door branch line sub-harness 63 or a sub-harness 71 thereto. The supply side control box 51 can connect power source systems, earth systems, and communication systems of respective circuits to each other among the main power source cable 81, the instrument panel backbone trunk line portion 11, the front door branch line sub-harness 63, and the sub-harness 71.

Figure 3B:
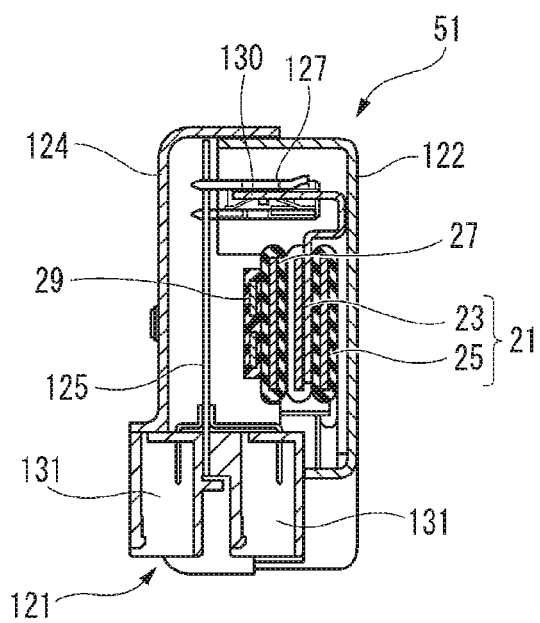
FIG. 3B is a sectional view taken along a line A-A in FIG. 3A.

As illustrated in FIG. 3(b), the supply side control box 51 accommodates a circuit board 125 in a case formed of a lower case 122 and an upper case 124. Male terminals 130 which are electrically connected to the respective flat conductors 100 of the sub-power source system 25, the main power source system 23, and the earth line 27 are fitted to three female terminals 127 mounted on the circuit board 125. The sub-power source system 25, the main power source system 23, the earth line 27, and the communication line 29 in the instrument panel backbone trunk line portion 11 are electrically branch-connected to a plurality of board connectors 131 provided at one edge of the circuit board 125 in order to form the branch line connection portion 121, via circuits or bus bars formed on the board.

The main power source connection portion 120 includes a power source connection part 133 connected to a power source line 82 of the main power source cable 81, and an earth connection part 135 connected to an earth line 84 thereof.

Figure 4A:
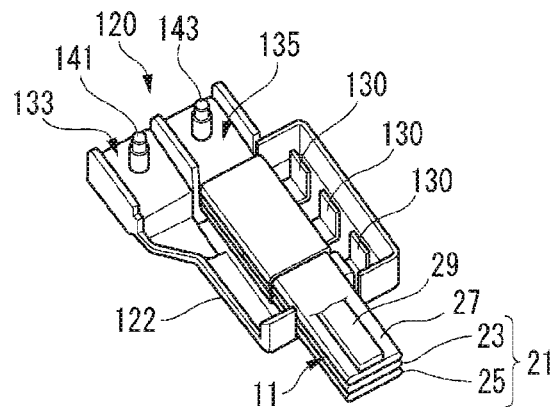
FIGS. 4A to 4C are perspective views illustrating procedures of assembling the supply side control box illustrated in FIG. 3.

As illustrated in FIG. 4(a), the flat conductor 100 of the main power source system 23 is connected to a stud bolt (power input terminal) 141 of the power source connection part 133 embedded in the lower case 122. The flat conductor 100 of the earth line 27 is connected to a stud bolt (power input terminal) 143 of the earth connection part 135 embedded in the lower case 122. The communication line 29 is connected to the circuit board 125 via, for example, a board connector (not illustrated).

Figure 4B:
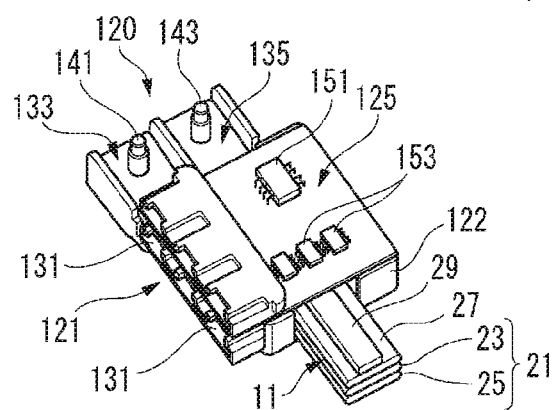

As illustrated in FIG. 4(b), the circuit board 125 is fixed to the lower case 122 so that the respective female terminals 127 are fitted to the male terminals 130 which are respectively electrically connected to the flat conductors 100. The circuit board 125 is mounted with a control unit 151 which distributes power from the power source line 21 and signals from the communication line 29 to the engine compartment sub-harness 61, the front door branch line sub-harness 63, or the sub-harness 71. The circuit board 125 is mounted with a plurality of electric components (accessories), and switching circuits 153 each including a field-programmable gate array (FPGA) device and a circuit module, as constituent elements which are required to switch between connection to states of the electric components.

Figure 4C:
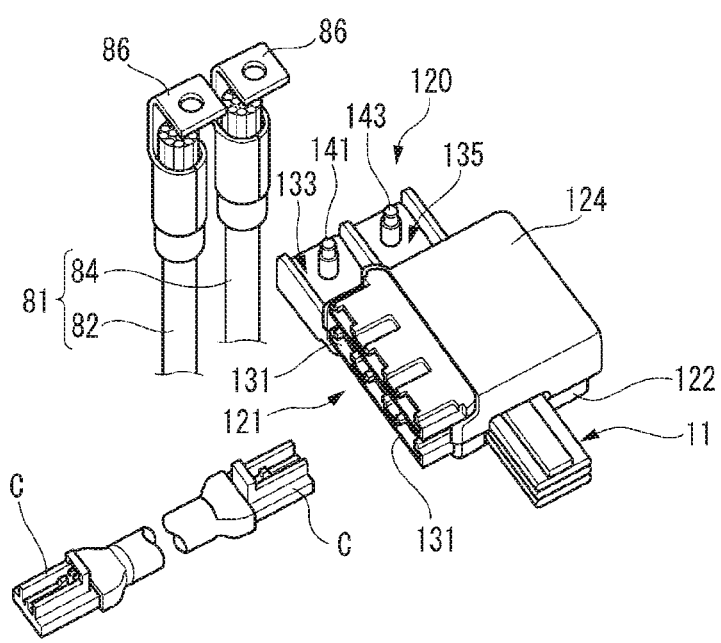

As illustrated in FIG. 4(c), a terminal 86 crimped to an end of the power source line 82 of the main power source cable 81 is nut-fastened to the flat conductor 100 of the main power source system 23 in the power source connection part 133. A terminal 86 crimped to an end of the earth line 84 of the main power source cable 81 is nut-fastened to the flat conductor 100 of the earth line 27 in the earth connection part 135. In the above-described way, the main power source cable 81 can be connected and fixed to the instrument panel backbone trunk line portion 11.

The board connectors 131 of the branch line connection portion 121 are connector-connected to the instrument panel branch line sub-harness 31, the front door branch line sub-harness 63, and the module connector C connected to an end of the sub-harness 71. The module connectors C can transmit power from the power source line 21 and the earth line 27 and signals from the communication line 29 to respective electric components.

Figure 6A:
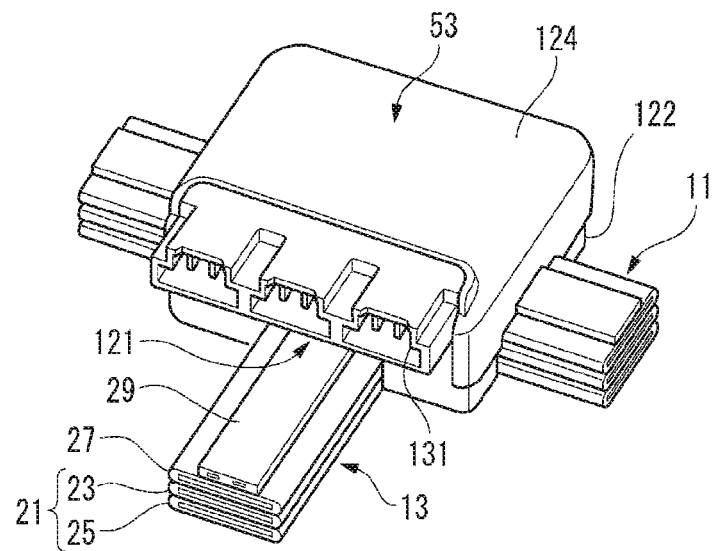
FIG. 6A is a perspective view illustrating a branch control box illustrated in FIG. 1.

As illustrated in FIG. 6(a), the branch control box 53 is disposed in the branch portion in the middle of the backbone trunk line portion 15, which is the connection portion between the instrument panel backbone trunk line portion 11 and the floor backbone trunk line portion 13, and includes the branch line connection portion 121 for connecting sub-harnesses (branch lines) connected to electric components (not illustrated). The branch control box 53 can connect power source systems, earth systems, and communication systems of respective circuits to each other among the instrument panel backbone trunk line portion 11, the floor backbone trunk line portion 13, and the sub-harnesses.

In the same manner as the supply side control box 51, the branch control box 53 accommodates a circuit board 125 in a case formed of a lower case 122 and an upper case 124. The sub-power source system 25, the main power source system 23, the earth line 27, and the communication line 29 in the instrument panel backbone trunk line portion 11 are electrically branch-connected to a plurality of board connectors 131 provided at one edge of the circuit board 125, via circuits or bus bars formed on the board.

Figure 14:
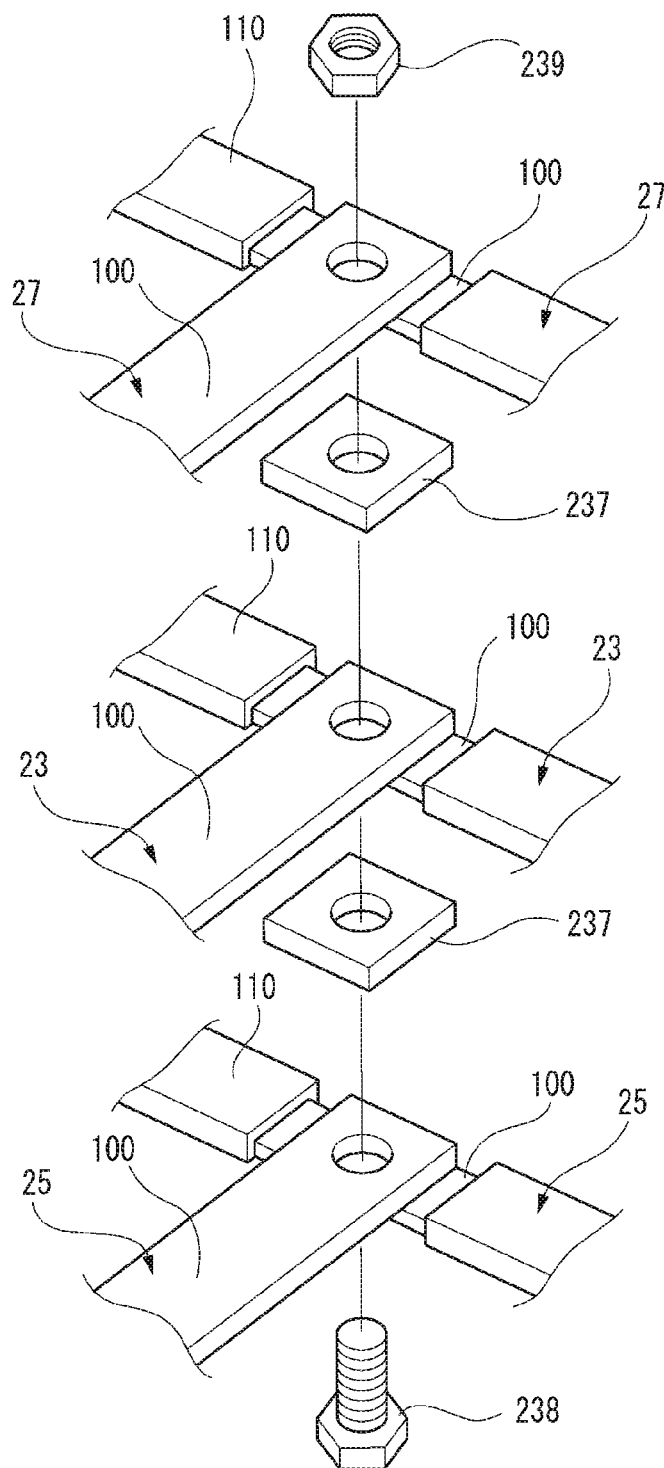
FIG. 14 is a perspective view for explaining a connection structure example of a routing material formed of flat conductors according to the present embodiment.

The sub-power source systems 25, the main power source systems 23, and the earth lines 27 in the instrument panel backbone trunk line portion 11 and the floor backbone trunk line portion 13 may be electrically connected and fixed to each other, for example, by welding or bolt-fastening the flat conductors 100 thereof (refer to FIG. 14). The communication lines 29 in the instrument panel backbone trunk line portion 11 and the floor backbone trunk line portion 13 may be electrically connected and fixed to each other, for example, through connector connection.

Figure 6B:
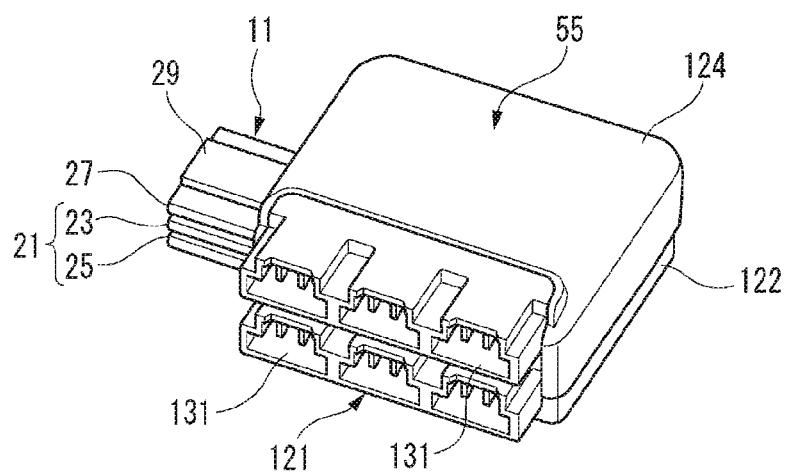
FIG. 6B is a perspective view illustrating a control box illustrated in FIG. 1.

As illustrated in FIG. 6(b), the control box 55 is disposed at the downstream end of the backbone trunk line portion 15, which is the right end of the instrument panel backbone trunk line portion 11, and includes a branch line connection portion 121 for connection to the front door branch line sub-harness 63 or a sub-harness 73. The control box 55 can connect power source systems, earth systems, and communication systems of respective circuits to each other among the instrument panel backbone trunk line portion 11, the front door branch line sub-harness 63, and the sub-harness 73.

In the same manner as the supply side control box 51, the control box 55 accommodates a circuit board 125 in a case formed of a lower case 122 and an upper case 124. Male terminals 130 which are electrically connected to the respective flat conductors 100 of the sub-power source system 25, the main power source system 23, and the earth line 27 are fitted into three female terminals 127 mounted on the circuit board 125 (refer to FIG. 3(b)). The sub-power source system 25, the main power source system 23, the earth line 27, and the communication line 29 in the instrument panel backbone trunk line portion 11 are electrically branch-connected to a plurality of board connectors 131 provided at one edge of the circuit board 125 in order to form the branch line connection portion 121, via circuits or bus bars formed on the board.

The control box 59 disposed at the rear end of the floor backbone trunk line portion 13 has the same configuration as that of the control box 55.

Figure 6C:
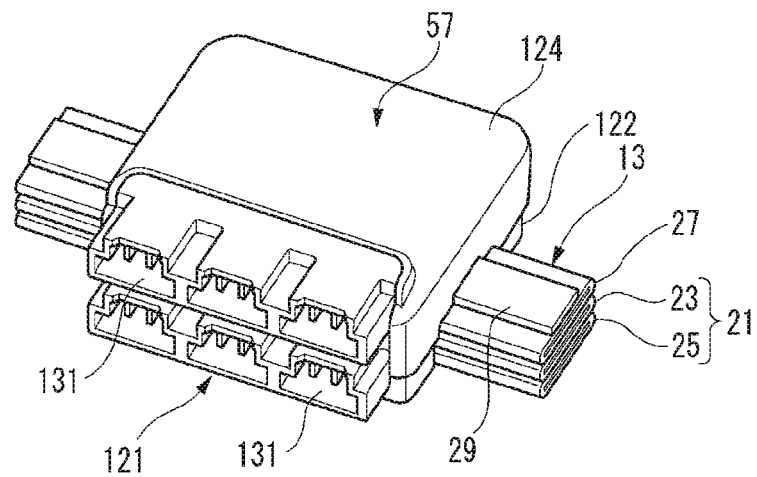
FIG. 6C is a perspective view illustrating an intermediate control box illustrated in FIG. 1.

As illustrated in FIG. 6(*c*), the intermediate control box 57 is disposed in the middle of the backbone trunk line portion 15, which is an intermediate portion of the floor backbone trunk line portion 13, and includes a branch line connection portion 121 for connection to the rear door branch line sub-harnesses 65, the center console branch line sub-harness 66, the front seat branch line sub-harnesses 67, the rear seat branch line sub-harnesses 68, and the sub-battery 7. The intermediate control box 57 can connect power source systems, earth systems, and communication systems of respective circuits to each other among the floor backbone trunk line portion 13, the rear door branch line sub-harnesses 65, the center console branch line sub-harness 66, the front seat branch line sub-harnesses 67, the rear seat branch line sub-harnesses 68, and the sub-battery 7.

In the same manner as the supply side control box 51, the intermediate control box 57 accommodates a circuit board 125 in a case formed of a lower case 122 and an upper case 124. The sub-power source system 25, the main power source system 23, the earth line 27, and the communication line 29 in the floor backbone trunk line portion 13 are electrically branch-connected to a plurality of board connectors 131 provided at one edge of the circuit board 125, via circuits or bus bars formed on the board.

The above-described respective control boxes (the supply side control box 51, the branch control box 53, the intermediate control box 57, and the control boxes 55 and 59) can cope with most vehicle models by appropriately changing a plurality of kinds of circuit boards 125 having the branch line connection portions 121 corresponding to a grade or a target specification of an attachment target vehicle, and thus it is possible to reduce the number of components by using a component in common.

Figure 5A:
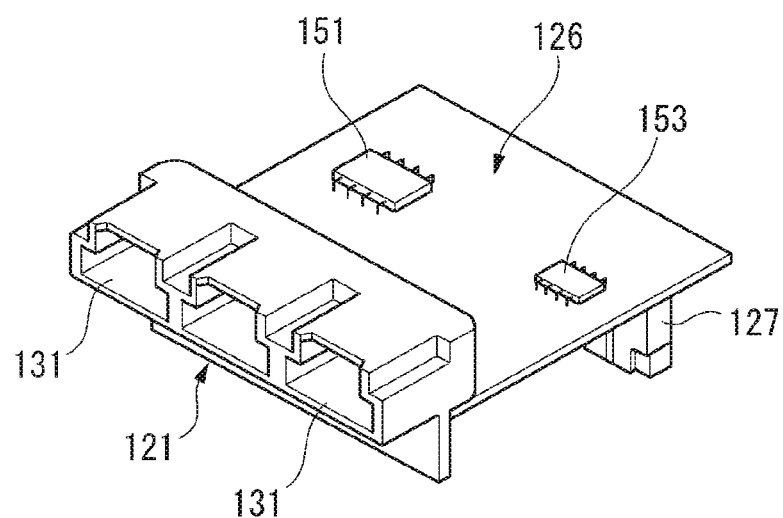
FIGS. 5A and 5B are perspective views for explaining a circuit board according to the present embodiment.
Figure 5B:
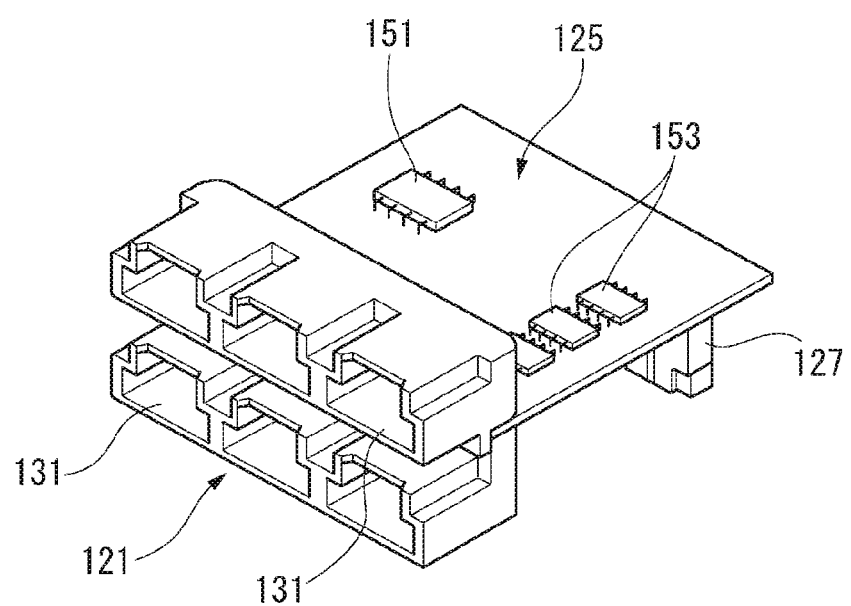

For example, a circuit board 126 illustrated in FIG. 5(*a*) includes three board connectors 131 forming the branch line connection portion 121, a control unit 151, and a single switching circuit 153.

In contrast, a circuit board 125 illustrated in FIG. 5(*b*) includes six board connectors 131 forming the branch line connection portion 121, a control unit 151, and three switching circuits 153.

The circuit board 126 and the circuit board 125 can be accommodated in a common case formed of a lower case 122 and an upper case 124.

(Module)

In the vehicular circuit body 10 according to the first embodiment, the instrument panel branch line sub-harnesses 31, the front door branch line sub-harnesses 63, the rear door branch line sub-harnesses 65, the center console branch line sub-harness 66, the front seat branch line sub-harnesses 67, the rear seat branch line sub-harnesses 68, and the like, which are connected to the backbone trunk line portion 15 as branch lines, are configured as modules integrated with the instrument panel module 30, the front doors 33, the rear doors 35, the center console 39, the front seats 37, the rear seats 38, and the like.

In other words, the instrument panel branch line sub-harness 31 is connected to the module driver 30*b* of the instrument panel harness 30*a* which is electrically connected to a control unit of an electric component mounted on the instrument panel module 30, and can thus be configured as a module integrated with the instrument panel module 30.

Each of the front door branch line sub-harnesses 63 is connected to the module driver 33*b* of the front door harness 33*a* which is electrically connected to a control unit of an electric component mounted on the front door 33, so that noncontact power supply and near-field wireless communication can be performed, and can thus be configured as a module integrated with the front door 33.

Each of rear door branch line sub-harnesses 65 is connected to the module driver 35*b* of the rear door sub-harness 35*a* which is electrically connected to a control unit of an electric component mounted on the rear door 35, so that noncontact power supply and near-field wireless communication can be performed, and can thus be configured as a module integrated with the rear door 35.

The center console branch line sub-harness 66 is electrically connected to the module driver 39*b* of the center console harness 39*a* which is electrically connected to a control unit of an electric component mounted on a center console 39, and can thus be configured as a module integrated with the instrument panel module 30.

Each of the front seat branch line sub-harnesses 67 is electrically connected to the module driver 37*b* of the front seat harness 37*a* which is electrically connected to a control unit of an electric component mounted in the front seat 37, and can thus be configured as a module integrated with the front seat 37.

Each of the rear seat branch line sub-harnesses 68 is electrically connected to the module driver 38*b* of the rear seat harness 38*a* which is electrically connected to a control unit of an electric component mounted in the rear seat 38, and can thus be configured as a module integrated with the rear seat 38.

As illustrated in FIG. 1, the instrument panel module 30 according to the present embodiment is formed of a plurality of instrument panel sub-modules such as a glove box 32, a center cluster 34, and a steering wheel 36 along with an instrument panel main body.

Figure 7:
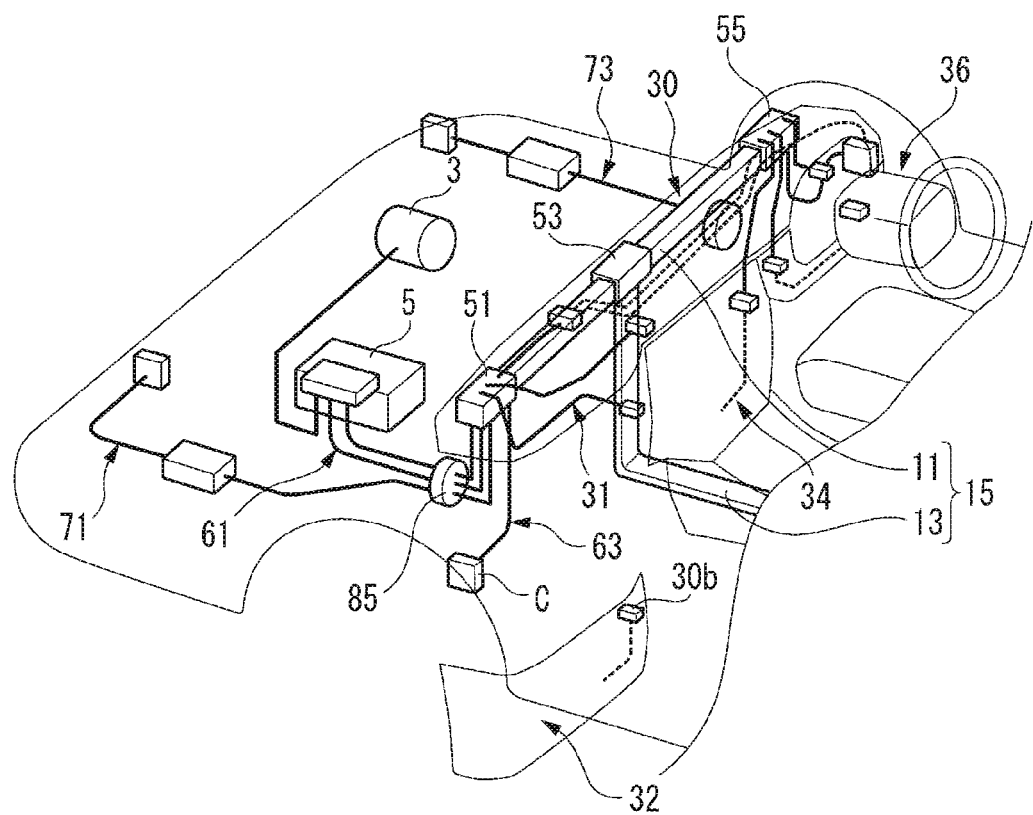
FIG. 7 is a principal portion enlarged perspective view for explaining an instrument panel module illustrated in FIG. 2.

As illustrated in FIG. 7, the supply side control box 51 disposed on the left side in the instrument panel backbone trunk line portion 11 is located on the left side in the vehicle body 1 of the instrument panel module 30 to which the glove box 32 is attached.

Therefore, in a case where a mechanical relay or a mechanical fuse for distributing power is provided in the supply side control box 51 which is electrically connected to the main battery 5 via the main power source cable 81, the mechanical relay or the mechanical fuse in the supply side control box 51 can be easily accessed by detaching the glove box 32, and thus the maintenance for exchanging the mechanical relay or the mechanical fuse is facilitated.

(Branch Box)

Figure 8:
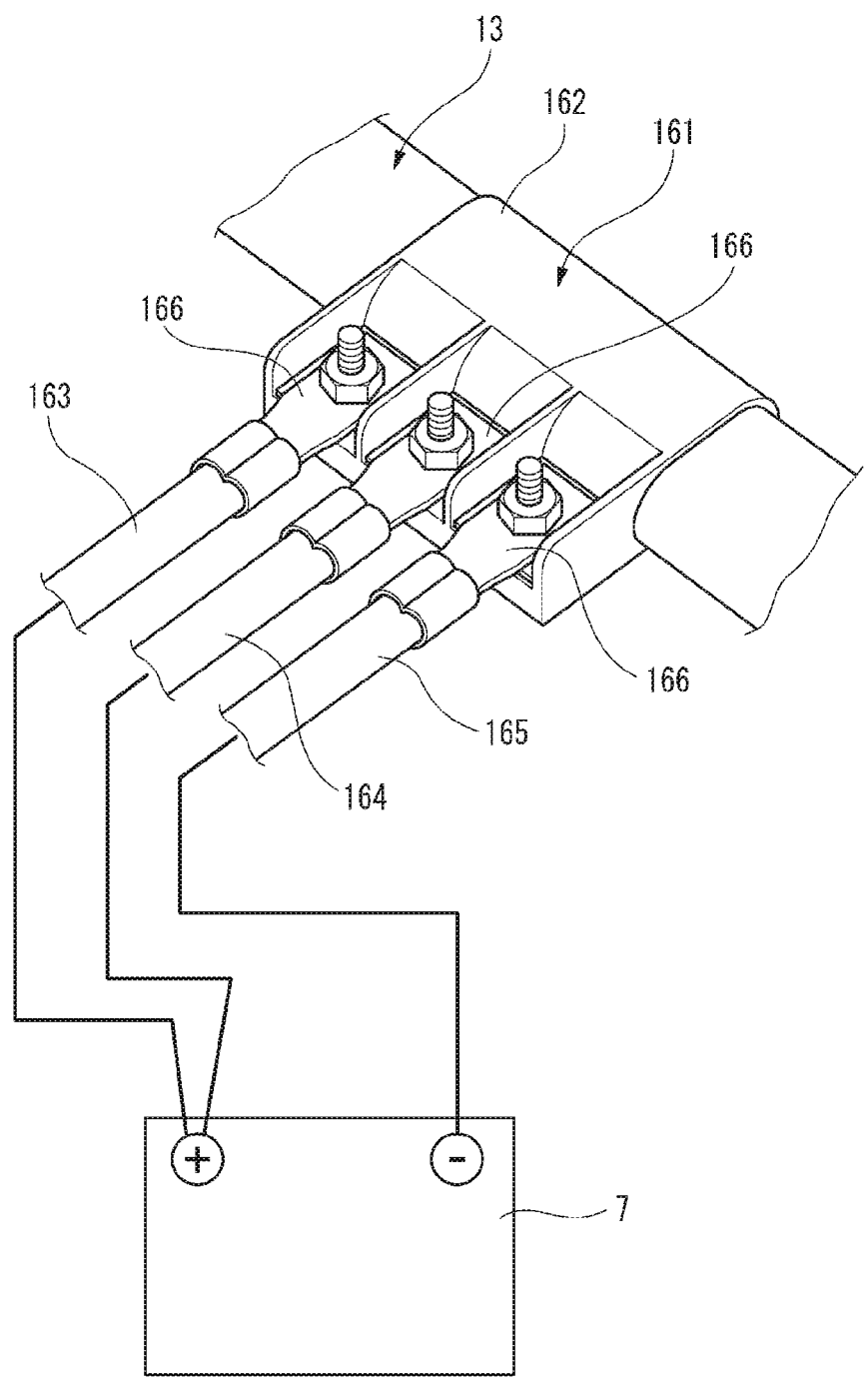
FIG. 8 is a schematic configuration diagram for explaining a branch box according to the present embodiment.

The vehicular circuit body 10 according to the present embodiment may be provided with a branch box 161 in the middle of the backbone trunk line portion 15 (for example, in the middle of the floor backbone trunk line portion 13) as illustrated in FIG. 8. The branch box 161 is connected to, for example, the sub-battery 7.

Figure 9A:
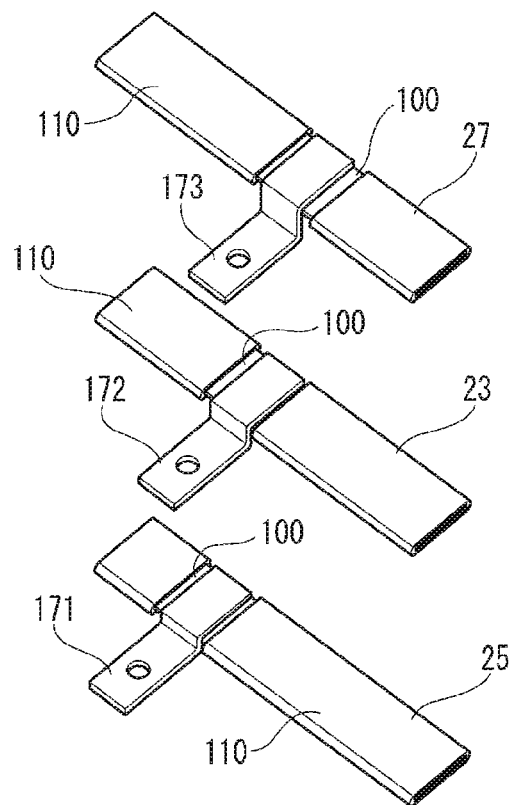
FIGS. 9A to 9C are perspective views for explaining a structure of the branch box illustrated in FIG. 8.

In order to provide the branch box 161 in the middle of the floor backbone trunk line portion 13, first, as illustrated in FIG. 9(*a*), the insulating coats 110 are peeled off at predetermined locations of the sub-power source system 25, the main power source system 23, the earth line 27 so as to expose the flat conductors 100, and connection terminals 171, 172 and 173 are respectively connected to the flat conductors 100 through welding or the like.

Figure 9B:
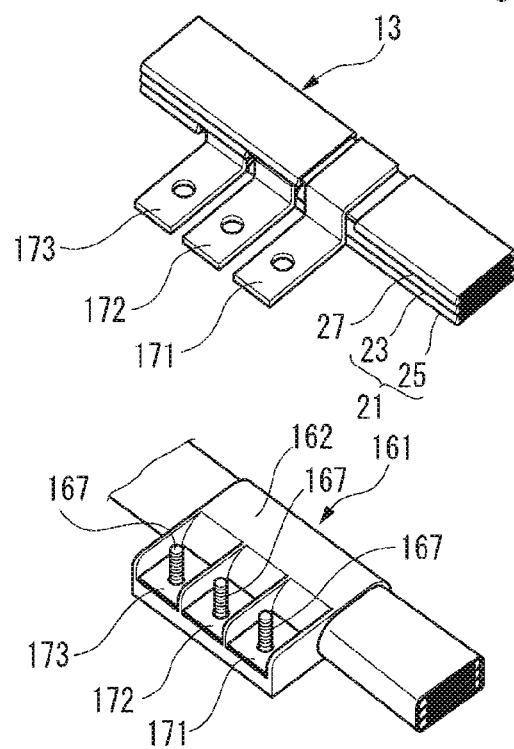

Next, as illustrated in FIG. 9(b), the sub-power source system 25, the main power source system 23, and the earth line 27 are stacked so that the connection terminals 171, 172 and 173 are arranged side by side.

Figure 9C:
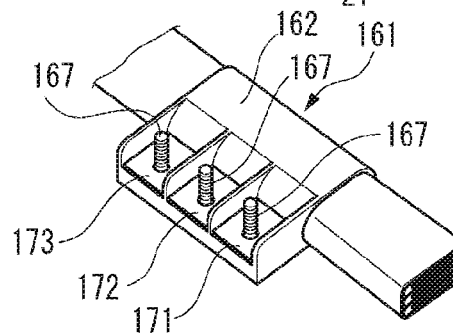

As illustrated in FIG. 9(c), the portion from which the insulating coat 110 of the floor backbone trunk line portion 13 is peeled off is covered with a case 162 in which three stud bolts 167 are studded, and the stud bolts 167 are respectively attached to the connection terminals 171, 172 and 173 so as to penetrate through penetration holes thereof.

As illustrated in FIG. 8, LA terminals 166 crimped to ends of power source cables 163, 164 and 165 connected to the sub-battery 7 are inserted with the stud bolts 167, and are fixed thereto with nuts. Therefore, the sub-power source system 25 and the main power source system 23 are connected to a positive electrode of the sub-battery 7 via the power source cables 163 and 164, and the earth line 27 is connected to a negative electrode of the sub-battery 7 via the power source cable 165.

As mentioned above, the branch box 161 is provided in the middle of the floor backbone trunk line portion 13, so that the sub-battery 7 can be reliability and easily connected to the floor backbone trunk line portion 13.

(Effects of Vehicular Circuit Body)

As described above, according to the vehicular circuit body 10 of the first embodiment, it is possible to provide a vehicular circuit body with a simple structure by using the backbone trunk line portion 15 which has a predetermined current capacity and a predetermined communication capacity and is routed in the vehicle body 1; and the branch lines (the instrument panel branch line sub-harnesses 31, the front door branch line sub-harnesses 63, the rear door branch line sub-harnesses 65, the center console branch line sub-harness 66, the front seat branch line sub-harnesses 67, the rear seat branch line sub-harnesses 68, the luggage branch line sub-harnesses 69, and the like) which connect electric components at respective vehicle body locations to the backbone trunk line portion 15 via the five control boxes (the supply side control box 51, the branch control box 53, the intermediate control box 57, and the control boxes 55 and 59) disposed in a distribution manner along the backbone trunk line portion 15.

In other words, it becomes easier to manufacture the backbone trunk line portion 15 which has a simple shape as a whole and is formed of the instrument panel backbone trunk line portion 11 extending in the leftward-and-rightward direction of the vehicle body 1 and the floor backbone trunk line portion 13 extending in the front-and-rear direction of the vehicle body 1 substantially at the center of the vehicle body 1. The backbone trunk line portion 15 has a division structure of being able to be divided into a plurality of portions among the control boxes, and the portions can be connected to each other via the control boxes.

The branch lines (the instrument panel branch line sub-harnesses 31, the front door branch line sub-harnesses 63, the rear door branch line sub-harnesses 65, the center console branch line sub-harness 66, the front seat branch line sub-harnesses 67, the rear seat branch line sub-harnesses 68, the luggage branch line sub-harnesses 69, and the like) connected to the plurality of control boxes (the supply side control box 51, the branch control box 53, the intermediate control box 57, and the control boxes 55 and 59) disposed in a distribution manner along the backbone trunk line portion 15 are results obtained through subdivision for the respective areas of the vehicle body, and electric wire lengths can be reduced since circuit specification differences of the respective areas are distributed. Therefore, it is possible to improve the productivity, and also to reduce the transport cost since a packing ratio of miniaturized branch lines obtained through subdivision increases.

The vehicular circuit body 10 is separately formed of the backbone trunk line portion 15 which is used in common to a plurality of vehicle models, grades, or options, and the branch lines (the instrument panel branch line sub-harnesses 31, the front door branch line sub-harnesses 63, the rear door branch line sub-harnesses 65, the center console branch line sub-harness 66, the front seat branch line sub-harnesses 67, the rear seat branch line sub-harnesses 68, the luggage branch line sub-harnesses 69, and the like) which are changed depending on a plurality of vehicle models, grades, or to optional accessories. Therefore, even if the number of vehicle models, grades, or optional accessories increases, only the branch lines having different wirings need to be prepared depending on a plurality of vehicle models, grades, or optional accessories, and thus it is possible to facilitate manufacturing of the vehicular circuit body 10 and to reduce cost.

The backbone trunk line portion 15 according to the first embodiment is formed in a T shape in which the power source line 21 and the communication line 29 branch at the branch portion at which the branch control box 53 is disposed and which is a connection portion between the instrument panel backbone trunk line portion 11 and the floor backbone trunk line portion 13. Therefore, since the backbone trunk line portion 15 branches into a plurality of portions in the branch portion, a plurality of control boxes (the supply side control box 51, the branch control box 53, the intermediate control box 57, and the control boxes 55 and 59) disposed in a distribution manner in the instrument panel backbone trunk line portion 11 and the floor backbone trunk line portion 13 can be disposed at respective locations of the vehicle body 1. Therefore, it is possible to easily supply power to or easily transmit and receive communication data (signal) to and from accessories (electric components) disposed at the respective locations of the vehicle body 1 via the branch lines (the instrument panel branch line sub-harnesses 31, the front door branch line sub-harnesses 63, the rear door branch line sub-harnesses 65, the center console branch line sub-harness 66, the front seat branch line sub-harnesses 67, the rear seat branch line sub-harnesses 68, the luggage branch line sub-harnesses 69, and the like) connected to the control boxes. Thus, it is also possible to shorten the branch lines.

The trunk line of the present invention is not limited to a T shape formed by the instrument panel backbone trunk line portion 11 and the floor backbone trunk line portion 13, and may employ various forms such as an I shape or an H shape.

According to the vehicular circuit body 10 of the first embodiment, the main battery (main power source) 5 and the sub-battery (sub-power source) 7 are disposed in a distribution manner in the power source line 21 of the backbone trunk line portion 15. Therefore, a voltage fluctuation in a case where power required in each accessory (electric component) is high can be reduced by supplying a current from each power source. In a case where the supply of power from one power source is stopped due to vehicle crash, power can be supplied from the other power source, and thus it is possible to configure the power source line 21 which is not disconnected.

Since the main battery 5 and the sub-battery 7 disposed in a vehicle in a distribution manner are connected to each other via the power source line 21 of the backbone trunk line portion 15, regenerative energy can be easily recovered in an electric car or a hybrid car, and thus it is possible to improve an energy recovery ratio.

Since a plurality of power sources are provided, power source backup handling can be performed, and thus it is possible to reduce the influence when the power source is abnormal.

Modification Examples

Hereinafter, a detailed description will be made on a modification example of each configuration of the vehicular circuit body 10 according to the first embodiment.

Figure 10:
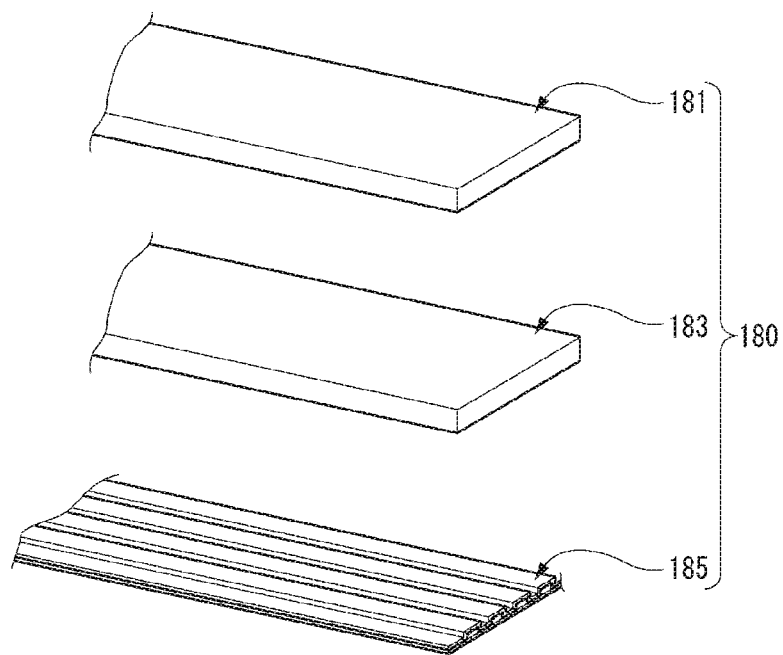
FIG. 10 is an exploded perspective view illustrating a modification example of a routing material according to the present embodiment.

FIG. 10 is an exploded perspective view illustrating a modification example of a routing material according to the present embodiment.

A routing material 180 forming a backbone trunk line portion is provided with a power source line 181 and an earth line 183 formed of aluminum flat conductors, and a communication line 185 formed of a flexible printed circuit (FPC).

Therefore, the routing material 180 can be routed in a state in which the power source line 181 and the earth line 183 are disposed to be adjacent to each other in parallel, and can prevent sneaking of power source noise since the earth line 183 is stacked between the communication line 185 and the power source line 181.

Since the power source line 181 and the earth line 183 in the routing material 180 are formed of the aluminum flat conductors and the communication line 185 is formed of the FPC, a lightweight and thin backbone trunk line portion can be provided.

Figure 11:
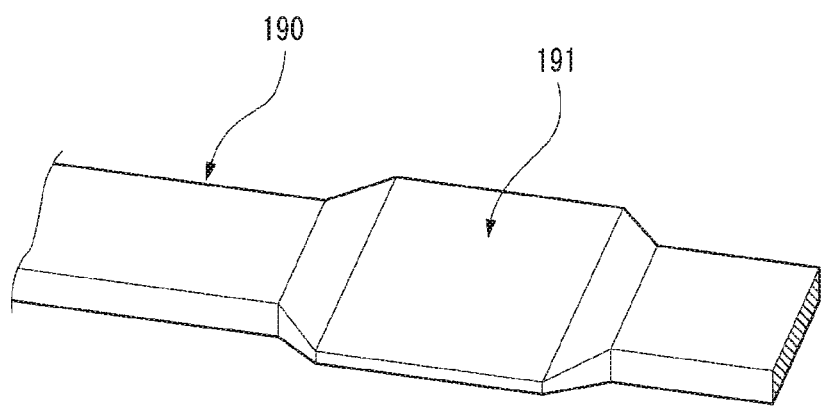
FIG. 11 is a principal portion perspective view illustrating a modification example of a flat conductor according to the present embodiment.

FIG. 11 is a principal portion perspective view illustrating a modification example of a flat conductor according to the present embodiment.

As illustrated in FIG. 11, a flat conductor 190 for forming a power source line or an earth line has a thin plate portion 191 formed at a part thereof in a longitudinal direction as appropriate.

Therefore, the flat conductor 190 is easily bent at the thin plate portion 191 in a plate thickness direction, and can thus be easily bent along a shape of a vehicle body when a backbone trunk line portion is routed in the vehicle body 1. Thus, it is possible to improve the routing property of the backbone trunk line portion.

Figure 12:
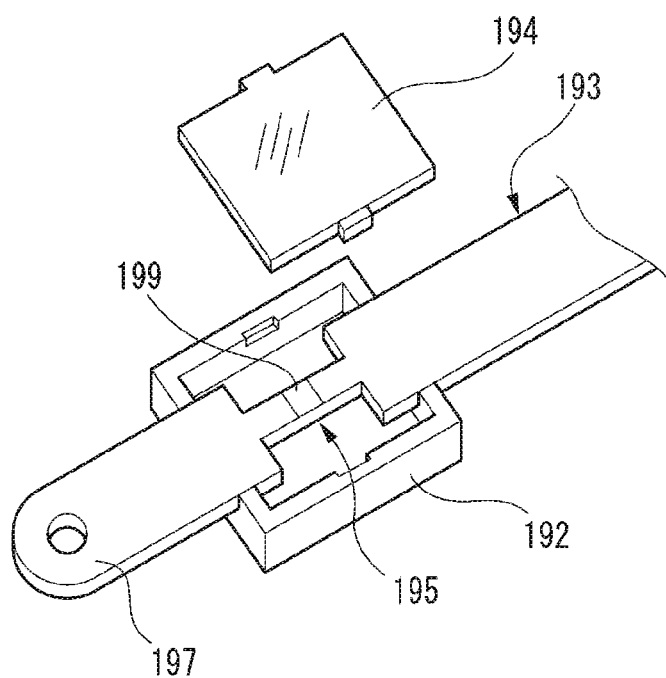
FIG. 12 is a perspective view for explaining a fuse provided in a flat conductor according to the present embodiment.

FIG. 12 is a perspective view for explaining a fuse provided in a flat conductor according to the present embodiment.

A power source line 193 connected to a battery is formed of a flat conductor, and an attachment hole 197 into which a battery post is fitted is formed at a tip end thereof.

A fuse 195 is integrally formed on a basal end side of the attachment hole 197. The fuse 195 is obtained by providing a meltable member 199 made of a low melting metal in a small-diameter portion in which a width of the flat conductor is reduced. The fuse 195 is covered with a fuse housing 192 having a transparent lid 194.

According to the power source line 193 integrally having the fuse 195, it is not necessary to separately provide a fuse when the power source line is connected to a battery, and the number of components can be prevented from increasing.

Figure 13A:
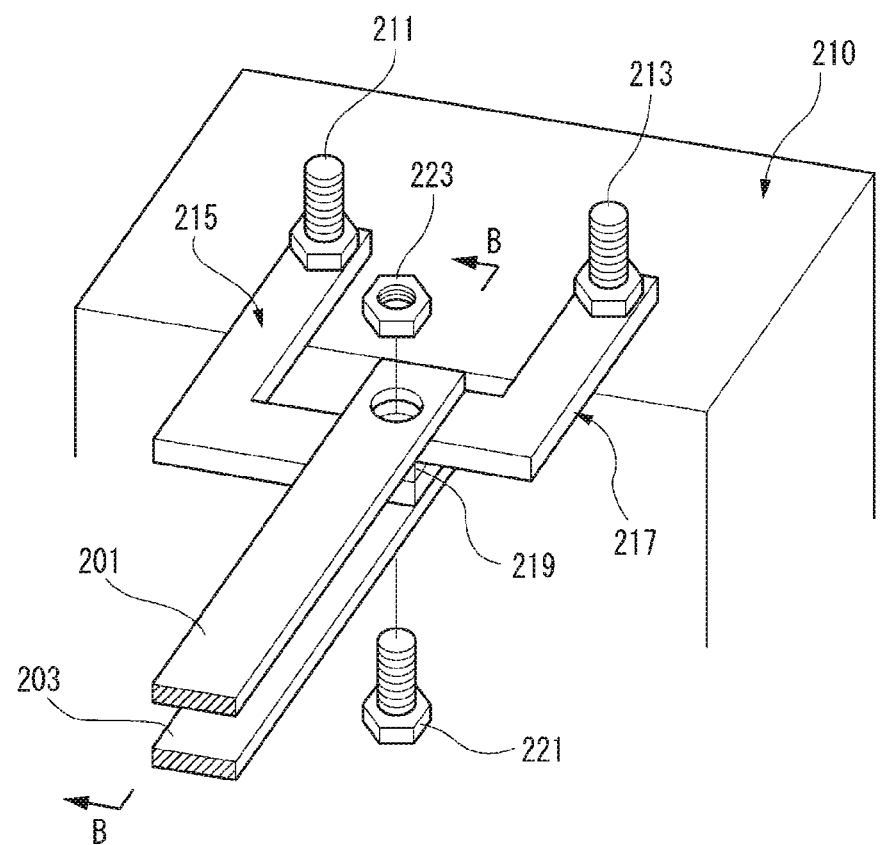
FIG. 13A is a perspective view for explaining an example in which a power source line and an earth line formed of flat conductors according to the present embodiment are connected to a battery.
Figure 13B:
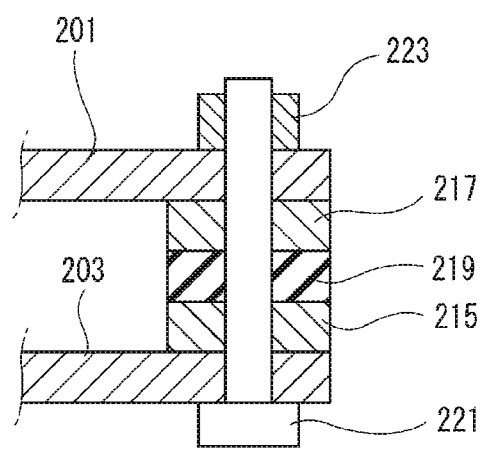
FIG. 13B is a sectional view taken along a line B-B in FIG. 13A.

FIG. 13 shows a perspective view and a sectional view for explaining an example in which a power source line and an earth line formed of flat conductors according to the present embodiment are connected to a battery.

As illustrated in FIG. 13, a power source line 201 and an earth line 203 in a backbone trunk line portion are formed of flat conductors, and have penetration holes formed at tip ends thereof.

An L-shaped bus bar 217 bent inward is electrically connected and fixed to a positive terminal 213 of a battery 210, and an L-shaped bus bar 215 bent inward is electrically connected and fixed to a negative terminal 211. Penetration holes respectively formed at tip ends of the intersecting bus bars 215 and 217 are concentrically disposed so that a bolt 221 can penetrate therethrough.

The power source line 201 overlaps an upper surface of the bus bar 217 and the earth line 203 overlaps a lower surface of the bus bar 215 with an insulating sheet 219 having a hole interposed therebetween at the tip ends of the bus bars 215 and 217, and, in this state, the bolt 221 penetrating therethrough is fastened and fixed by a nut 223.

As a result, the power source line 201 is connected to the positive terminal 213 of the battery 210 via the bus bar 217, and the earth line 203 is connected to the negative terminal 211 of the battery 210 via the bus bar 215, without using a complex connection structure.

According to the battery connection structure, since the power source line 201 and the earth line 203 formed of flat conductors can be separately connected to the battery 210 in a state of being routed in parallel, it is possible to improve noise resistance.

FIG. 14 is a perspective view for explaining a connection structure example of a routing material formed of flat conductors according to the present embodiment.

In a connection structure illustrated in FIG. 14, for example, in the branch control box 53 illustrated in FIG. 6(a), the flat conductors 100 of the sub-power source systems 25, the main power source systems 23, and the earth lines 27 in the instrument panel backbone trunk line portion 11 and the floor backbone trunk line portion 13 are electrically connected and fixed to each other through bolt-fastening.

First, parts of the insulating coats 110 of the sub-power source system 25, the main power source system 23, and the earth line 27 in the instrument panel backbone trunk line portion 11 are peeled off so as to expose the flat conductors 100, and penetration holes are formed therein. Parts of the insulating coats 110 of the sub-power source system 25, the main power source system 23, and the earth line 27 in the floor backbone trunk line portion 13 are peeled off so as to expose the flat conductors 100, and penetration holes are formed therein.

Next, the flat conductors 100 of the sub-power source system 25, the main power source system 23, and the earth line 27 in the floor backbone trunk line portion 13 respectively overlap the flat conductors 100 of the sub-power source system 25, the main power source system 23, and the earth line 27 in the instrument panel backbone trunk line portion 11.

Insulating plate 237 having holes are interposed between the overlapping sub-power source systems 25 and the overlapping main power source systems 23, and between the overlapping main power source systems 23 and the overlapping earth lines 27, and, in this state, an insulating bolt 238 penetrating therethrough is fastened and fixed by an insulating nut 239. The insulating bolt 238 and the insulating nut 239 are preferably made of electrically insulating engineering plastic or ceramic.

As a result, the flat conductors 100 of the sub-power source systems 25, the main power source systems 23, and the earth lines 27 in the instrument panel backbone trunk line portion 11 and the floor backbone trunk line portion 13 are firmly fastened to each other with the bolt.

Figure 15A:
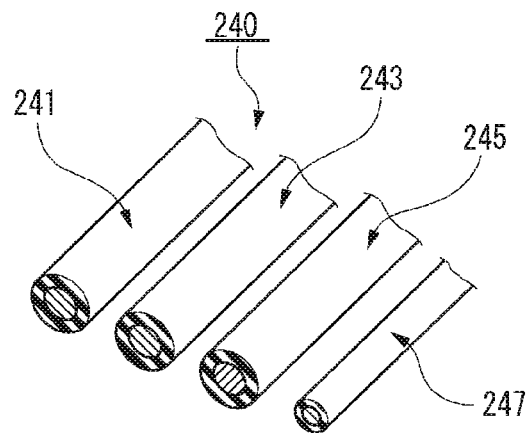
FIGS. 15A to 15C are perspective views for explaining arrangements of power source lines according to the present embodiment.
Figure 15B:
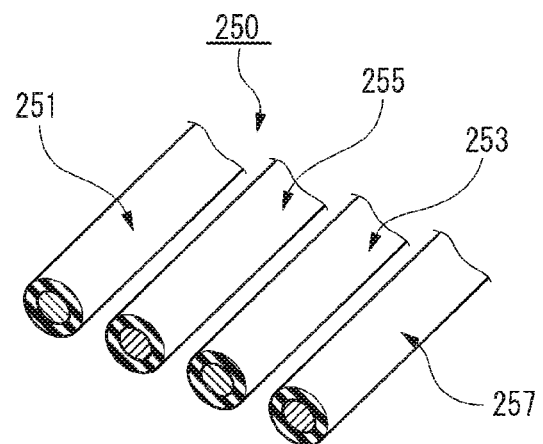
Figure 15C:
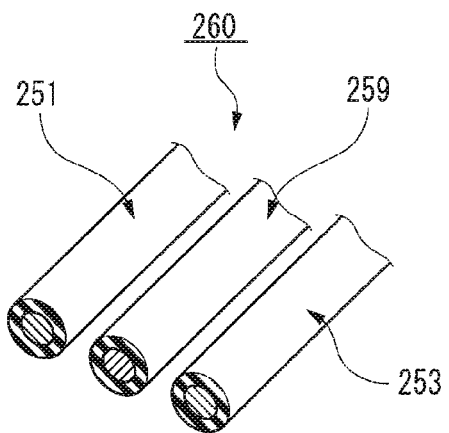
Figure 16A:
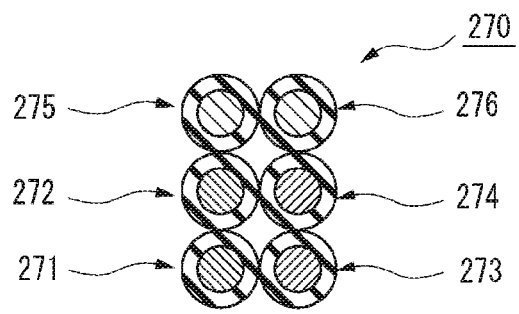
FIGS. 16A to 16D are sectional views for explaining arrangements of routing materials according to the present embodiment.
Figure 16B:
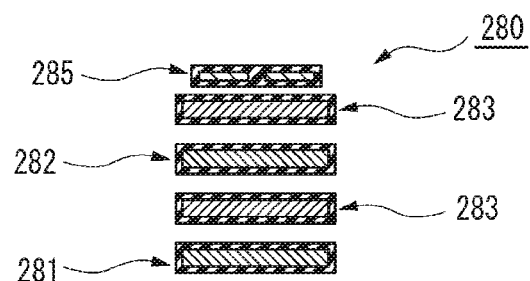
Figure 16C:
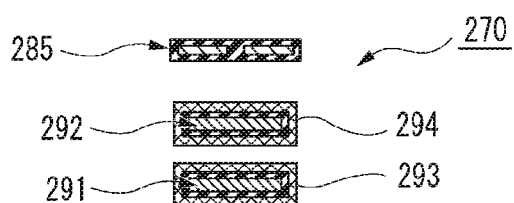
Figure 16D:
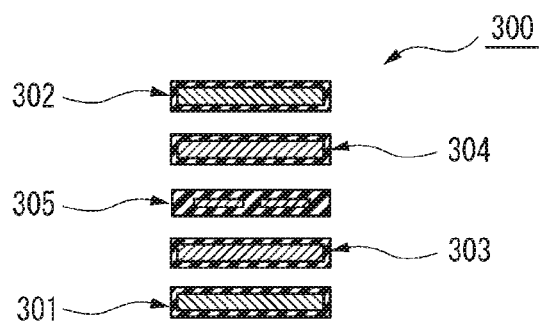
Figure 17A:
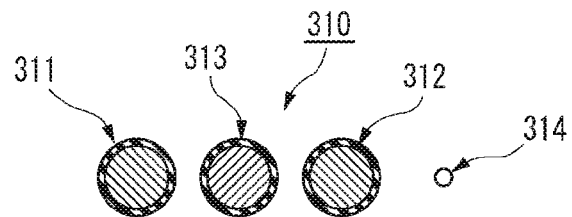
FIGS. 17A to 17E are sectional views for explaining arrangements of routing materials according to the present embodiment.
Figure 17B:
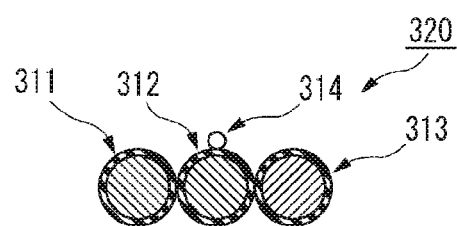
Figure 17C:
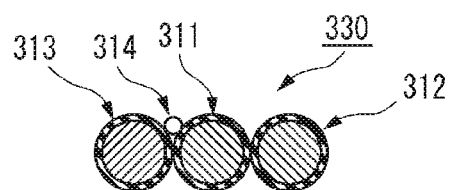
Figure 17D:
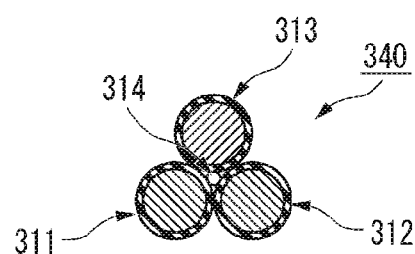
Figure 17E:
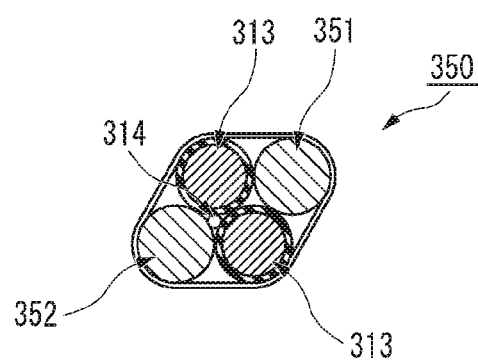

FIG. 15 shows perspective views for explaining arrangements of power source lines according to the present embodiment.

A routing material 240 illustrated in FIG. 15(*a*) includes a sub-power source system 241, a main power source system 243, an earth line 245, and a communication line 247, each of which is formed of an electric wire having a stranded wire.

The routing material 240 is formed of the electric wires having highly versatile stranded wires, and can thus be easily manufactured and be freely bent in all directions. Therefore, the routing property improves.

It is assumed that the routing material 240 has sufficient current capacities which can be used together in a backbone trunk line portion, such as 12 volts and 48 volts. Therefore, in a case where a voltage of 12 volts is supplied to the backbone trunk line portion and power consumption of an accessory is large during a normal operation, a voltage of 48 volts boosted by a DC/DC converter (high voltage/low voltage converter) is supplied to the backbone trunk line portion. As mentioned above, the backbone trunk line portion is used while switching between 12 volts and 48 volts, and thus it is possible to easily compensate a power source voltage for an accessory.

A routing material 250 illustrated in FIG. 15(*b*) has a power source system 251 for 12 volts, an earth line 255 for 12 volts, a power source system 253 for 48 volts, and an earth line 257 for 48 volts arranged side by side, each of which is formed of an electric wire having a stranded wire.

Therefore, a backbone trunk line portion including the routing material 250 is also used while switching between 12 volts and 48 volts, and thus it is possible to easily compensate a power source voltage for an accessory.

A routing material 260 illustrated in FIG. 15(*c*) has a power source system 251 for 12 volts, an earth line 259 used in common for 12 volts and 48 volts, and a power source system 253 for 48 volts arranged side by side, each of which is formed of an electric wire having a stranded wire.

Therefore, it is possible to reduce a space or a weight by reducing the number of electric wires as a result of using a backbone trunk line portion including the routing material 260.

FIG. 16 shows perspective views for explaining arrangements of routing materials according to the present embodiment.

A routing material 270 illustrated in FIG. 16(*a*) has a configuration in which twisted lines of a main power source system 272 and an earth line 274 are overlapped on twisted lines of a sub-power source system 271 and an earth line 273, and twisted lines of communication lines 275 and 276 are overlapped thereon.

Therefore, in the routing material 270, the noise resistance performance can be improved by canceling noise due to twisting.

A routing material 280 illustrated in FIG. 16(*b*) has a configuration in which an earth line 283, a main power source system 282, an earth line 283, and a communication line 285 are sequentially stacked on a sub-power source system 281 formed of a flat conductor.

Therefore, in the routing material 280, the noise resistance performance can be improved by disposing the earth lines 283 in a distribution manner.

A routing material 290 illustrated in FIG. 16(*c*) has a configuration in which a sub-power source system 291 and a main power source system 292 formed of flat conductors are respectively covered with a braid 293 and a braid 294 on the peripheries thereof, and then overlap each other in a plate thickness direction, and a communication line 285 is stacked thereon.

Therefore, in the routing material 290, the braid 293 and the braid 294 realize both grounding and shielding, and thus the noise resistance performance can be improved.

In a routing material 300 illustrated in FIG. 16(*d*), an earth line 303 is interposed between a sub-power source system 301 containing noise and a communication line 305, and an earth line 304 is interposed between a main power source system 302 and the communication line 305, so that the communication line 305 is shielded.

The earth lines 304 and 303 are disposed on and under the communication line 305, and thus the shield performance is improved.

Since the sub-power source system 301, the main power source system 302, and the earth lines 303 and 304 are formed of flat conductors and are stacked on each other, facing areas of the power source systems and the earth lines are large, and a gap therebetween is small, so that the shield performance is improved.

FIG. 17 is a perspective view for explaining arrangements of routing materials according to the present embodiment.

FIGS. 17(*a*) to 17(*d*) are sectional views illustrating routing patterns of routing materials 310, 320, 330 and 340 each including a main power source system 311 and a sub-power source system 312 formed of electric wires having stranded wires, an earth line 313 formed of an electric wire having a stranded wire, and a communication line 314 formed of a plastic optical fiber.

Optical communication resistant to noise is used for the communication line 314 in each of the routing materials 310, 320, 330 and 340, and thus it is possible to improve the degree of freedom of a routing pattern of a backbone trunk line portion.

A routing material 350 illustrated in FIG. 17(*e*) has a configuration in which a main power source system 351 and a sub-power source system 352 formed of aluminum round bar conductors, a pair of earth lines 313 formed of electric wires having stranded wires, and a communication line 314 formed of plastic optical fibers are bundled up.

Therefore, the communication line 314 disposed in a gap between the sub-power source system 352 formed of a round bar conductor and the pair of earth lines 313 is prevented from being damaged, and is easily routed in the vehicle body 1.

Figure 18A:
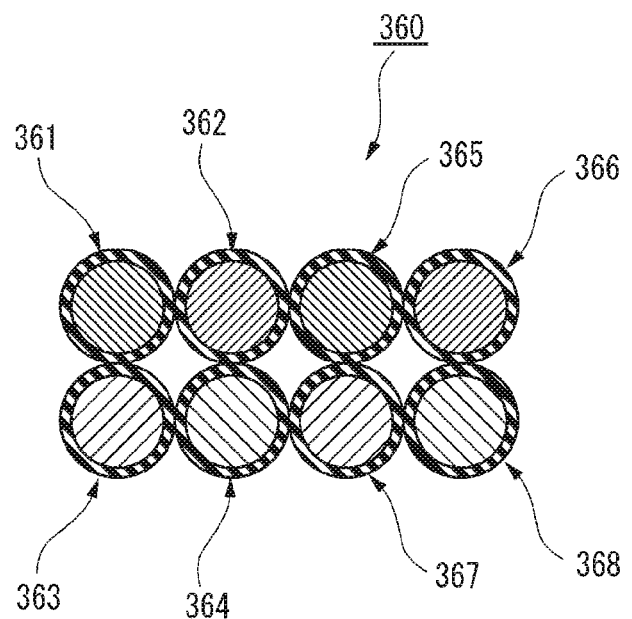
FIGS. 18A and 18B are sectional views for explaining arrangements of routing materials according to the present embodiment.
Figure 18B:
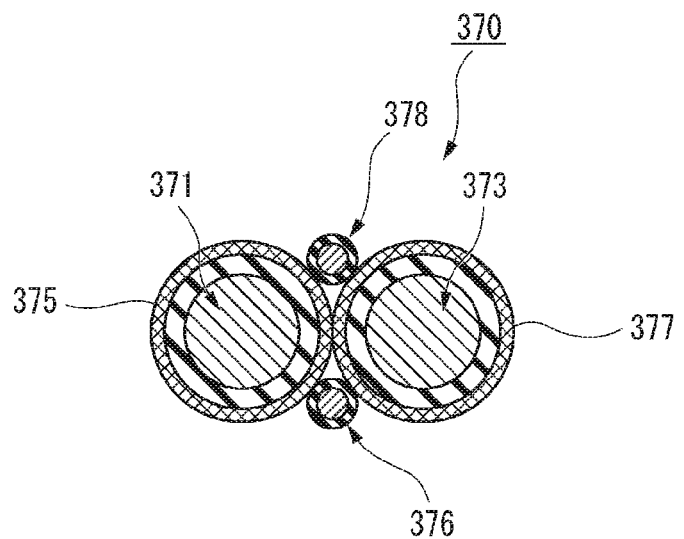

FIG. 18 is a sectional view for explaining arrangements of routing materials according to the present embodiment.

As illustrated in FIG. 18(*a*), a routing material 360 has a configuration in which a main power source system 361 and a main earth line 362 for 12 volts, a sub-power source system 365 and a sub-earth line 366 for 12 volts, a main earth line 363 and a main power source system 364 for 48 volts, and a sub-earth line 367 and a sub-power source system 368 for 48 volts are alternately disposed.

Therefore, the routing material 360 has the improved shield performance, and thus a shield component and further a noise filter can be omitted.

As illustrated in FIG. 18(*b*), a routing material 370 has a configuration in which a main power source system 371 and a sub-power source system 373 which are formed of electric wires having stranded wires and are arranged side by side, earth lines 375 and 377 which are formed of braided wires covering outer circumferential surfaces of the main power source system 371 and the sub-power source system 373, and a pair of communication lines 376 and 378 disposed in upper and lower gaps between the main power source system 371 and the sub-power source system 373 arranged side by side are disposed in parallel to each other.

Therefore, in the routing material 370, the outer circumferential surfaces of the main power source system 371 and the sub-power source system 373 are respectively covered with the earth lines 375 and 377, and thus the influence of noise on the communication lines 376 and 378 can be reduced.

Since both of shielding and grounding are realized, and the communication lines 376 and 378 are disposed in the upper and lower gaps between the two main power source system 371 and the sub-power source system 373, it is possible to save a space.

Figure 19A:
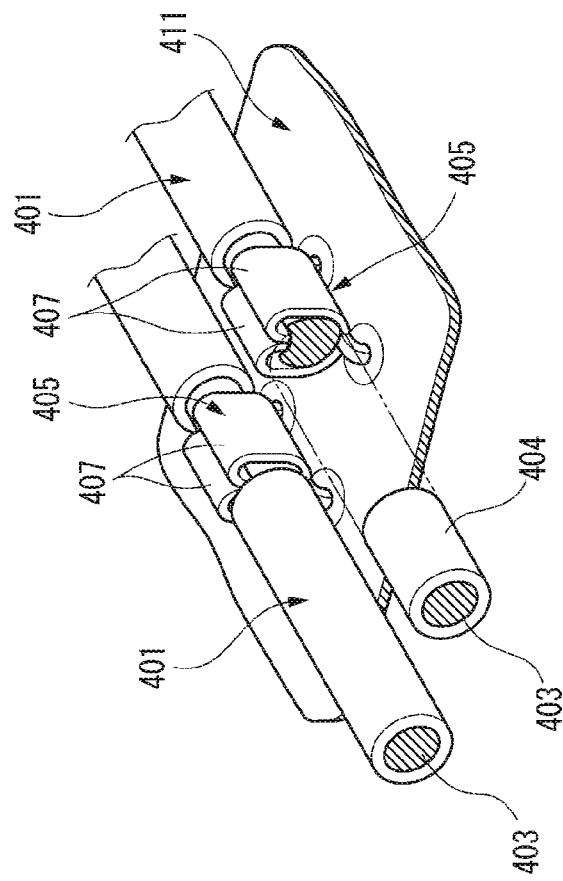
FIGS. 19A and 19B are sectional views for explaining a board connection structure of a round bar conductor according to the present embodiment.
Figure 19B:
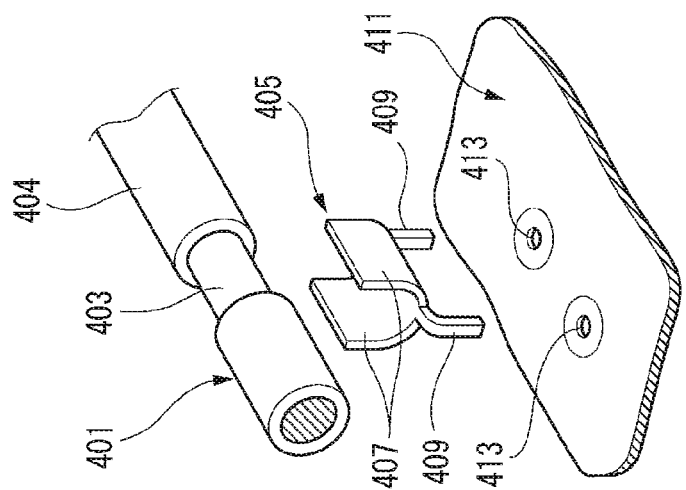

FIG. 19 shows sectional views for explaining a board connection structure of a round bar conductor according to the present embodiment.

As illustrated in FIG. 19(*a*), for example, when a routing material 401 having a round bar conductor 403 is electrically connected to a circuit board 411 in a control box, first, an insulating coat 404 at a connection location of the routing material 401 is peeled off so that the round bar conductor 403 is exposed.

A crimp terminal 405 made of a copper alloy includes a pair of crimp pieces 407, and a pair of leads 409 inserted into through holes 413 of the circuit board 411.

The crimp pieces 407 of the crimp terminal 405 are crimped and fixed to the exposed round bar conductor 403 of the routing material 401, and, then, as illustrated in FIG. 19(*b*), the leads 409 of the crimp terminal 405 are inserted into the through holes 413 of the circuit board 411 so as to be soldered. As a result, the round bar conductor 403 of the routing material 401 is electrically connected to a predetermined circuit of the circuit board 411.

Therefore, according to the board connection structure of the round bar conductor 403 of the present embodiment, it is not necessary to process the round bar conductor 403 for connection to the circuit board 411, and dedicated processing equipment such as a dedicated press device or a press mold is not necessary. Thus, processing cost can be reduced. In other words, in the related art, a connection portion is required to be processed in a flat form and to be welded or bolt-fastened in order to connect a round bar conductor to a terminal or an electric wire of the counter party, and thus processing cost increases.

Since the round bar conductor 403 is exposed by peeling off the insulating coat 404 at any position in the routing material 401, the crimp terminal 405 can be attached at any position in the round bar conductor 403, and thus it is possible to increase the degree of freedom of layout of the routing material 401.

Figure 20:
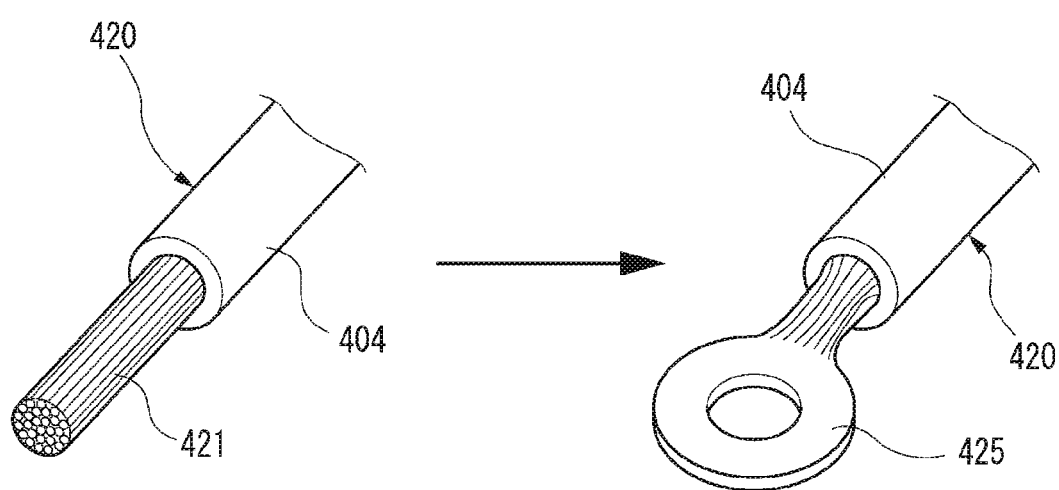
FIG. 20 is a perspective view for explaining a structure of forming a terminal by using a stranded wire according to the present embodiment.
Figure 21A:
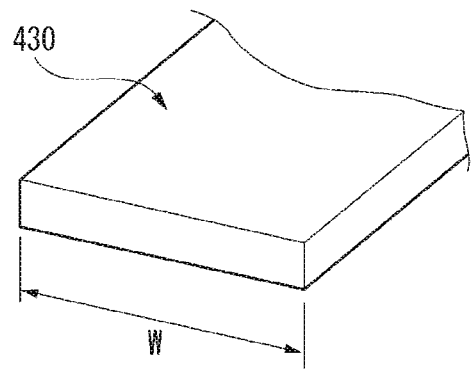
FIGS. 21A to 21D are principal portion enlarged views for explaining terminal structure examples of power source lines according to the present embodiment.
Figure 21B:
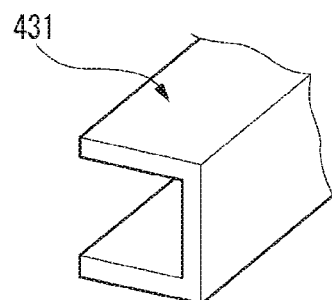
Figure 21C:
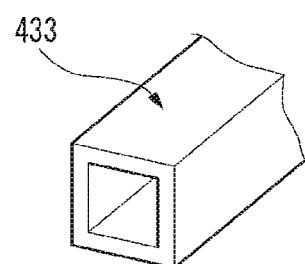
Figure 21D:
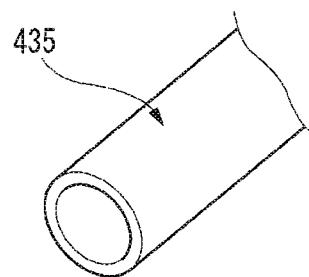

FIG. 20 is a perspective view for explaining a structure of forming a terminal by using a stranded wire according to the present embodiment.

As illustrated in FIG. 20, when a routing material 420 formed of an electric wire having a stranded wire 421 made of, for example, an aluminum alloy is fixed to a stud bolt such as a battery terminal, the stranded wire 421 exposed at an end of the routing material 420 by peeling off an insulating coat 404 is press-processed in an LA terminal form so that an LA terminal portion 425 is formed.

Therefore, it is not necessary to connect an LA terminal to the end of the routing material 420, and thus the number of components can be reduced.

FIG. 21 shows principal portion enlarged views for explaining terminal structure examples of power source lines according to the present embodiment.

As a connection terminal of a power source line in a backbone trunk line portion according to the present embodiment, for example, a connection terminal having a terminal size called a "1.5 terminal", and a connection terminal having a terminal size called a "4.8 terminal" are used.

As illustrated in FIG. 21(*a*), a male tab terminal 430 called a "4.8 terminal" has a terminal width W of 4.8 mm, and causes a female terminal of the counter party to be large-sized.

Therefore, a terminal connection portion is formed to have a three-dimensional U-shaped section as in a male terminal 431 illustrated in FIG. 21(*b*), and thus it is possible to provide a structure of being capable of coping with a large current even in a small size by increasing a surface area (a contact area with a counter terminal).

A terminal connection portion is formed in a three-dimensional rectangular tubular shape as in a male terminal 433 illustrated in FIG. 21(*c*), and thus it is possible to provide a structure of being capable of coping with a large current even in a small size by increasing a surface area.

A terminal connection portion is formed in a three-dimensional cylindrical shape as in a male terminal 435 illustrated in FIG. 21(*d*), and thus it is possible to provide a structure of being capable of coping with a large current even in a small size by increasing a surface area.

Figure 22:
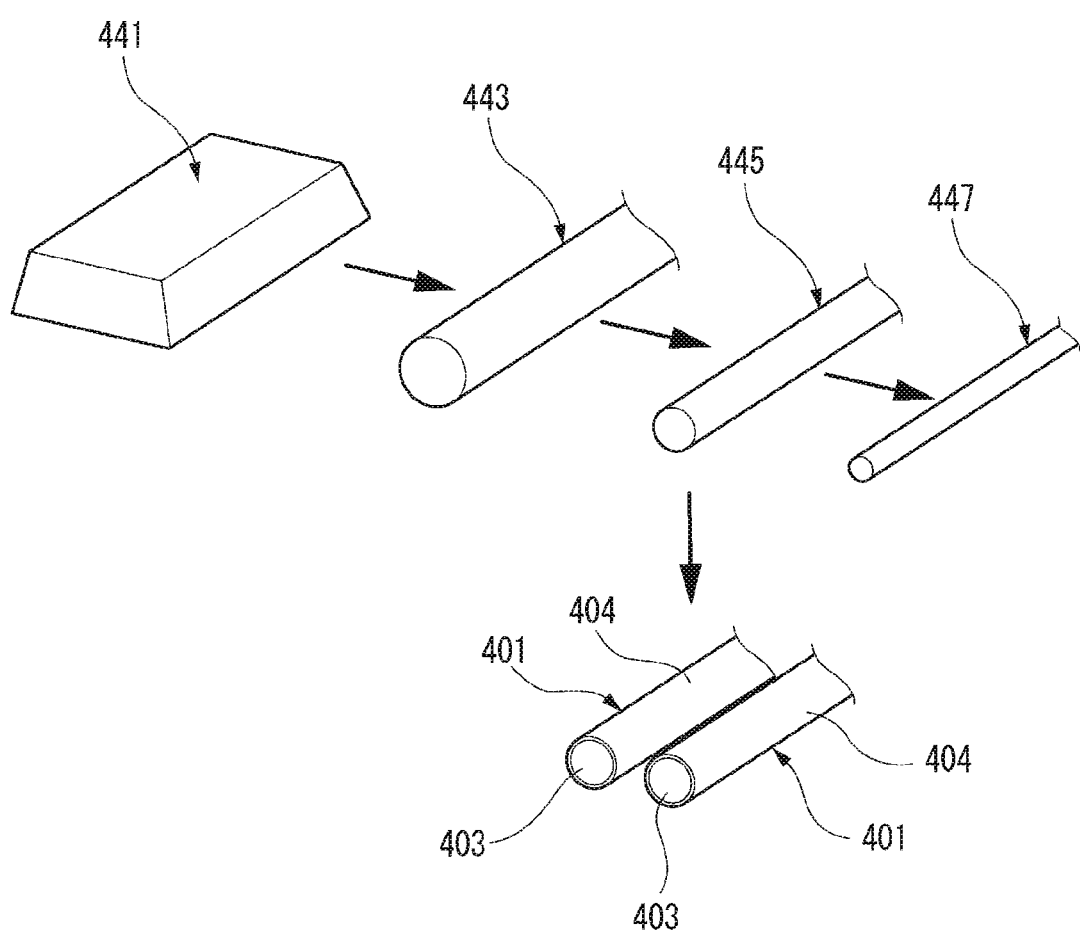
FIG. 22 is a perspective view for explaining an example of forming a round bar conductor according to the present embodiment.

FIG. 22 is a perspective view for explaining an example of forming a round bar conductor according to the present embodiment.

In a routing material 401 illustrated in FIG. 22, an aluminum round bar conductor 403 is formed by using a secondary intermediate 445 obtained when a core wire 447 of an aluminum electric wire is manufactured.

In other words, the core wire 447 in a well-known aluminum electric wire is formed, for example, by forming a columnar primary intermediate 443 from an aluminum ingot 441, then, forming the long secondary intermediate 445 by extending the primary intermediate 443, and further stretching the secondary intermediate 445 to have a small diameter.

Therefore, the routing material 401 can be formed just by forming the insulating coat 404 on the circumference of the secondary intermediate 445 which is used as the round bar conductor 403, and thus it is possible to reduce the processing cost for the round bar conductor 403 compared with a case where a round bar conductor is processed and manufactured exclusively.

Figure 23:
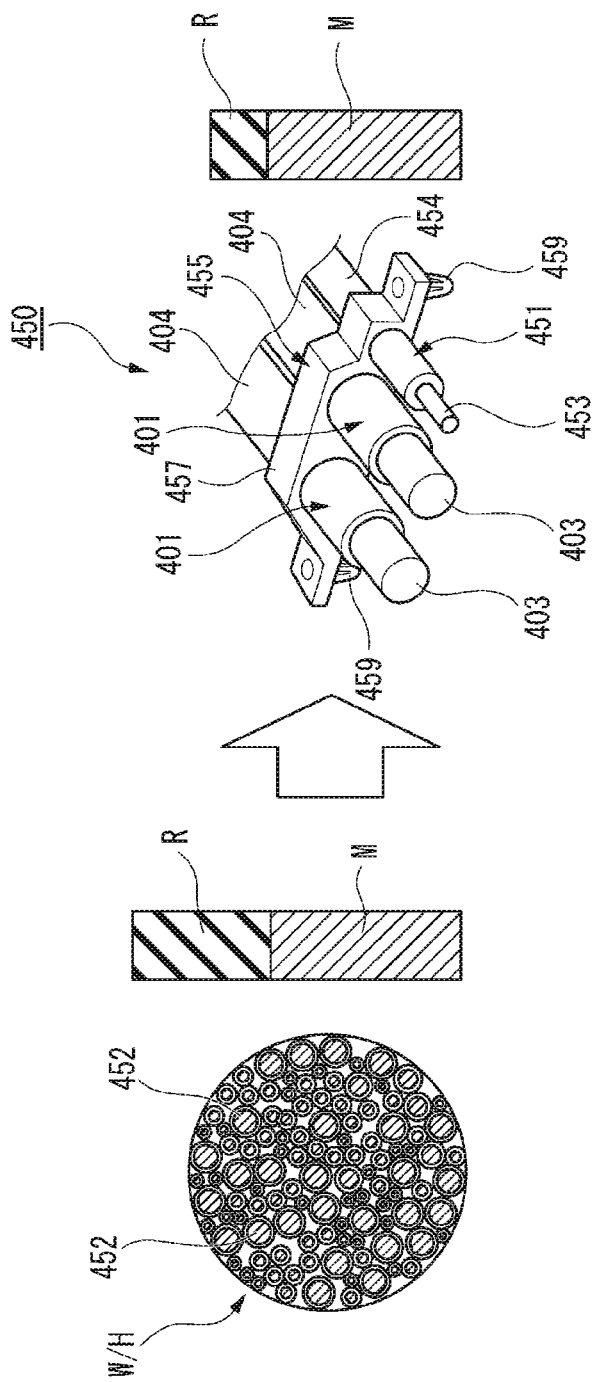
FIG. 23 is an explanatory diagram in which a coat sectional area of a wire harness of the related art is compared with a coat sectional area of a routing material according to the present embodiment.

FIG. 23 is an explanatory diagram in which a coat sectional area of a wire harness of the related art is compared with a coat sectional area of a routing material according to the present embodiment.

As illustrated on a left part in FIG. 23, a wire harness W/H of the related art including a power source line, an earth line, and a communication line routed in a vehicle body is an electric wire bundle formed of a plurality of electric wires 452, and there is a tendency for a sectional diameter to increase.

In contrast, in a routing material 450 according to the present embodiment illustrated on a right part in FIG. 23, a power source line 451 and an earth line 453 in which insulating coats 404 are formed on circumferences of aluminum round bar conductors 403, and a communication line 456 formed of a plastic optical fiber 454 are integrally held with clamps 455 which are molded at a predetermined interval along a longitudinal direction.

Therefore, when a sectional area configuration of an insulating coat R and a conductor M in the wire harness W/H is compared with an insulating coat R and a conductor M in the routing material 450, a sectional area of the insulating coat R of the wire harness W/H is larger than a sectional area of the insulating coat R of the routing material 450 although sectional areas of the conductors M being the same as each other. In other words, in the wire harness W/H of the related art, each of the plurality of electric wires 452 has an insulating coat, but in the routing material 450, electric wires are unified into a single power source line 451, a single earth line 453, and a single communication line 456, so that a sectional area of the insulating coat R can be reduced, and, as a result, it is possible to make the routing material 450 considerably slim.

In the clamps 455 integrally molded to the routing material 450, engagement clips 459 protrude at both ends of a clamp body 457. Therefore, the engagement clips 459 are inserted into and engaged with penetration holes of a vehicle body panel and the like, and thus the routing material 450 can be easily routed in and fixed to the vehicle body.

Figure 24A:
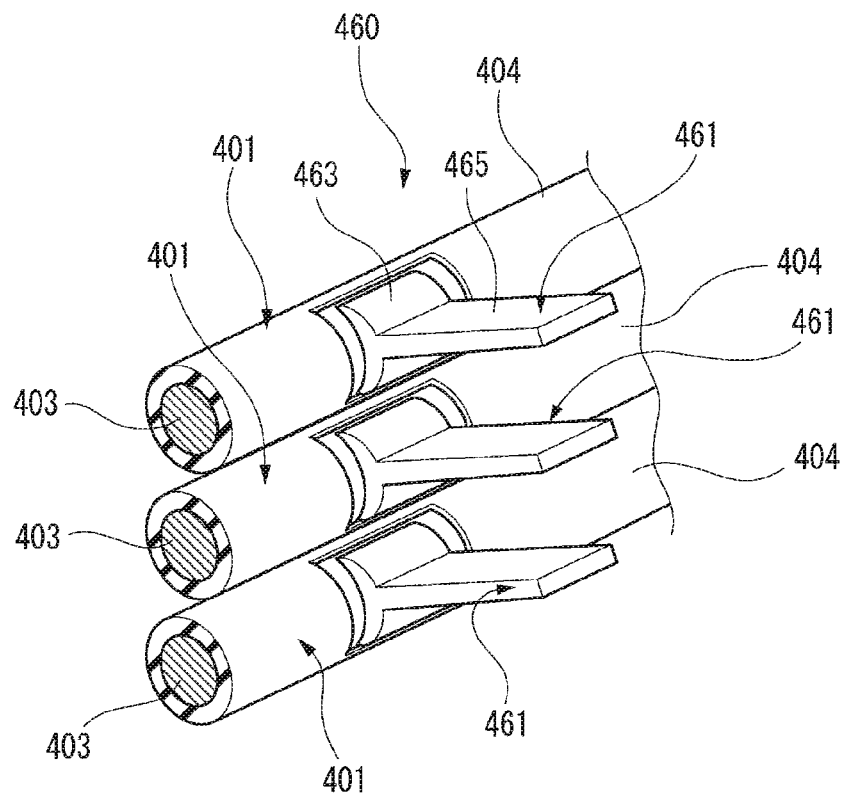
FIGS. 24A and 24B are principal portion perspective view and sectional view for explaining a terminal connection structure of the round bar conductor according to the present embodiment.
Figure 24B:
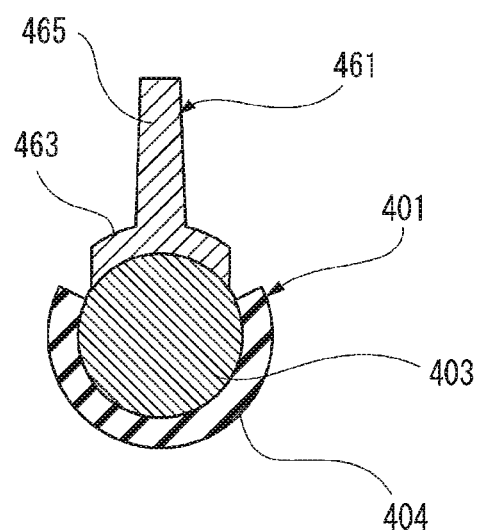

FIG. 24 shows principal portion perspective view and sectional view for explaining a terminal connection structure of the round bar conductor according to the present embodiment.

For example, when the routing material 401 having the round bar conductor 403 is electrically connected to a circuit board in a control box, first, the insulating coat 404 at a connection location of the routing material 401 is partially peeled off so that the round bar conductor 403 is exposed.

A connection terminal 461 made of a copper alloy includes a fixing portion 463 having a cylindrical inner surface in contact with an outer surface of the round bar conductor 403, and a tab terminal portion 465 protruding outward of the fixing portion 463.

The fixing portion 463 of the connection terminal 461 is fixed to the exposed round bar conductor 403 of the routing material 401 through welding or by using ultrasonic waves. The tab terminal portion 465 is fitted to a counter terminal provided on the circuit board, so that the round bar conductor 403 of the routing material 401 is electrically connected to a predetermined circuit of the circuit board. Since the fixing portion 463 has the cylindrical inner surface in contact with the outer surface of the round bar conductor 403, the connection terminal 461 secures a sufficient contact area with respect to the round bar conductor 403, and can thus ensure connection reliability.

As illustrated in FIG. 24(a), in a backbone trunk line portion 460 configured by arranging a plurality of routing materials 401 side by side, the respective tab terminal portions 465 are fitted to counter terminals in a state of protruding outwardly in a diameter direction of the routing material 401 in parallel to each other. Therefore, the tab terminal portions 465 can be fitted to the counter terminals with respect to the plurality of routing materials 401 arranged side by side without changing an arrangement interval.

FIG. 25 shows principal portion perspective view and sectional view for explaining a control box connection structure of a round bar conductor according to the present embodiment.

Figure 25A:
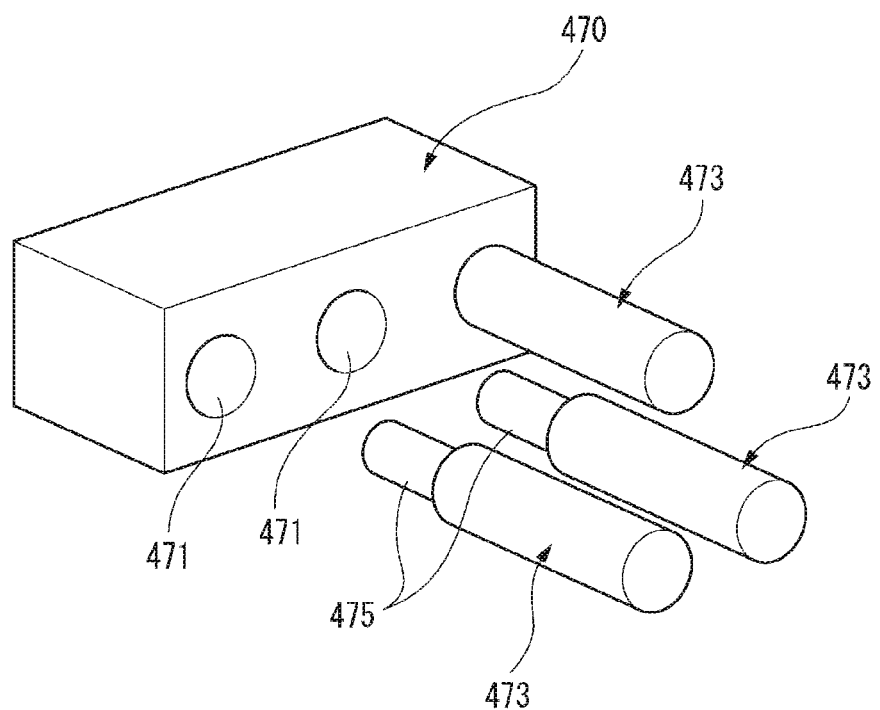
FIGS. 25A and 25B are principal portion perspective view and sectional view for explaining a control box connection structure of a round bar conductor according to the present embodiment.
Figure 25B:
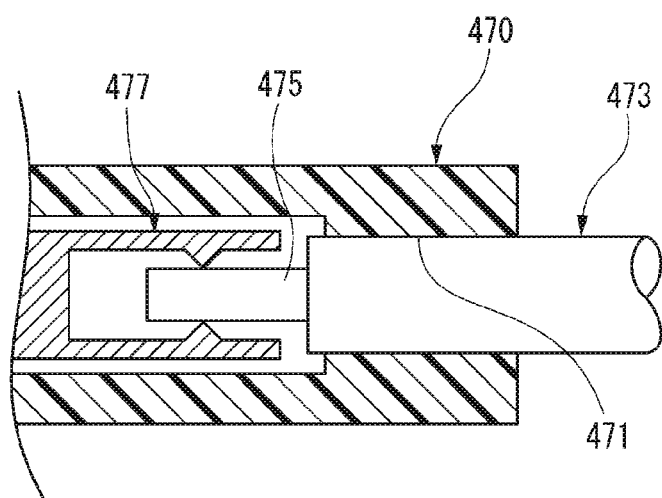

As illustrated in FIGS. 25(a) and 25(b), in a case where each of a main power source system, a sub-power source system, and an earth line forming a backbone trunk line portion is formed of an aluminum round bar conductor 473, a terminal connection portion 475 having a small diameter is formed at a tip end of each round bar conductor 473, and a counter female terminal 477 made of an aluminum alloy to which the terminal connection portion 475 is fitted is disposed inside each terminal accommodation room 471.

If the tip end of the round bar conductor 473 is inserted into the terminal accommodation room 471 of a control box 470 as a male terminal, the backbone trunk line portion is in a state of being electrically connected to the control box 470.

Therefore, it is not necessary to separately attach a connection terminal to the tip end of each round bar conductor 473 which is electrically connected to the control box 470, and thus the number of components can be reduced.

FIG. 26 shows principal portion perspective views for explaining modification examples of the round bar conductor according to the present embodiment.

Figure 26A:
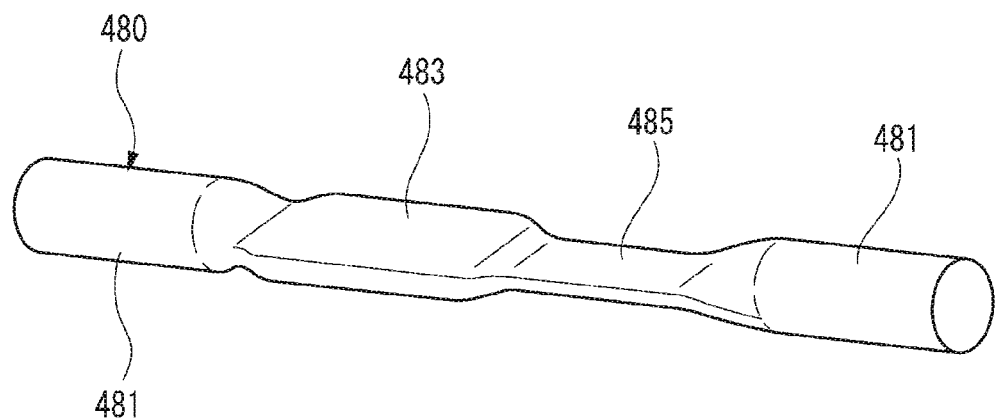
FIGS. 26A and 26B are principal portion perspective views for explaining to modification examples of the round bar conductor according to the present embodiment.

A routing material 480 illustrated in FIG. 26(a) is formed in which a circular section portion 481 formed of an aluminum round bar conductor, a tabular portion 483 formed of a thick aluminum flat conductor, and a thin tabular portion 485 formed of a thin aluminum flat conductor are connected to each other such that a shape thereof changes seamlessly along the longitudinal direction.

The tabular portion 483 is easily bent in a plate thickness direction, and the thin tabular portion 485 is more easily bent. The circular section portion 481 is more difficult to be bent than the tabular portion 483 or the thin tabular portion 485, but is freely bent in all directions.

Therefore, a backbone trunk line portion formed of the routing material 480 is easily routed in a three-dimensional manner according to a routing path of a vehicle body.

Figure 26B:
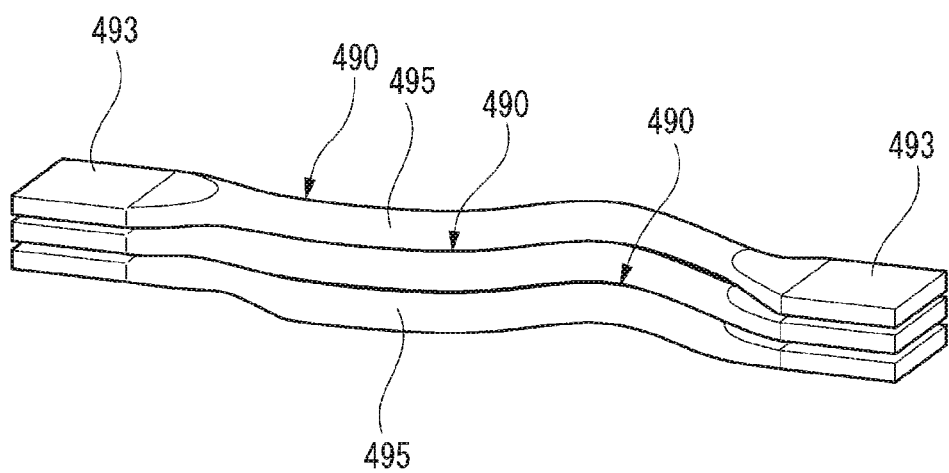

A routing material 490 illustrated in FIG. 26(b) is formed in which a tabular portion 493 formed of a thick aluminum flat conductor and a circular section portion 495 formed of an aluminum round bar conductor are connected to each other such that a shape thereof changes seamlessly along the longitudinal direction.

The tabular portion 493 has a height smaller than that of the circular section portion 495 and is used at a portion which is required to be routed with a reduced height.

Therefore, a backbone trunk line portion formed by stacking a plurality of routing materials 490 is easily routed in a three-dimensional manner according to a routing path of a vehicle body since the tabular portion 493 is used at a portion which is required to be routed with a reduced height, and the circular section portion 495 is used at a portion which facilitates path routing in a three-dimensional.

The routing materials 480 and 490 can be formed by using an aluminum round bar or rectangular bar without using an aluminum strand, and thus it is possible to reduce manufacturing cost.

Figure 27:
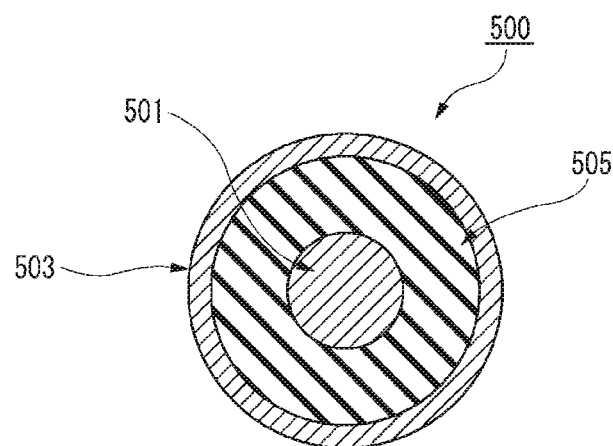
FIG. 27 is a sectional view for explaining a modification example of a routing material according to the present embodiment.

FIG. 27 is a sectional view for explaining a modification example of a routing material according to the present embodiment.

A routing material 500 illustrated in FIG. 27 is a coaxial cable including a central conductor 501, an insulating layer 505 which is coaxially disposed on the outside of the central conductor 501, and an earth line 503 formed of a braided wire covering an outer circumferential surface of the insulating layer 505.

A current flows through the central conductor 501 as a power source line, and a signal flows therethrough according to a power line communication (PLC) technique.

Therefore, in the routing material 500, two constituent elements such as the central conductor 501 and the earth line 503 can cope with three functions such as a power source line, an earth line, and a signal line, and are formed as a thick coaxial cable by using the coaxial structure, so that a large current can be made to flow therethrough.

Figure 28:
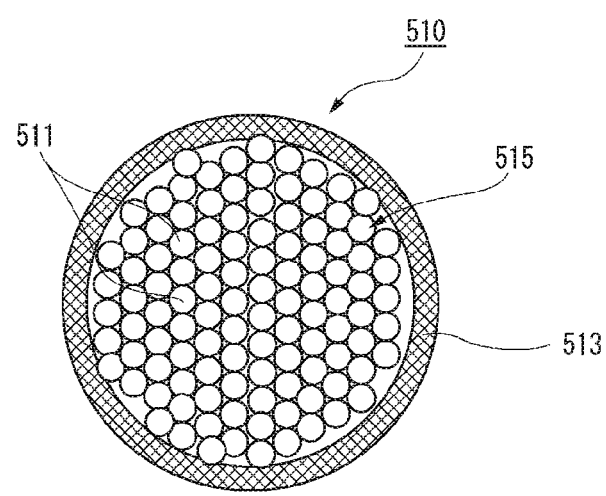
FIG. 28 is a sectional view for explaining a modification example of a routing material according to the present embodiment.

FIG. 28 is a sectional view for explaining a modification example of a routing material according to the present embodiment.

A routing material 510 illustrated in FIG. 28 includes a power source line 515 formed of a plurality of stranded litz wires (enamel wires) 511, and an earth line 513 disposed as a braided wire surrounding the outside of the power source line 515.

Therefore, the routing material 510 is a compact electric wire resistant to noise.

Figure 29A:
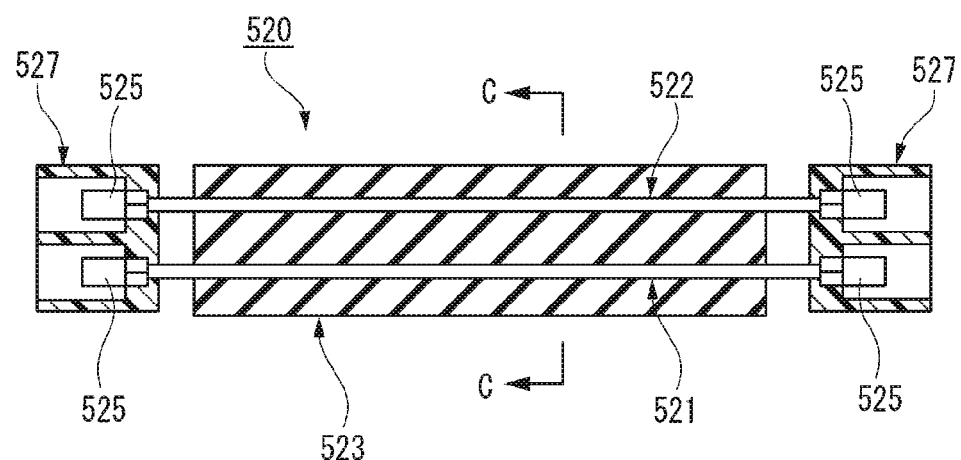
FIG. 29A is a longitudinal sectional view for explaining a modification example of a routing material according to the present embodiment.
Figure 29B:
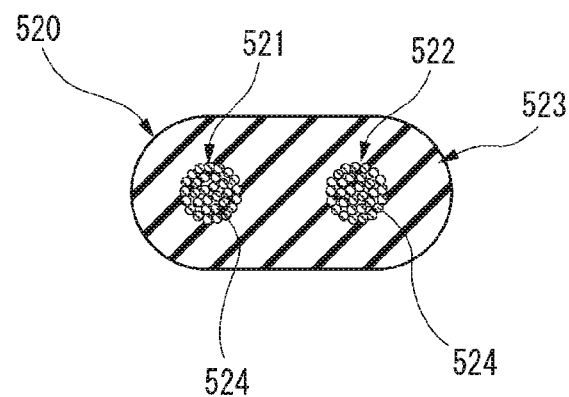
FIG. 29B is a sectional view taken along a line C-C in FIG. 29A.

FIG. 29 shows sectional views for explaining a modification example of a routing material according to the present embodiment.

As illustrated in FIG. 29, a routing material 520 has a configuration in which a power source line 521 formed of a plurality of core wires 524 and an earth line 522 formed of a plurality of core wires 524 are disposed in parallel with a predetermined interval, and are covered with an insulating coat 523 having an elliptical section in this state.

Both ends of the power source line 521 and the earth line 522 are respectively connected to terminals 525, and the terminals 525 are accommodated in a connector housing 527.

Therefore, in the routing material 520, the power source line 521 and the earth line 522 can be covered with the single insulating coat 523, and thus a routing space can be reduced compared with a wire harness of the related art in which each of a plurality of core wires is covered with an insulating coat, so that manufacturing cost can be reduced.

FIG. 30 shows sectional views for explaining modification examples of routing materials according to the present embodiment.

Figure 30A:
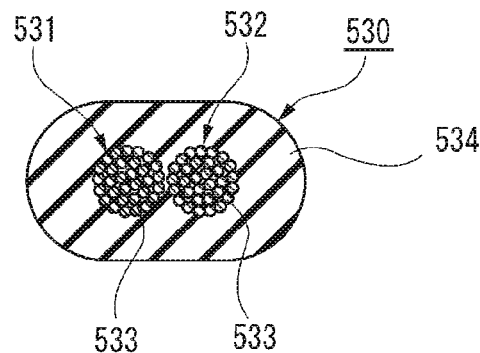
FIGS. 30A to 30D are sectional views for explaining modification examples of routing materials according to the present embodiment.

A routing material 530 illustrated in FIG. 30(a) has a configuration in which a power source line 531 formed of a plurality of litz wires (enamel wires) 533 and an earth line 532 formed of a plurality of litz wires (enamel wires) 533 are covered with an insulating coat 534 having an elliptical section in a state of being close to each other.

In other words, the power source line 531 and the earth line 532 do not have coat layers, but are formed of the litz wires 533, and thus are not short-circuited to each other even if the lines are close to each other. The power source line 531 and the earth line 532 not having coat layers are covered with the insulating coat 534 in a state of being close to each other, and thus the routing material 530 can be made compact.

Figure 30B:
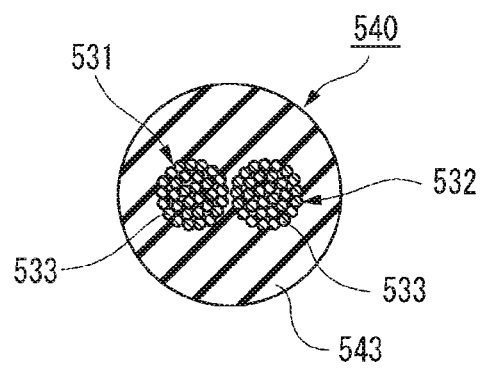

A routing material 540 illustrated in FIG. 30(b) has a configuration in which a power source line 531 formed of a plurality of litz wires 533 and an earth line 532 formed of a plurality of litz wires 533 are covered with an insulating coat 543 having a circular section in a state of being close to each other.

Figure 30C:
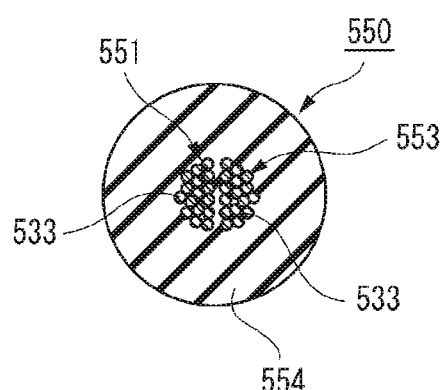

A routing material 550 illustrated in FIG. 30(c) has a configuration in which a power source line 551 having a semicircular section and formed of a plurality of litz wires 533 and an earth line 553 having a semicircular section and formed of a plurality of litz wires 533 are covered with an insulating coat 554 having a circular section in a state of being combined each other to have a circular section.

Figure 30D:
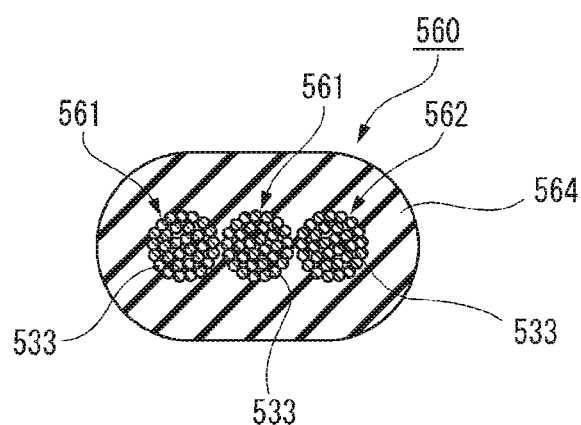

A routing material 560 illustrated in FIG. 30(d) has a configuration in which a sub-power source line 561 formed of a plurality of litz wires 533, a main power source line 562 formed of a plurality of litz wires 533, and an earth line 563 formed of a plurality of litz wires 533 are covered with an insulating coat 564 having an elliptical section in a state of being close to each other.

Figure 31A:
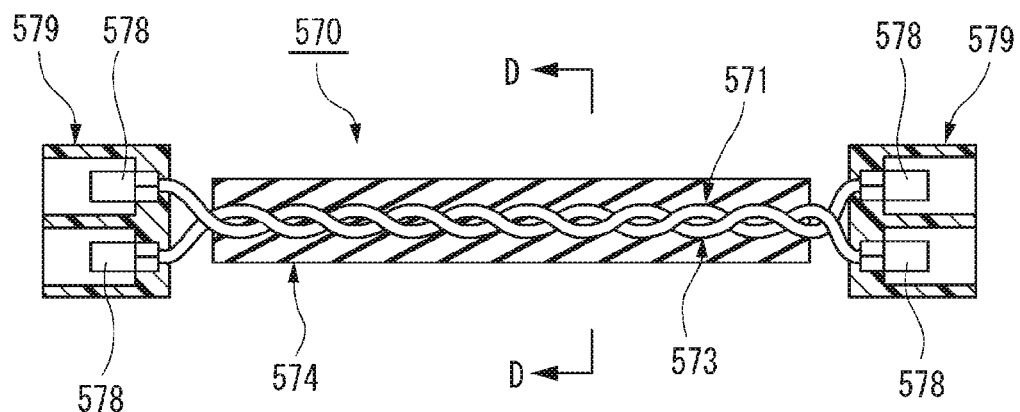
FIG. 31A is a longitudinal sectional view for explaining a modification example of a routing material according to the present embodiment.
Figure 31B:
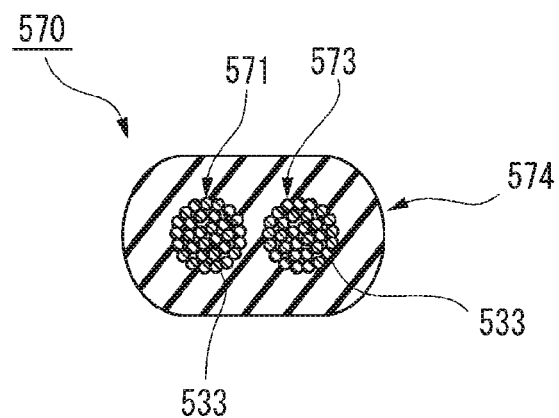
FIG. 31B is a sectional view taken along a line D-D in FIG. 31A.

FIG. 31 shows sectional views for explaining a modification example of a routing material according to the present embodiment.

As illustrated in FIG. 31, a routing material 570 has a configuration in which a power source line 571 formed of a plurality of litz wires 533 and an earth line 573 formed of a plurality of litz wires 533 are covered with an insulating coat 574 having an elliptical section in a state of being twisted in order to increase a noise canceling effect.

Both ends of the power source line 571 and the earth line 573 are respectively connected to terminals 578, and the terminals 578 are accommodated in a connector housing 579.

Therefore, in the routing material 570, the twisted power source line 571 and earth line 573 can be covered with the single insulating coat 574, and thus a routing space can be reduced compared with a twisted cable of the related art in which each of a plurality of core wires is covered with an insulating coat. In the routing material 570, the litz wires 533 can be brought into close contact with each other, and thus noise can be efficiently reduced. In the routing material 570, the insulating coat 574 can be formed while twisting the power source line 571 and the earth line 573, and can thus be manufactured in a single electric wire manufacturing process, and thus it is possible to reduce processing cost.

Figure 32:
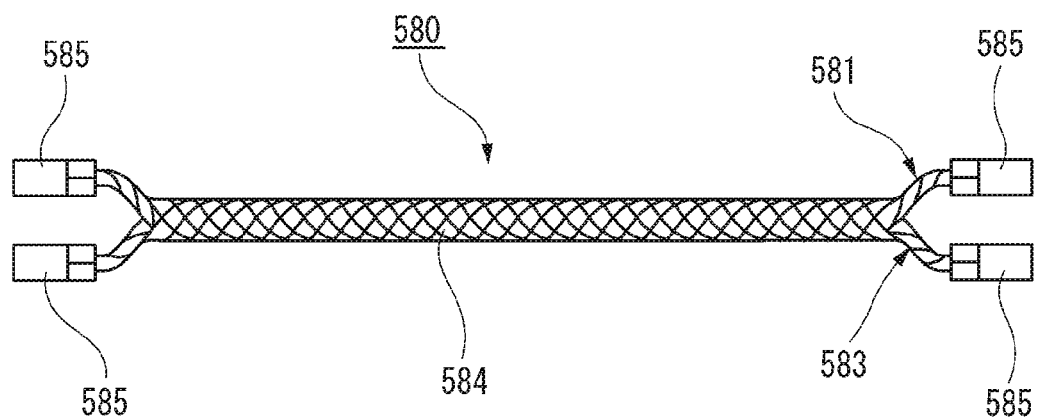
FIG. 32 is a plan view for explaining a modification example of a routing material according to the present embodiment.

FIG. 32 is a plan view for explaining a modification example of a routing material according to the present embodiment.

A routing material 580 illustrated in FIG. 32 has a configuration in which a power source line 581 formed of a plurality of litz wires 584 and an earth line 583 formed of a plurality of litz wires 584 are braided to each other, such as braided wires. Both ends of the power source line 581 and the earth line 583 are respectively connected to terminals 585 through soldering or by using ultrasonic waves. The braided power source line 581 and earth line 583 can maintain independent current paths since the litz wires 584 are not conducted to each other.

Therefore, in the routing material 580, the power source line 581 and the earth line 583 are braided to each other so that the litz wires 584 are brought into close contact with each other, and thus it is possible to efficiently reduce noise.

FIG. 33 shows partial perspective views and a cross-sectional view for explaining routing form examples of routing materials according to the present embodiment.

Figure 33A:
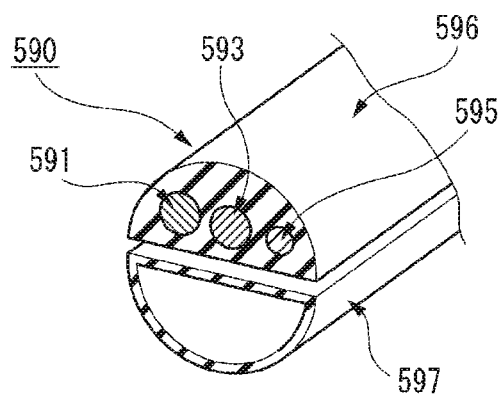
FIGS. 33A to 33C are partial perspective views and a cross-sectional view for explaining routing form examples of routing materials according to the present embodiment.

As illustrated in FIG. 33(a), a routing material 590 in which a power source line 591, an earth line 593, and a communication line 595 are covered with an insulating coat 596 having a semicircular sectional shape is integrally routed to overlap a reinforcement 597 having a semicircular sectional shape. Therefore, the routing material 590 can be miniaturized through improvement of space efficiency.

Figure 33B:
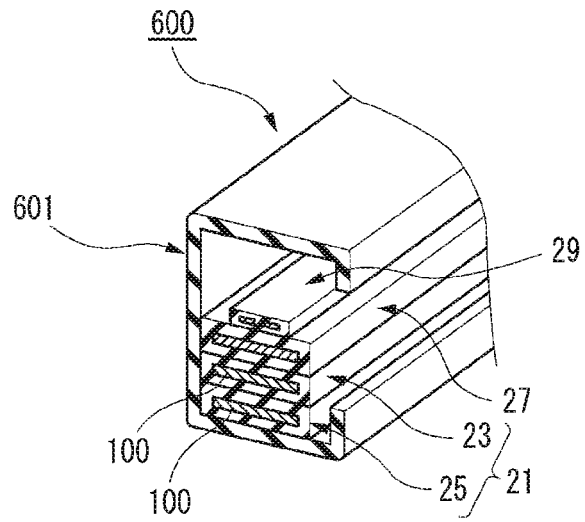

As illustrated in FIG. 33(b), a routing material 600 is routed in a reinforcement 601 having a rectangular sectional shape in a state in which a sub-power source system 25, a main power source system 23, an earth line 27, and a communication line 29 are stacked. Therefore, the routing material 600 can be miniaturized through improvement of space efficiency.

Figure 33C:
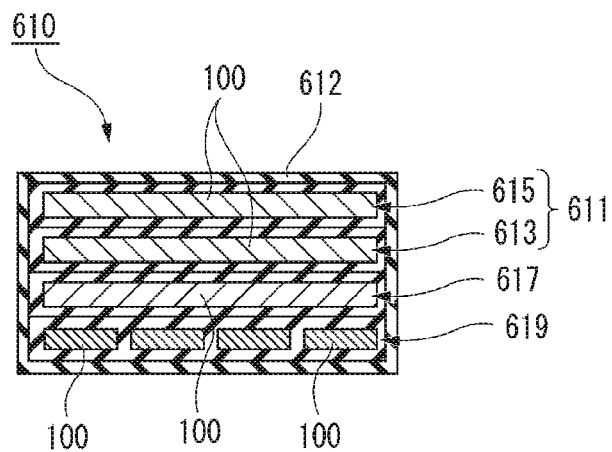

As illustrated in FIG. 33(c), a routing material 610 has a configuration in which an earth line 617 is stacked on a communication line 619, and a power source line 611 formed of a main power source system 613 and a sub-power source system 615 stacked thereon is stacked on the earth line 617. A sheath 612 covers the periphery so as to gather the systems.

Therefore, the routing material 610 is shielded by the earth line 617, and sneaking of noise of the power source line 611 can be prevented.

FIG. 34 is a partial sectional perspective view for explaining a modification example of a vehicular circuit body according to the present embodiment.

In a backbone trunk line portion 620 illustrated in FIG. 34, trunk lines among a plurality of control boxes 621, 623 and 625 are formed of a routing material 627 having round bar conductors and a routing material 629 having flat conductors.

According to the backbone trunk line portion 620 of the present embodiment, the routing materials 627 and 629 having the conductors suitable for a routing path of a vehicle can be used for the respective trunk lines among the plurality of control boxes 621, 623 and 625, and thus the routing property is further improved.

Figure 35:
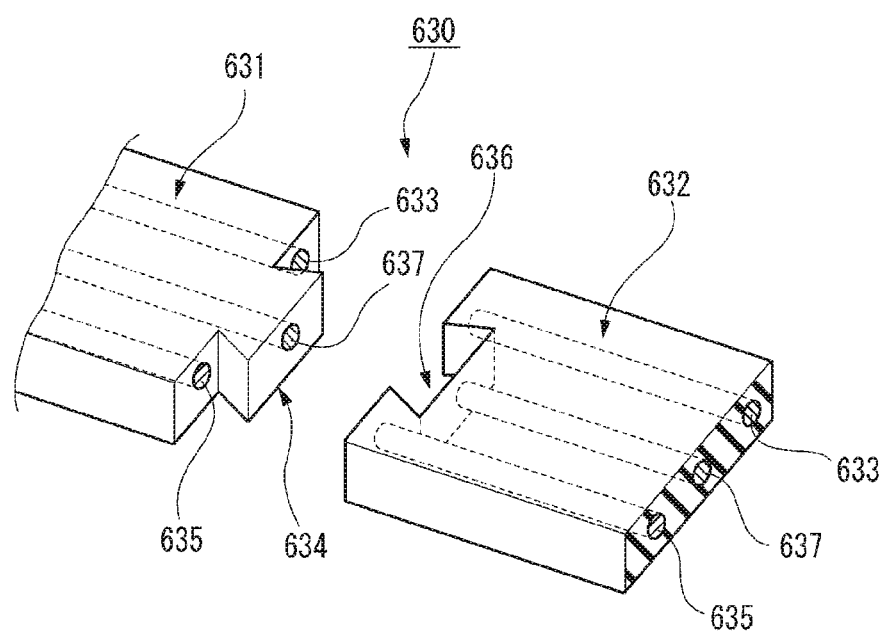
FIG. 35 is a principal portion perspective view for explaining a joint form example of a routing material according to the present embodiment.

FIG. 35 is a principal portion perspective view for explaining a joint form example of a routing material according to the present embodiment.

As illustrated in FIG. 35, a routing material 630 has a configuration in which two thin tabular routing materials 631 and 632 are connected to each other by butting facing surfaces thereof, so as to be integrated. Specifically, a protrusion 634 is formed on a right end surface of the routing material 631, and a concave 636 having a shape complementary to that of the protrusion 634 is formed on a left end surface of the routing material 632.

Each electrode of a power source line 633, an earth line 635, and a signal line 637 is disposed to be exposed to the right end surface of the routing material 631. Although not illustrated, similarly, electrodes which can be respectively brought into contact with the power source line 633, the earth line 635, and the signal line 637 are also disposed on the left end surface of the routing material 632.

As mentioned above, the types of the routing materials 631 and 632 in which shapes of connection locations, electrode specifications, and the like are standardized in advance, are selected, and the selected members are combined with each other, so that the routing material 630 corresponding to various specifications can be configured.

In this case, it is possible to reduce the number of types of standardized routing materials 630 and also to reduce the number of components.

Figure 36:
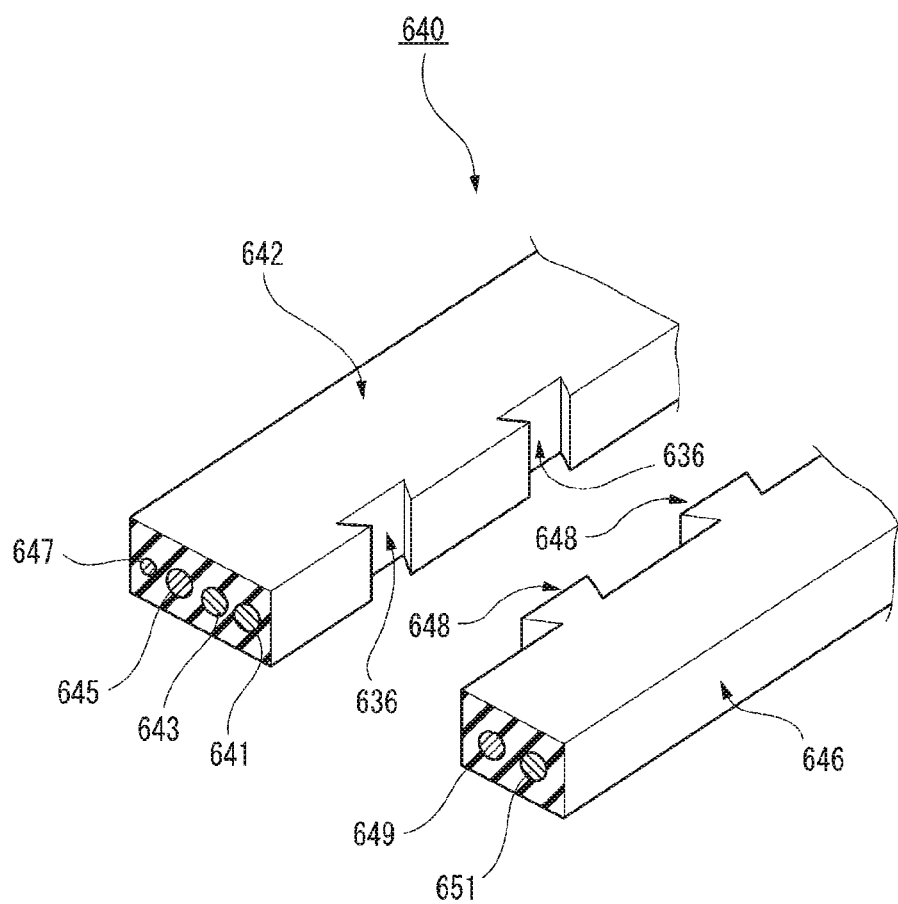
FIG. 36 is a principal portion perspective view for explaining a joint form example of a routing material according to the present embodiment.

FIG. 36 is a principal portion perspective view for explaining a joint form example of a routing material according to the present embodiment.

As illustrated in FIG. 36, a routing material 640 has a configuration in which two thin tabular routing materials 642 and 646 are connected to each other by butting facing surfaces thereof, so as to be integrated. Specifically, a plurality of concaves 636 are formed with a predetermined interval in a longitudinal direction on a right side surface of the routing material 642, and a plurality of protrusions 648 having a shape complementary to that of the concaves 636 are formed with a predetermined interval in the longitudinal direction on a left side surface of the routing material 646.

In the routing material 642, a main power source system 641 for 12 volts, a sub-power source system 643 for 12 volts, an earth line 645 for 12 volts, and a signal line 647 are arranged side by side, each of which is formed of an electric wire having a stranded wire.

In the routing material 646, a power source system 651 for 48 volts and an earth line 649 for 48 volts are arranged side by side, each of which is formed of an electric wire having a stranded wire.

As mentioned above, according to the present embodiment, the routing materials 642 and 646 having a voltage difference with each other so as to be used as the single routing material 640. A routing material having a voltage difference may be easily added in the future. The routing materials 642 and 646 can be fixed to each other through simple work of fitting the protrusions 648 to the concaves 636.

Figure 37A:
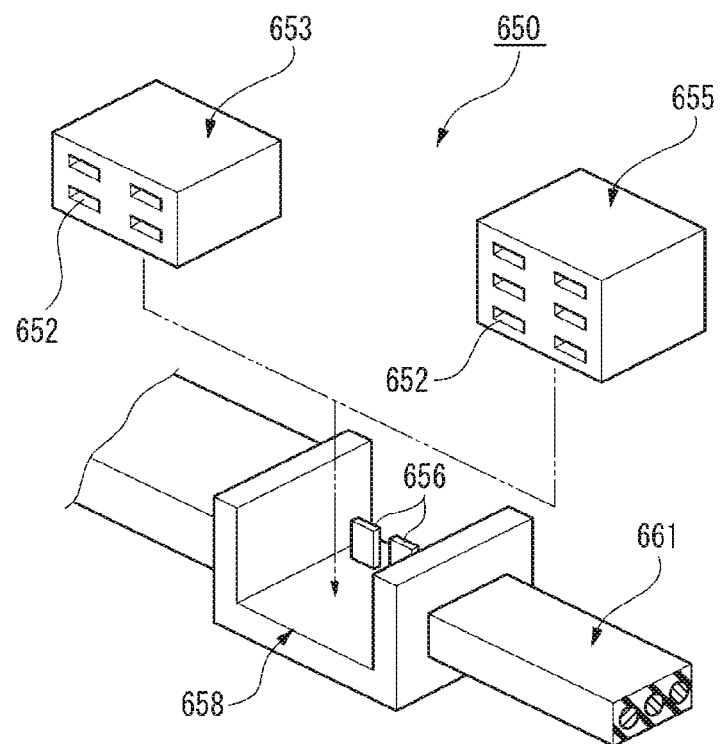
FIGS. 37A and 37B are principal portion exploded perspective views for explaining modification examples of control boxes according to the present embodiment.
Figure 37B:
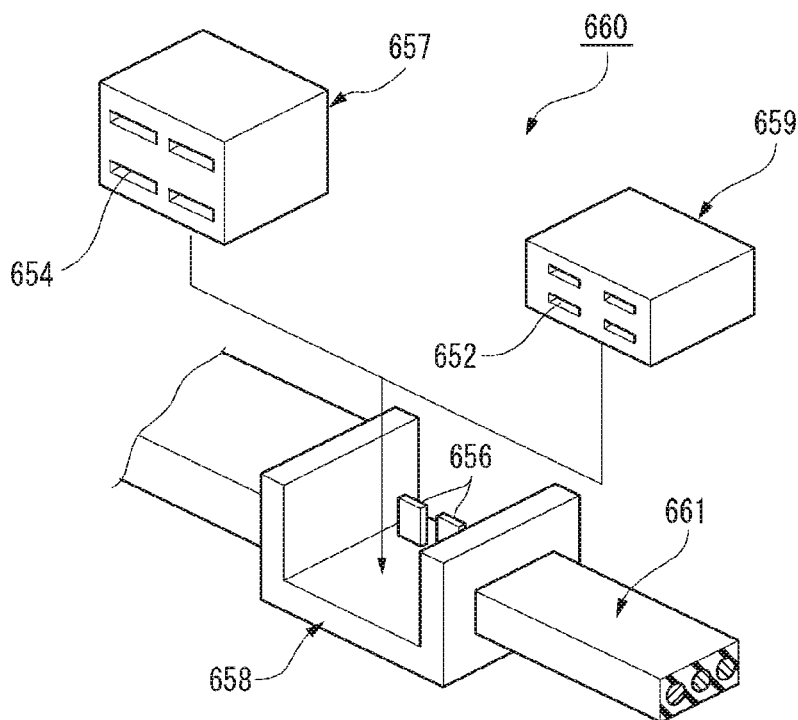

FIG. 37 shows principal portion exploded perspective views for explaining modification examples of control boxes according to the present embodiment.

As illustrated in FIG. 37(*a*), a control box 650 disposed along a backbone trunk line portion 661 includes a control box main body 658 connected to the backbone trunk line portion 661, and cartridges 653 and 655 which are attachable to and detachable from tab terminals 656 of the control box main body 658.

The cartridge 653 has four connector ports 652 forming a branch line connection portion connected to module connectors of branch lines (not illustrated). The cartridge 655 has six connector ports 652 forming a branch line connection portion connected to module connectors of branch lines (not illustrated).

Therefore, the control box 650 has a variation in the number of modules to be connected by selecting the cartridges 653 and 655 as appropriate and mounting the cartridges in the common control box main body 658, and the control box in a vehicle equipment grade can be easily set in the backbone trunk line portion 661.

As illustrated in FIG. 37(*b*), a control box 660 disposed along the backbone trunk line portion 661 includes a control box main body 658 connected to the backbone trunk line portion 661, and cartridges 657 and 659 which are attachable to and detachable from the control box main body 658.

The cartridge 657 has a configuration corresponding to a 48-volt power source having connector ports 654 or the like corresponding to a "4.8 terminal". The cartridge 659 has a configuration corresponding to a 12-volt power source having connector ports 652 or the like corresponding to a "1.5 terminal".

Therefore, the control box 660 can cope with a 12-volt power source, a 48-volt power source, and a variation in both of the power sources by selecting the cartridges 657 and 659 and mounting the cartridges in the common control box main body 658. Thus, the backbone trunk line portion 661 with the control box 660 can cope with apparatuses for different voltages by stepping up or down a single voltage.

Figure 38A:
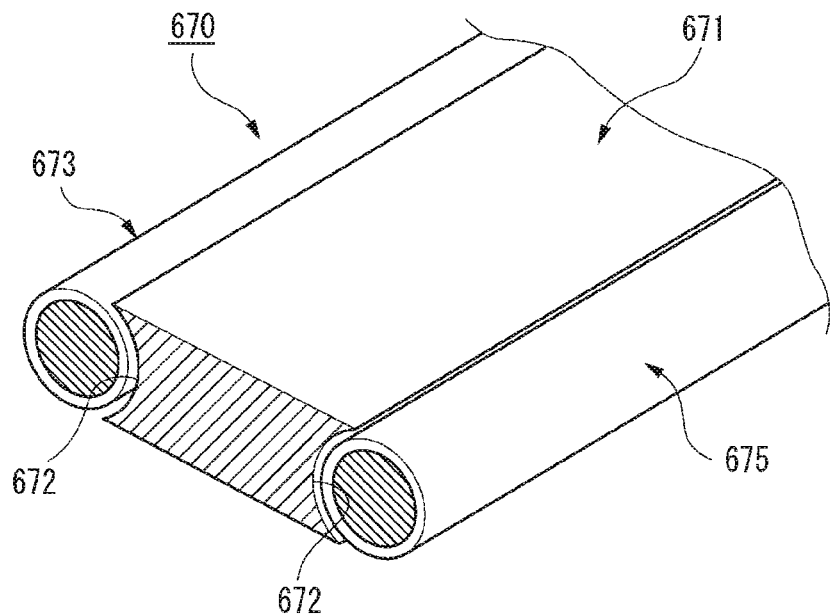
FIGS. 38A and 38B are partial sectional perspective views for explaining modification examples of routing materials according to the present embodiment.

FIG. 38 shows partial sectional perspective views for explaining modification examples of routing materials according to the present embodiment.

As illustrated in FIG. 38(*a*), a routing material 670 includes an earth line 671 formed of a flat conductor, and a main power source system 673 and a sub-power source system 675 formed of round bar conductors disposed on both sides of the earth line 671. The earth line 671 has depressed surfaces 672 having a semicircular shape on surfaces facing the main power source system 673 and the sub-power source system 675 in order to increase a facing area with the main power source system 673 and the sub-power source system 675.

Therefore, the noise resistance performance of the routing material 670 is improved due to an increase of the facing area with the main power source system 673 and the sub-power source system 675.

The earth line 671 faces the main power source system 673 and the sub-power source system 675 formed of round bar conductors and thus has the depressed surfaces 672 having a semicircular shape, but has flat surfaces in a case where the main power source system 673 and the sub-power source system 675 are formed of flat conductors. In other words, facing surfaces of the earth line 671 have shapes complementary to shapes of the main power source system 673 and the sub-power source system 675.

Figure 38B:
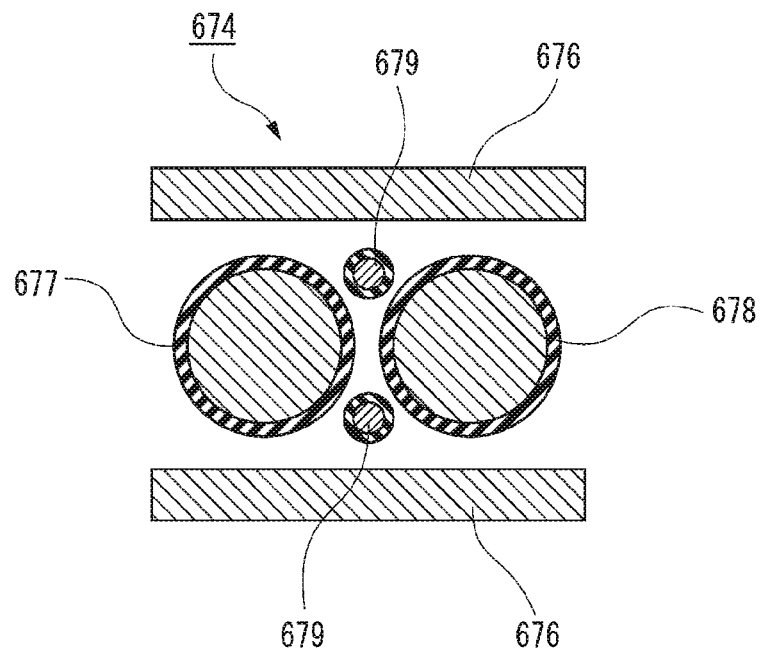

As illustrated in FIG. 38(b), a routing material 674 has a configuration in which a main power source system 677 and a sub-power source system 678 formed of electric wires having stranded wires and arranged side by side so as to be close to each other, a pair of earth lines 676 and 676 formed of flat conductors and disposed on and under the main power source system 677 and the sub-power source system 678 in parallel to an arrangement direction of the main power source system 677 and the sub-power source system 678, and a pair of communication lines 679 and 679 formed of electric wires having stranded wires and disposed in an upper or lower gap between the flat earth lines 676 and the adjacent main power source system 677 or the sub-power source system 678, are disposed in parallel to each other.

Therefore, the upper or lower side of the main power source system 677 or the sub-power source system 678 is covered with the pair of earth lines 676 formed of flat conductors, and thus the routing material 674 can prevent the communication lines 679 and 679 from being influenced by noise.

Since the communication lines 679 and 679 are disposed in the upper or lower gap between the flat earth lines 676 and the adjacent main power source system 677 or the sub-power source system 678, a space can be saved.

FIG. 39 shows perspective views for explaining routing form examples of a routing material according to the present embodiment.

Figure 39A:
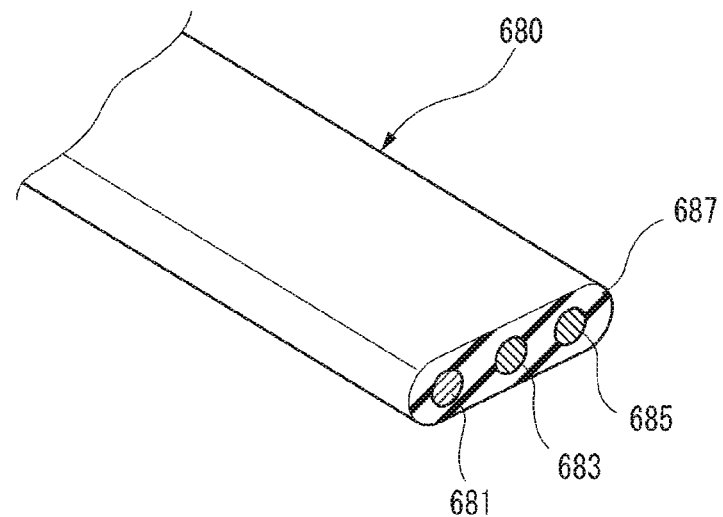
FIGS. 39A and 39B are perspective views for explaining routing form examples of a routing material according to the present embodiment.

As illustrated in FIG. 39(a), a thin tabular routing material 680 in which a main power source system 681, an earth line 683, and a sub-power source system 685 arranged side by side are covered with an insulating coat 687 can be bent in a thickness direction. However, when the routing material is routed in a vehicle body, the routing material 680 tends to return to a linear form due to elastic repulsion, and is thus difficult to be routed at a corner or the like.

Figure 39B:
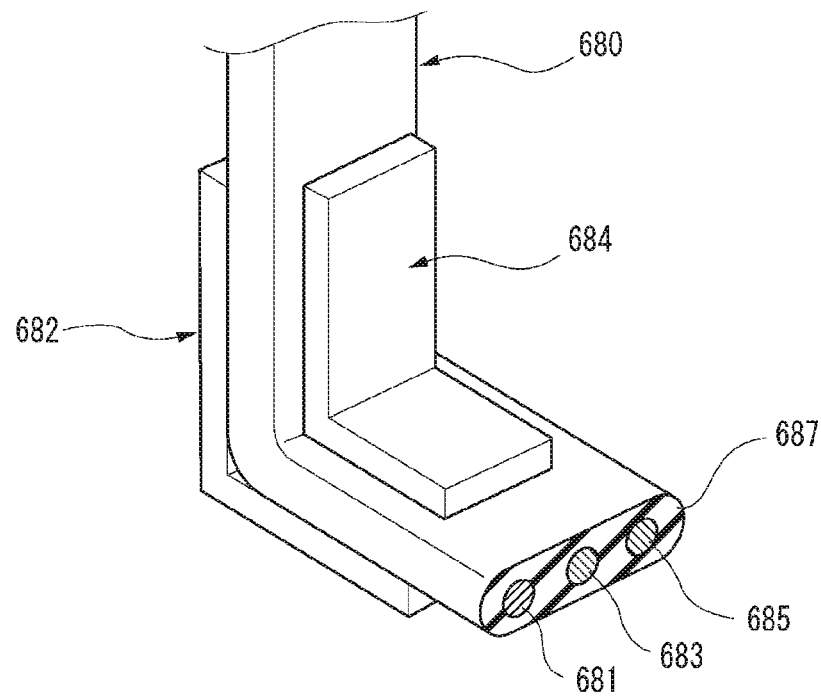

Therefore, as illustrated in FIG. 39(b), splint members 682 and 684 having shapes bent with predetermined angles are disposed on front and rear surfaces of the routing material 680, and thus the routing material 680 can be maintained in a desired shape along a routing path thereof. Consequently, the routing workability of the routing material 680 is improved.

Figure 40:
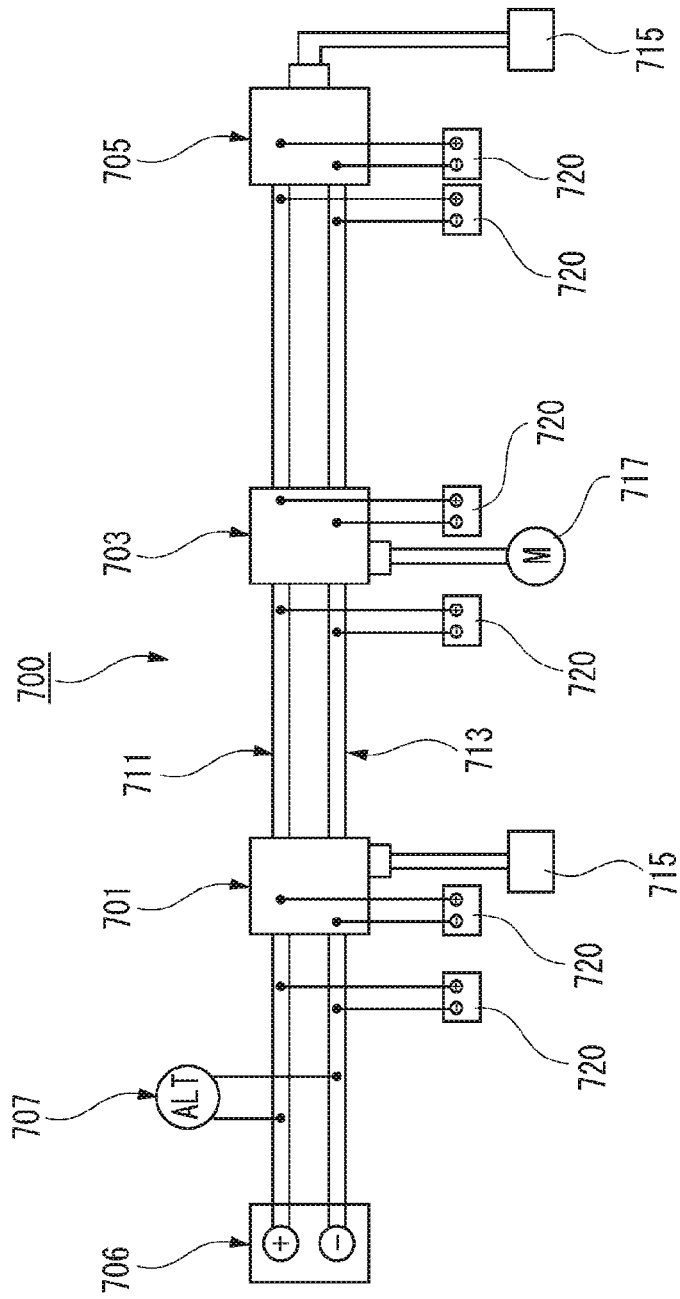
FIG. 40 is a schematic plan view for explaining a modification example of a vehicular circuit body according to the present embodiment.

FIG. 40 is a schematic plan view for explaining a modification example of a vehicular circuit body according to the present embodiment.

As illustrated in FIG. 40, a backbone trunk line portion 700 including a power source line 711 and an earth line 713 is connected to a battery 706 and an alternator 707 which are power sources. A plurality of control boxes 701, 703 and 705 are disposed in the backbone trunk line portion 700 in a distribution manner. Accessories 715 and a motor 717 are connected to the control boxes 701, 703 and 705.

A plurality of sub-batteries 720 are connected to the power source line 711 and the earth line 713 inside and in the vicinity of each of the control boxes 701, 703 and 705.

Therefore, in the backbone trunk line portion 700, the sub-batteries 720 are set at locations close to a noise source so that noise is easily absorbed, and thus noise sneaking into an ECU can be prevented.

Since the plurality of control boxes 701, 703 and 705 are disposed in a distribution manner, there is no problem even if noise emitting devices or noise influenced devices are located at any positions in the backbone trunk line portion 700, and thus the noise resistance performance is improved.

FIG. 41 shows schematic plan views for explaining modification examples of vehicular circuit bodies according to the present embodiment.

As in backbone trunk line portions 730, 740, 750 and 760 illustrated in FIGS. 41(a) to 41(d), a battery 732 can be connected to any position in the backbone trunk line portion according to conditions or the like of a vehicle. In this case, in order to remove the influence of a voltage fluctuation or noise, a low impedance routing material is preferably used as a routing material (a power source line 735 and an earth line 737) of the backbone trunk line portions 730, 740, 750 and 760 routed between a control box 731 and a control box 733.

Figure 41A:
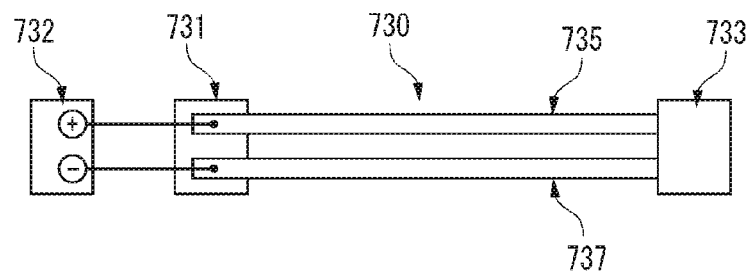
FIGS. 41A to 41E are schematic plan views for explaining modification examples of vehicular circuit bodies according to the present embodiment.
Figure 41B:
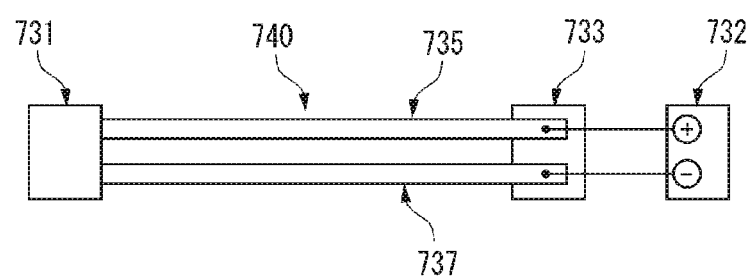
Figure 41C:
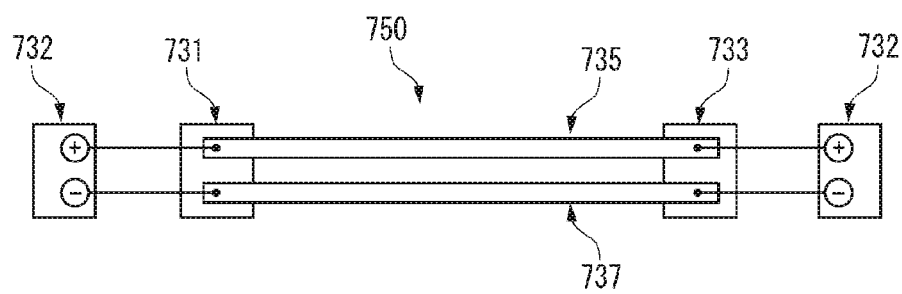
Figure 41D:
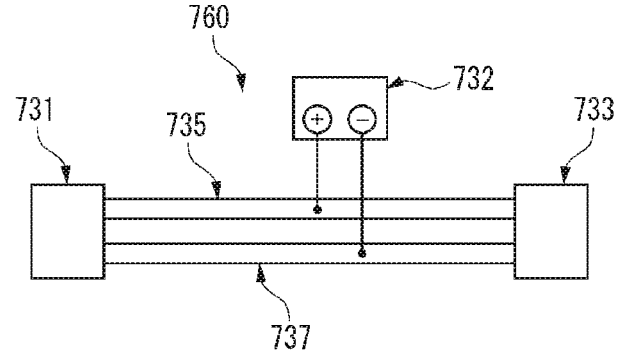
Figure 41E:
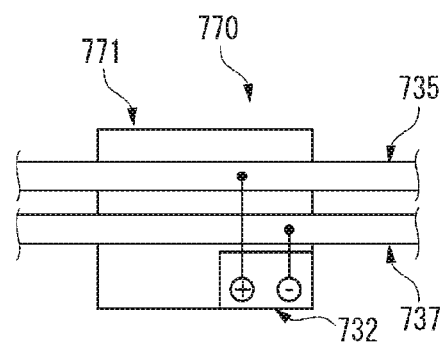

As in a backbone trunk line portion 770 illustrated in FIG. 41(e), the battery 732 may be provided in a control box 771.

Figure 42:
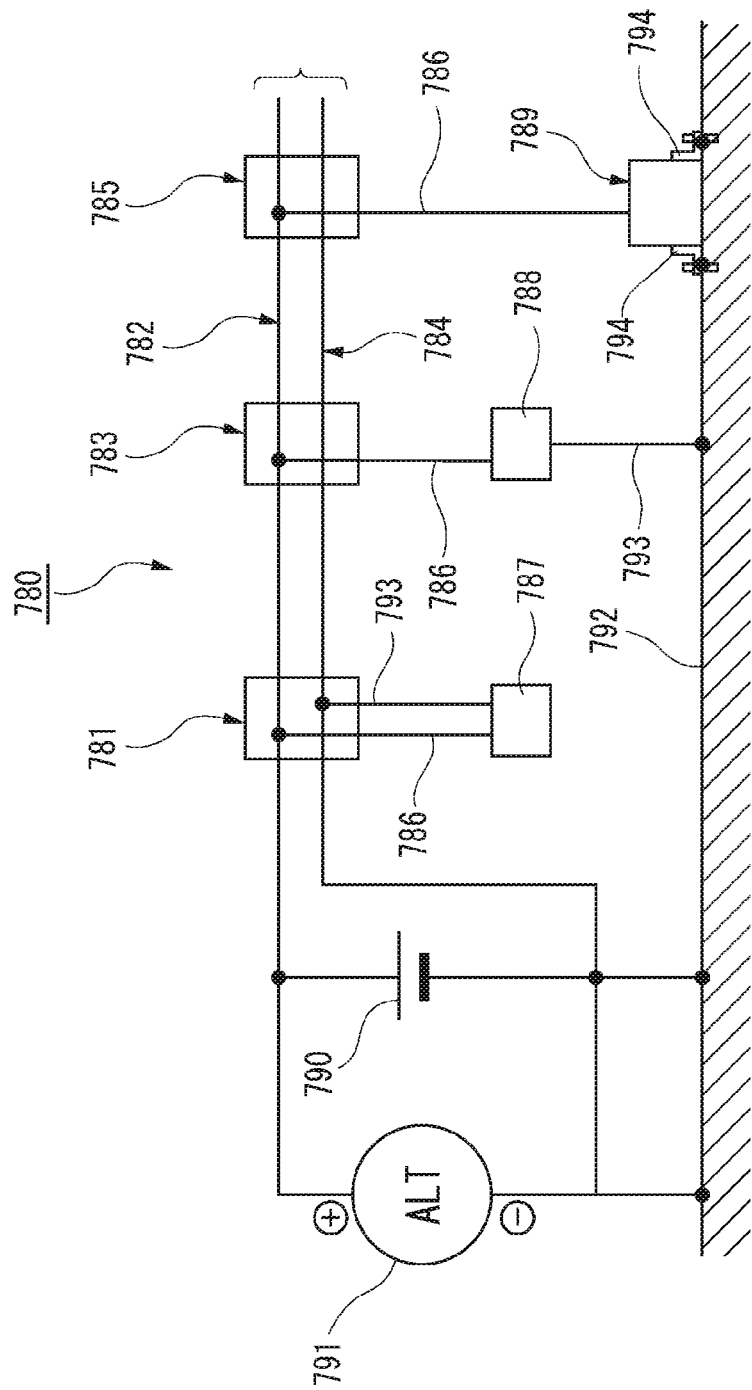
FIG. 42 is a schematic configuration diagram for explaining a modification example of a vehicular circuit body according to the present embodiment.

FIG. 42 is a schematic configuration diagram for explaining a modification example of a vehicular circuit body according to the present embodiment.

As illustrated in FIG. 42, a backbone trunk line portion 780 having a power source line 782 and an earth line 784 is connected to a battery 790 and an alternator 791 which are power sources. A plurality of control boxes 781, 783 and 785 are disposed in the backbone trunk line portion 780 in a distribution manner. Accessories 787, 788 and 789 are respectively connected to the control boxes 781, 783 and 785. A sub-battery may be connected to the backbone trunk line portion 780 on the rearmost side.

The battery 790 and the alternator 791 are grounded to a vehicle body 792. The accessories 788 and 789 of a large current system are also grounded to the vehicle body 792. The accessory 788 is grounded to the vehicle body 792 via an earth line 793, and the accessory 789 is grounded to the vehicle body 792 via brackets 794 fixing a case to the vehicle body 792.

In other words, the accessories 788 and 789 of a large current system are grounded to the vehicle body so as to reduce the influence of noise, and thus it is possible to reduce a ground voltage fluctuation or noise of the alternator 791.

Figure 43:
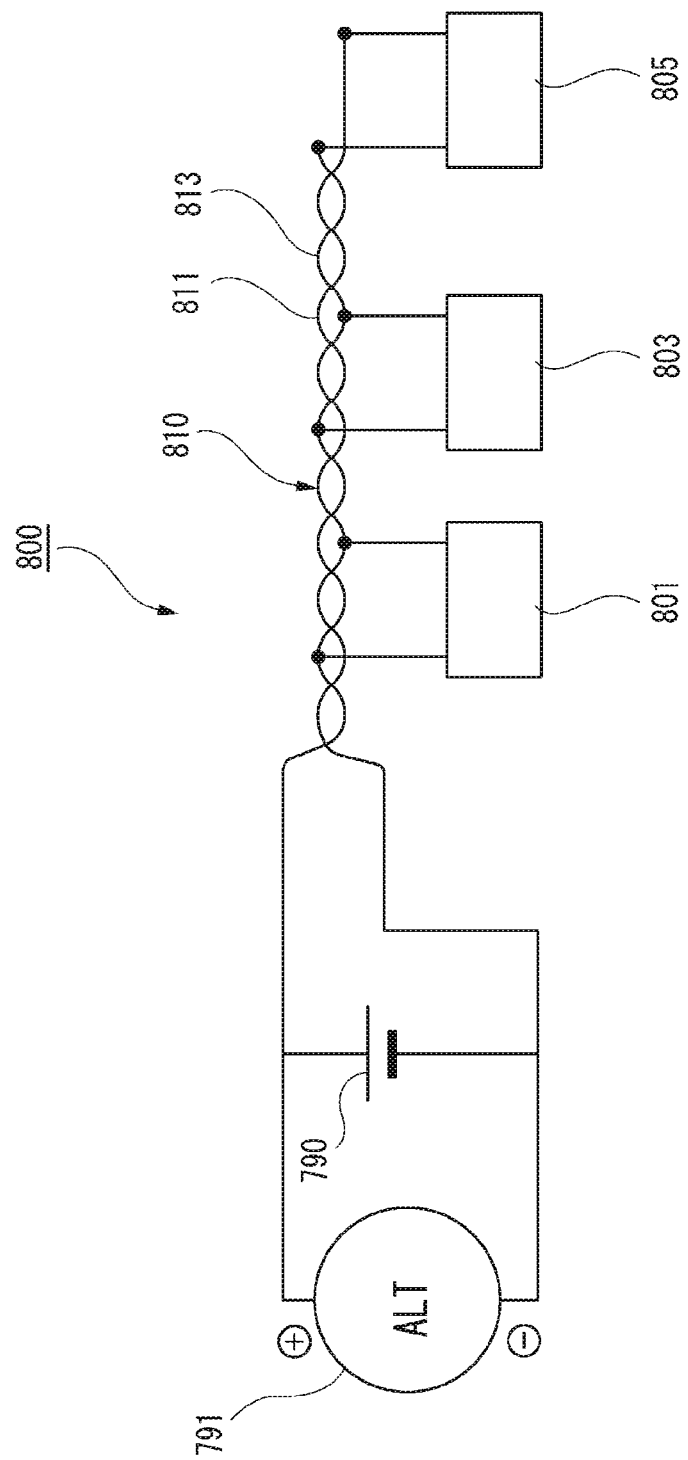
FIG. 43 is a schematic configuration diagram for explaining a modification example of a vehicular circuit body according to the present embodiment.

FIG. 43 is a schematic configuration diagram for explaining a modification example of a vehicular circuit body according to the present embodiment.

As illustrated in FIG. 43, a backbone trunk line portion 800 includes a routing material 810 in which a power source line 811 and an earth line 813 formed of, for example, aluminum round bar conductors or stranded wires are twisted. The routing material 810 is connected to a battery 790 and an alternator 791 which are power sources. A plurality of control boxes 801, 803 and 805 are disposed in the backbone trunk line portion 800 in a distribution manner.

Since the power source line 811 and the earth line 813 are twisted, a noise canceling effect can be increased, and thus resistance performance of external noise can be improved.

Figure 44:
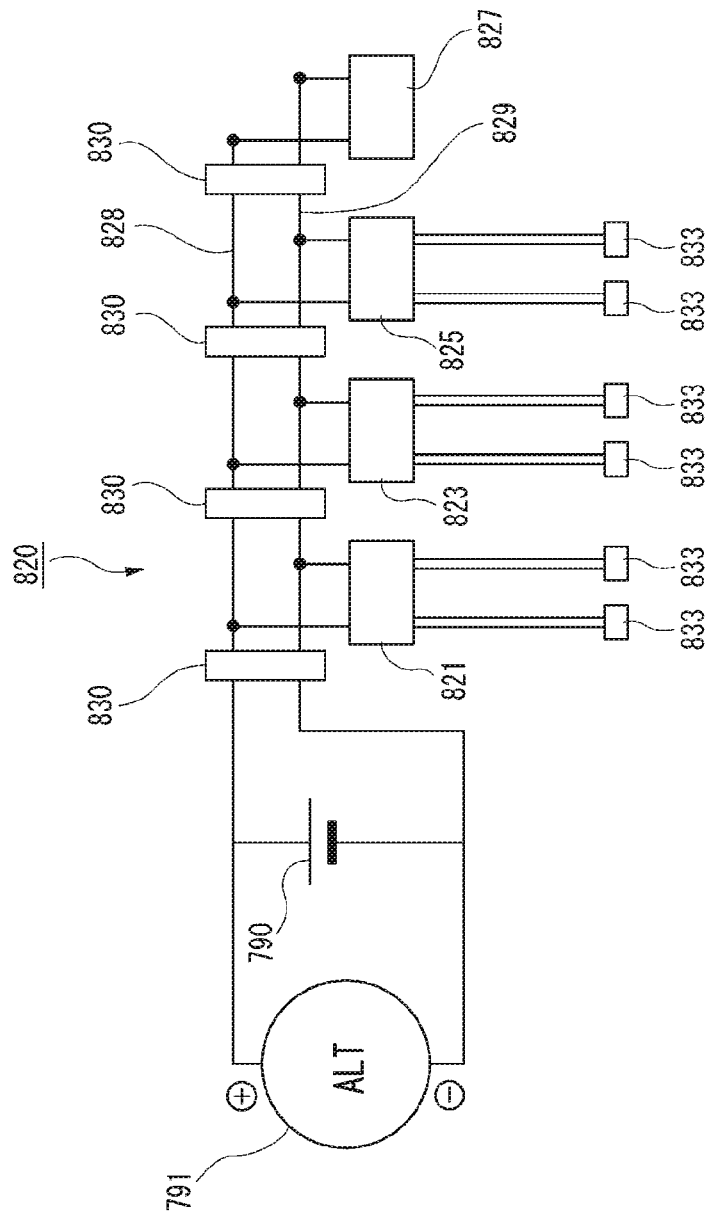
FIG. 44 is a schematic configuration diagram for explaining a modification example of a vehicular circuit body according to the present embodiment.

FIG. 44 is a schematic configuration diagram for explaining a modification example of a vehicular circuit body according to the present embodiment.

As illustrated in FIG. 44, a backbone trunk line portion 820 having a power source line 828 and an earth line 829 is connected to a battery 790 and an alternator 791 which are power sources. A plurality of control boxes 821, 823, 825 and 827 are disposed in the backbone trunk line portion 820 in a distribution manner. Accessories 833 are separately connected to the control boxes 821, 823 and 825.

Annular ferrites 830 are connected to the backbone trunk line portion 820 between the control boxes 821, 823, 825 and 827.

Therefore, it is possible to prevent noise on downstream sides of the respective control boxes 821, 823, 825 and 827 from spreading through the backbone trunk line portion 820.

Figure 45:
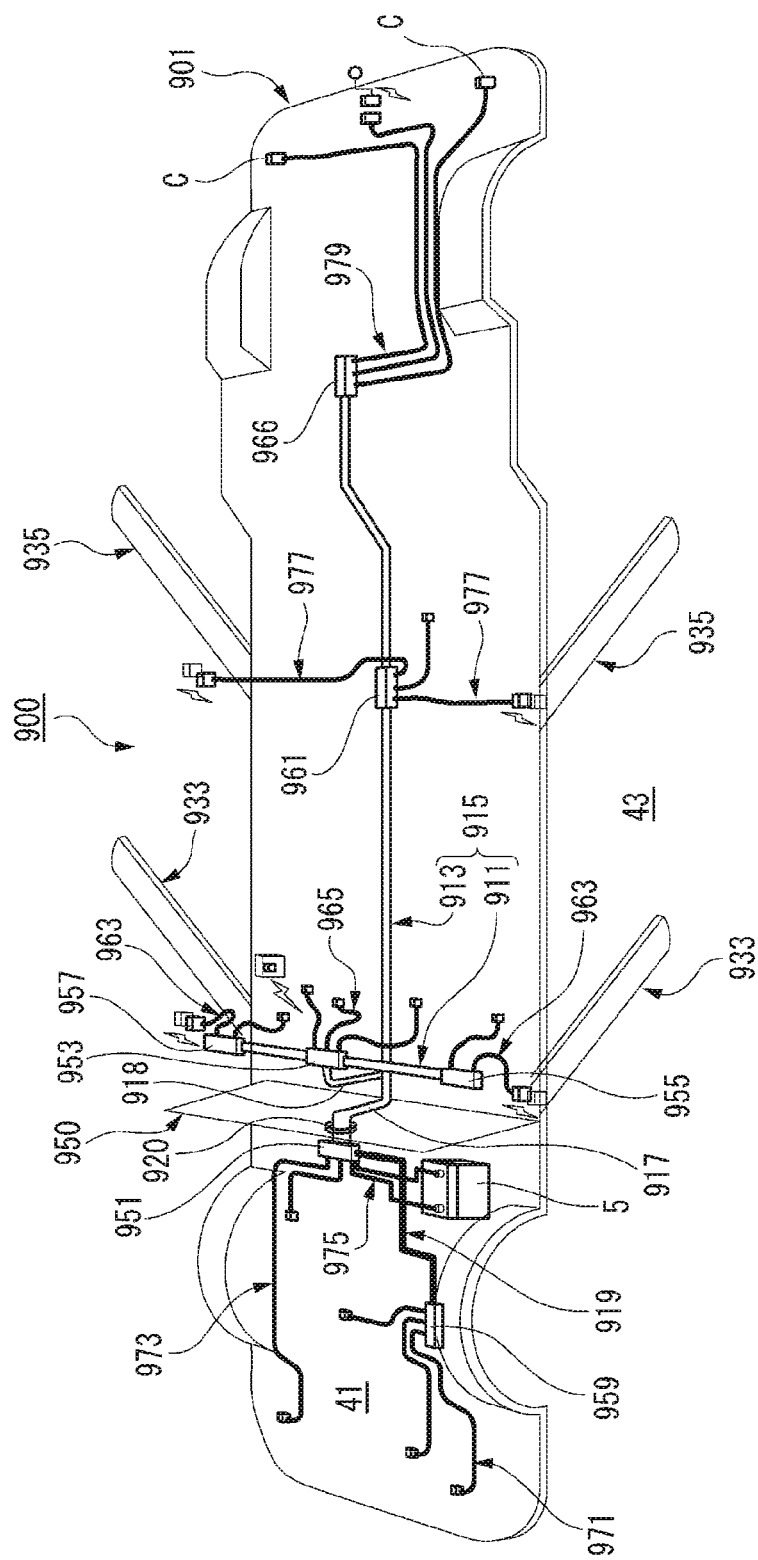
FIG. 45 is a schematic perspective view illustrating a layout and a connection state of each portion in a state in which a vehicular circuit body according to the modification example of the present embodiment is routed on the vehicle body.

FIG. 45 is a schematic perspective view illustrating a layout and a connection state of each portion in a state in which a vehicular circuit body according to the modification example of the present embodiment is routed on the vehicle body.

A vehicular circuit body 900 illustrated in FIG. 45 includes, as fundamental constituent elements, a trunk line (backbone trunk line portion 915) routed in a vehicle body 901 and having a power source line 931, an earth line 933, and a communication line 935; branch lines (instrument panel branch line sub-harnesses 965, front door branch line sub-harnesses 963, rear door branch line sub-harnesses 977, and luggage branch line sub-harnesses 979) connected to electric components at the respective vehicle body locations; and a plurality of control boxes (a supply side control box 951, a branch control box 953, an intermediate control box 961, and control boxes 955, 957, 959 and 966) disposed along the trunk line in a distribution manner and having a control unit for distributing power from the power source line 931 supplied to the trunk line and signals from the communication line 935 to the branch lines connected to the trunk line.

The backbone trunk line portion 915 of the vehicular circuit body 900 is broadly divided into an instrument panel backbone trunk line portion 911, a floor backbone trunk line portion 913, and an engine compartment backbone trunk line portion 919.

The instrument panel backbone trunk line portion 911 is linearly disposed in a leftward-and-rightward direction at a location along a surface of a dash panel 950 so as to be substantially in parallel to a reinforcement (not illustrated) at a position above the reinforcement. The instrument panel backbone trunk line portion 911 may be fixed to the reinforcement.

The floor backbone trunk line portion 913 is disposed to extend in a front-and-rear direction of the vehicle body 901 substantially at the center of the vehicle body 901 in the leftward-and-rightward direction along a vehicle interior floor, and a tip end of a rising portion 917 linearly extending in an upward-and-downward direction at the location along the surface of the dash panel 950 is connected to a joint box 920 installed in a penetration hole of the dash panel 950. A tip end of a rising portion 918 which is branch-connected to the floor backbone trunk line portion 913 is connected to an intermediate portion of the instrument panel backbone trunk line portion 911.

The engine compartment backbone trunk line portion 919 is connected to the floor backbone trunk line portion 913 via the joint box 920 installed in the penetration hole of the dash panel 950.

The engine compartment backbone trunk line portion 919 routed in an engine room 41 of the vehicle is connected to a main battery 5 which is a main power source via a branch line sub-harness 975 connected to the supply side control box 951. The supply side control box 951 and the control box 959 are connected to branch line sub-harnesses 971 and 973.

Here, the dash panel 950 is disposed at a boundary between the engine room 41 and the vehicle interior 43, and a location where an electrical connection member penetrates through the dash panel 950 is required to be perfectly sealed.

In other words, the dash panel 950 is required to have functions of insulating vibration from the engine room 41, reducing vibration or noise from a suspension, and blocking heat, noise, and smell in order to maintain the vehicle interior 43 to be comfortable. Sufficient consideration is also required for the penetration location of the electrical connection member in order to prevent the functions from being impaired.

Figure 46:
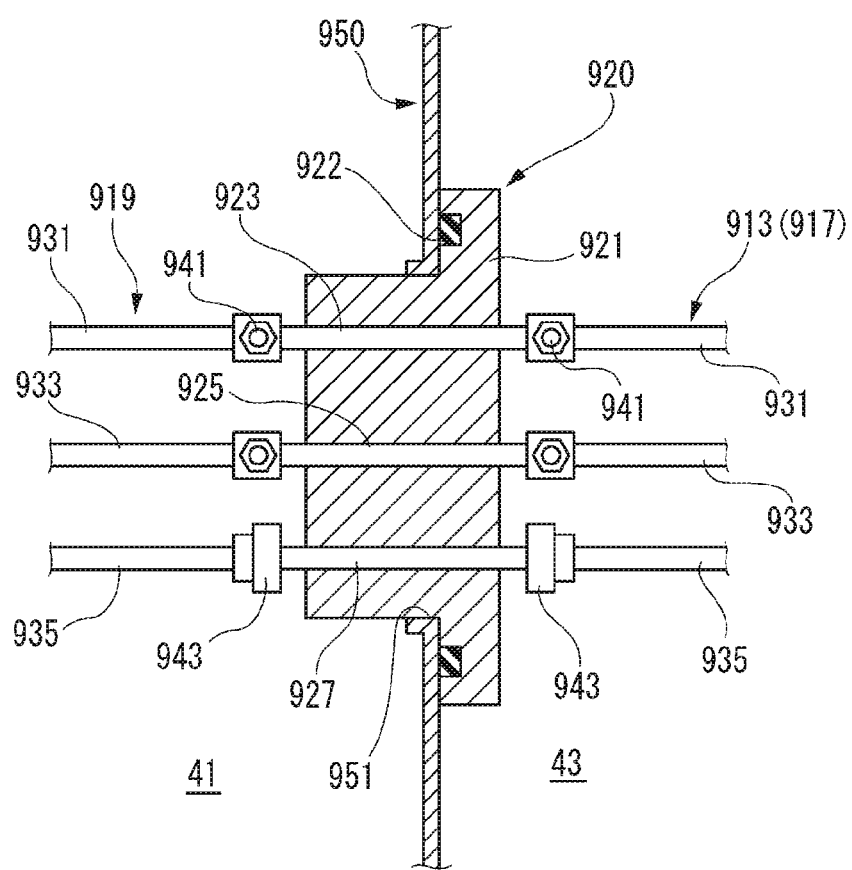
FIG. 46 is a principal portion sectional view for explaining a dash panel penetration structure of a trunk line illustrated in FIG. 45.

As illustrated in FIG. 46, the joint box 920 includes relay terminals 923, 925 and 927 penetrating through a housing 921, and a packing 922 sealing a gap with dash panel 950.

A power source line 931, an earth line 933, and a communication line 935 at the rising portion 917 of the floor backbone trunk line portion 913 and a power source line 931, an earth line 933, and a communication line 935 at the engine compartment backbone trunk line portion 919 are connected to each other through bolt-fastening using bolts 941 at both ends of the relay terminals 923, 925 and 927 and connector coupling using connectors 943.

Therefore, the floor backbone trunk line portion 913 and the engine compartment backbone trunk line portion 919 are connected to each other in a fluid-tight manner via the joint box 920 installed in the penetration hole of the dash panel 950.

Second Embodiment

Figure 47:
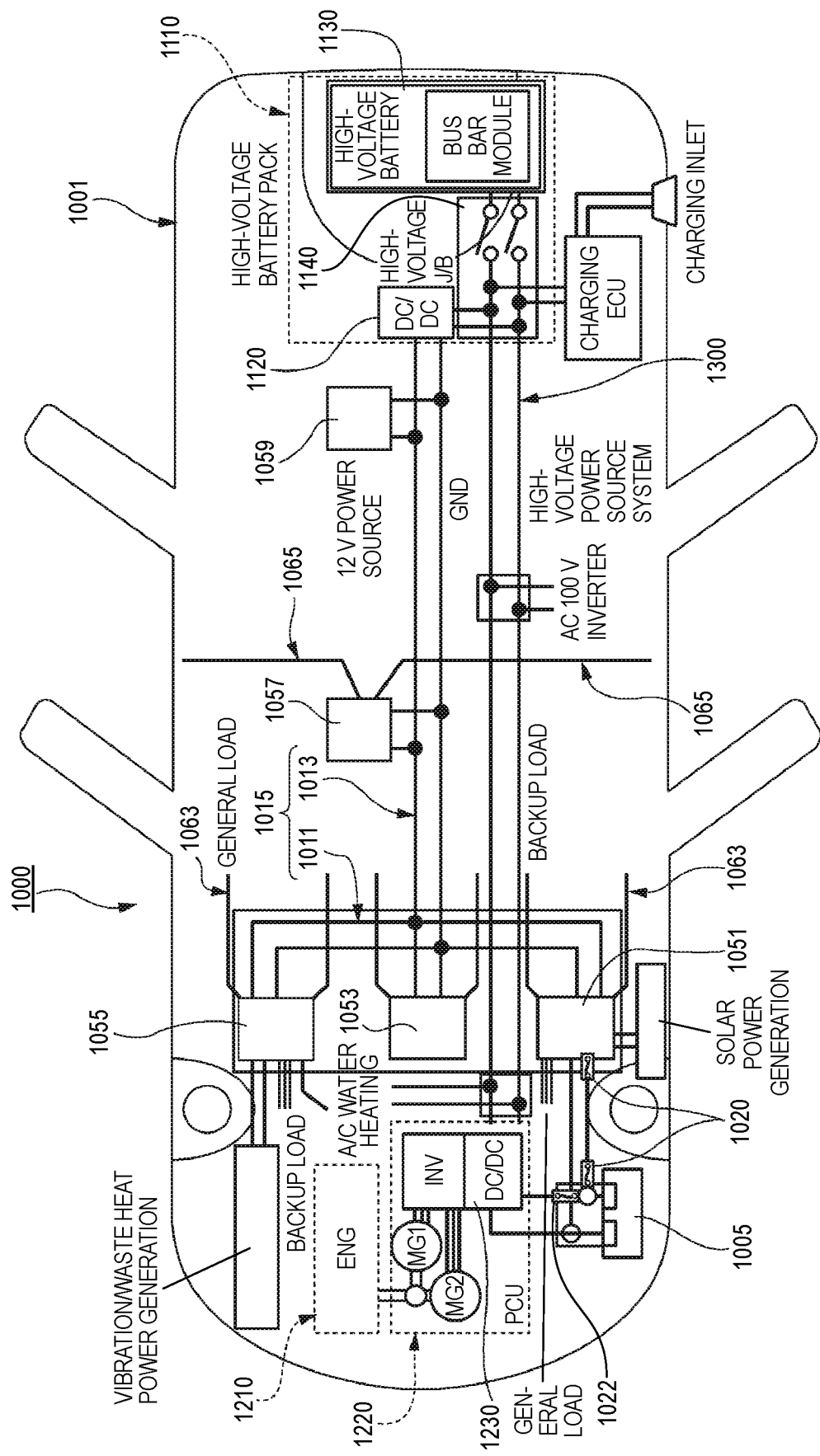
FIG. 47 is a schematic plan view illustrating a layout and a connection state of each portion in a state in which a vehicular circuit body according to a second embodiment of the present invention is routed on a vehicle body.

FIG. 47 is a schematic plan view illustrating a layout and a connection state of each portion in a state in which a vehicular circuit body according to a second embodiment of the present invention is routed on a vehicle body.

A vehicular circuit body 1000 illustrated in FIG. 47 includes, as fundamental constituent elements, a backbone trunk line portion 1015 which is a trunk line routed in a vehicle body 1001 of a so-called plugin hybrid car; branch lines (front door branch line sub-harnesses 1063, rear door branch line sub-harnesses 1065, and the like) connected to electric components at respective vehicle body locations; a plurality of control boxes (a supply side control box 1051, a branch control box 1053, an intermediate control box 1057, and control boxes 1055 and 1059) disposed along the trunk line in a distribution manner and having a control unit which distributes power from a power source line supplied to the trunk line and signals from a communication line to the branch lines connected to the trunk line, and a high-voltage cable 1300 disposed on a vehicle body lower portion in order to connect a high-voltage battery pack 1110 to a power control unit 1220.

The high-voltage battery pack 1110 transmits high-voltage power from a high-voltage battery 1130 to the high-voltage cable 1300 via a high-voltage J/B 1140. The power transmitted to the power control unit 1220 from the high-voltage cable 1300 is sent to a motor generator and an engine 1210 via a DC/DC converter 1230.

A floor backbone trunk line portion 1013 and an instrument panel backbone trunk line portion 1011 of the backbone trunk line portion 1015 are connected to the high-voltage J/B 1140 via a DC/DC converter 1120.

A power source cable connected to the supply side control box 1051 is connected to a main battery 1005 via fusible links 1020. The main battery 1005 is also connected to the DC/DC converter 1230 of the power control unit 1220 via a fusible link 1022.

In the vehicular circuit body 1000, the DC/DC converter 1230 and the DC/DC converter 1120 are respectively disposed at the front part and the rear part of the vehicle, and thus power source redundancy can be realized.

Therefore, power from the high-voltage battery pack 1110 can be stepped down in the DC/DC converter 1120 so as to be supplied to the backbone trunk line portion 1015 as a sub-power source.

In other words, the fusible links 1020 and 1022 are disposed at an end of the backbone trunk line portion 1015, and disconnect circuits when short-circuiting occurs at the front part or the rear part, and thus the supply of power can be continuously performed (backed up) from one of the DC/DC converter 1230 and the DC/DC converter 1120.

Therefore, according to the above-described vehicular circuit bodies 10, 900 and 1000, a new electric wire can be easily added, and miniaturization and a reduction in weight can be realized, by simplifying a structure for electrical connection between various electric components and power sources on a vehicle, and between the electric components, especially, a configuration of a trunk line portion.

Third Embodiment

<Configuration Example of Principal Portions>

Figure 48:
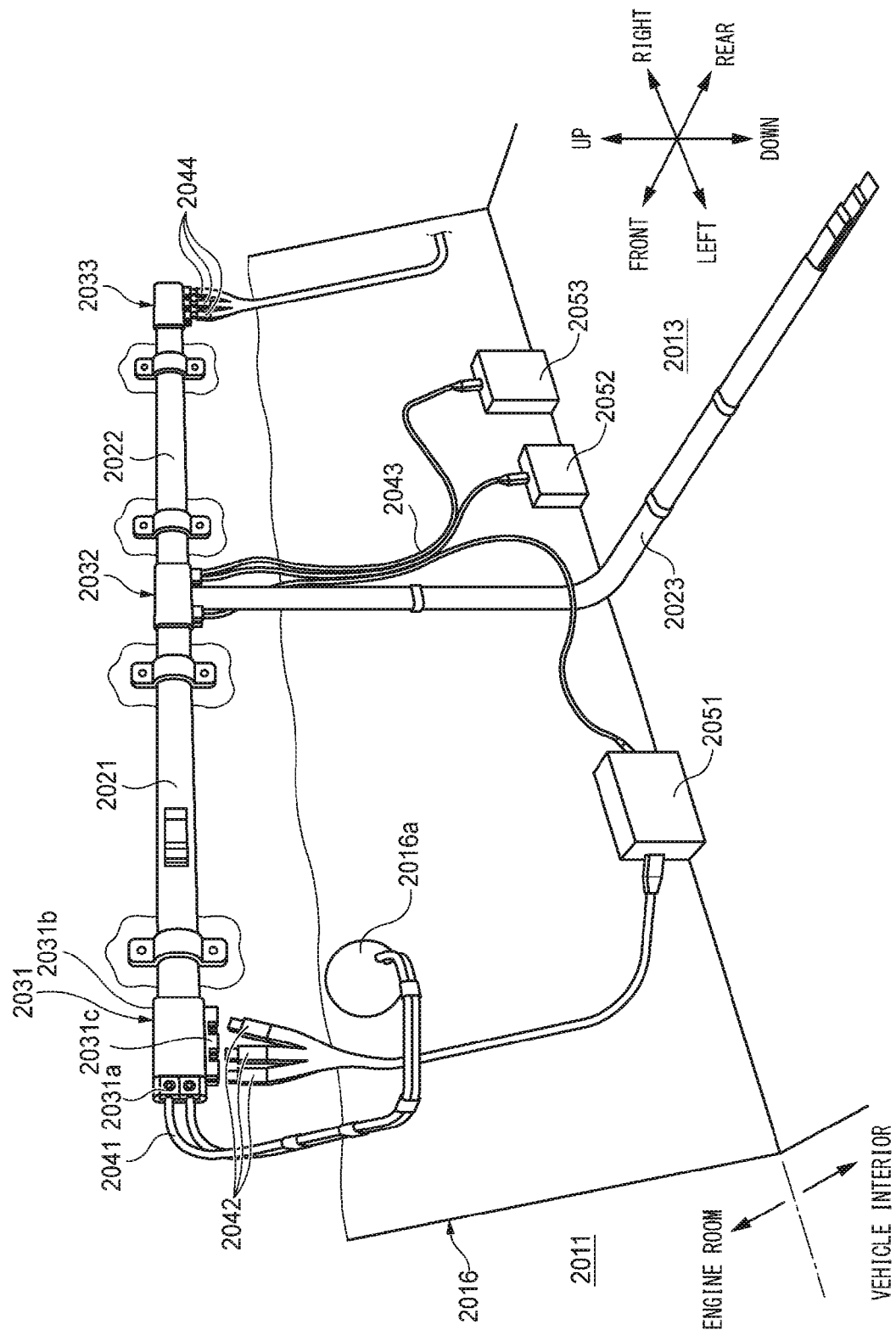
FIG. 48 is a perspective view illustrating a configuration example of principal portions of an on-vehicle device including a vehicular circuit body in a third embodiment of the present invention.

FIG. 48 illustrates a configuration example of principal portions of an on-vehicle device including a vehicular circuit body in a third embodiment of the present invention.

A vehicular circuit body illustrated in FIG. 48 is used as a transmission line required to supply power from a main power source such as an on-vehicle battery to accessories at respective vehicle body locations, that is, various electric components or to exchange signals between the electric components. In other words, a function of the vehicular circuit body of the third embodiment is the same as a general wire harness, but a structure thereof is greatly different from that of the general wire harness.

The on-vehicle device shown in FIG. 48 illustrates a configuration of a vehicle interior side in the vicinity of a dash panel 2016 which partitions a vehicle body into an engine room 2011 and a vehicle interior (occupant compartment) 2013. As illustrated in FIG. 48, a reinforcement (not shown) which is a reinforcement member is provided on an instrument panel portion slightly located on a rear side of the dash panel 2016 so as to extend in the leftward-and-rightward direction of the vehicle body. Principal constituent elements of the vehicular circuit body are disposed in the vicinity of the reinforcement. The vehicular circuit body at a location extending in the leftward-and-rightward direction of the vehicle body may be fixed to the reinforcement, may be fixed to the dash panel 2016, or may be fixed to a dedicated fixing tool.

The vehicular circuit body illustrated in FIG. 48 includes a plurality of backbone trunk line portions 2021, 2022 and 2023, and a plurality of backbone control boxes 2031, 2032 and 2033. Each of the backbone trunk line portions 2021, 2022 and 2023 includes lines such as a power source line, an earth line, and a communication line. The power source line and the earth line of each backbone trunk line portion have a configuration in which a strip-shaped metal material (for example, copper or aluminum) having a flat sectional shape is employed, and such metal materials are stacked in a thickness direction in a state of being electrically insulated from each other. Consequently, a large current is allowed to pass therethrough, and bending processing in the thickness direction is relatively facilitated.

The backbone trunk line portions 2021 and 2022 are linearly disposed in the leftward-and-rightward direction so as to be substantially parallel to the reinforcement over the reinforcement at a location along a surface of the dash panel 2016. The backbone trunk line portion 2023 is disposed substantially at the center of the vehicle body in the leftward-and-rightward direction, and linearly extends in the upward-and-downward direction at the location along the surface of the dash panel 2016. The backbone trunk line portion 2023 is bent in the thickness direction by about 90 degrees in the vicinity of a boundary between the dash panel 2016 and a vehicle interior floor, and is disposed to extend in the front-and-rear direction of the vehicle body along the vehicle interior floor.

The backbone control box 2032 is disposed substantially at the center of the vehicle body in the leftward-and-rightward direction, the backbone control box 2031 is disposed in the vicinity of a left end in the leftward-and-rightward direction, and the backbone control box 2033 is disposed in the vicinity of a right end in the leftward-and-rightward direction.

A left end of the backbone trunk line portion 2021 is connected to a right end of the backbone control box 2031, and a right end of the backbone trunk line portion 2021 is connected to a left end of the backbone control box 2032. A left end of the backbone trunk line portion 2022 is connected to a right end of the backbone control box 2032, and a right end of the backbone trunk line portion 2022 is connected to a left end of the backbone control box 2033. A tip end of the backbone trunk line portion 2023 is connected to a lower end of the backbone control box 2032.

In other words, the backbone trunk line portions 2021 to 2023 and the backbone control boxes 2031 to 2033 are formed in a shape similar to a T shape as illustrated in FIG. 48. Internal circuits of the backbone trunk line portions 2021 to 2023 are in a state of being capable of being electrically connected to each other via the backbone control box 2032.

<Details of Backbone Control Boxes>

The backbone control box 2031 disposed on the left of the vehicle body is provided with a main power source connection portion 2031*a*, a trunk line connection portion 2031*b*, and a branch line connection portion 2031*c*. As illustrated in FIG. 48, the main power source connection portion 2031*a* of the backbone control box 2031 is connected to a main power source cable 2041, the trunk line connection portion 2031*b* is connected to the left end of the backbone trunk line portion 2021, and the branch line connection portion 2031*c* is connected to a plurality of branch line sub-harnesses 2042.

Although not illustrated in FIG. 48, power source lines of two systems, an earth line, and a communication line are provided inside the backbone trunk line portion 2021. The main power source connection portion 2031*a* is provided with two connection terminals which are connected to a power source line and an earth line of the main power source cable 2041.

For example, of the power source lines of two systems included in the backbone trunk line portion 2021, one power source line is used as a path for supplying power from the main power source. The other power source line is used as a path for supplying source power for backup, for example, when abnormality occurs.

A circuit board for connecting power source systems, earth systems, and communication systems of respective circuits to each other among the main power source cable 2041, the backbone trunk line portion 2021, and the branch line sub-harnesses 2042 is provided inside the backbone control box 2031.

Regarding the main power source cable 2041, terminals connected to tip ends of the power source line and the earth line are connected to the terminals of the main power source connection portion 2031*a*, and are fixed by using bolts and nuts, and thus to the circuits can be connected to each other.

Regarding the branch line sub-harnesses 2042, connectors provided at respective tip ends thereof are attachable to and detachable from the branch line connection portion 2031c, and thus the circuits can be connected to each other as necessary. Each of the branch line sub-harnesses 2042 is configured to include all of a power source line, an earth line, and a communication line, or a part thereof. In the backbone control box 2031 illustrated in FIG. 48, the branch line connection portion 2031c is provided with six connectors, and can thus connect to six branch line sub-harnesses 2042 at most.

As illustrated in FIG. 48, the backbone trunk line portions 2021 to 2023 and the backbone control boxes 2031 to 2033 are combined, and various branch line sub-harnesses 2042 to 2044 are connected to the backbone control boxes 2031 to 2033, and thus it is possible to route various transmission lines with a simple structure similar to a backbone.

For example, options or various electric components additionally mounted on a vehicle can be handled just by adding or changing the branch line sub-harnesses 2042 to 2044 connected to any one of the backbone control boxes 2031 to 2033, and thus it is not necessary to change the structure of the trunk line of the vehicular circuit body. In the present embodiment, a case is assumed in which the branch line sub-harnesses 2042 to 2044 are connected to the backbone control boxes 2031 to 2033, but other branch line sub-harnesses (not illustrated) may be connected to locations of proper relay points on the backbone trunk line portions 2021 to 2023, for example.

In an actual on-vehicle device, for example, as illustrated in FIG. 48, an electronic control unit (ECU) 2051 provided in a vehicle may be connected to the backbone control box 2031 or other electric components via the branch line sub-harnesses 2042. The backbone control box 2032 may be connected to electronic control units 2051, 2052 and 2053 or other electric components via the branch line sub-harnesses 2043. The backbone control box 2033 may be connected to various electric components via the branch line sub-harnesses 2044. The respective electronic control units 2051, 2052 and 2053 can control various electric components on the vehicle via communication lines of the branch line sub-harnesses 2042, 2043 and 2044, the backbone control boxes 2031 to 2033, and the like.

On the other hand, the vehicular circuit body illustrated in FIG. 48 is required to perform electrical connection not only between electric components in the vehicle interior 2013 but also between the main power source and electric components in the engine room 2011. The dash panel 2016 is disposed at a boundary between the engine room 2011 and a vehicle interior 2013, and a location where an electrical connection member penetrates through the dash panel 2016 is required to be perfectly sealed. In other words, the dash panel is required to have functions of insulating vibration from the engine room, reducing vibration or noise from a suspension, and blocking heat, noise, and smell in order to maintain the vehicle interior to be comfortable. Sufficient consideration is also required for the penetration location of the electrical connection member in order to prevent the functions from being impaired.

However, for example, if a component which has a large sectional area and is hardly bent in directions other than a specific direction, such as the backbone trunk line portions 2021 to 2023, is configured to penetrate through the dash panel 2016, it is considerably hard to seal the penetration location, and thus it is also difficult to perform routing work of a vehicular circuit body.

In the vehicular circuit body illustrated in FIG. 48, the backbone trunk line portions 2021 to 2023 and the backbone control boxes 2031 to 2033 which are principal constituent elements are all disposed in a space on the vehicle interior 2013 side, and thus the problem of the penetration location in the dash panel 2016 can be easily solved.

Actually, as illustrated in FIG. 48, the main power source cable 2041 connected to the left end of the backbone control box 2031 is routed to pass through a penetration hole 2016a of the dash panel 2016, and a circuit of the main power source in the engine room 2011 is connected to a power source circuit of the backbone control box 2031 via the main power source cable 2041. Consequently, power from the main power source can be supplied to the backbone control box 2031. Since an easily bendable material can be used for the main power source cable 2041, a sectional shape thereof can be made a circular shape, and a sectional area thereof can be made small, sealing of the penetration hole 2016a can be facilitated, and thus it is also possible to prevent workability from degrading when routing work is performed.

In a case where various electric components in the engine room 2011 are connected to the vehicular circuit body of the vehicle interior 2013, for example, a part of the branch line sub-harnesses 2042 connected to the backbone control box 2031 is provided to pass through the dash panel 2016, or a part of the branch line sub-harnesses 2044 connected to the backbone control box 2033 is provided to pass through the dash panel 2016, and thus a desired electrical connection path can be realized. In this case, since the branch line sub-harnesses 2042 and 2044 have small sectional areas and are easily bent, a location where the branch line sub-harnesses pass through the dash panel 2016 can be easily sealed.

Since the main power source is located in the engine room 2011 side, a power source line or an earth line may be omitted in a branch line sub-harness provided at a penetration location of the dash panel 2016, and only a communication line may be provided therein. Such a special branch line sub-harness may be configured as a communication trunk line separately from the branch line sub-harnesses 2042 to 2044 branched from the backbone trunk line.

The on-vehicle device of the present embodiment has the above-described fundamental configuration as illustrated in FIG. 48, but various changes or additions can be made in a configuration or an operation as will be described below for further improvement.

<Characteristic Technique Regarding Supply of Power>
<Configuration Example of System>

Figure 49:
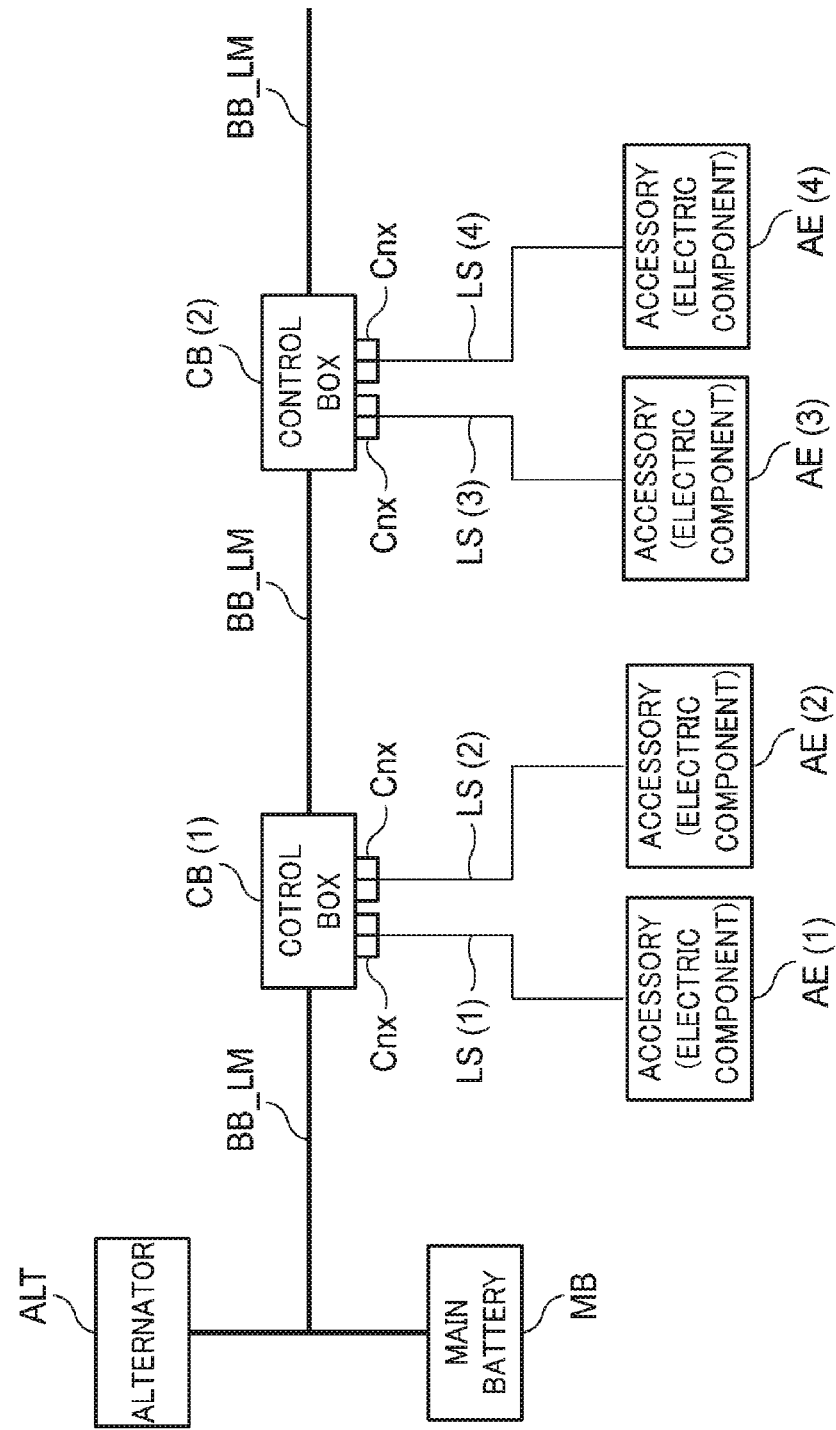
FIG. 49 is a block diagram illustrating a configuration example of an on-vehicle system.

A system illustrated in FIG. 49 includes a backbone trunk line BB_LM in order to secure principal paths for the supply of power and communication. A plurality of control boxes CB(1) and CB(2) are connected in the middle of the backbone trunk line BB_LM. A main battery MB and an alternator ALT which are main power sources of a vehicle side are connected to an upstream side of the backbone trunk line BB_LM.

Each of the control boxes CB(1) and CB(2) is provided with connection portions Cnx for connection to various accessories AE. The respective accessories AE correspond to electric components such as various loads or an electronic control unit (ECU) mounted on the vehicle.

In the configuration illustrated in FIG. 49, the accessory AE(1) is connected to a single connector in the connection portions Cnx of the control box CB(1) via a branch line sub-harness LS(1). The accessory AE(2) is connected to a single connector in the connection portions Cnx of the control box CB(1) via a branch line sub-harness LS(2).

Similarly, each of the accessories AE(3) and AE(4) is connected to a single connector in the connection portions Cnx of the control box CB(2) via corresponding branch line sub-harnesses LS(3) and LS(4).

The connection portions Cnx of each control box CB is provided with a plurality of connectors (not illustrated in FIG. 49), and the plurality of connectors have the same shape, size and configuration. Therefore, in a case where each branch line sub-harness LS is connected to the connector of the connection portion Cnx, any one of the plurality of connectors may be selected.

Therefore, source power supplied to the backbone trunk line BB_LM from the main power source or the like branches at the location of the control box CB(1) or CB(2), and is supplied to each accessory AE via the branch line sub-harness LS connected to the branching location.

<Configuration Examples of Trunk Line>

Figure 50A:
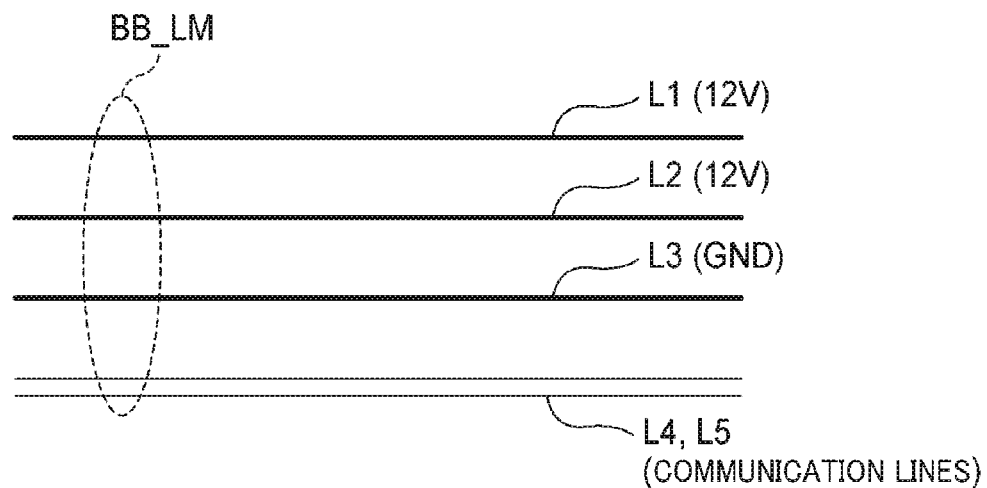
FIGS. 50A and 50B are electrical circuit diagrams illustrating configuration examples of backbone trunk lines.
Figure 50B:
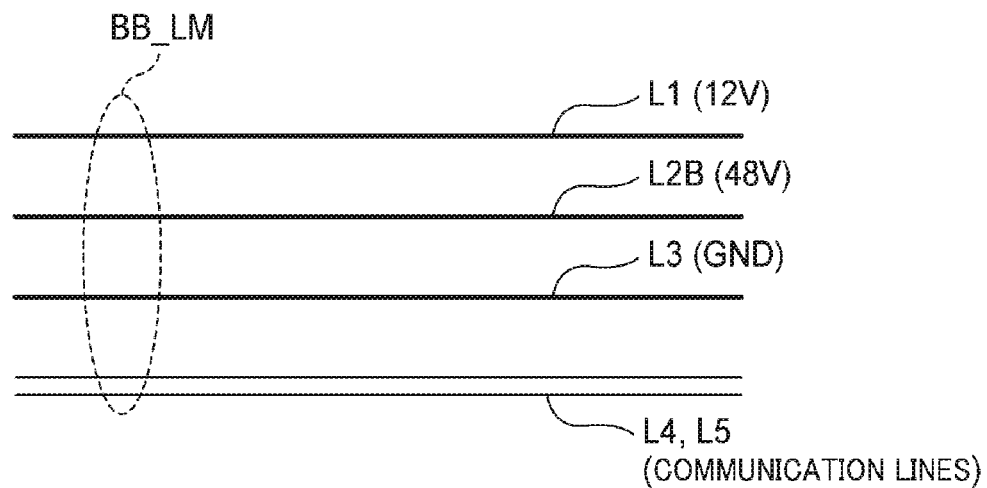

FIGS. 50(*a*) and 50(*b*) illustrate configuration examples of the backbone trunk line BB_LM. In the example illustrated in FIG. 50(*a*), the backbone trunk line BB_LM to includes power source lines L1 and L2 of independent two systems, an earth line L3, and communication lines L4 and L5 formed of two electric wires. The power source lines L1 and L2, the earth line L3, and the communication lines L4 and L5 are disposed as lines which are parallel to each other so as to extend in parallel. In an environment in which each accessory AE can be connected to the ground of the power source along other paths such as the vehicle body ground, the earth line L3 may be omitted from the constituent elements of the backbone trunk line BB_LM.

In the example illustrated in FIG. 50(*a*), both of the power source lines L1 and L2 of two systems are configured to handle a common DC power source voltage of 12 V. The control box CB has a function of selecting one of the power source lines L1 and L2 of two systems and supplying power to a downstream side. Therefore, for example, in a case where only one of the power source lines L1 and L2 is disconnected in the middle of the backbone trunk line BB_LM, each control box CB can continuously supply power by using the remaining normal path.

In the example illustrated in FIG. 50(*b*), the backbone trunk line BB_LM includes power source lines L1 and L2B of independent two systems, an earth line L3, and communication lines L4 and L5 formed of two electric wires. Of the power source lines L1 and L2B of two systems, one power source line L1 is configured to handle a DC power source voltage of 12 V. The other power source line L2B is configured to handle a DC power source voltage of 48 V.

Therefore, in the configuration illustrated in FIG. 50(*b*), the control box CB may select one of the two kinds of power source voltages and supply the selected voltage to the accessory AE under control thereof. Thus, an appropriate power source voltage may be automatically selected depending on, for example, characteristics or situations of a load. For example, in a case where the load has large power consumption, a large power source current flows and a voltage drop in a supply line path increases, and thus, it is possible to prevent an increase in a power loss by selecting a higher power source voltage. As in the example illustrated in FIG. 50(*b*), in a case where only one of the power source lines L1 and L2B is disconnected, each control box CB can continuously supply power by using the remaining normal path.

In a case where two kinds of power source voltages are used, a voltage may be stepped up from 12 V to 48 V on the main power source side so as to be supplied to the backbone trunk line BB_LM, and power of 12 V supplied from the backbone trunk line is BB_LM may be stepped up to be generated as power of 48 V in either of the control boxes CB.

<Circuit Configuration Example of Power Source System>

Figure 51:
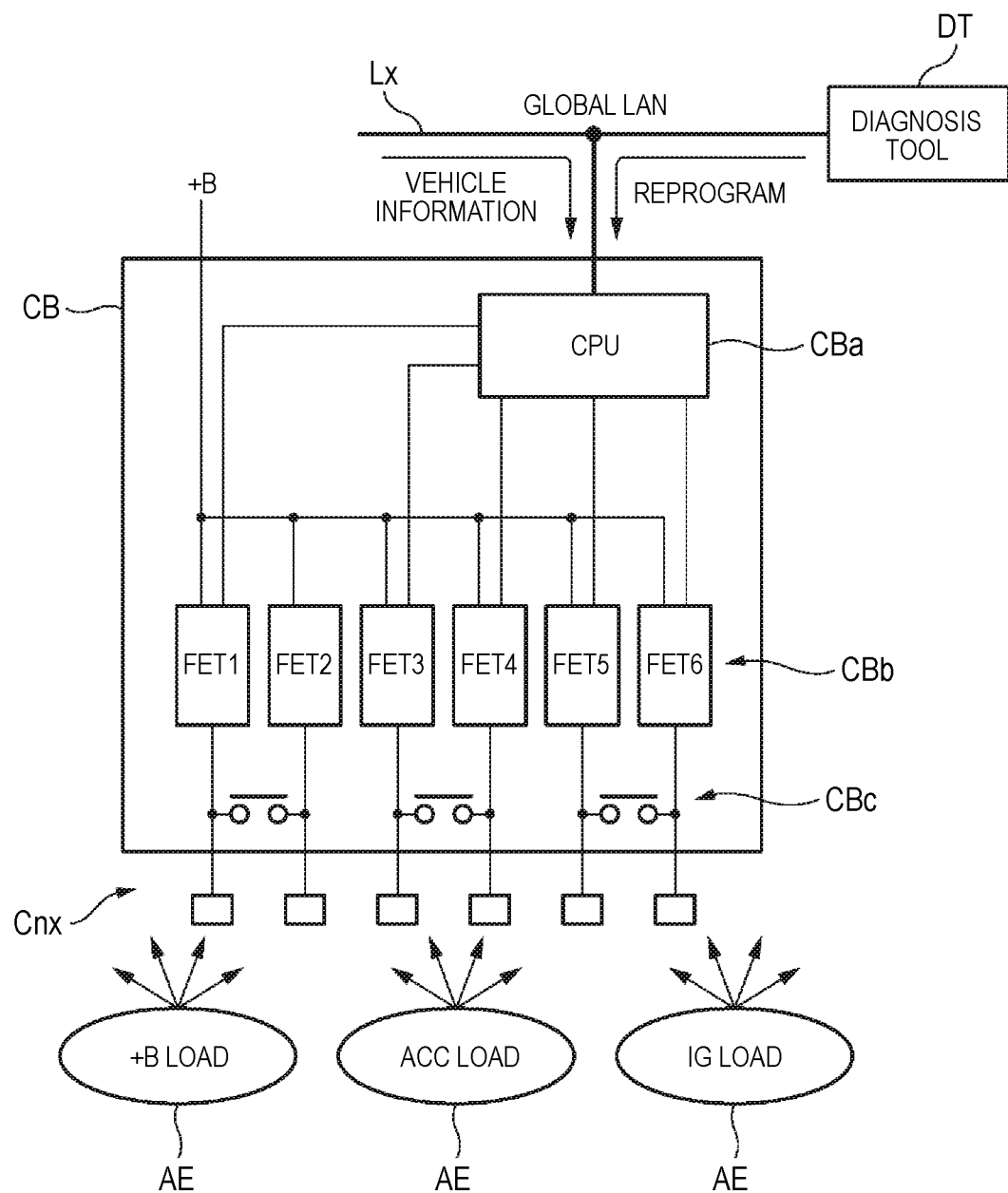
FIG. 51 is a block diagram illustrating a configuration example of an electrical circuit inside a control box.

FIG. 51 illustrates a specific configuration example regarding a power source system in the control box CB. In this configuration, a microcomputer (CPU) CBa, a switch circuit CBb, and a bridge circuit CBc are provided in the control box CB.

The microcomputer CBa is configured by a field-programmable gate array (FPGA), and thus a configuration and an operation thereof can be reconfigured according to an external program rewriting instruction (reprogram). A configuration of the FPGA in the present specification is only an example.

The microcomputer CBa is connected to a predetermined diagnosis tool DT via a communication line Lx. Actually, there is a case where the diagnosis tool DT is connected only when adjustment or maintenance is performed in a vehicle factory, and a case where the diagnosis tool DT is normally mounted on a vehicle in order to automatically solve a problem through diagnosis performed at all times.

As the communication line Lx, the communication lines L4 and L5 of the backbone trunk line BB_LM may be used without being changed, or a dedicated communication line may be separately prepared. If a predetermined manager gives an instruction by using the diagnosis tool DT, or a predetermined recovery program is executed, the diagnosis tool DT can rewrite a program regarding a configuration and an operation of the microcomputer CBa.

The switch circuit CBb includes a plurality of switching elements which distribute power of a DC power source voltage (+B) supplied from the power source line L1 or L2 of the backbone trunk line BB_LM to a plurality of output systems, and perform switching between ON and OFF of conduction for the respective output systems. In the example illustrated in FIG. 51, six power field effect transistors (FETs) are used as switching elements. Each of the switching elements is configured to be turned on and off according to an output from the microcomputer CBa. Regarding an operation of the switching element, in addition to simple turning-on and turning-off, for example, an output power adjustment function may be provided by performing pulse width control (PWM) using turning-on and turning-off. Furthermore, although a +B load, an ACC load and an IG load must be connected respectively according to the conventional construction, it is possible to connect a +B load, an ACC load and an IG load to any portion since the power FET can have functions equivalent to an ACC relay and an IG relay by using reprogram.

The bridge circuit CBc includes a plurality of switching elements for connecting the plurality of output systems located on the output side of the switch circuit CBb to each other as bridges. Each of the switching elements is also configured to be turned on and off according to an output from the microcomputer CBa.

<Configuration Example of Power Control Function>

Figure 52:
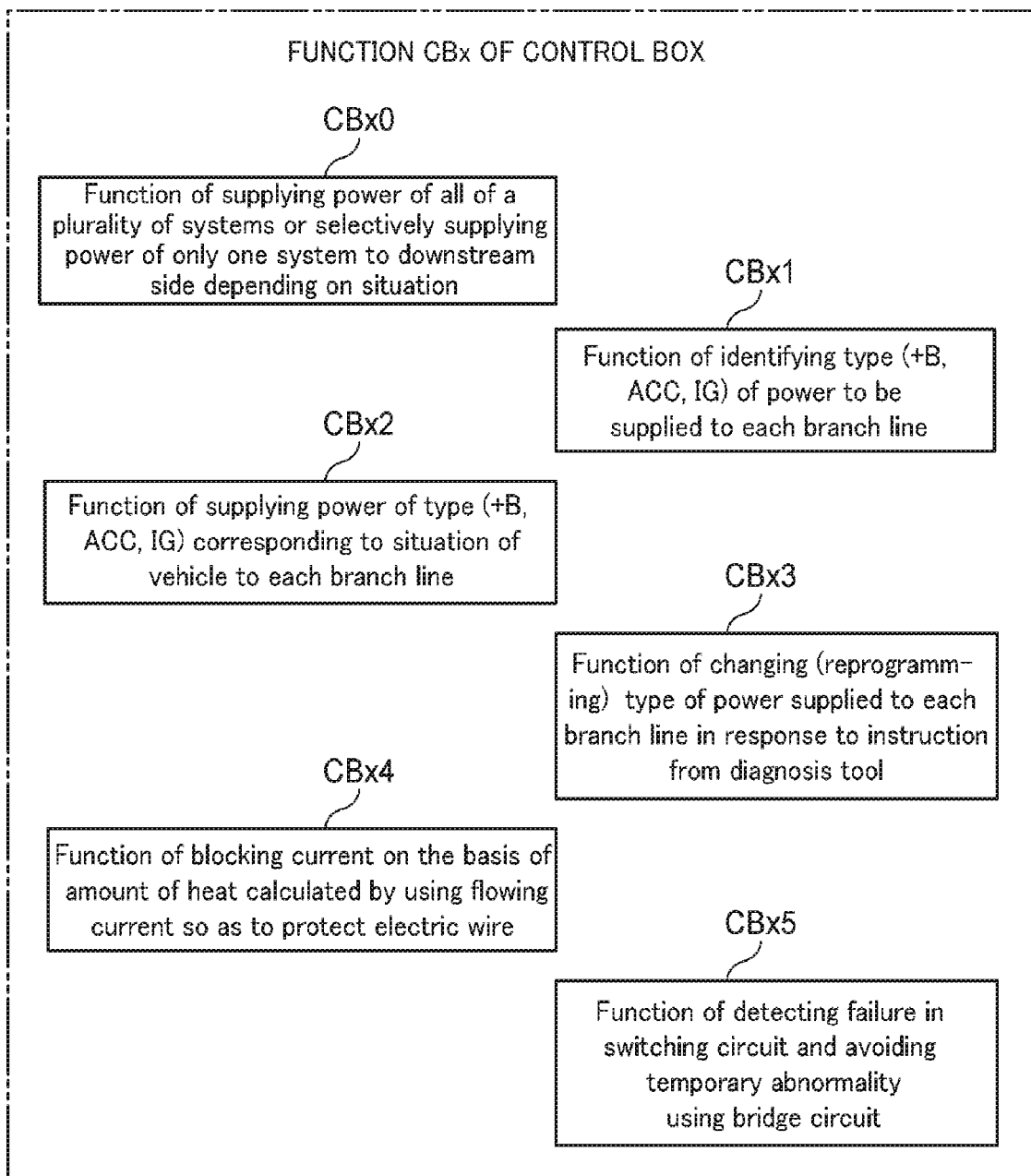
FIG. 52 is a block diagram illustrating a configuration example of functions of the control box.

FIG. 52 illustrates a specific example of a power control function CBx of the control box CB. In the example, the control box CB has six kinds of functions CBx0, CBx1, CBx2, CBx3, CBx4 and CBx5 illustrated in FIG. 52 as representative power control functions. These functions are realized through processes performed by the microcomputer CBa.

Function CBx0: The microcomputer CBa detects various situations, and supplies power of all of the plurality of systems supplied from the backbone trunk line BB_LM or selectively supplies power of only one thereof to a downstream side, that is, the accessories AE sides, depending on a detected situation. For example, in a case where the backbone trunk line BB_LM has the configuration illustrated in FIG. 50(a), if disconnection of one of the power source lines L1 and L2 is detected, only power to supplied from a normal path of the power source lines L1 and L2 is supplied to an output path. For example, in a case where the backbone trunk line BB_LM has the configuration illustrated in FIG. 50(b), power of higher voltage (48 V) supplied from the power source line L2B is preferentially selected and is output based on a specification, or preferentially selected and is output to an output system connected to the accessory AE having an actually large load current.

Function CBx1: The microcomputer CBa identifies the type of power to be supplied to each branch line. Regarding the type of power, specifically, there are "+B" power which is supplied at all times, "ACC" power whose supply is in conjunction with turning-on and turning-off of an accessory switch, and "IG" power whose supply is in conjunction with turning-on and turning-off of an ignition switch. The microcomputer CBa identifies the kind of the accessory AE connected thereto and under the control thereof, and selectively supplies power of a more appropriate type among "+B, ACC, and IG" to a corresponding branch line. Power of a type determined in advance on the basis of constant data of a program may be supplied to each branch line, and information such as an ID may be acquired from the actually connected accessory AE so that the type of power may be identified.

Function CBx2: The microcomputer CBa monitors turning-on and turning-off states of an accessory switch and an ignition switch provided in a vehicle side, and controls ON and OFF of power of each output system for each type. In other words, power is supplied to a branch line of an output system to which "ACC: accessory" is allocated as the type of power by turning on the switch circuit CBb only when the accessory switch is turned on, and power is not supplied when the accessory switch is turned off. Power is supplied to a branch line of an output system to which "IG: ignition" is allocated as the type of power by turning on the switch circuit CBb only when the ignition switch is turned on, and power is not supplied when the ignition switch is turned off.

Function CBx3: The microcomputer CBa changes (reprograms) the types "+B, ACC, and IG" of source power supplied to each branch line in response to an instruction from the diagnosis tool DT. For example, the type of power output from an element "FET4" of the switch circuit CBb is allocated to "IG" in a normal state. When a certain necessity for change occurs, the type of power output from the element "FET4" is changed to "ACC" by executing the reprogram of the microcomputer CBa. This change influences control conditions for a control signal which is given to the element "FET4" by the microcomputer CBa. In other words, in a case where "IG" is allocated as the type of power, a control signal for the element "FET4" is changed according to a state of the ignition switch. In a case where "ACC" is allocated as the type of power, a control signal for the element "FET4" is changed according to a state of the accessory switch.

Function CBx4: The microcomputer CBa protects a corresponding electric wire for each branch line connected to an output side. Specifically, an actually conduction current in each output system is measured, an amount of heat is calculated on the basis of the conduction current, and a corresponding system of the switch circuit CBb is interrupted before a temperature increases to a predetermined level or more.

Function CBx5: The microcomputer CBa detects a failure in each switch circuit CBb, and automatically avoids the failure so as to maintain the function in a case where the failure is detected. Specifically, adjacent output systems are connected to each other by using the bridge circuit CBc, and the supply of power to an output side is continuously performed by temporarily using a path which does not pass through an element where the failure has occurred.

Instead of the above "+B, ACC, and IG", "+BA", "IGP", and "IGR" may be employed as a new classification of the type of power. "+BA" indicates power of a system which is turned on when a user comes close to a vehicle. "IGP" indicates power of a system which is turned on when ignition is brought into an ON state, and then an engine is in a full state. "IGR" indicates power of a system which is turned on when wheels rotate. Even in a case where such newly classified type of power is employed, the respective functions CBx1 and CBx2 illustrated in FIG. 52 can be realized in the same manner by acquiring information required for control.

<Characteristic Techniques Regarding Communication>
<Technique for Uninterrupted Communication>

Figure 53:
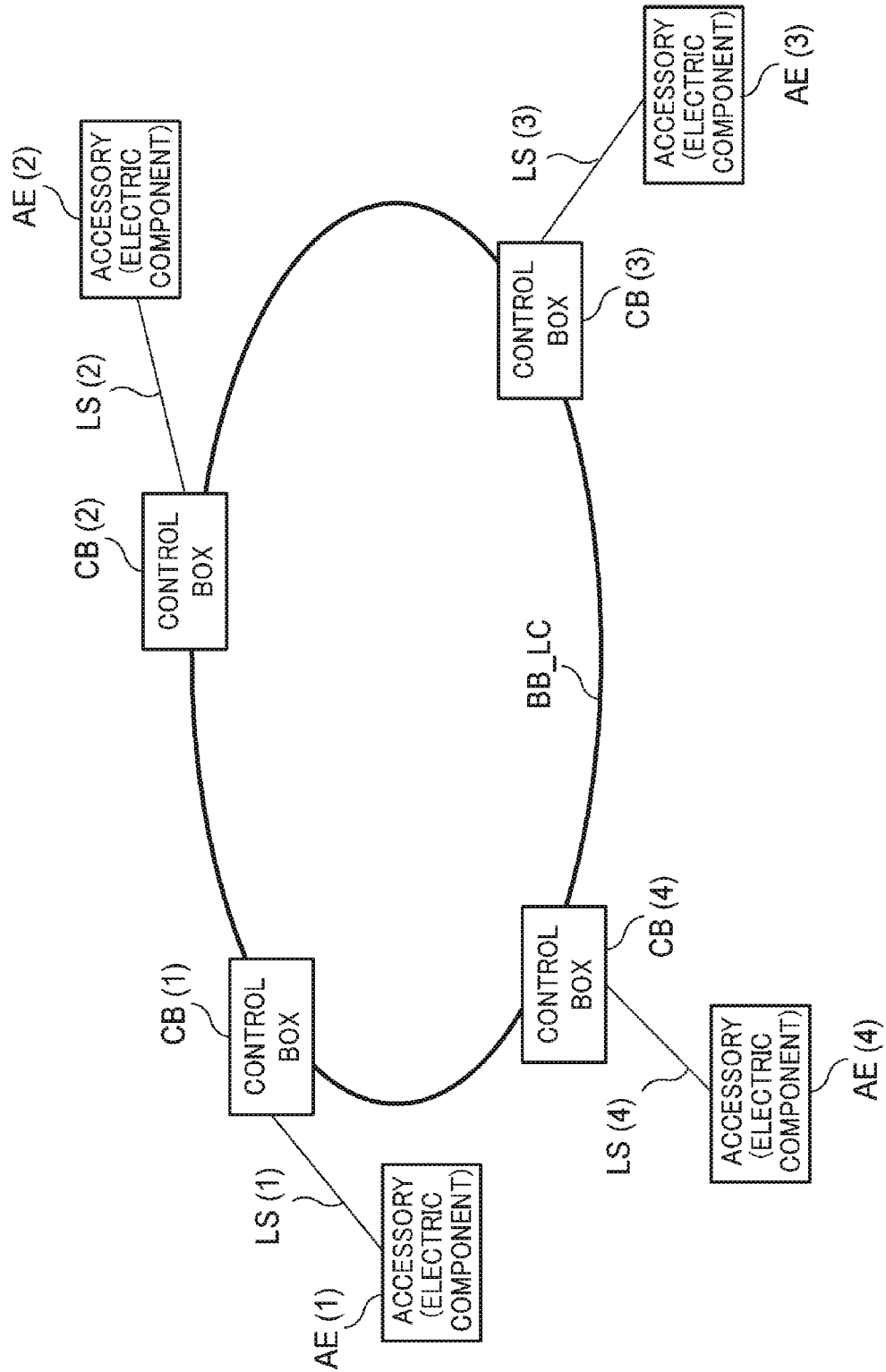
FIG. 53 is a block diagram illustrating a configuration example of a communication system in the on-vehicle system.

FIG. 53 illustrates a configuration example of a communication system mounted on a vehicle. A configuration illustrated in FIG. 53 employs a communication trunk line BB_LC formed in a ring form. Although not illustrated in FIG. 53, the communication trunk line BB_LC is integrally formed with a wire harness for power supply or a backbone trunk line including a specially provided power source line.

In the configuration illustrated in FIG. 53, a plurality of control boxes CB(1) to CB(4) are connected in the middle of the communication trunk line BB_LC in a distribution manner. Accessories AE(1) to AE(4) are respectively connected to and under the control of the control boxes CB(1) to CB(4) via branch line sub-harnesses LS(1) to LS(4). The accessories AE correspond to electric components such as various loads or an electronic control unit (ECU) disposed on a vehicle.

Each of the plurality of control boxes CB(1) to CB(4) has a function of supplying power diverging from a trunk line to the accessory AE via the branch line sub-harness LS, or branching a communication path passing through the communication trunk line BB_LC. Each branch line sub-harness LS includes a power source line and a communication line. The branch line sub-harness LS may include an earth line.

In a system having the configuration illustrated in FIG. 53, a case is assumed in which communication is performed between the accessory AE(1) and the accessory AE(2). In this case, in the communication trunk line BB_LC in a ring form, a path between the control box CB(1) and the control box CB(2) is used, and thus communication can be performed along the shortest path.

Further, a part of the communication trunk line BB_LC may be disconnected. However, even if the communication trunk line BB_LC is disconnected on the path between the control box CB(1) and the control box CB(2), the entire path has a ring form, and thus another path may be used. In other words, a communication path reaching the control box CB(2) from the control box CB(1) via the control box CB(4) and the control box CB(3) can be used, and thus a communication path between the accessory AE(1) and the accessory AE(2) is not interrupted.

The communication trunk line BB_LC in a ring form as illustrated in FIG. 53 may also be applied to a communication system having a linear path, such as the backbone trunk line BB_LM illustrated in FIG. 49, without being changed. For example, two trunk lines such as a communication trunk line BB_LC for a forward route and a communication trunk line BB_LC for a backward route are disposed on the linear backbone trunk line BB_LM in parallel to each other as a set, and ends of the communication trunk lines BB_LC for a forward route and a backward route are connected to each other, and thus a communication path in a ring form, that is, in a closed loop can be configured.

<Security Technique for Connection Portion>
<Protection Using Physical Means>

Figure 55A:
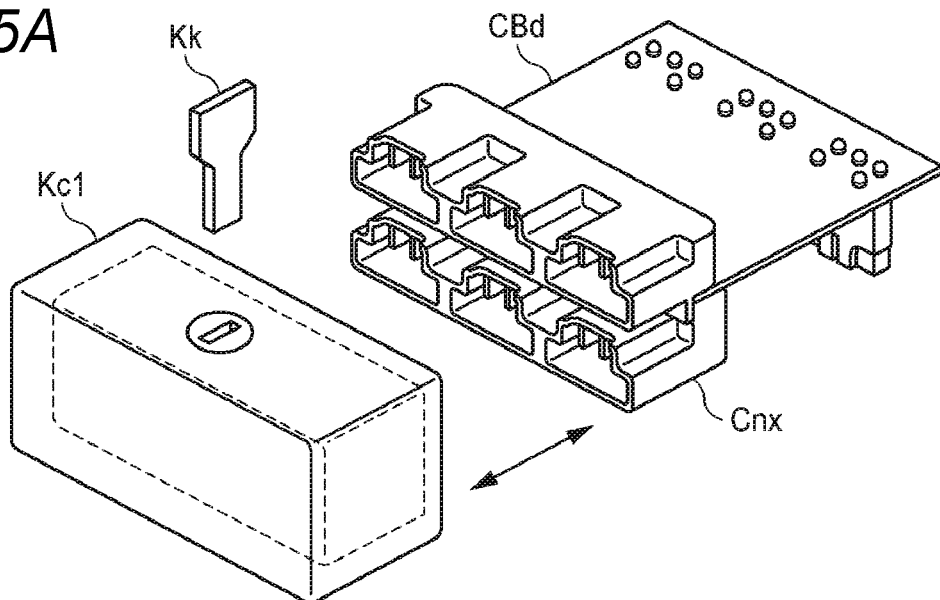
FIGS. 55A, 55B and 55C are perspective views respectively illustrating configuration examples for physically protecting unused connectors in a connection portion of the control box.
Figure 55B:
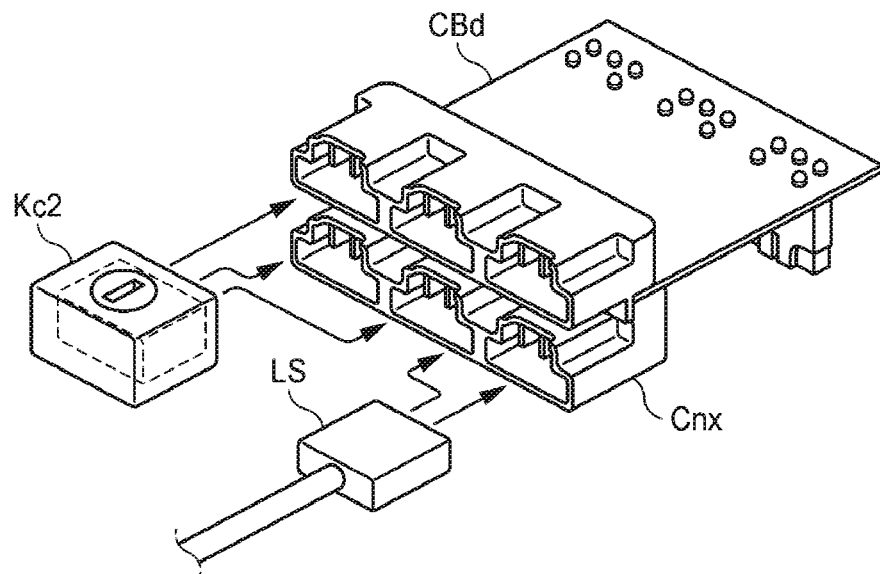
Figure 55C:
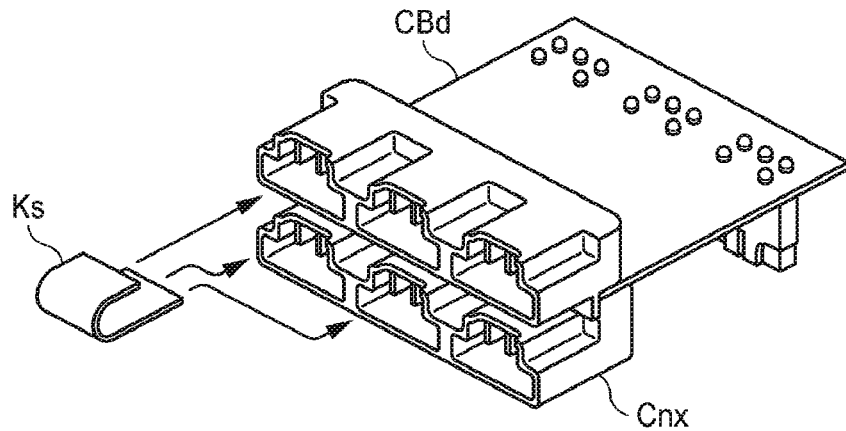

FIGS. 55(a), 55(b) and 55(c) illustrate specific examples of techniques for physically protecting the connection portion Cnx of each control box CB. A circuit board CBd illustrated in FIGS. 55(a), 55(b) and 55(c) is provided in each control box CB.

Each of the control boxes CB(1) to CB(4) has the connection portions Cnx including a plurality of connectors so as to be connected to various accessories AE via the branch line sub-harnesses LS or the like. The connectors are configured to be suitable for a predetermined standard such as the universal serial bus (USB), and the plurality of connectors are disposed to be arranged side by side for connection to a plurality of apparatuses.

However, in a specific control box CB, none of the connectors of the connection portion Cnx may be used, or some of the connectors of the connection portion Cnx may not be used, due to a difference in a vehicle model, a difference in a grade, a difference in a destination, and a difference in an option selected by a user purchasing a vehicle. If a configuration of each control box CB is changed so as to reflect the difference in the vehicle model, the difference in the grade, the difference in the destination, or the like, such a configuration cannot be used in common, and thus the number of control boxes CB is increased, thereby also increasing manufacturing cost.

On the other hand, in a case where a connector in an unoccupied state in which no branch line sub-harness LS is connected thereto in a defined vehicular default state is present in the connection portion Cnx, a user or a third party may freely and illegally connect a certain apparatus to the connector in an unoccupied state. Physical configurations illustrated in FIGS. 55(a), 55(b) and 55(c) are used to prevent such illegality.

In the configuration illustrated in FIG. 55(a), a case is assumed in which none of six connectors of the connection portion Cnx are used. Therefore, openings of all of the connectors are closed by using a physical cover Kc1 with a key so that none of the connectors of the connection portion Cnx are freely used.

The cover Kc1 with a key is a cover covering an outside of the connection portion Cnx, and can be fixed to the connection portion Cnx correctly. The cover Kc1 with a key has a key mechanism built therein, and has a structure in which fixation of the cover Kc1 with a key cannot be unlocked unless an operation is performed by using a physical unlock key Kk prepared in advance. Therefore, a person without the unlock key Kk cannot illegally connect any apparatus to the connectors of the connection portion Cnx.

In the configuration illustrated in FIG. 55(b), a case is assumed in which the predetermined branch line sub-harnesses LS or the like are connected to some connectors of the connection portion Cnx, and remaining connectors are in an unoccupied state. Therefore, in the connection portion Cnx, openings or the like of the connectors in an unoccupied state are individually closed by using a physical cover Kc2 with a key so that the connectors are not freely used.

The cover Kc2 with a key is structurally fixed to a connector in a state of closing a corresponding single opening as a result of being attached to one of the six connectors having the same shape and size in the connection portion Cnx. In the same manner as the cover Kc1 with a key, the cover Kc2 with a key has a key mechanism built therein, and has a structure in which fixation of the cover Kc2 with a key cannot be unlocked unless an operation is performed by using a physical unlock key Kk prepared in advance.

In the configuration illustrated in FIG. 55(c), a case is assumed in which the predetermined branch line sub-harnesses LS or the like are connected to some connectors of the connection portion Cnx, and remaining connectors are in an unoccupied state. Therefore, in the connection portion Cnx, openings or the like of the connectors in an unoccupied state are individually closed by using a physical seal Ks for sealing so that the connectors are not freely used. There may be a configuration in which openings of a plurality of connectors are collectively covered with a single seal Ks for sealing.

For example, the seal Ks for sealing is formed in an elongated and thin tape form, and is made of a resin. For example, a special pattern is formed on a surface of the seal Ks for sealing through printing so as to be clearly differentiated from other seals generally available in the market. Both ends of the seal Ks for sealing in a longitudinal direction are fixed to the connection portion Cnx via an adhesive or the like.

In a case where a user or the like illegally uses a specific connector whose opening is covered with the seal Ks for sealing so as not to be used, the seal Ks for sealing is broken or the adhesive location is torn off, and thus signs of removing the seal can be physically left. In other words, illegal use of a connector can be easily confirmed by a predetermined manager or the like after the illegal use is performed.

<Protection Based on Control>

Figure 56:
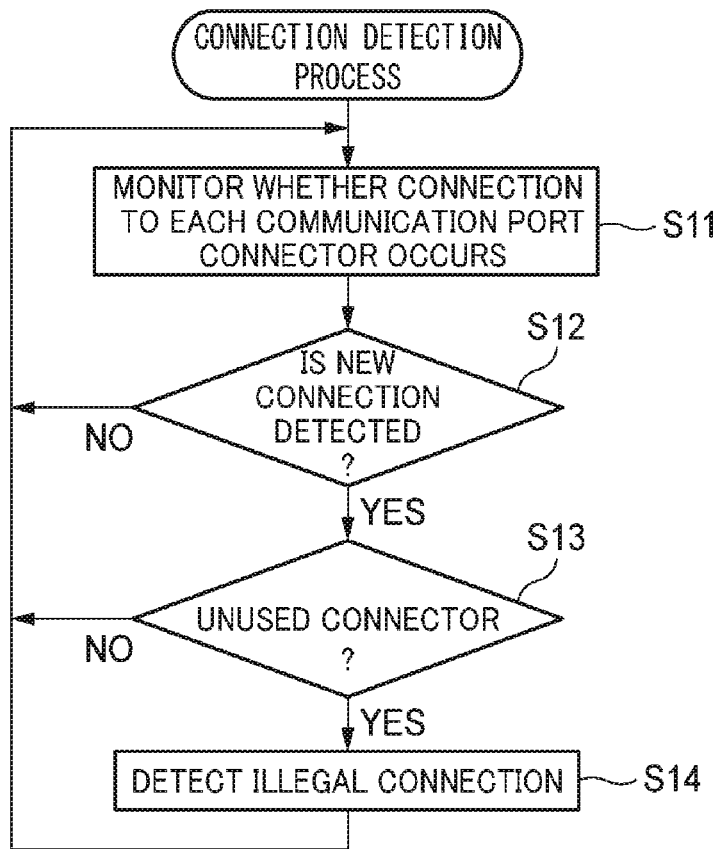
FIG. 56 is a flowchart illustrating an example of a process for protecting an unused connector through control.

FIG. 56 illustrates a specific example of a technique for protecting the connection portion Cnx of each control box CB on the basis of electrical control. In other words, a microcomputer (not illustrated) provided on the circuit board CBd performs control illustrated in FIG. 56, and thus protects an unused connector of the Do connection portion Cnx from illegal use.

The microcomputer on the circuit board CBd recognizes whether or not each connector of the connection portion Cnx managed by the microcomputer is used on the basis of a program and constant data written in advance by using a diagnosis tool. The microcomputer monitors voltages at a plurality of terminals provided in the respective connectors, and can thus actually detect whether or not a certain apparatus is connected to a connector.

In step S11, the microcomputer monitors whether or not each communication port connector is connected for each connector. If new connection to each connector is detected in step S12, the flow proceeds to step S13. In a case where the connector to which a new connection is detected is registered as an unused connector, the flow proceeds to the next step S14, and a process of detecting illegal connection is performed.

Through the process in step S14, for example, data indicating the illegal use is preserved in a nonvolatile memory, or abnormality display regarding the illegal use is performed on a display such as a meter unit. Communication using a corresponding connector may be automatically interrupted so that illegal use of an apparatus is prevented.

<Technique for Mutually Connecting Communication Networks and Communication Apparatuses Based on Various Specifications>

Figure 54:
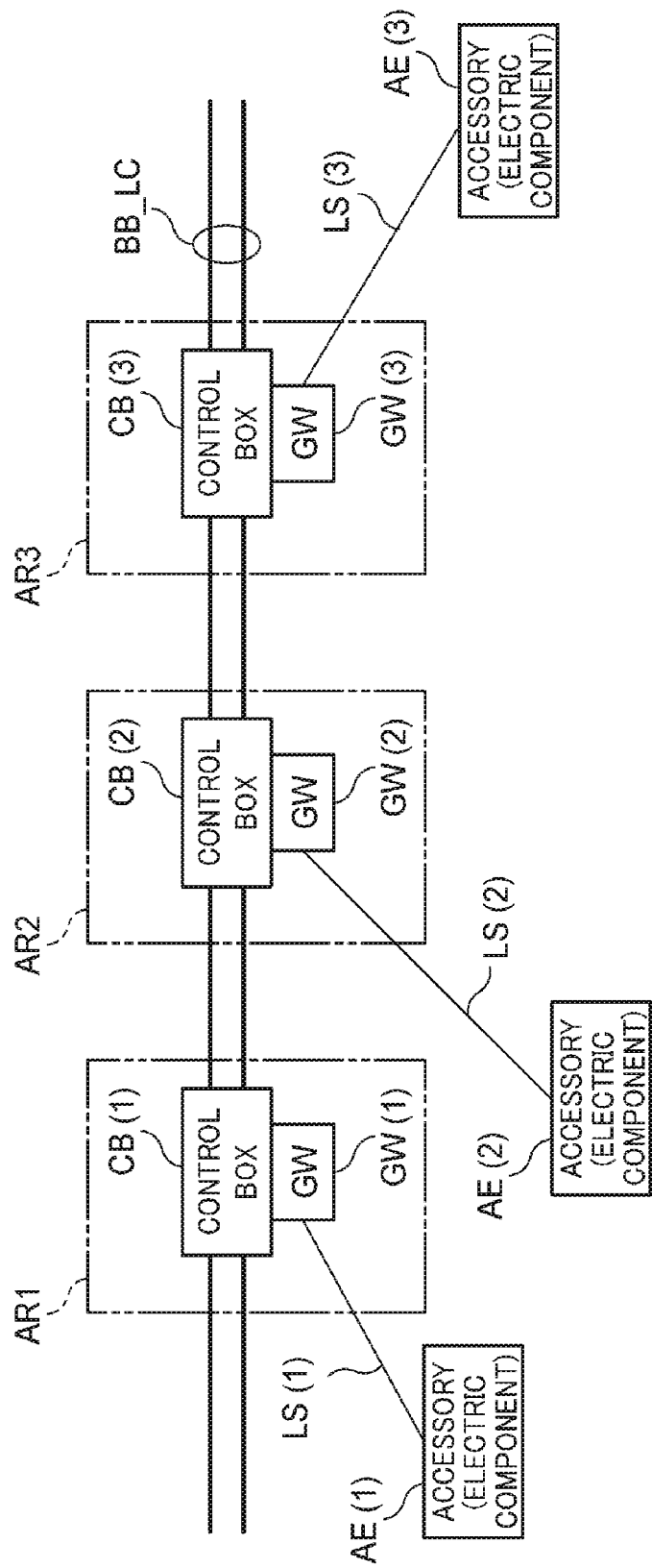
FIG. 54 is a block diagram illustrating a configuration example of the communication system in the on-vehicle system including a gateway.

FIG. 54 illustrates a configuration example of a communication system mounted on a vehicle. The communication system illustrated in FIG. 54 includes a communication trunk line BB_LC. Although not illustrated in FIG. 54, the communication trunk line BB_LC is integrally formed with a wire harness for power supply or a backbone trunk line including a specially provided power source line. The backbone trunk line is provided with an earth line as necessary.

In the configuration illustrated in FIG. 54, a plurality of control boxes CB(1), CB(2) and CB(3) are connected to the communication trunk line BB_LC used in common in a state of being distributed to a plurality of areas AR1, AR2 and AR3. Specific examples of the areas AR1, AR2 and AR3 may include an engine room, an instrument panel region, a floor region, and a luggage room.

Each of the control boxes CB(1) to CB(3) has a function of dividing power supplied to a trunk line so as to supply the power to the accessory AE, or a function of branching a path of a communication line so as to secure a connection path. In the configuration illustrated in FIG. 54, each of the plurality of control boxes CB(1), CB(2) and CB(3) includes a gateway GW.

Each of the plurality of gateways GW(1) to GW(3) illustrated in FIG. 54 fundamentally has a function of connecting networks or apparatuses based on different specifications such as communication protocols to each other.

For example, in a system on a vehicle, communication apparatuses or networks based on various standards using different specifications, such as Controller Area Network (CAN), CAN with Flexible Data Rate (CAN_FD), Clock Extensible Peripheral Interface (CXPI), Ethernet (registered trademark), and an optical communication network, may be employed for each area, each vehicle model, and the like. The gateway GW absorbs such a difference between the specifications, and thus apparatuses having different specifications can be communicably connected to each other.

In the configuration illustrated in FIG. 54, a gateway GW is respectively provided in the control box CB for each area, and thus communication lines can be connected to each other by using the gateway GW even if a communication specification differs for each area.

<Technique for Enabling High-Speed Communication and Technique for Gateway>

Figure 57:
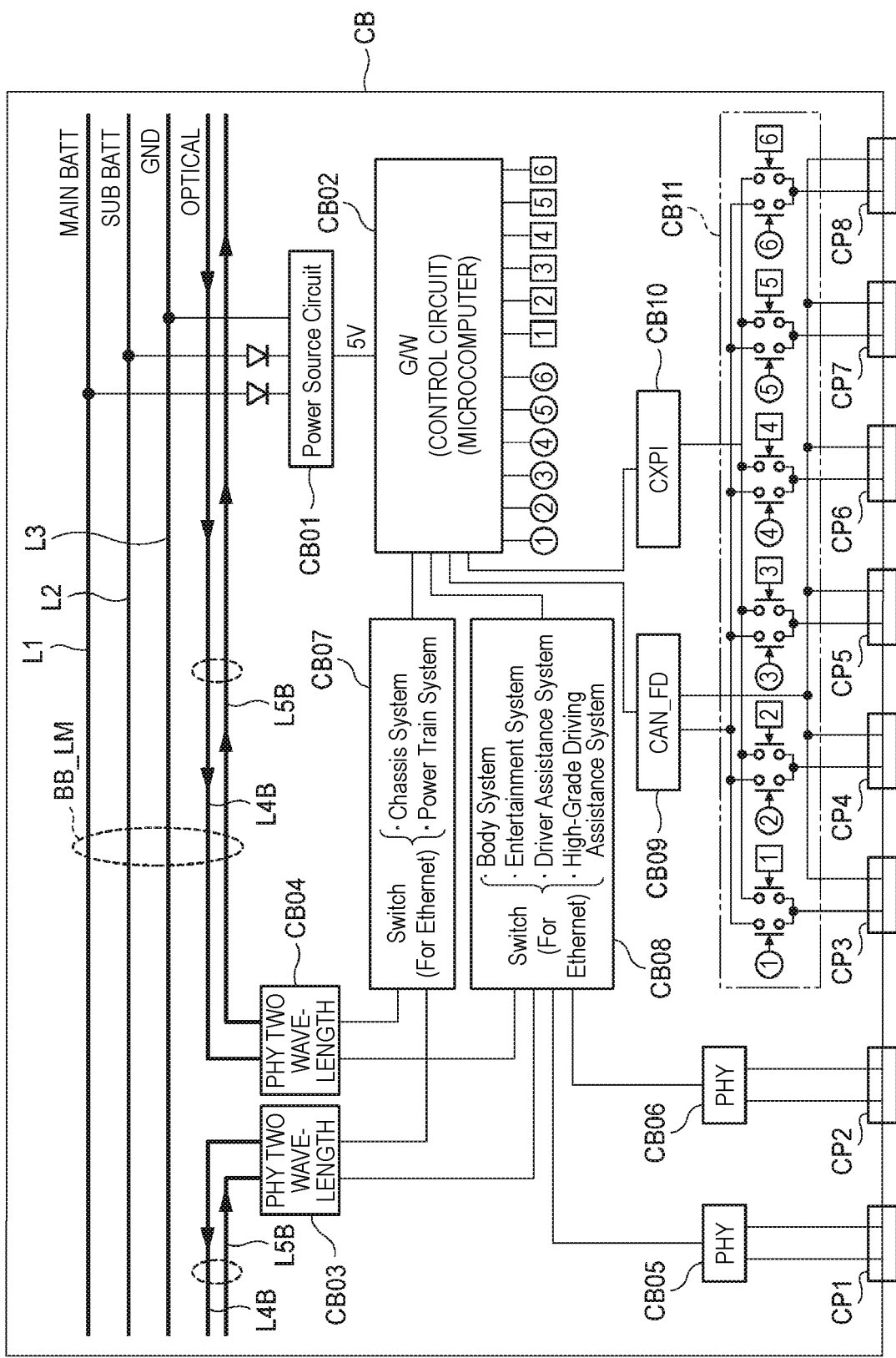
FIG. 57 is a block diagram illustrating a configuration example of a communication system inside the control box.
Figure 58:
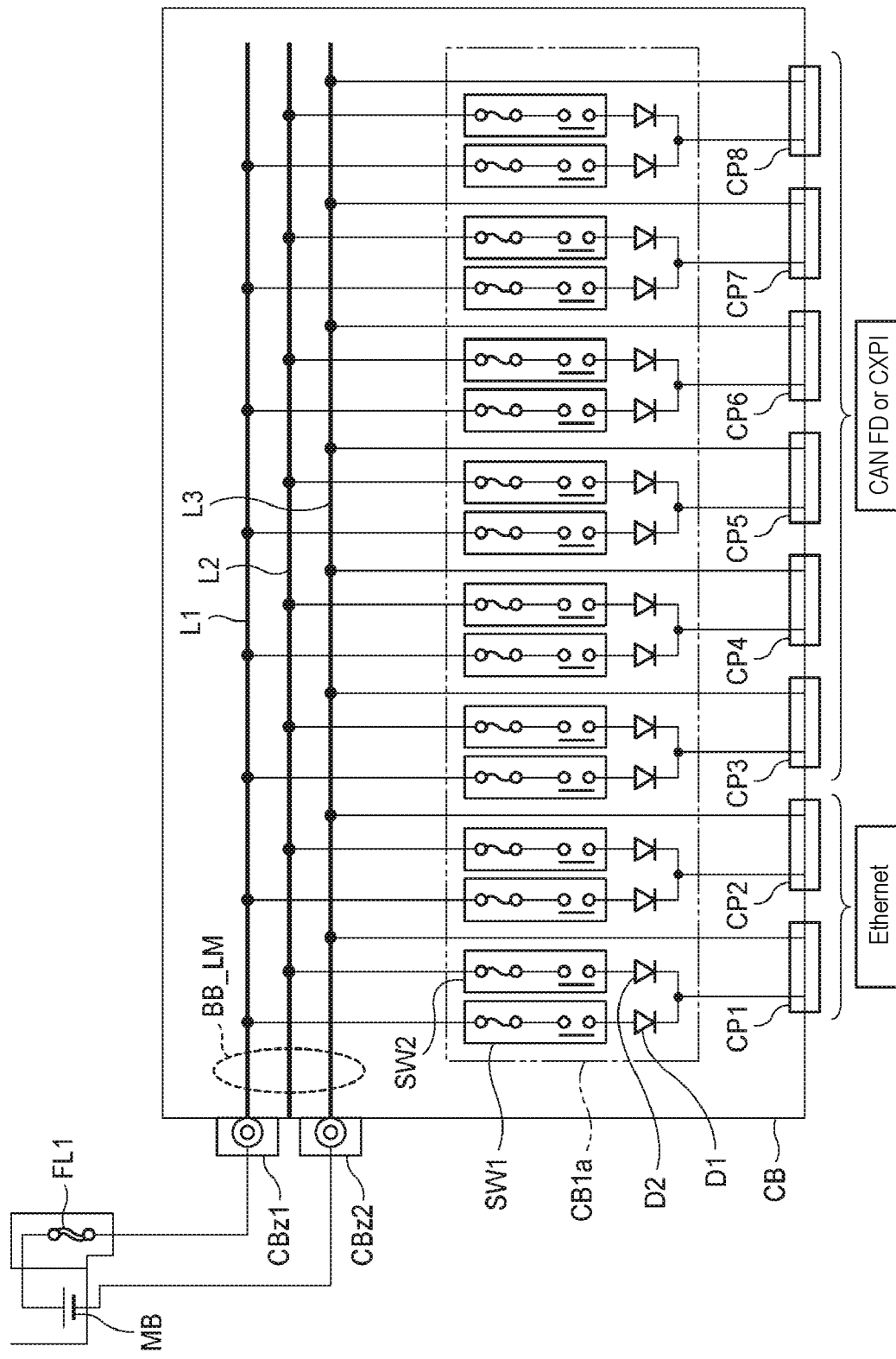
FIG. 58 is an electrical circuit diagram illustrating a circuit configuration example for supplying power to each communication system inside the control box.

FIG. 57 illustrates configuration examples of the control box CB having an optical communication function and a gateway function and a communication system of the backbone trunk line BB_LM. FIG. 58 illustrates a configuration example for supplying source power to a communication system.

Also in the system illustrated in FIG. 57, the control box CB is connected to the backbone trunk line BB_LM. The backbone trunk line BB_LM illustrated in FIG. 57 includes power source lines L1 and L2, an earth line L3, and communication lines L4B and L5B. In FIG. 57, GND indicates the ground, that is, the earth.

In the example illustrated in FIG. 57, the power source line L1 is connected to a main battery (BATT) of the vehicle, and the power source line L2 is connected to a sub-battery. The communication lines L4B and L5B are formed of optical fibers so as to cope with optical communication. The optical communication is employed in the trunk line, and thus high-speed communication can be performed at various locations on the vehicle. Also, it is hard to be influenced by noise.

The control box CB illustrated in FIG. 57 copes with each communication function in Ethernet (Trademark), CAN_FD, and CXPI in addition to the optical communication. Specifically, eight sets of communication port connectors CP1 to CP8 are provided in the control box CB. The communication port connectors CP1 and CP2 are communication ports for use only in Ethernet (Trademark), and each of the communication port connectors CP3 to CP8 is a communication port for which one of specifications such as CAN_FD and CXPI is selectable. Each of the eight sets of communication port connectors CP1 to CP8 has a specification corresponding to a metal communication line. A branch line has a metal specification, and thus component cost of the branch line can be reduced.

As illustrated in FIG. 57, the control box CB includes a power source circuit CB01, a gateway control circuit CB02, PHY circuits CB03, CB04, CB05 and CB06, network switches CB07 and CB08, transceivers CB09 and CB10, and a switching circuit CB11.

The power source circuit CB01 is connected to the power source lines L1 and L2 and the earth line L3, and a power source voltage, for example, "+5 V" required in each circuit such as the gateway control circuit CB02 is generated on the basis of source power supplied from the backbone trunk line BB_LM.

The gateway control circuit CB02 is formed of a microcomputer, and realizes a function of a gateway (GW). In other words, protocol conversion between communications based on different standards or signal switching control is performed. A control signal for switching in the switching circuit CB11 is also generated.

The PHY circuits CB03, CB04, CB05 and CB06 provide an interface function of a physical layer in Ethernet (Trademark). Each of the PHY circuits CB03 and CB04 has a function of performing mutual conversion between an optical signal and an electric signal or mutual conversion between a digital signal and an analog signal so as to correspond to two wavelengths of the optical signal. Each of the PHY circuits CB05 and CB06 has a function of performing mutual conversion between a digital signal and an analog signal so as to correspond to a signal based on the metal standard of Ethernet (Trademark).

The network switches CB07 and CB08 are switch circuits corresponding to the standards of Ethernet (Trademark), and have a function of determining whether or not transmission to each connected apparatus is to be performed by taking into consideration a destination of received data.

In the configuration illustrated in FIG. 57, the network switch CB07 has a function of controlling a chassis system and a power train system on the vehicle system. The network switch CB08 has a function of controlling a body system, an entertainment system, a driving assistance system, and a high-grade driving assistance system on the vehicle system. The network switch CB07 is connected between the PHY circuits CB03 and CB04, and the gateway control circuit CB02. The network switch CB08 is connected between the PHY circuits CB03 to CB06, and the gateway control circuit CB02.

The transceivers CB09 and CB10 are connected between the gateway control circuit CB02 and the switching circuit CB11. The transceiver CB09 has a function of transmitting and receiving signals corresponding to the standard of CAN_FD. The transceiver CB10 has a function of transmitting and receiving signals corresponding to the standard of CXPI.

The switching circuit CB11 has a switching function of enabling CAN_FD using two communication lines and CXPI using a single communication line to be used by the common communication port connectors CP3 to CP8. Specifically, the switching circuit CB11 has twelve switching elements for switching between signals which are input to the respective communication port connectors CP3 to CP8. Turning-on and turning-off of the switching elements are controlled on the basis of control signals output from the gateway control circuit CB02, and thus signals suitable for any one of CAN_FD and CXPI can be used by the communication port connectors CP3 to CP8.

For example, in a case where an accessory AE such as cameras or various sensors requiring a relatively high communication speed is connected to and under the control of the control box CB, it is possible to satisfy a specification required for high-speed communication by using, for example, the communication port connector CP1 or CP2. In a case where an accessory AE performing relatively low-speed communication is connected, it is possible to ensure a necessary minimum communication function by using the communication port connectors CP3 to CP8.

FIG. 58 illustrates a circuit configuration example for supplying source power to each of the communication port connectors CP1 to CP8. In the configuration illustrated in FIG. 58, terminals CBz1 and CBz2 provided in the control box CB are connected to a main power source. Specifically, the terminal CBz1 is connected to a positive electrode of the main battery MB via a fusible link FL built in the main battery MB. The terminal CBz2 of the control box CB is connected to a negative electrode of the main battery MB. The terminals CBz1 and CBz2 are respectively connected to the power source line L1 and the earth line L3 of the backbone trunk line BB_LM. The power source line L2 of the backbone trunk line BB_LM is connected to a positive electrode of a sub-battery (not illustrated).

A power source circuit CB01a for supplying source power to each of the communication port connectors CP1 to CP8 of eight systems is built in the control box CB. The power source circuit CB01a includes switch circuits SW01 and SW02, and diodes D1 and D2 for each system regarding the communication port connector.

Each of the switch circuits SW01 and SW02 is formed as a circuit in which a switching element whose turning-on and turning-off can be controlled by a control circuit of the control box CB is connected in series to a fuse. The diodes D1 and D2 have a function of preventing a reverse current.

Therefore, if, of the switch circuits SW01 and SW02, only the switch circuit SW01 is turned on, power from the main power source can be supplied to each of the communication port connectors CP1 to CP8. If, of the switch circuits SW01 and SW02, only the switch circuit SW02 is turned on, power from the sub-power source can be supplied to each of the communication port connectors CP1 to CP8.

<Special Optical Communication Technique>
<Combination of a Plurality of Communication Paths>

Figure 101:
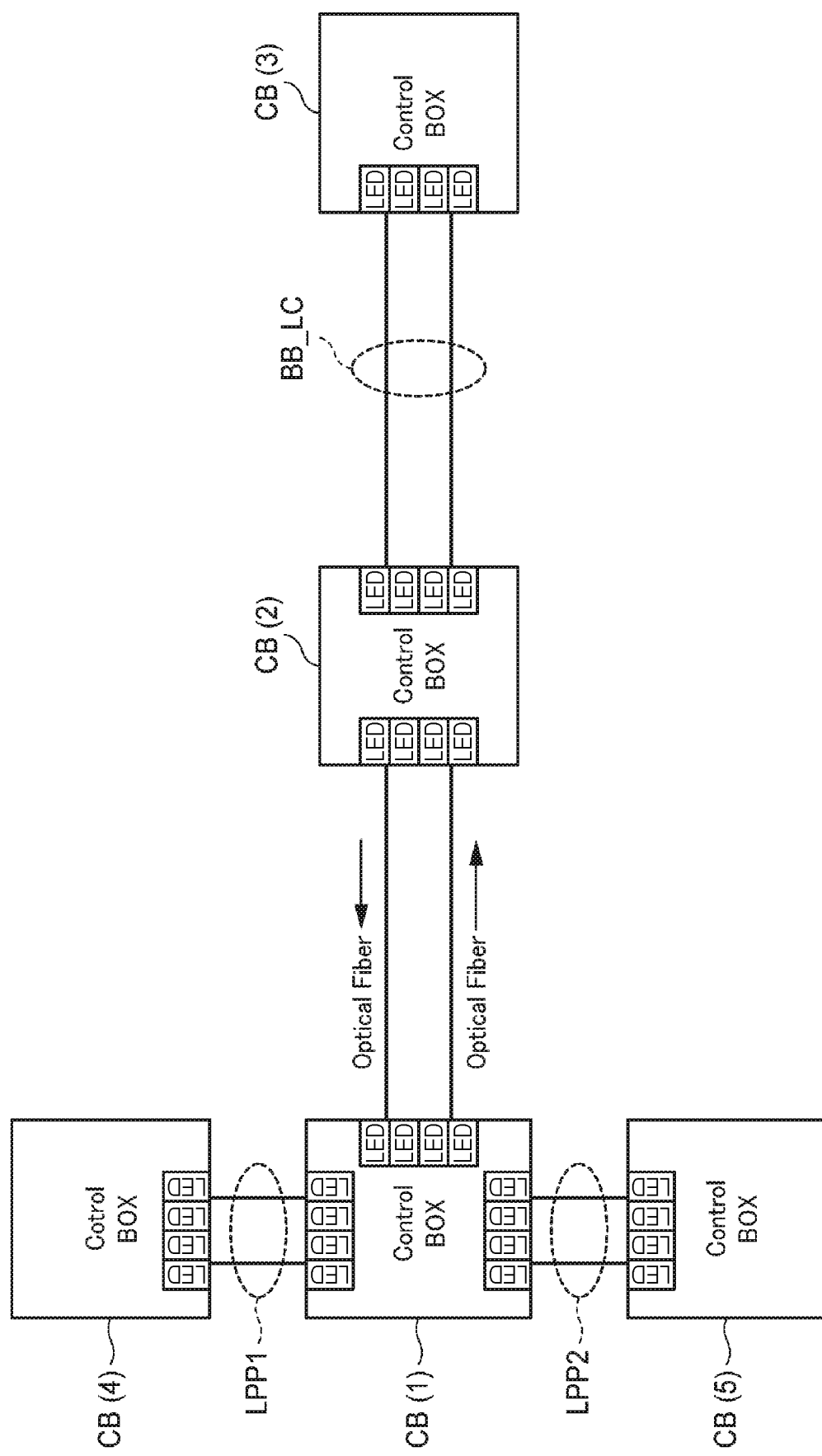
FIG. 101 is a block diagram illustrating a configuration example of a communication system in an on-vehicle system.

FIG. 101 illustrates a configuration example of a communication system of an on-vehicle system. The on-vehicle system illustrated in FIG. 101 includes five control boxes CB(1) to CB(5). Three control boxes CB(1), CB(2) and CB(3) are connected to each other via a communication trunk line BB_LC configured in a ring form. A peer-to-peer (P2P) communication line LPP1 is connected between the control box CB(1) and the control box CB(4), and a P2P communication line LPP2 is connected between the control box CB(1) and the control box CB(5). Optical communication is used for all of the communication trunk line BB_LC, and the communication lines LPP1 and LPP2.

In a case where the optical communication is used, each relay node on a communication path corresponding to the control box CB performs a process of converting a received optical signal into an electrical signal, converting the electrical signal to an optical signal again, and sending the optical signal to a transmission path. Therefore, a delay of an optical signal occurs for each relay node. In a case where a communication path of the entire system is configured in a ring form, a delay of an optical signal increases due to an increase in the number of connected relay nodes.

On the other hand, since, in the on-vehicle system illustrated in FIG. 101, the communication trunk line BB_LC having a ring form and the P2P communication lines LPP1 and LPP2 are combined with each other, a signal delay can be reduced, and high-speed communication can be performed. In other words, since the number of nodes on the communication trunk line BB_LC having a ring form is three, a delay occurring on the ring can be minimized.

Therefore, for example, in a case where optical communication is performed between the control box CB(3) and the control box CB(4), a signal delay is reduced, and thus high-speed communication can be performed, compared with a case where the entire communication path is configured in a ring form.

Since the communication trunk line BB_LC having a ring form is provided, there is redundancy in the communication path, and thus reliability of communication is improved. In other words, in a case where disconnection occurs at a single location on the communication trunk line BB_LC, communication can be performed by using other paths which are not disconnected. A trunk line may be formed of a transmission path for optical communication, a branch line may be formed of a transmission path for an electrical signal, and these may be combined with each other.

<Simultaneous Use of Optical Signals with a Plurality of Wavelengths>

Figure 102:
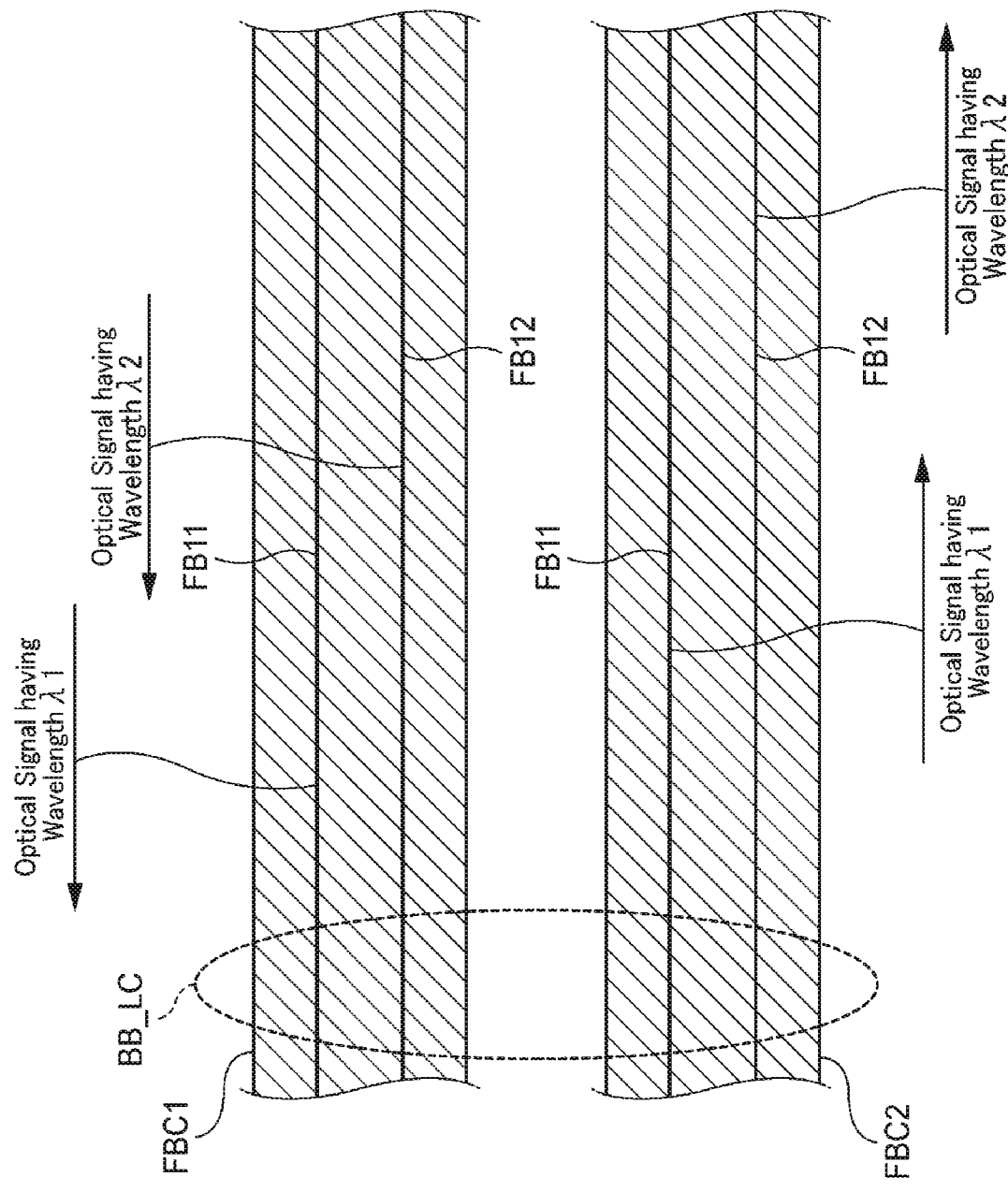
FIG. 102 is a longitudinal sectional view illustrating a configuration example of a communication trunk line BB_LC.

FIG. 102 illustrates a configuration example of a section of the communication trunk line BB_LC in the on-vehicle system illustrated in FIG. 101. In other words, as illustrated in FIG. 102, the communication trunk line BB_LC illustrated in FIG. 101 includes an optical fiber cable FBC1 forming a forward route and an optical fiber cable FBC2 forming a backward route. Each of the optical fiber cables FBC1 and FBC2 has two optical fibers FB11 and FB12 built therein.

In the present embodiment, both of a specific wavelength AA and a wavelength λ2 which is different from the wavelength λ1 are respectively used for handled optical signals. As illustrated in FIG. 102, one optical fiber cable FBC1 transmits an optical signal having the wavelength λ1, and the other optical fiber cable FBC2 transmits an optical signal having the wavelength λ2.

Therefore, two communication paths can be secured together by using optical signals corresponding to two wavelengths on the communication trunk line BB_LC, and thus redundancy can be provided. Consequently, it is possible to improve reliability of communication.

As a specific example, optical signals corresponding to two kinds of wavelengths are used depending on importance or priority. For example, a signal used to control an important load on a vehicle is allocated to an optical signal having the wavelength λ1, and a signal used to control a load having low importance is allocated to an optical signal corresponding to the wavelength λ2. In a case where communication using an optical signal having the wavelength λ1 on which an important load is put is interrupted, information to be transmitted is automatically transmitted by using an optical signal having the wavelength λ2. Consequently, it is possible to secure a path for continuously performing communication. This control may be performed by using a microcomputer on each control box CB.

<Use of Wavelength Multiplexing/Time Division Multiplexing (TDM)>

Figure 103:
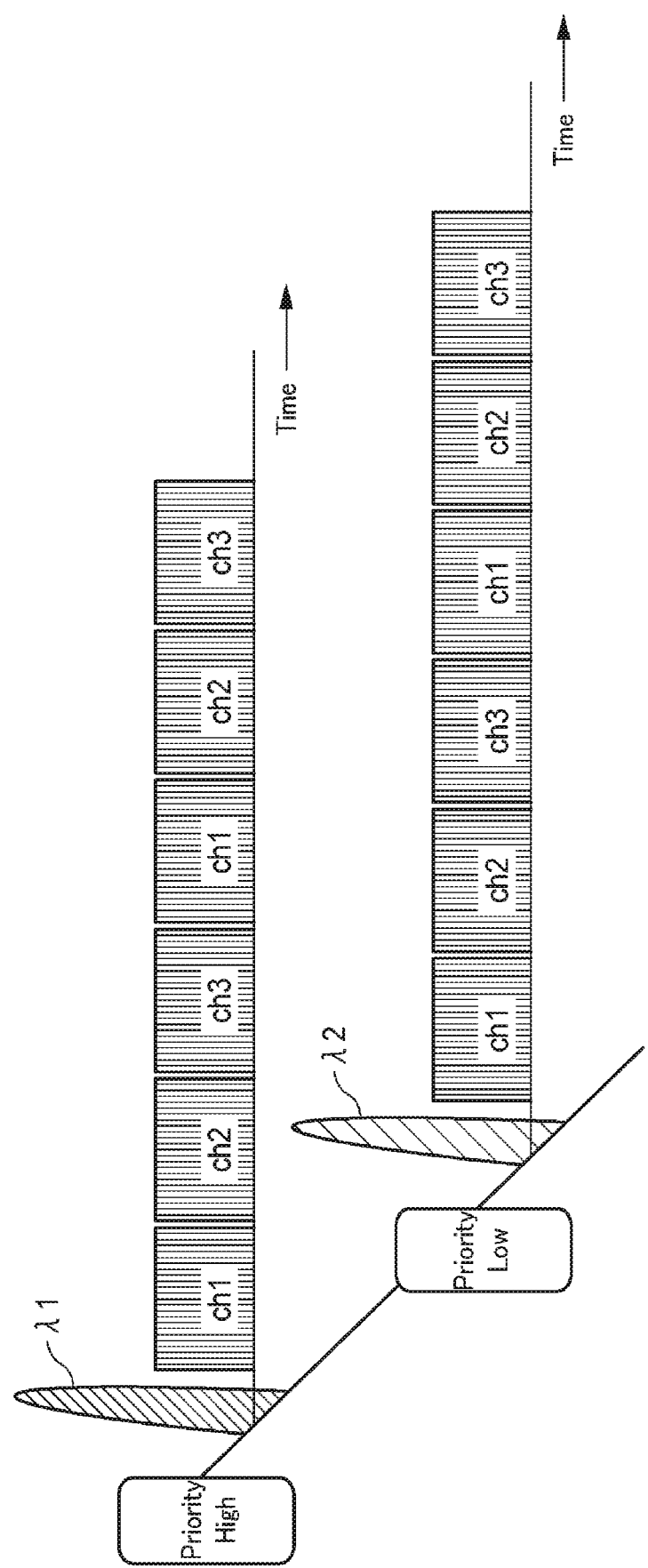
FIG. 103 is a time chart illustrating a configuration example of an optical signal on which wavelength multiplexing and time division multiplexing are performed.
Figure 104:
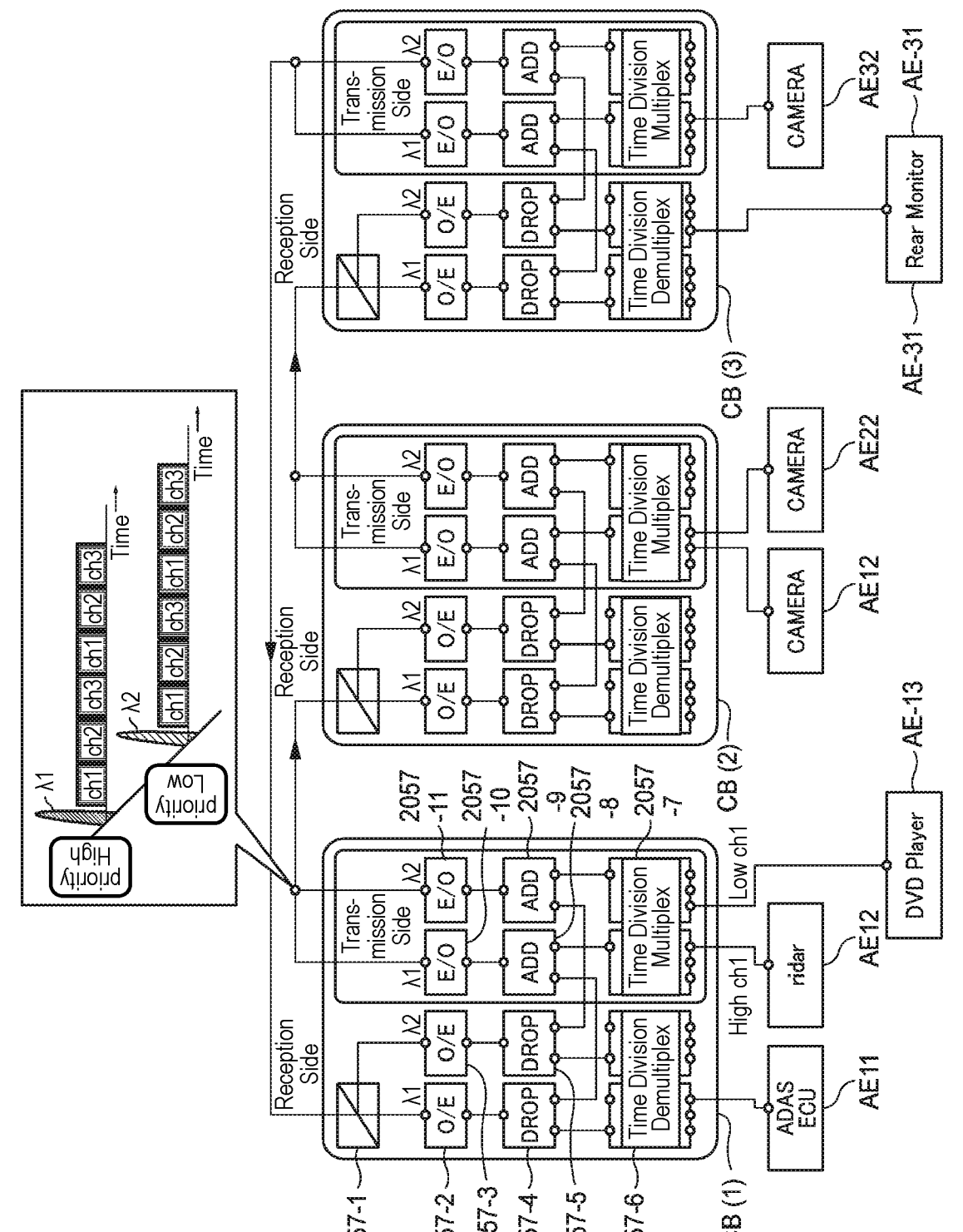
FIG. 104 is a block diagram illustrating a configuration example of a communication system in an on-vehicle system performing optical multiplexing communication.

FIG. 103 illustrates a configuration example of an optical signal on which wavelength multiplexing and time division multiplexing are performed. FIG. 104 illustrates a configuration example of a communication system of an on-vehicle system performing optical wavelength multiplex communication.

For example, in a case where an optical signal having the wavelength λ1 and an optical signal having the wavelength λ2 are used together, the wavelengths of the two optical signals are different from each other, and thus the signals may be transmitted with a single optical fiber through wavelength multiplexing as in FIG. 103.

Therefore, either one of the two optical fibers FB11 and FB12 illustrated in FIG. 102 can be omitted. High priority may be allocated to the optical signal having the wavelength λ1, and low priority may be allocated to the optical signal having the wavelength λ2. The optical signals are subjected to time division multiplexing, and thus optical signals ch1, ch2 and ch3 of a plurality of channels can be sequentially transmitted as illustrated in FIG. 103 by a single communication line.

In the on-vehicle system illustrated in FIG. 104, three control boxes CB(1), CB(2) and CB(3) are connected to each other via the communication trunk line BB_LC. The communication trunk line BB_LC illustrated in FIG. 104 is formed of an optical fiber for a forward route and an optical fiber a backward route, and is configured in a ring form as a whole.

An optical signal subjected to wavelength multiplexing and time division multiplexing is sent onto a single optical fiber of the communication trunk line BB_LC as illustrated in FIG. 103, and thus optical communication can be performed between the control box CB(1) to the control box CB(3).

Each of the control boxes CB(1) to CB(3) illustrated in FIG. 104 includes a reception side circuit and a transmission side circuit. The reception side circuit includes a splitter 2057-1, optical/electrical conversion units (O/E) 2057-2 and 2057-3, branching units (DROP) 2057-4 and 2057-5, and a time division demultiplexer 2057-6. The transmission side circuit includes a time division multiplexer 2057-7, inserting units (ADD) 2057-8 and 2057-9, and electrical/optical conversion units (E/O) 2057-10 and 2057-11.

In other words, in the control boxes CB(1) to CB(3), an optical signal is incident to the reception side circuit from the single optical fiber of the communication trunk line BB_LC. The optical signal is divided into two optical signals respectively having the wavelengths λ1 and λ2 in the splitter 2057-1. The divided optical signal having the wavelength λ1 is converted into an electrical signal by the /optical/electrical conversion unit 2057-2, and branches into two systems in the branching unit 2057-4. One branched electrical signal is input to the time division demultiplexer 2057-6, and the other electrical signal is input to the transmission side circuit.

Similarly, the divided optical signal having the wavelength λ2 is converted into an electrical signal by the optical/electrical conversion unit 2057-3, and branches into two systems in the branching unit 2057-5. One branched electrical signal is input to the time division demultiplexer 2057-6, and the other electrical signal is input to the transmission side circuit. The time division demultiplexer 2057-6 divides the input electrical signals which are output from the branching units 2057-4 and 2057-5 for each time, so as to generate signals of a plurality of channels (ch1, ch2, and ch3).

For example, the control box CB(1) sends a received signal of a first channel output from the time division demultiplexer 2057-6 to accessory AE11 (ADAS ECU). The control box CB(2) may use a received signal of a second channel output from the time division demultiplexer 2057-6. The control box CB(3) sends a received signal of a third channel output from the time division demultiplexer 2057-6 to accessory AE31 (rear monitor).

In the transmission side circuit of the control box CB(1), a signal for an accessory AE12 (ridar) is input to the time division multiplexer 2057-7 as a signal having high priority, and a signal for an accessory AE13 (DVD player) is input to the time division multiplexer 2057-7 as a signal having low priority, by using the channel (ch1) allocated to this control box CB. The time division multiplexer 2057-7 allocates the input signals of two systems respectively to corresponding timings of the channel, so as to generate electrical signals subjected to time division multiplexing. The signal having high priority and the signal having low priority are respectively input to the inserting units 2057-8 and 2057-9 from the time division multiplexer 2057-7.

The inserting unit 2057-8 generates a signal obtained by combining the received signal with the output from the time division multiplexer 2057-7 for each to channel with respect to the signal having high priority. The inserting unit 2057-9 generates a signal obtained by combining the received signal with the output from the time division multiplexer 2057-7 for each channel with respect to the signal having low priority.

The output signal from the inserting unit 2057-8 is converted into an optical signal having the wavelength λ1 by the electrical/optical conversion unit 2057-10. The output signal from the inserting unit 2057-9 is converted into an optical signal having the wavelength λ2 by the electrical/optical conversion unit 2057-11. The optical signal having the wavelength λ1 output from the electrical/optical conversion unit 2057-10 and the optical signal having the wavelength λ2 output from the electrical/optical conversion unit 2057-11 are simultaneously supplied to a single common optical fiber of the communication trunk line BB_LC, and are transmitted as an optical signal subjected to wavelength multiplexing.

Similarly, in the transmission side circuit of the control box CB(2), a signal for an accessory AE21 (camera) is input to the time division multiplexer 2057-7 as a signal having high priority, and a signal for an accessory AE22 (camera) is input to the time division multiplexer 2057-7 as a signal having low priority, by using the channel (ch2) allocated to this control box CB. In the transmission side circuit of the control box CB(3), a signal for an accessory AE32 (camera) is input to the time division multiplexer 2057-7 as a signal having high priority by using the channel (ch3) allocated to this control box CB.

In any case, in the communication system of the on-vehicle system illustrated in FIG. 104, an optical signal subjected to wavelength multiplexing and time division multiplexing can be transmitted by using a single optical fiber of the communication trunk line BB_LC as illustrated in FIG. 103.

In the on-vehicle system illustrated in FIG. 104, both of the two kinds of wavelengths λ1 and λ2 are used, and signal processing is separately performed for each wavelength. A difference between the wavelengths is correlated with a difference between priorities. Therefore, in a case where a failure occurs in communication using either one of the two kinds of the wavelengths λ1 and λ2, for example, switching control may be performed so that a normal communication line is used for transmitting a signal having high priority. A communication path can be secured with only a single optical fiber.

<Other Characteristic Techniques>
<Technique of Reducing the Number of Components of Wire Harness>

Figure 59:
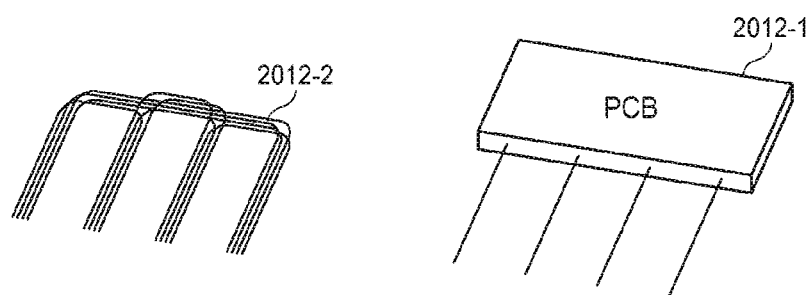
FIG. 59 is an exploded view illustrating a configuration example of a wire harness obtained by combining a printed circuit board with electric wires.

FIG. 59 is an exploded view illustrating a configuration example of a wire harness obtained by combining a printed circuit board with electric wires.

A configuration of a wire harness may variously change depending on a difference in a vehicle model, a difference in a grade, a difference in a destination, and a difference in an option. If the configuration changes, it is necessary to individually add a component number to each component for each configuration. If the number of kinds of configurations increases, the number of components increases and thus manufacturing also increases.

Therefore, a constituent element of a wire harness is divided into a base in which a configuration does not change and an addition in which a configuration changes. As in a backbone member 2012-1 illustrated in FIG. 59, a circuit formed on a printed circuit board (PCB) is used as an addition element of a wire harness, a sub-harness 2012-2 formed of electric wires is used as a base element of the wire harness, and the entire wire harness is configured by combining the addition element with the base element.

Here, the circuit formed on the printed circuit board is easily configured as an electronic circuit, and has, for example, a field-programmable gate array (FPGA) device built therein so as to rewrite a program, and thus a circuit configuration can be easily changed. Thus, hardware common to all elements can be employed in the backbone member 2012-1, and thus it is possible to prevent an increase in the number of components.

<Technique for Coping with Connection of Post-Installation Apparatus or Carry-in Apparatus>

Figure 60:
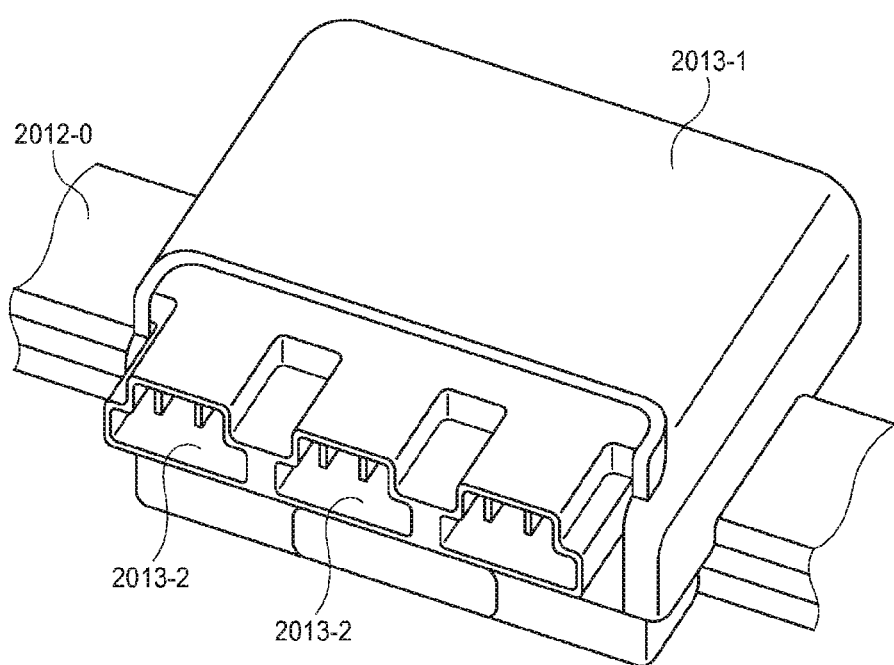
FIG. 60 is a perspective view illustrating an example of an exterior of a control box having USB ports.

FIG. 60 is a perspective view illustrating an example of an exterior of a control box having USB ports.

A control box 2013-1 illustrated in FIG. 60 is connected to a backbone trunk line 2012-0, and includes a plurality of standard communication ports 2013-2 so as to be connected to predetermined branch line harnesses. Specifically, a plurality of connectors having a communication function based on a universal serial bus (USB) standard are provided in the standard communication ports 2013-2. Therefore, various apparatuses can be connected to the backbone trunk line 2012-0 via the control box 2013-1 as long as the apparatus has a standardized communication port. In other words, it is easy to post-install various apparatuses or to connect an apparatus carried in a vehicle by a user.

<Technique for Diversifying Functions of Control Box or the Like>

Figure 61A:
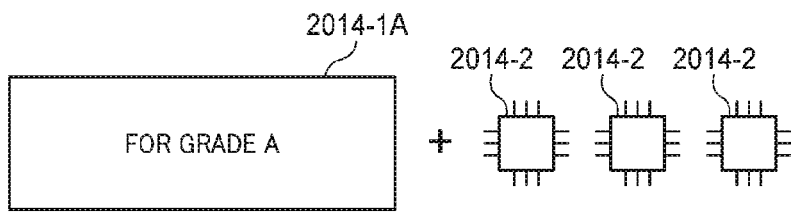
Figure 61B:
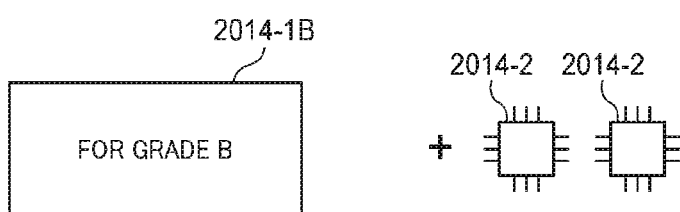
Figure 61C:
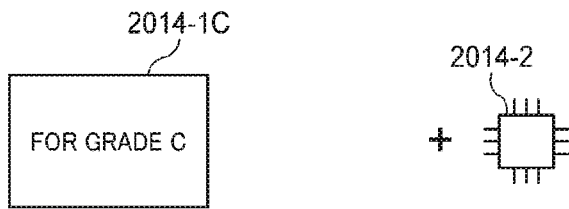

FIGS. 61(*a*), 61(*b*) and 61(*c*) are plan views illustrating three configuration examples of circuit boards built in a control box or the like.

In a wire harness or the like of a vehicle, functions to be supported greatly change depending on the kind of a vehicle model, the kind of a grade, the kind of a destination, the kind of an option, and the like. For example, the number of circuits, a current capacity, a processing speed, and the number of processes with which each control box on a backbone trunk line should cope change depending on a grade or the like of a vehicle. If functions satisfying all needs are installed in control boxes of all grades, the minimum cost increases, and thus a low cost vehicle cannot be provided. However, if a control box having a configuration optimal for each of various combinations of vehicle models, grades, destinations, options, and the like is prepared, the number of components considerably increases, and thus cost increases.

Therefore, as illustrated in FIGS. 61(*a*), 61(*b*) and 61(*c*), an increase in the number of components is prevented by using a component in common. Specifically, a necessary circuit function is realized by combining the standardized circuit boards 2014-1A, 2014-1B and 2014-1C of three kinds with a microcomputer 2014-2 formed of an FPGA.

The circuit board 2014-1A is a circuit board for a grade A which is the highest of three grades. The circuit board 2014-1B is a circuit board for a grade B which is the second highest of three grades. The circuit board 2014-1C is a circuit board for a grade C which is the lowest of three grades. The circuit boards 2014-1A, 2014-1B and 2014-1C of three kinds have different sizes (large, medium, and small), and can thus cope with a change in the number of circuits through selection of the boards. The number of microcomputers 2014-2 is changed in order to cope with a change in the number of circuits.

In other words, since the number of circuits to cope with is small in a case of a low grade vehicle, the small-sized circuit board 2014-1C is combined with a single microcomputer 2014-2 so as to realize a necessary function as illustrated in FIG. 61(*c*). Since the number of circuits to cope with is intermediate in a case of an intermediate grade vehicle, the medium-sized circuit board 2014-1B is combined with two microcomputers 2014-2 so as to realize a necessary function as illustrated in FIG. 61(*b*). Since the number of circuits to cope with is large in a case of a high grade vehicle, the large-sized circuit board 2014-1A is combined with three microcomputers 2014-2 so as to realize a necessary function as illustrated in FIG. 61(*a*).

Each microcomputer 2014-2 is an FPGA, and a program thereof is easily rewritten. Therefore, the program of each microcomputer 2014-2 is rewritten in order to cope with a difference between various specifications such as a grade of a vehicle.

Therefore, in a case of employing the configurations illustrated in FIGS. 61(*a*), 61(*b*) and 61(*c*), any one of the three kinds of circuit boards 2014-1A, 2014-1B and 2014-1C and one kind of microcomputer 2014-2 have only to be prepared, and thus it is possible to prevent increases in the number of kinds of components and the number of components.

<Technique for Reducing the Number of Components Such as Trunk Line>

Figure 62:
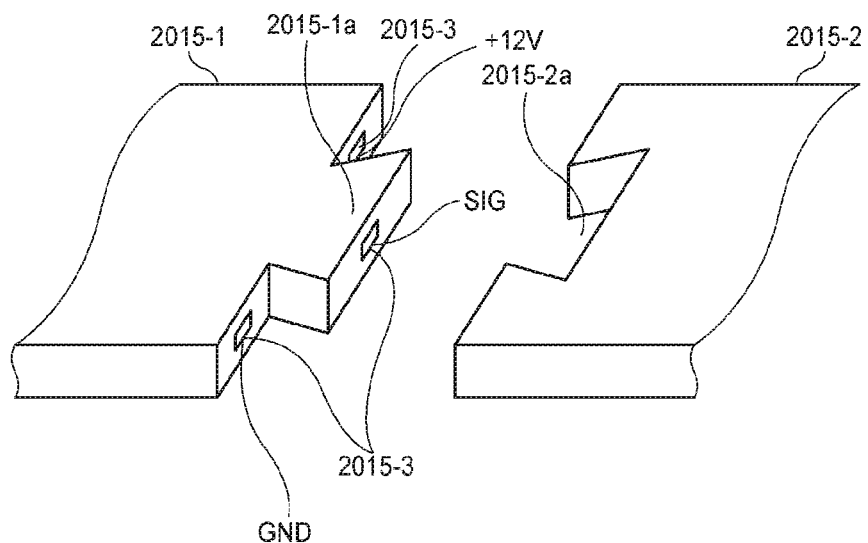
FIG. 62 is a perspective view illustrating a configuration example of a connection location of a routing member forming a trunk line.

FIG. 62 is a perspective view illustrating a configuration example of a connection location of a routing member forming a trunk line.

For example, in a case of forming large-sized routing members such as the backbone trunk line portions 2021, 2022 and 2023 illustrated in FIG. 48, a single routing member may be configured by combining a plurality of components used in common with each other in order to prevent an increase in the number of kinds of components or an increase in the number of components due to a difference between specifications such as configurations or shapes.

In the configuration example illustrated in FIG. 62, two thin tabular routing members 2015-1 and 2015-2 are connected to each other by butting facing surfaces thereof, so as to be integrated. Specifically, as illustrated in FIG. 62, a protrusion 2015-1*a* is formed on a right end surface of the routing member 2015-1, and a concave 2015-2*a* having a shape complementary to that of the protrusion 2015-1*a* is formed on a left end surface of the routing member 2015-2.

A plurality of electrodes 2015-3 respectively connected to a power source line (+12 V), the ground (GND), and a predetermined signal line are disposed to be exposed to the right end surface of the routing member 2015-1. Although not illustrated, similarly, electrodes which can be respectively brought into contact with the electrodes 2015-3 are also disposed on the left end surface of the routing member 2015-2.

As mentioned above, the types of the routing members 2015-1 and 2015-2 in which shapes of connection locations, electrode specifications, and the like are standardized in advance, are selected, and the selected members are combined with each other, so that the routing member corresponding to various specifications can be configured. In this case, it is possible to reduce the number of types of standardized routing members and also to reduce the number of components.

<Technique for Coping with Change in Connection Specification>

Figure 63:
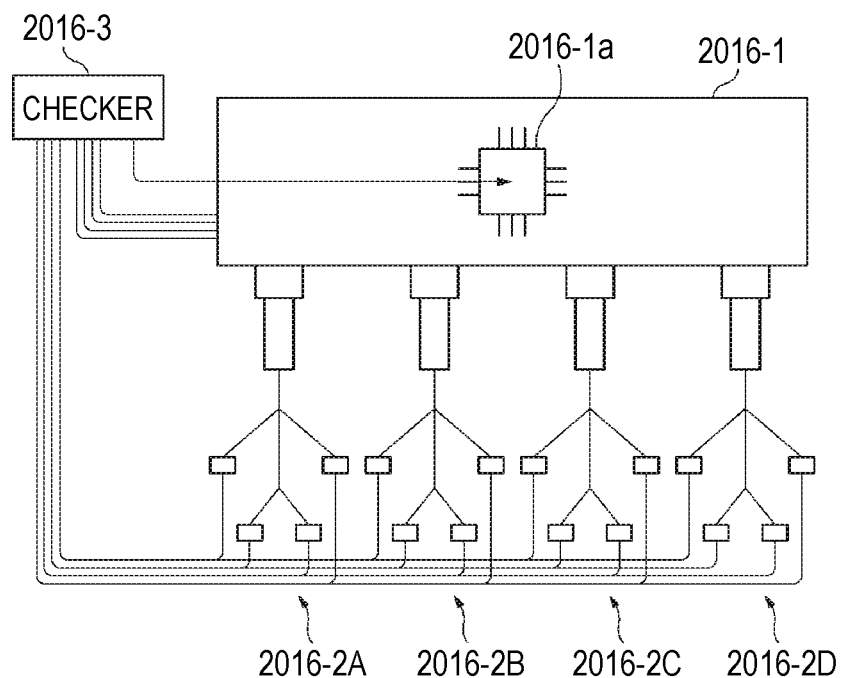
FIG. 63 is a plan view illustrating a connection example between a control box on the trunk line and branch line sub-harnesses.

FIG. 63 is a plan view illustrating a connection example between a control box on the trunk line and branch line sub-harnesses.

A control box 2016-1 illustrated in FIG. 63 is connected to, for example, the backbone trunk line portions 2021, 2022 and 2023 illustrated in FIG. 48. The whole function or specification of a wire harness is determined according to an order of a user who has ordered a vehicle, and predetermined branch line sub-harnesses 2016-2A, 2016-2B, 2016-2C and 2016-2D are connected to connection portions of the control box 2016-1.

A microcomputer whose program is easily rewritten is mounted on the control box 2016-1. When such a wire harness is manufactured, a conduction checker 2016-3 is prepared to check whether or not there is the occurrence of conduction between each terminal of the branch line sub-harnesses 2016-2A, 2016-2B, 2016-2C and 2016-2D and each terminal of the control box 2016-1 through actual connection. When the program of the microcomputer on the control box 2016-1 is rewritten with a predetermined tool, the content of the program is rewritten so as to reflect an actual conduction state in conjunction with the conduction checker 2016-3.

Therefore, actually, a worker appropriately rewrites the program so that the kinds of branch line sub-harnesses 2016-2A, 2016-2B, 2016-2C and 2016-2D assembled to the control box 2016-1, or a difference between connection positions is reflected, and thus switching between circuit connection states in the actual control box 2016-1 can occur automatically. Thus, productivity of a wire harness is improved.

<Technique for Coping with Change in Connection Specification>

Figure 64:
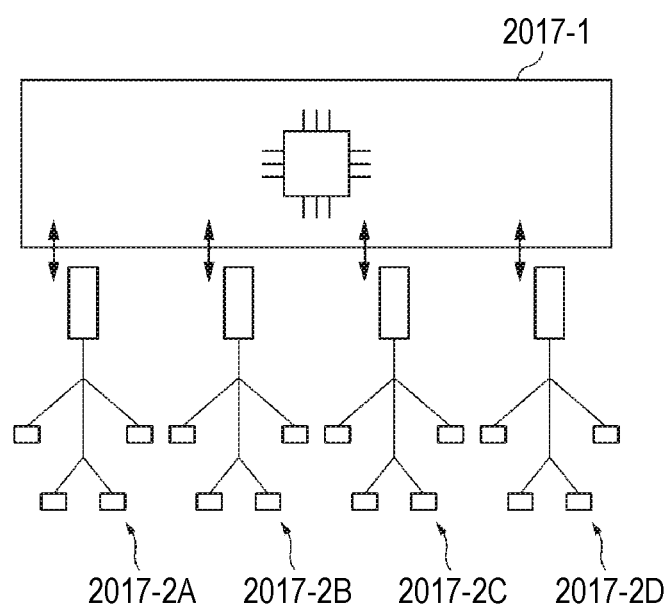
FIG. 64 is a plan view illustrating a connection example between a control box on the trunk line and branch line sub-harnesses.

FIG. 64 is a plan view illustrating a connection example between a control box on the trunk line and branch line sub-harnesses.

A control box 2017-1 illustrated in FIG. 64 is connected to, for example, the backbone trunk line portions 2021, 2022 and 2023 illustrated in FIG. 48. The whole function or specification of a wire harness is determined according to an order of a user who has ordered a vehicle, and predetermined branch line sub-harnesses 2017-2A, 2017-2B, 2017-2C and 2017-2D are connected to connection portions of the control box 2017-1.

Here, each of the branch line sub-harnesses 2017-2A, 2017-2B, 2017-2C and 2017-2D has a communication function, and transmits unique identification information (ID) pre-allocated thereto to a microcomputer of the control box 2017-1 which is a connection destination. The microcomputer identifies any one of, for example, "ABCD", "ABDC", and "ACDB" as combinations of IDs transmitted from the branch line sub-harnesses 2017-2A, 2017-2B, 2017-2C and 2017-2D which are actually connected thereto, and thus automatically selects a pattern of software which is to be applied to a connection destination of each branch line.

Therefore, a worker can freely select a connection position of each of various branch line sub-harnesses 2017-2A, 2017-2B, 2017-2C and 2017-2D, and thus productivity is improved. Even in a case where any accessory is post-installed, the microcomputer can automatically cope with the accessory if the microcomputer recognizes the accessory in advance.

<Technique for Coping with Change in Connection Specification>

Figure 65A:
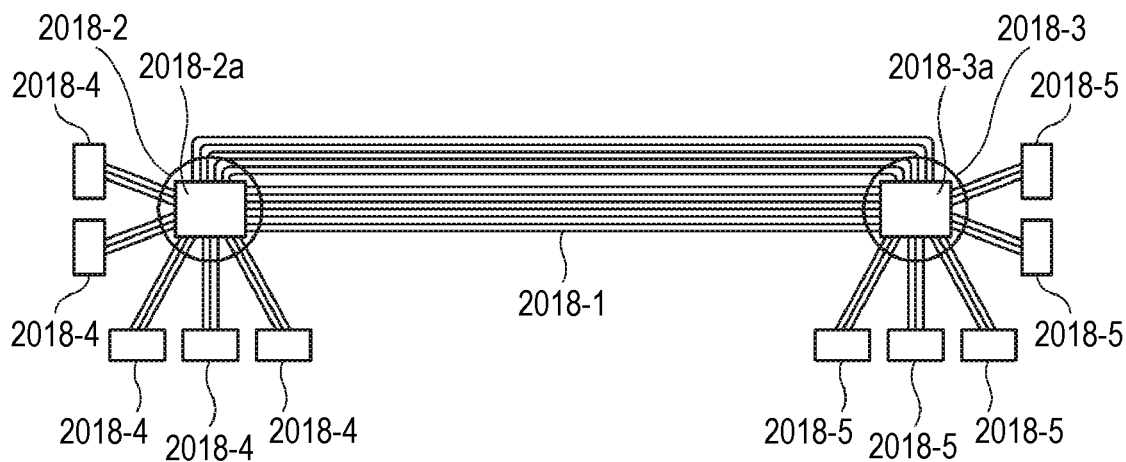
FIGS. 65A and 65B are plan views illustrating connection examples between a trunk line and branch line sub-harnesses.
Figure 65B:
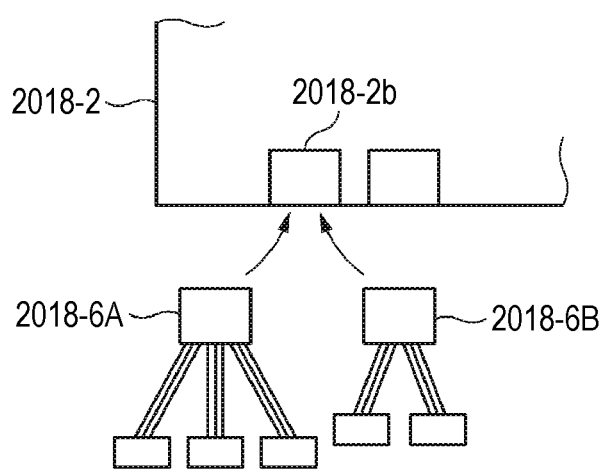

FIGS. 65(*a*) and 65(*b*) are plan views illustrating connection examples between a trunk line and branch line sub-harnesses.

As illustrated in FIG. 65(*a*), in a case where a backbone formed of a trunk line 2018-1 and a plurality of control boxes 2018-2 and 2018-3 is connected to various accessories via various branch line sub-harnesses 2018-4 and 2018-5, positions of connectors for connection of the respective branch line sub-harnesses 2018-4 and 2018-5 may change, or pin arrangement of the connectors may change.

For example, in the example illustrated in FIG. 65(*b*), a case is assumed in which either one of an automatic air conditioner 2018-6A and a manual air conditioner 2018-6B which are accessories is selectively connected to a connector 2018-2*b* of the control box 2018-2 according to a change in a specification. In this case, pin arrangement of a connector for the automatic air conditioner 2018-6A and pin arrangement of a connector for the manual air conditioner 2018-6B are different from each other.

In order to cope with this change, a microcomputer 2018-2*a* formed of an FPGA is mounted on the control box 2018-2, and a microcomputer 2018-3*a* formed of an FPGA is also mounted on the control box 2018-3. The microcomputer 2018-2*a* formed of an FPGA is mounted in main bodies or connectors of the automatic air conditioner 2018-6A and the manual air conditioner 2018-6B illustrated in FIG. 65(*b*).

Each connection destination is appropriately selected by the microcomputers 2018-2*a* and 2018-3*a* rewriting a program according to a specification for each circuit of the connected branch line sub-harnesses 2018-4 and 2018-5. As illustrated in FIG. 65(*b*), a microcomputer disposed in a branch line sub-harness on an accessory side or a connector thereof performs controls so that a specification difference such as a connector pin arrangement difference is absorbed. Consequently, an accessory side can absorb a connection specification in a case where respective accessories are connected to the control boxes 2018-2 and 2018-3, and a specification of the backbone side can be used in common.

<Technique for Coping with Change in Connection Specification>

Figure 66:
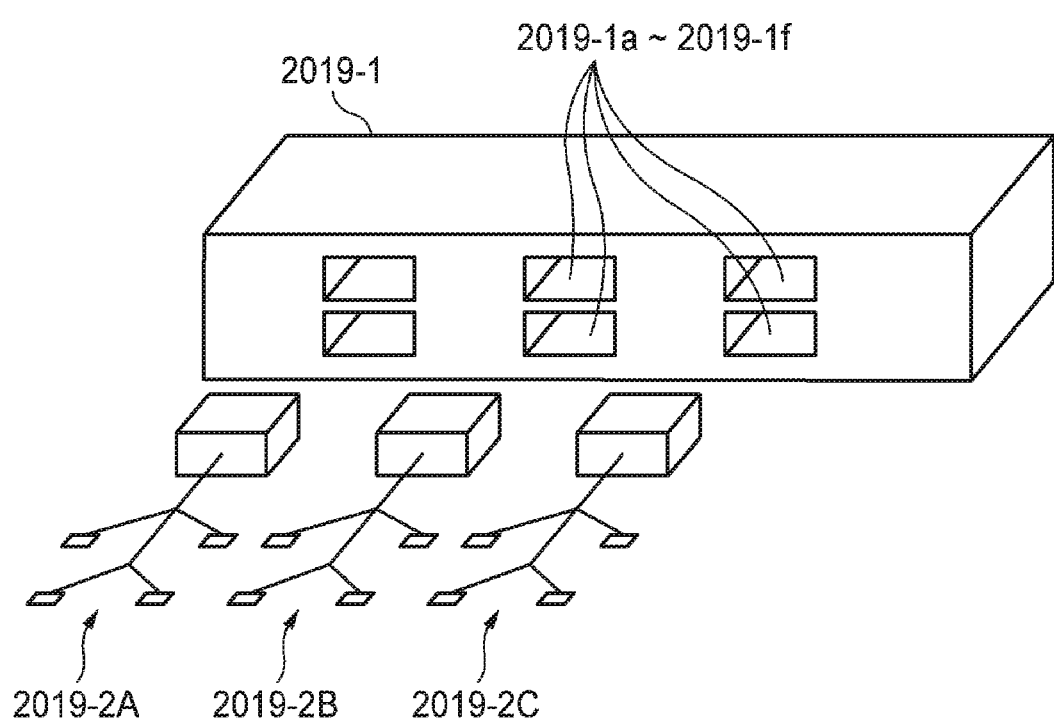
FIG. 66 is a perspective view illustrating a connection example between a control box on the trunk line and branch line sub-harnesses.

FIG. 66 is a perspective view illustrating a connection example between a control box on a trunk line and branch line sub-harnesses.

A plurality of connectors 2019-1*a*, 2019-1*b*, 2019-1*c*, 2019-1*d*, 2019-1*e* and 2019-1*f* which have the same size or shape are disposed to be arranged side by side on a control box 2019-1 illustrated in FIG. 66 in order to connect various branch lines and accessories. In a case where an accessory is connected to the control box 2019-1, any one of the plurality of connectors 2019-1*a* to 2019-1*f* is selected, and branch line sub-harnesses 2019-2A, 2019-2B and 2019-2C are respectively connected.

Here, a worker can freely select a position of a connector which is a connection destination of each of the branch line sub-harnesses 2019-2A, 2019-2B, and 2019-2C as necessary when a vehicle is produced. A change in a position of a connector which is a connection destination of the branch line sub-harnesses 2019-2A, 2019-2B, and 2019-2C is coped with by automatically changing a circuit connection state in the control box 2019-1 by a microcomputer formed of an FPGA built in the control box 2019-1 rewriting a program.

Therefore, the worker can freely select a position of a connector which is a connection destination of each of the branch line sub-harnesses 2019-2A, 2019-2B, and 2019-2C, and thus productivity is improved. It is possible to reduce the number of components by using a function in common.

<Technique of Using AC Power>

FIG. 67 is a perspective view illustrating an arrangement example of a trunk line and a plurality of branch line sub-harnesses routed on a vehicle body.

An on-vehicle system illustrated in FIG. 67 includes a backbone trunk line 2020-1 routed linearly in a front-and-rear direction of a vehicle body, and a plurality of branch line sub-harnesses 2020-2A, 2020-2B and 2020-2C connected to respective locations of the backbone trunk line 2020-1. The respective branch line sub-harnesses 2020-2A, 2020-2B and 2020-2C are connected to control boxes provided on the backbone trunk line 2020-1.

As a characteristic matter, AC power is supplied to the backbone trunk line 2020-1. Specifically, a voltage of about AC 200 V is used. Each control box is provided with a transformer and an AC/DC converter, transforms the AC power and converts the AC power into a predetermined DC voltage in the control box, and then supplies to each of the branch line sub-harnesses 2020-2A, 2020-2B and 2020-2C. In the example illustrated in FIG. 67, DC power voltages such as DC 5 V, DC 48 V, and DC to 12 V are respectively supplied to the branch line sub-harnesses 2020-2A, 2020-2B and 2020-2C.

As mentioned above, AC power is made to flow through the backbone trunk line 2020-1, and thus it is possible to reduce a power loss in the trunk line compared with a case of DC power. Since a configuration is simple, and a voltage can be converted by using a cheap transformer, it is possible to reduce cost of the system. A power loss is reduced, and thus fuel efficiency of a vehicle is improved.

<Technique of Using Multiplex Communication>

FIGS. 68(*a*) and 68(*b*) are block diagrams illustrating a plurality of control boxes and a communication trunk line connecting the control boxes to each other.

In a configuration illustrated in FIG. 68(*a*), a communication line 2021-3 of a backbone trunk line connecting two control box 2021-1 and 2021-2 to each other is formed of a set of a plurality of electric wires. In other words, individual communication lines of the same number of signals to be transmitted are required to be prepared in order to secure communication paths, and thus, if the number of signals increases, the number of communication lines also increases.

On the other hand, in the configuration illustrated in FIG. 68(*b*), a communication line 2021-3B of a backbone trunk line connecting two control box 2021-1B and 2021-2B to each other is formed of only one or two communication lines.

In other words, in a configuration illustrated in FIG. 68(*b*), since signals of a plurality of systems are superimposed on a single communication line by using a technique such as time division multiplexing (TDM), it is possible to considerably reduce the number of communication lines in a case where the number of signals to be transmitted increases. A technique such as frequency division multiplexing (FDM) may be used instead of time division multiplexing (TDM).

In a case where the number of communication lines is large as in FIG. 68(*a*), a communication line may be required to be divided at an intermediate portion of a line path of a trunk line, but a communication line is not required to be divided by reducing the number of communication lines, and thus a configuration can be simplified. Therefore, the number of circuits and the number of components are reduced.

<Technique for Recovery During Occurrence of Abnormality>

Figure 69:
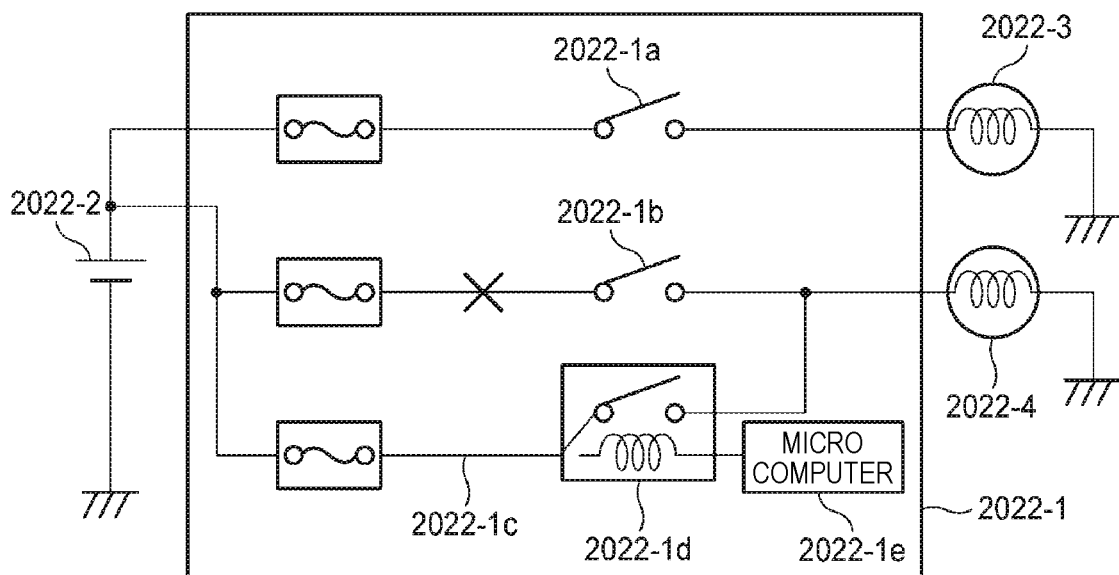
FIG. 69 is an electrical circuit diagram illustrating a configuration example of a control box having a recovery function.

FIG. 69 is an electrical circuit diagram illustrating a configuration example of a control box having a recovery function.

Abnormality such as disconnection of a circuit may occur in a backbone trunk line or a control box. If such abnormality occurs, predetermined source power cannot be supplied to a branch line sub-harness or a load side, and thus operations of accessories including various loads are stopped. In order to prevent this, a recovery function is provided.

In the configuration illustrated in FIG. 69, a case is assumed in which source power supplied from a main power source 2022-2 of a vehicle is supplied to two loads 2022-3 and 2022-4 via a control box 2022-1. If a switch 2022-1*a* is closed, power can be supplied to the load 2022-3. If a switch 2022-1*b* is closed, power can be supplied to the load 2022-4.

However, if a failure such as disconnection occurs in a line path connected to the switch 2022-1*b*, an abnormal state occurs in which power is not supplied to the load 2022-4 even if the switch 2022-1*b* is closed. Therefore, assuming that the load 2022-4 is a load having considerably high priority, in the configuration illustrated in FIG. 69, a backup path 2022-1*c* is connected in a state of in parallel to the path of the switch 2022-1*b*. The backup path 2022-1*c* is connected to a relay 2022-1*d* which can be turned on and off by a microcomputer 2022-1*e*.

If it is detected that abnormality has occurred in a conduction path of the switch 2022-1*b*, the microcomputer 2022-1*e* automatically switches on the relay 2022-1*d* so as to perform recovery control in which source power is supplied to the load 2022-4 via the backup path 2022-1*c*. The microcomputer 2022-1*e* controls a warning display portion provided in a meter unit of a vehicle to display the occurrence of the failure. The reliability regarding a wire harness and operations of various accessories is improved due to the recovery function.

<Proximity Wireless Communication Technique on Vehicle>

Figure 70A:
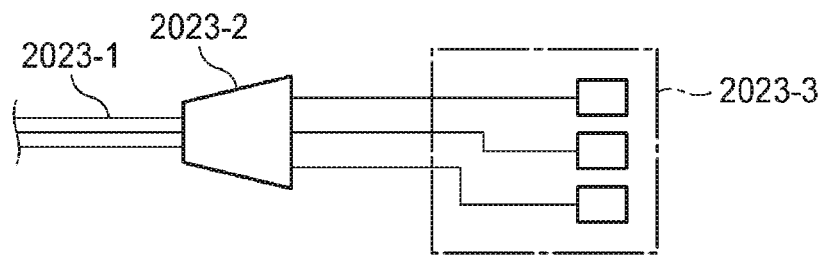
FIGS. 70A and 70B are block diagrams illustrating connection examples between a wire harness and a load.
Figure 70B:
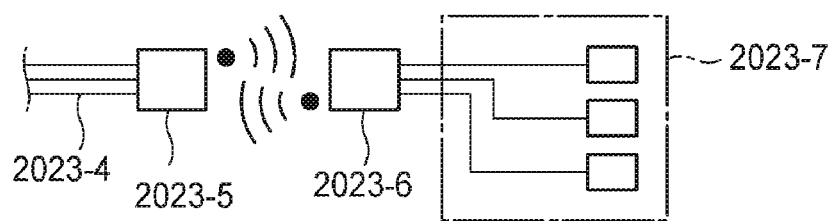
Figure 71:
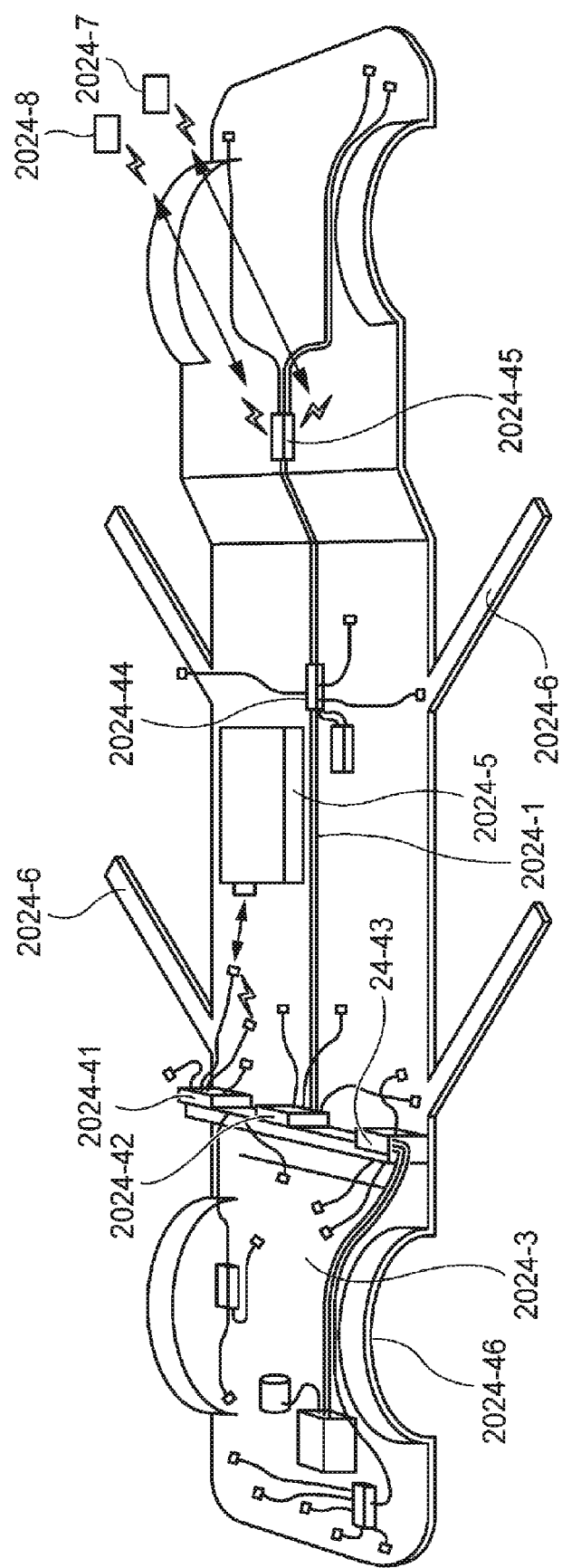
FIG. 71 is a perspective view illustrating a specific example of arrangement and connection of various constituent elements on a vehicle body.

FIGS. 70(*a*) and 70(*b*) are block diagrams illustrating connection examples between a wire harness and a load. FIG. 71 is a perspective view illustrating a specific example of arrangement and connection of various constituent elements on a vehicle body.

As illustrated in FIG. 70(*a*), in a case where various accessories disposed in a door 2023-3 of a vehicle are connected to a wire harness 2023-1 on a vehicle interior side via a wire harness, an electric wire bundle at a bent part of the wire harness which is bent with opening and closing of the door generally is put in a grommet 2023-2 and thus has functions such as protection of electric wires, waterproof, dustproof, and soundproof. However, in a case where a grommet is used, it is hard to perform routing work of a wire harness, and component cost also increases.

Therefore, in the configuration illustrated in FIG. 70(*b*), proximity wireless communication units 2023-5 and 2023-6 are used to connect a control box 2023-4 on a backbone on the vehicle interior side to various accessories disposed in a door 2023-7 of the vehicle. The proximity wireless communication units 2023-5 and 2023-6 has not only a communication function but also a function of supplying source power in a wireless manner. Therefore, in a case of using the configuration illustrated in FIG. 70(*b*), a grommet is not necessary, and routing work for connection of accessories is also considerably simplified.

A description will be made on a more realistic configuration example on a vehicle. In a configuration illustrated in FIG. 71, a backbone main line 2024-1, an instrument panel portion backbone 2024-2, an engine compartment backbone 2024-3, and the like are routed at respective locations on a vehicle body as trunk lines. Control boxes 2024-41, 2024-42, 2024-43, 2024-44 and 2024-45 are disposed at respective to locations in these trunk lines.

In the configuration illustrated in FIG. 71, a steering module 2024-5 and the control box 2024-41 are connected to each other in a wireless manner through proximity wireless communication. The respective control boxes and the accessories in the door are also connected to each other in a wireless manner through proximity wireless communication. Accessories such as a sensor 2024-7 and an antenna 2024-8 disposed in a luggage space and the control box 2024-45 are also connected to each other in a wireless manner through proximity wireless communication.

<Technique for Noise Countermeasure>

Figure 72A:
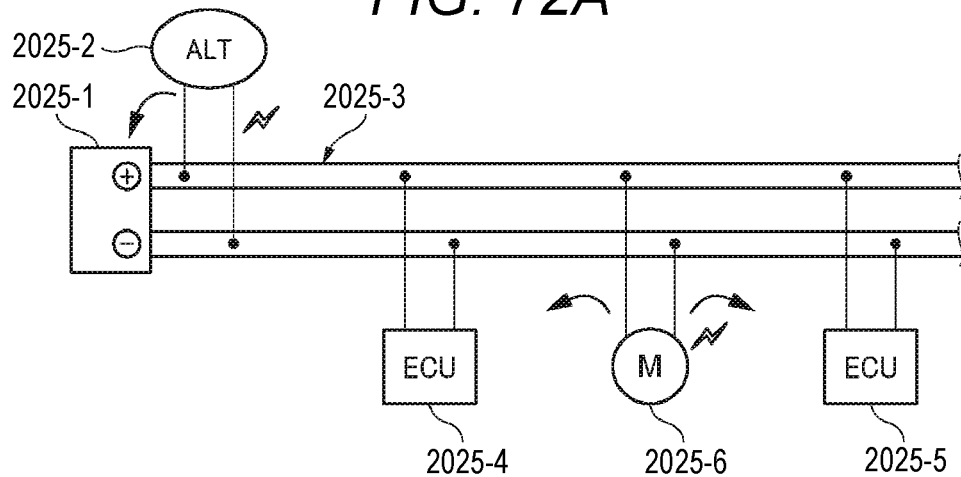
Figure 72B:
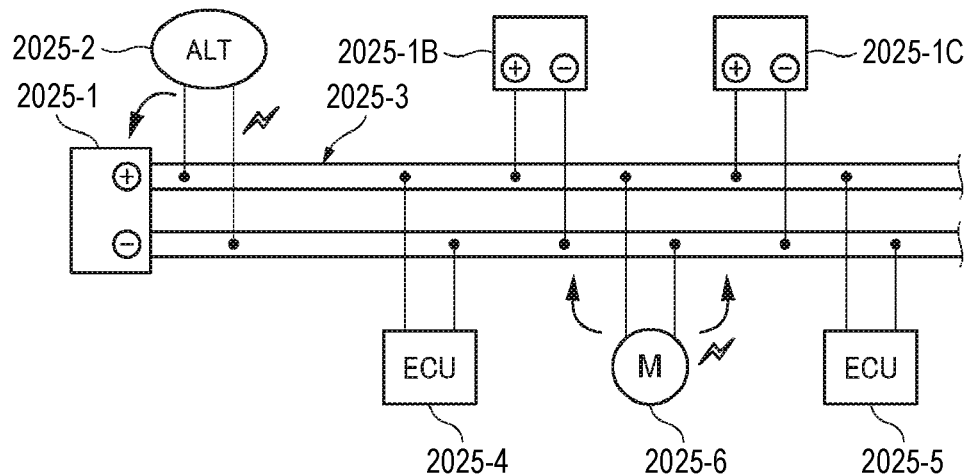
Figure 72C:
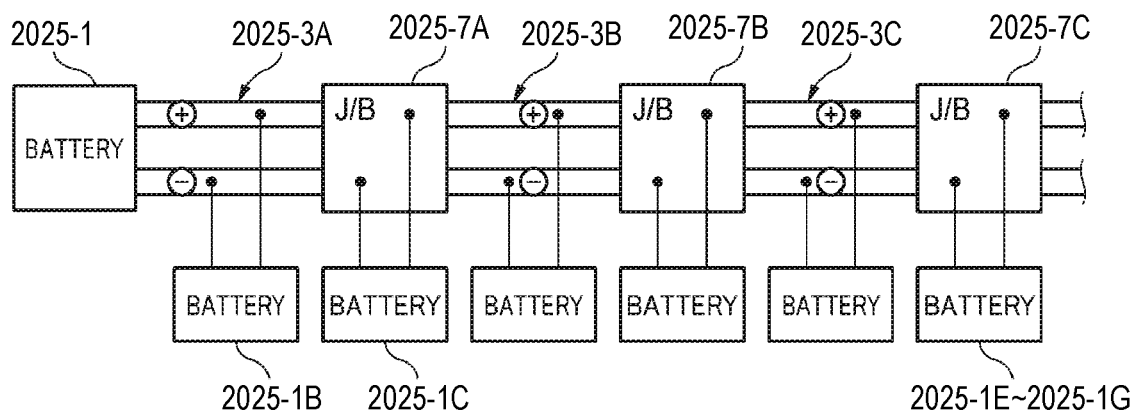
Figure 73A:
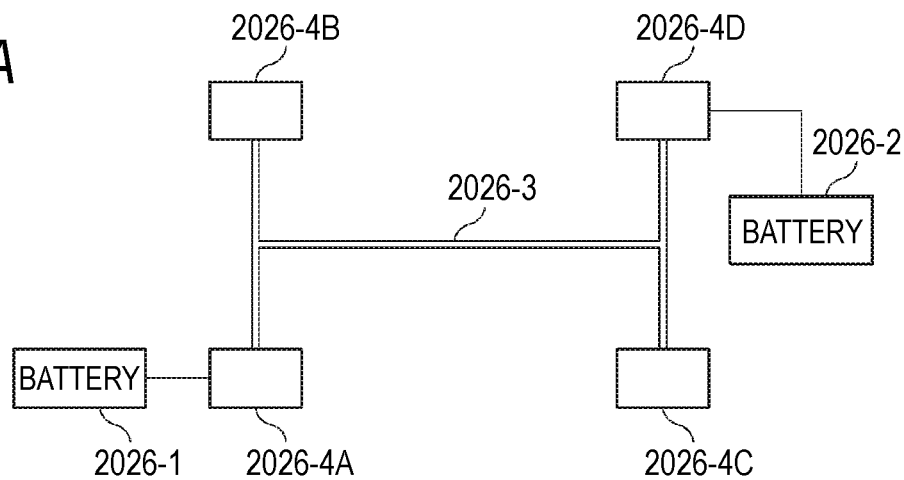
FIGS. 73A, 73B, 73C, 73D and 73E are block diagrams illustrating specific examples of connection states of a trunk line and one or more batteries.
Figure 73B:
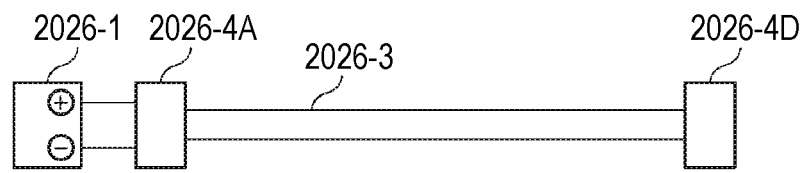
Figure 73C:
Figure 73D:
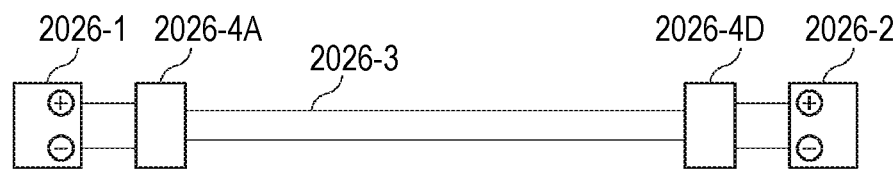
Figure 73E:
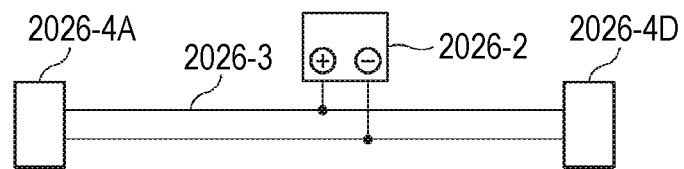

FIGS. 72(*a*), 72(*b*) and 72(*c*) are block diagrams illustrating specific examples of connection states of a trunk line, a control box, a battery, and the like.

In a configuration example illustrated in FIG. 72(*a*), in the same manner as in a general vehicle, a single main battery 2025-1 and an alternator 2025-2 are connected to the vicinity of an end of a wire harness 2025-3. Various parts of the wire harness 2025-3 are connected to accessories such as electronic control units (ECUs) 2025-4 and 2025-5, and an electric motor 2025-6.

In the configuration as illustrated in FIG. 72(*a*), an apparatus such as the alternator 2025-2 or the electric motor 2025-6 is a source generating noise, and thus there is a probability that electromagnetic noise generated therefrom has an adverse effect on the electronic control units 2025-4 and 2025-5 or the like located in the vicinity thereof.

Therefore, the following countermeasures are taken in order to reduce the influence of noise. In other words, a plurality of batteries are prepared and disposed in a distribution manner in a backbone at positions close to the noise sources. Consequently, the battery easily absorbs generated noise. It is possible to prevent sneaking of noise into each electronic control unit. The noise problem can be solved regardless of locations on the backbone where noise sources and apparatuses which are easily influenced by noise are connected.

In the configuration example illustrated in FIG. 72(*b*), in addition to the main battery 2025-1, sub-batteries 2025-1B and 2025-1C are connected to the backbone of the wire harness 2025-3 in a distribution manner. Therefore, noise generated from the electric motor 2025-6 which is a noise source is absorbed by the sub-batteries 2025-1B and 2025-1C connected in the vicinity thereof.

The electronic control units 2025-4 and 2025-5 which are easily influenced by noise are disposed at positions farther away from the noise source than the sub-batteries 2025-1B and 2025-1C, and are thus hardly influenced by noise.

In the configuration example illustrated in FIG. 72(*c*), in addition to the main battery 2025-1, six sub-batteries 2025-1B, 2025-1C, 2025-1D, 2025-1E, 2025-1F and 2025-1G are connected to the backbone of the wire harness 2025-3 in a distribution manner. The sub-battery 2025-1B is connected to a trunk line 2025-3A between the main battery 2025-1 and a control box 2025-7A. The sub-battery 2025-1C is connected to an internal circuit of the control box 2025-7A.

The sub-battery 2025-1D is connected to a trunk line 2025-3B between two control boxes 2025-7A and 2025-7B. The sub-battery 2025-1E is connected to an internal circuit of the control box 2025-7B. The sub-battery 2025-1F is connected to a trunk line 2025-3C between two control boxes 2025-7B and 2025-7C. The sub-battery 2025-1G is connected to an internal circuit of the control box 2025-7C.

As in the configuration illustrated in FIG. 72(*c*), in a case where a plurality of sub-batteries are connected, each sub-battery may be connected to any location. Since each sub-battery functions as a noise filter, a plurality of sub-batteries are connected, and thus performance of absorbing noise in a power supply line is improved.

<Technique for Noise Countermeasure>

FIGS. 73(*a*), 73(*b*), 73(*c*), 73(*d*) and 73(*e*) are block diagrams illustrating specific examples of connection states of a trunk line and one or more batteries.

In this technique, countermeasures of the following (1), (2) and (3) are taken.

(1) A battery having a characteristic of absorbing noise is configured to be connected to any location of a backbone trunk line. (2) In order to remove the influence of a voltage fluctuation or noise, a low impedance routing material is used as a routing material of a backbone trunk line. (3) A configuration of a backbone trunk line is used in common, and a battery attachment position can be changed according to conditions of each vehicle.

In a configuration illustrated in FIG. 73(*a*), control boxes 2026-4A, 2026-4B, 2026-4C and 2026-4D are respectively connected to four ends of a backbone trunk line 2026-3. A main battery 2026-1 is connected to the backbone trunk line 2026-3 at the position of the control box 2026-4A, and a sub-battery 2026-2 is connected to the backbone trunk line 2026-3 at the position of the control box 2026-4D. Even in a case where the main battery 2026-1 and the sub-battery 2026-2 are connected to the backbone trunk line 2026-3 at any positions of the control boxes 2026-4A, 2026-4B, 2026-4C and 2026-4D, the backbone trunk line 2026-3 whose configuration is used in common can be used.

In a configuration illustrated in FIG. 73(*b*), only a main battery 2026-1 is connected to a tip end of a backbone trunk line 2026-3 located on the front side of a vehicle via a control box 2026-4A.

In a configuration illustrated in FIG. 73(*c*), only a sub-battery 2026-2 is connected to a rear end of a backbone trunk line 2026-3 located on the rear side of a vehicle via a control box 2026-4D.

In a configuration illustrated in FIG. 73(*d*), a main battery 2026-1 is connected to a tip end of a backbone trunk line 2026-3 located on the front side of a vehicle via a control box 2026-4A, and a sub-battery 2026-2 is connected to a rear end of a backbone trunk line 2026-3 located on the rear side of a vehicle via a control box 2026-4D.

In a configuration illustrated in FIG. 73(*e*), a sub-battery 2026-2 is disposed in the vicinity of the center of a vehicle, and the sub-battery 2026-2 is directly connected to the center of a backbone trunk line 2026-3.

<Technique for Noise Countermeasure>

Figure 74:
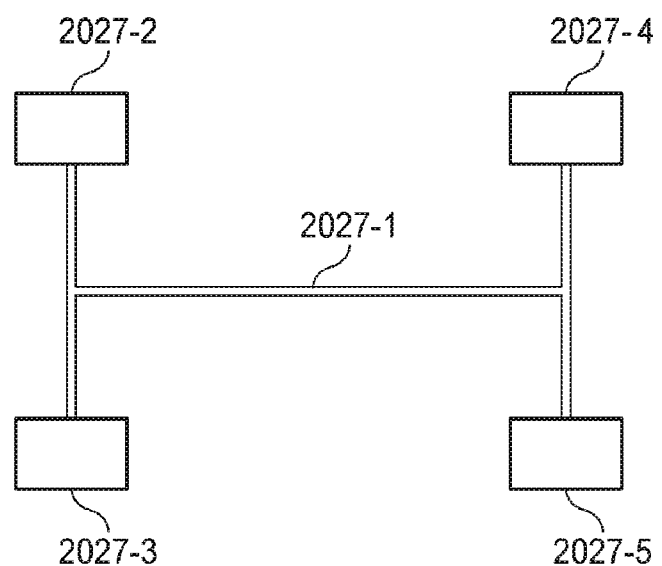
FIG. 74 is a block diagram illustrating a specific example of a connection state of a trunk line and a plurality of batteries.

FIG. 74 is a block diagram illustrating a specific example of a connection state of a trunk line and a plurality of batteries.

In a configuration illustrated in FIG. 74, control boxes 2027-2, 2027-3, 2027-4 and 2027-5 are respectively connected to four ends of a backbone trunk line 2027-1. Each of the plurality of control boxes 2027-2, 2027-3, 2027-4 and 2027-5 has a small-sized sub-battery (secondary battery) built therein. Each sub-battery is connected to a power source line of the backbone trunk line 2027-1. A main power source such as a main battery (not illustrated) is also connected to the backbone trunk line 2027-1. Therefore, the content shown in the following (1) to (4) is realized.

(1) A plurality of batteries can be disposed at respective parts of the backbone trunk line 2027-1 in a distribution manner. Consequently, a voltage fluctuation in a case where a voltage required in a load is high can be suppressed by supplying a current from each battery.

(2) A plurality of batteries disposed can be normally connected to respective portions of the backbone trunk line 2027-1 in a distribution manner. Consequently, in a case where regenerative electrical energy appears on the backbone trunk line 2027-1, this energy can be efficiently recovered by a plurality of batteries at the respective parts. Therefore, a recovery ratio of regenerative energy is improved.

(3) Since a plurality of batteries are provided, in a case where abnormality occurs in a main power source such as a main battery, backup power can be supplied from a plurality of sub-batteries. Such power backup control can be automatically performed by using microcomputers provided in the control boxes 2027-2, 2027-3, 2027-4 and 2027-5.

(4) Since a battery is provided in each area on a vehicle, even in a case where a part of the backbone trunk line 2027-1 is disconnected due to vehicle crash or the like, source power can be supplied from a battery located in the vicinity of an area in which an accessory is disposed, and thus a safe power source which does not stop supplying power can be implemented.

<Technique for Noise Countermeasure>

Figure 75:
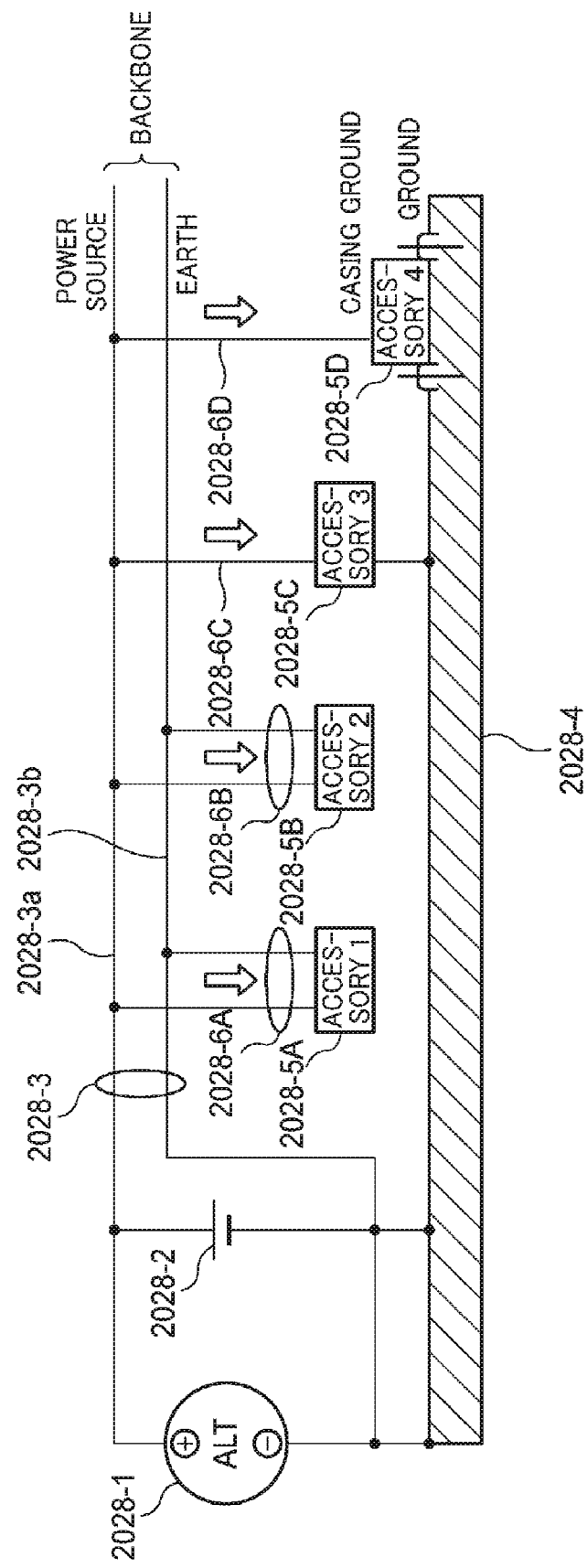
FIG. 75 is an electrical circuit diagram illustrating a configuration example of a power source system in an on-vehicle system.

FIG. 75 is an electrical circuit diagram illustrating a configuration example of a power source system in an on-vehicle system.

A device illustrated in FIG. 75 includes an alternator 2028-1, a main battery 2028-2, a backbone trunk line 2028-3, a body ground 2028-4, accessories 2028-5A to 2028-5D, and branch line sub-harnesses 2028-6A to 2028-6D. The backbone trunk line 2028-3 includes a power source line 2028-3*a* and a ground (GND) line 2028-3*b*. The body ground 2028-4 is a ground path using a metal forming a body of a vehicle.

In a configuration illustrated in FIG. 75, the alternator 2028-1 and the main battery 2028-2 are connected to an upstream side of the backbone trunk line 2028-3. Respective parts of the backbone trunk line 2028-3 are connected to the accessories 2028-5A to 2028-5D via the branch line sub-harnesses 2028-6A to 2028-6D.

Each negative terminal of the alternator 2028-1 and the main battery 2028-2 is respectively connected to both of the earth line 2028-3*b* of the backbone trunk line 2028-3 and the body ground 2028-4. Terminals on a ground side of a power source of the accessories 2028-5A and 2028-5B are connected to only the earth line 2028-3*b* of the backbone trunk line 2028-3 via the branch line sub-harnesses 2028-6A and 2028-6B, respectively. Terminals on a ground side of a power source of the accessories 2028-5C and 2028-5D are connected to only the body ground 2028-4 via a dedicated earth line or a casing ground.

A resistance value of a line path in a case of using the body ground 2028-4 is very small as, for example, about 0.7 mΩ, but a resistance value relatively increases in a case of using the earth line 2028-3*b* of the backbone trunk line 2028-3.

Since the earth line 2028-3*b* of the backbone trunk line 2028-3 has a relatively large resistance value, if a large current flows, a ground potential fluctuation may occur due to a voltage drop caused by a resistance of the line path. However, if the body ground 2028-4 is used, a resistance value thereof is small, and thus a ground potential fluctuation scarcely occurs.

In the configuration illustrated in FIG. 75, since it is assumed that a power source current consumed in the accessories 2028-5A and 2028-5B is relatively small, the ground terminals thereof are connected to the earth line 2028-3*b* of the backbone trunk line 2028-3. In addition, since it is assumed that a power source current consumed in the accessories 2028-5C and 2028-5D is relatively large, the ground terminals thereof are connected to the body ground 2028-4. In the above-described connection way, it is possible to reduce a ground potential fluctuation.

The alternator 2028-1 has a switching circuit such as a DC/DC converter built therein, and thus there is a high probability that noise is generated due to switching. However, as illustrated in FIG. 75, the negative terminal of the alternator 2028-1 is connected to the body ground 2028-4, and thus generated noise can be absorbed by using the main battery 2028-2 or the like since resistance of a line path is small.

<Technique for Communicating Between Vehicle and Vehicle Exterior>

Figure 76A:
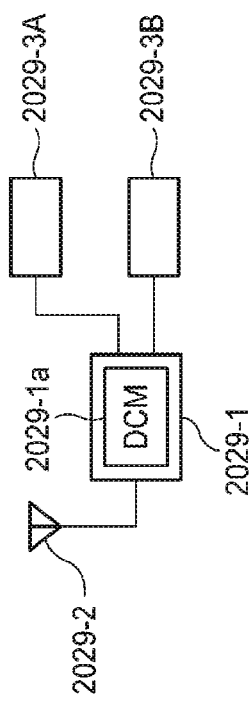
FIG. 76A is a block diagram illustrating a configuration example of an on-vehicle system.
Figure 76B:
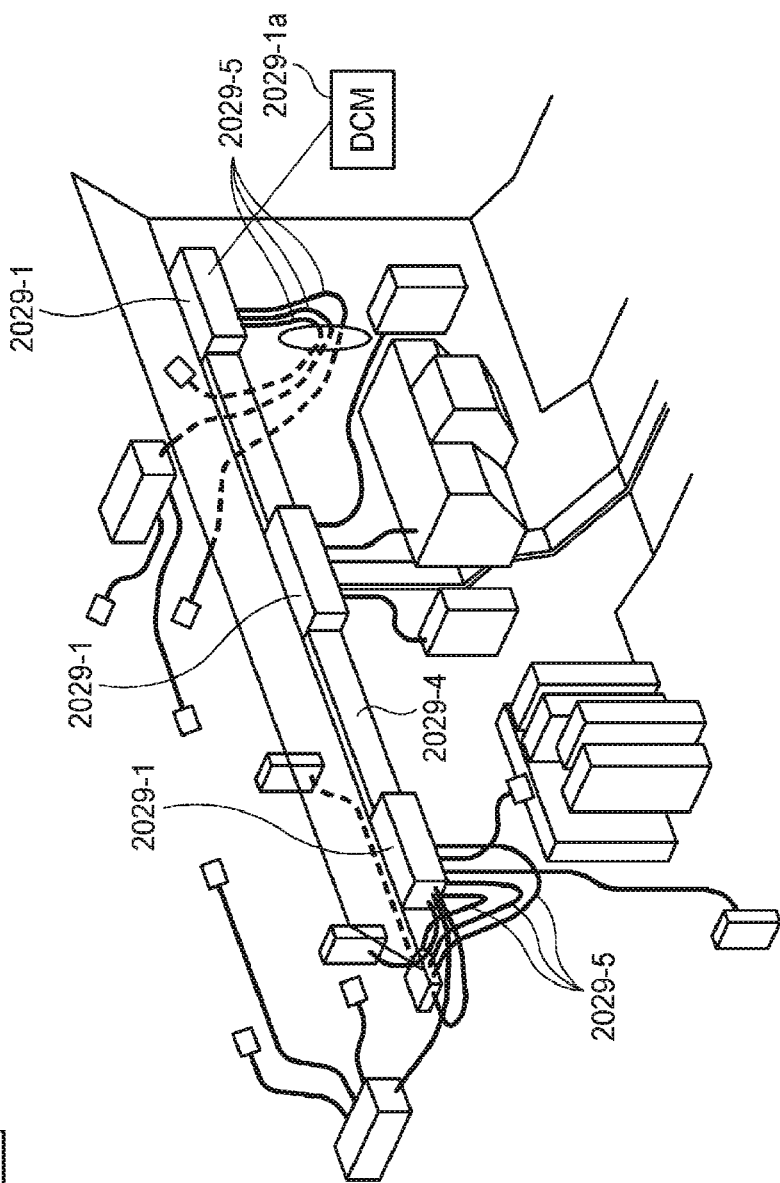
FIG. 76B is a perspective view illustrating an example of an exterior of the same on-vehicle system.

FIG. 76(*a*) is a block diagram illustrating a configuration example of an on-vehicle system, and FIG. 76(*b*) is a perspective view illustrating an example of an exterior of the same on-vehicle system.

The on-vehicle system illustrated in FIG. 76(*b*) includes a plurality of control boxes 2029-1, a backbone trunk line 2029-4 connecting the control boxes to each other, and a plurality of branch line sub-harnesses 2029-5 connected to the backbone trunk line 2029-4 via the control boxes.

As illustrated in FIG. 76(*a*), accessories 2029-3A and 2029-3B, and the like are connected to and under the control of the branch line sub-harnesses 2029-5. As specific examples of the accessories 2029-3A and 2029-3B, for example, an audio device or an electronic control unit (ECU) is connected. As illustrated in FIG. 76(*b*), in this example, a data communication module (DCM) 2029-1*a* is provided in one of the plurality of control boxes 2029-1.

In a general vehicle, respective accessories are separately connected to the DCM so that the accessories of various kinds perform wireless communication with a vehicle exterior. Thus, connection locations of various circuits concentrate on the DCM. If many circuits concentrate, the number of processed electric wires in a wire harness increases, which leads to an increase in a size of a connector, and thus productivity of the wire harness deteriorates.

Therefore, as in the configuration illustrated in FIG. 76(*a*), the DCM 2029-1*a* is built in a single control box 2029-1, and the various accessories 2029-3A and 2029-3B are connected to the common control box 2029-1.

Since the control box 2029-1 illustrated in FIG. 76(a) is connected to the backbone trunk line 2029-4, various kinds of accessories disposed at various positions on a vehicle are connected to the backbone trunk line 2029-4, and thus it is possible to easily use the wireless communication function of the DCM 2029-1a via the trunk line. Consequently, it is possible to reduce the number of circuits of a wire harness, and thus to reduce component cost and manufacturing cost of the wire harness.

<Technique Regarding Voltage and Current Consumption in Trunk Line>

FIGS. 77(a) and 77(b) are longitudinal sectional views respectively illustrating configuration examples of different backbone trunk lines. FIG. 78 is a time chart illustrating an example of a correspondence relationship between a power source current and a power source voltage in a case where special power source control is performed.

In an on-vehicle system, if current consumption of an accessory connected to a wire harness increases, a voltage drop increases and a ground potential easily fluctuates in a case where resistance of an earth line is large. A ground terminal of the accessory may float from an earth line. There is a case where a power source voltage supplied to an accessory is reduced due to a voltage drop in a power source line.

Therefore, in the present embodiment, two kinds of power source voltages, for example, +12 V and +48 V are configured to be used together in a common backbone trunk line, and the two kinds of power source voltages are used depending on situations.

A backbone trunk line 2030-1 illustrated in FIGS. 77(a) and 77(b) includes two power source lines 2030-1a and 2030-1b, an earth line 2030-1c, and a communication line 2030-1d. In the present embodiment, it is possible to switch between power source voltages supplied to at least one of the power source lines 2030-1a and 2030-1b. In other words, in a case where the power source voltage of +12 V is selected, as illustrated in FIG. 77(a), the power source voltage of +12 V is supplied to the power source line 2030-1a or 2030-1b. In a case where the power source voltage of +48 V is selected, as illustrated in FIG. 77(b), the power source voltage of +48 V is supplied to the power source line 2030-1a or 2030-1b.

For example, DC power supplied from a main power source such as a main battery is stepped up or down in a control box disposed on the backbone trunk line 2030-1, and thus switching between +12 V and +48 V can be performed.

Control is performed by using a microcomputer of the control box, and thus switching between +12 V and +48 V can be automatically performed. For example, if the microcomputer monitors a current required in a load or actual current consumption, automatic switching between voltages can be performed as in the example illustrated in FIG. 78 depending on the magnitude of the current.

In other words, in a case where current consumption of a load is great, a voltage supplied by the control box is changed from +12 V to +48 V, and thus it is possible to reduce the influence of a decrease in a voltage supplied to the load.

<Technique Regarding Configuration of Trunk Line>

Figure 79A:
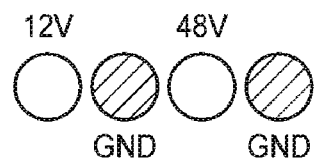
FIGS. 79A, 79B and 79C are longitudinal sectional views respectively illustrating configuration examples of different backbone trunk lines.
Figure 79B:
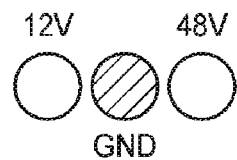
Figure 79C:
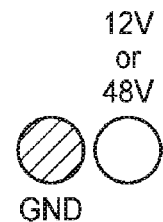

FIGS. 79(a), 79(b) and 79(c) are longitudinal sectional views respectively illustrating configuration examples of different backbone trunk lines.

In a general vehicle, +12 V is used as a power source voltage. However, if current consumption of a load increases, a problem such as a voltage drop in a wire harness occurs. If an electric wire diameter of the wire harness is increased in order to reduce the voltage drop, the wire harness grows too large, and thus a weight thereof also increases.

Therefore, as a power source voltage handled in a wire harness, +48 V is configured to be also used in addition to +12 V.

In a configuration illustrated in FIG. 79(a), a backbone trunk line is formed of four routing materials (electric wires, bus bars, and the like). Two of the four routing materials are used as a power source line and an earth (GND) line for +12 V, and the other two remaining routing materials are used as a power source line and an earth line for +48 V.

In a configuration illustrated in FIG. 79(b), a backbone trunk line is formed of three routing materials. One of the three routing materials is used as a power source line for +12 V, another one is used as an earth (GND) line, and the remaining one is used as a power source line for +48 V.

In a configuration illustrated in FIG. 79(c), a backbone trunk line is formed of two routing materials. One of the two routing materials is used as a common power source line for +12 V or +48 V, and the other one is used as an earth (GND) line. In a case of using the configuration illustrated in FIG. 79(c), for example, voltage switching between +12 V and +48 V is performed in a control box on the backbone trunk line.

<Technique Regarding Power Saving Control>

For example, if the supply of power to a load having low priority is reduced, or conduction of a load having low priority is temporarily stopped, power consumption of the entire vehicle can be reduced, and this leads to improvement of power efficiency and miniaturization of a battery. However, if such power saving control is performed at all times, a user may not be able to comfortably use a load having low priority.

Therefore, a case is assumed in which a normal mode is switched to a power saving mode only when a certain situation occurs, and the above-described power saving control is performed. Here, it is important how to define a determination condition for determining whether or not to switch the normal mode to the power saving mode.

In the present embodiment, past data DA and expectation data DB for one day from now on are prepared in order to determine the switching from the normal mode to the power saving mode. The past data DA is compared with the expectation data DB, a today's power use prediction is presented to a user, and a control device on a vehicle side automatically selects the power saving mode.

As a specific example of the past data DA, condition patterns such as a day basis, a season basis, and an environmental condition basis, for example, weather, temperature, and humidity are taken into consideration, and a power use amount for each condition pattern is measured, and is generated as data. The data is optimized by using a learning function.

As a specific example of the expectation data DB, there are use amount prediction data of a car air conditioner based on a today's weather prediction, a user's schedule data registered in a smart phone or the like, destination information which is input to a car navigation device, and the like. Specific condition patterns are extracted on the basis of the specific data, and thus appropriate expectation data DB can be obtained.

<Technique for Preventing Battery Exhaustion>

For example, in a case where a vehicle is parked without being connected to an external power source, most of the accessories on a vehicle are in a stop state, and power accumulated in a battery is scarcely consumed. However, for example, since some loads such as a theft prevention device continue to consume power even during parking, if a parking state is continued for a long period of time, battery exhaustion occurs, and thus the vehicle cannot be started.

Therefore, in the present embodiment, a control device on the vehicle performs special control in order to prevent battery exhaustion in advance. In other words, the control device recognizes a power residual capacity in a power source such as a main battery, measures a conduction current or a dark current flowing out of the battery, and predicts the number of days left until battery exhaustion occurs based on the information. In a case where the number of days left is small, the supply of power from the battery is automatically stopped. The supply of power may be controlled to be reduced stepwise.

<Technique Regarding Disconnection Detection>

Figure 80:
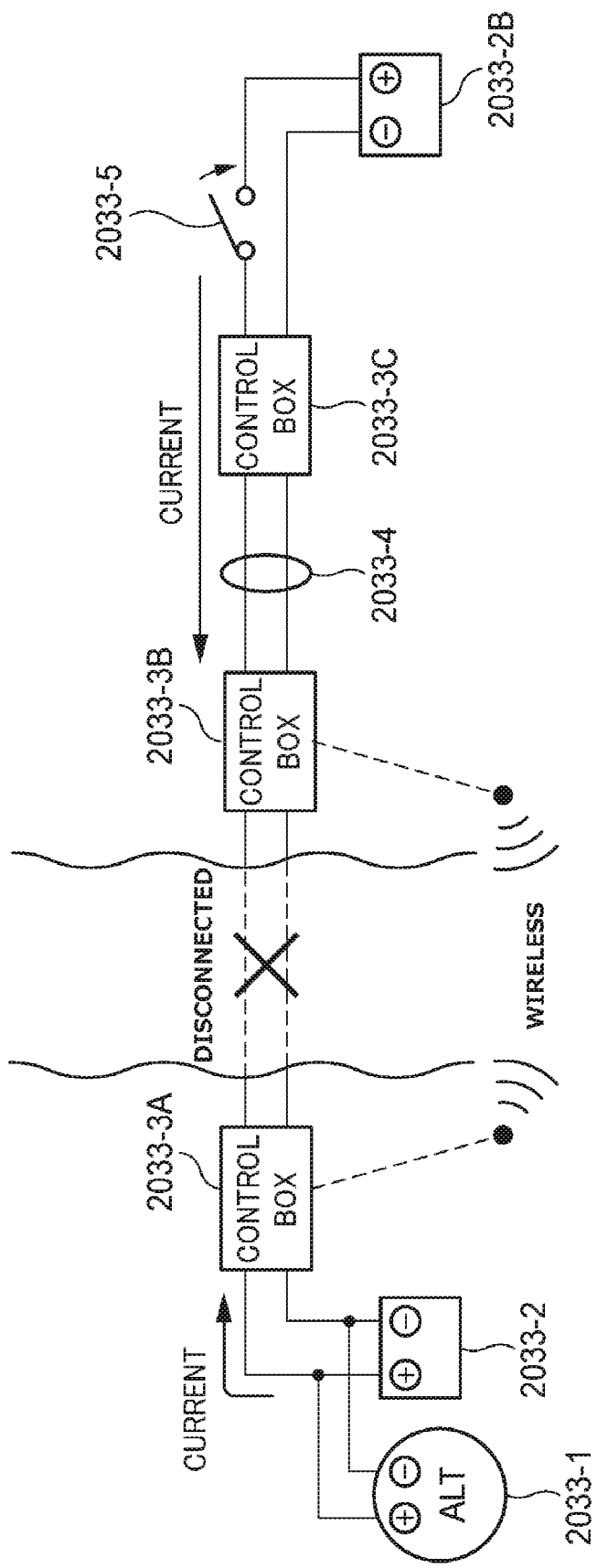
FIG. 80 is an electrical circuit diagram illustrating a configuration example of a power source system in an on-vehicle system.

FIG. 80 is an electrical circuit diagram illustrating a configuration example of a power source system in an on-vehicle system.

In an on-vehicle system illustrated in FIG. 80, an alternator 2033-1 and a main battery 2033-2 which are main power sources are connected to a tip end side of a backbone trunk line 2033-4, and a sub-battery 2033-2B is connected to a rear end side of the backbone trunk line 2033-4 via a switch 2033-5.

A plurality of control boxes 2033-3A, 2033-3B and 2033-3C are connected to an intermediate portion of the backbone trunk line 2033-4 in a distribution manner at respective positions. A power source line and an earth line are included as constituent elements of the backbone trunk line 2033-4. The power source line of the backbone trunk line 2033-4 is configured to be used not only for the supply of power but also for communication. In other words, by using the existing power line communication (PLC) technique, DC source power and an AC signal for communication are transmitted in a state of being superimposed with each other on the power source line.

Therefore, each of the plurality of control boxes 2033-3A, 2033-3B and 2033-3C has an interface for PLC communication built therein, and thus the plurality of control boxes 2033-3A, 2033-3B and 2033-3C can perform PLC communication with each other.

In this configuration, for example, if the backbone trunk line 2033-4 between the two control boxes 2033-3A and 2033-3B is disconnected, PLC communication cannot be performed between the two control boxes 2033-3A and 2033-3B. Therefore, in a case where the PLC communication cannot be performed, the control boxes 2033-3A and 2033-3B can recognize disconnection of the backbone trunk line 2033-4. Further, a position where the disconnection occurs can be specified. Each of the plurality of control boxes 2033-3A, 2033-3B and 2033-3C has a short-range wireless communication function so as to perform communication even in a case where the backbone trunk line 2033-4 is disconnected.

In a case where the above-described disconnection occurs, power recovery control is performed according to a fail-safe function of any one of the control boxes 2033-3A, 2033-3B and 2033-3C which detected the disconnection. In other words, if the switch 2033-5 is closed, source power is supplied to the backbone trunk line 2033-4 from both of the main battery 2033-2 and the sub-battery 2033-2B. The switch 2033-5 is maintained in a closed state. Consequently, power is supplied to each circuit from the main battery 2033-2 on the upstream side of the disconnection position, and power is supplied to each circuit from the sub-battery 2033-2B on the downstream side of the disconnection position. In a case where disconnection occurs, PLC communication is stopped, and communication paths between the control boxes 2033-3A, 2033-3B and 2033-3C are secured by using wireless communication whose function is restricted.

<Technique for Using Communication System in Common>

Figure 81:
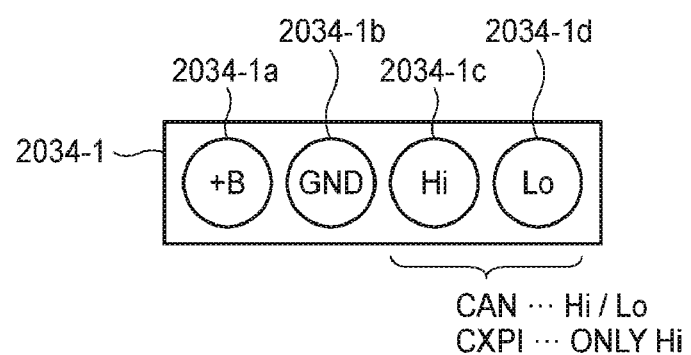
FIG. 81 is a longitudinal sectional view illustrating a configuration example of a communication cable.

FIG. 81 is a longitudinal sectional view illustrating a configuration example of a communication cable.

There is a plurality of standards such as CAN or CXPI as standards related to communication on a vehicle. Therefore, there is a probability that communication interfaces based on a plurality of standards may be combined with each other due to a difference between vehicle specifications, a difference between areas on a vehicle, a difference between grades, and the like. Components such as communication cables having different configurations for the respective standards are used. Since the configurations are different from each other, components based on a plurality of standards cannot be used in common.

A communication cable 2034-1 illustrated in FIG. 81 is configured to be able to be used for both of communication based on the CAN standard and communication based on the CXPI standard. The communication cable 2034-1 is formed of four electric wires including a power source line 2034-1a, an earth (GND) line 2034-1b, a high-side communication line 2034-1c, and a low-side communication line 2034-1d.

In a case of performing communication based on the CAN standard, both of the high-side communication line 2034-1c and the low-side communication line 2034-1d are used, and, in a case of performing communication based on the CXPI standard, only the high-side communication line 2034-1c is used. Consequently, the communication cable 2034-1 whose configuration is used in common can be used regardless of whether being connected to a communication interface based on any one of the CAN and CXPI standards. Through this common use, manufacturing of a wire harness is facilitated, and thus various accessories are also easily post-installed.

A configuration of a switching circuit CB11 for switching between two kinds of interface connections based on CAN and CXPI is illustrated in FIG. 57 as described above.

<Technique for Using Configuration in Common>

Figure 82:
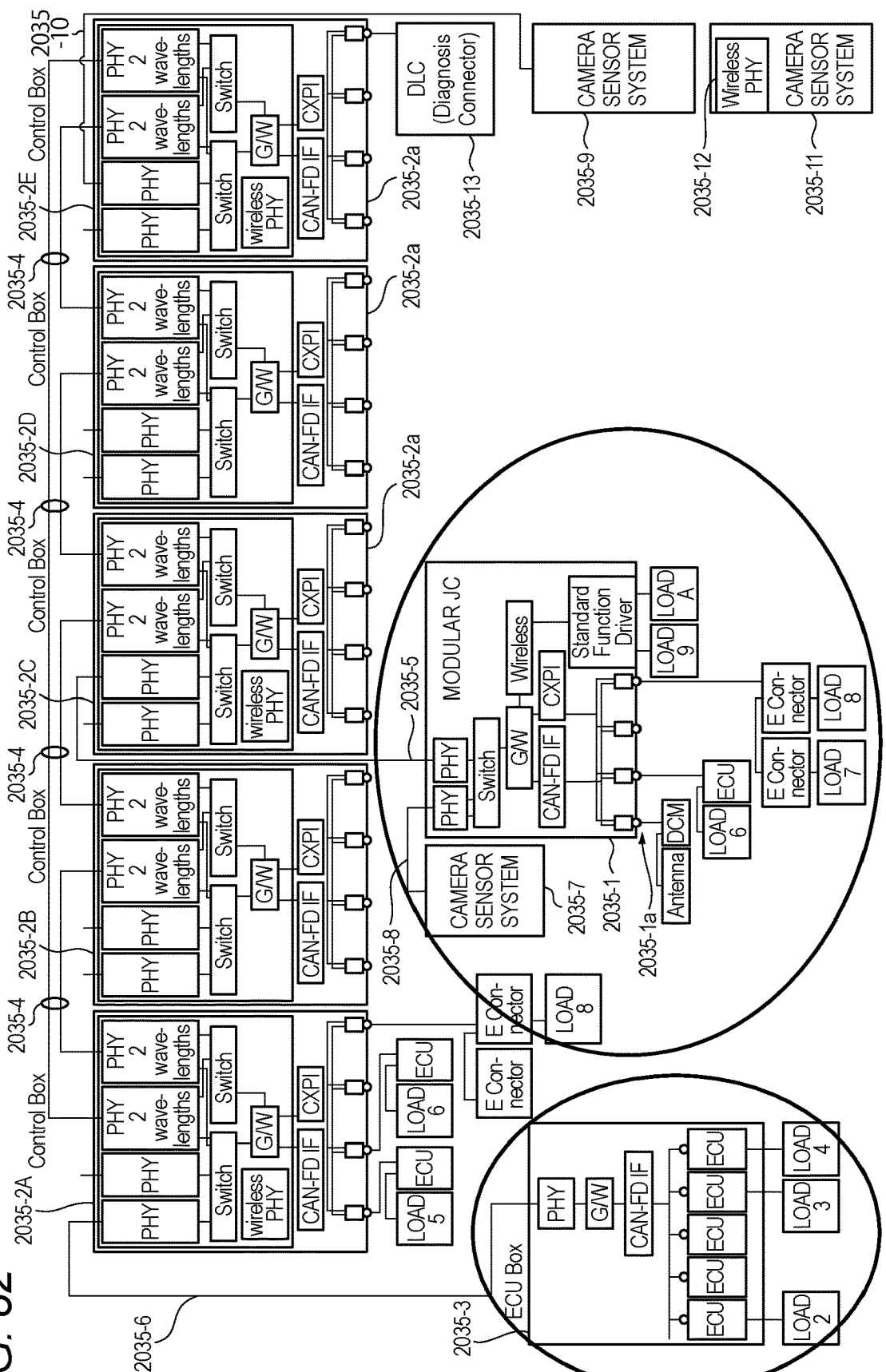
FIG. 82 is a block diagram illustrating a configuration example of a communication system in an on-vehicle system.

FIG. 82 is a block diagram illustrating a configuration example of a communication system in an on-vehicle system.

For example, in a case where various accessories are connected to and under the control of the control boxes 2031 to 2033 as illustrated in FIG. 48 via branch line sub-harnesses, it is hard to use a large-sized control box, and the number of connectors for connection of the branch line sub-harnesses may be restricted. Thus, in a case where a plurality of accessories are to be connected to a single control box, the number of connectors may be insufficient. In other words, a width of the control box is small, and thus there is a case where a plurality of connectors cannot be provided in the control box.

Therefore, in the present embodiment, a modular connection connector (JC) 2035-1 illustrated in FIG. 82 is prepared. The modular connection connector 2035-1 has a configuration similar to that of a table tap, an upstream side thereof is connected to a single branch line sub-harness 2035-5, and a connection portion 2035-1a on a downstream side is provided with a plurality of connectors for connection of a plurality of apparatuses.

As illustrated in FIG. 82, the branch line sub-harness 2035-5 of the modular connection connector 2035-1 is connected to a connector of a single control box 2035-2C as a branch line, for example. As illustrated in FIG. 82, the modular connection connector 2035-1 is provided with two PHY circuits, a network switch (switch), a gateway (GW), a processing unit, an CAN-FD interface, a CXPI interface, a standard function driver, and the like therein.

In the configuration illustrated in FIG. 82, one of the PHY circuits of the modular connection connector 2035-1 is connected to an apparatus 2035-7 of a camera and a sensor system via a communication line 2035-8. Two loads are connected to and under the control of the standard function driver.

The connection portion 2035-1a on the downstream side of the modular connection connector 2035-1 is provided with a plurality of connectors, and thus a plurality of accessories can be connected thereto as necessary. For example, as illustrated in FIG. 82, a DCM and an antenna may be connected, or a load 6 may be connected via an electronic control unit (ECU). Instead of the ECU, a load may also be connected via connectors (E connectors) having a simple communication function or an output control function.

Another modular connection connector 2035-1 can be connected in series to the connection portion 2035-1a on the downstream side of the modular connection connector 2035-1, and thus it is possible to increase the number of connectable apparatuses as necessary. Constituent elements such as an ECU box 2035-3 illustrated in FIG. 82 will be described later in detail.

<Technique of Incorporating Optical Communication Path in Backbone Trunk Line>

As illustrated in FIG. 57 described above, optical fiber cables are used as two communication lines L4B and L5B of the backbone trunk line BB_LM, and thus the control box CB has an optical communication function. Consequently, since large-capacity or high-speed communication can be performed by using the trunk line, it can be used for communication for a high grade vehicle. Specifically, since the maximum communication speed of about 10 Gbps can be ensured, it can be applied also to an application in which high resolution video data is required to be sent without time lag.

<Technique for Handling Optical Signal in Control Box>

A function for handling an optical signal is installed in a control box. For example, as in the on-vehicle system illustrated in FIG. 57, the PHY circuits CB03 and CB04 are incorporated into the control box CB, so that an electrical signal can be converted into an optical signal so as to be transmitted, and a received optical signal can be converted into an electrical signal so as to be subjected to a reception process.

More specifically, as in the control box CB(1) illustrated in FIG. 104, the optical/electrical conversion units 2057-2 and 2057-3, and the electrical/optical conversion units 2057-10 and 2057-11 are incorporated therein, and thus mutual conversion between an optical signal and an electrical signal can be performed.

<Technique Regarding Connection Form of Communication System Trunk Line>

Figure 83:
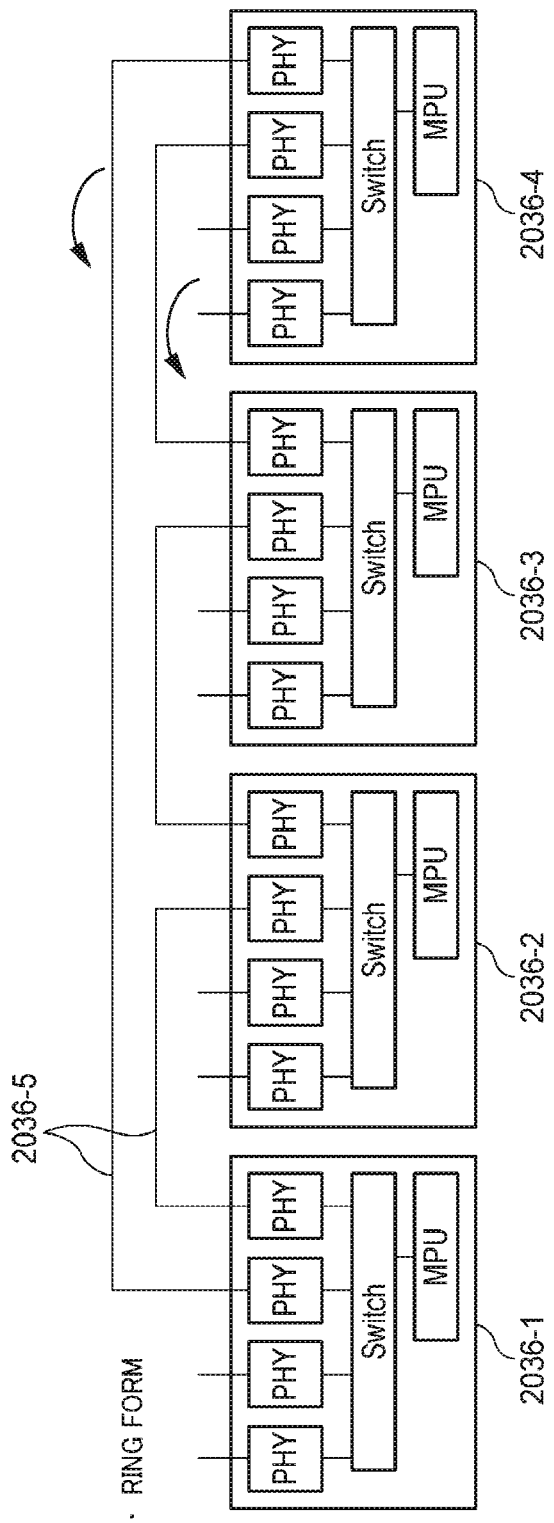
FIG. 83 is a block diagram illustrating a configuration example of communication systems in an on-vehicle system in which the communication systems are connected in a ring form.
Figure 84:
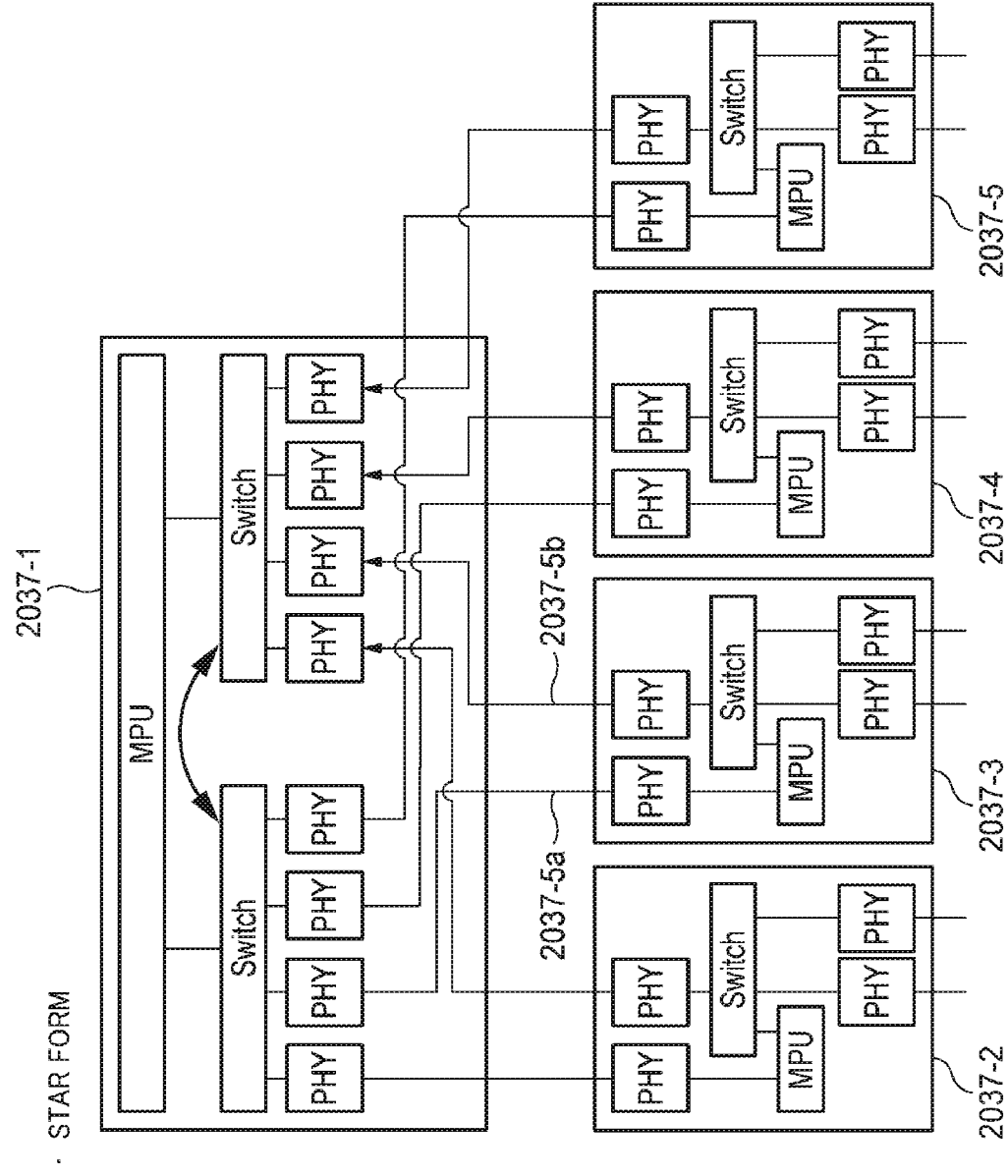
FIG. 84 is a block diagram illustrating a configuration example of communication systems in an on-vehicle system in which the communication systems are connected in a star form.

FIG. 83 is a block diagram illustrating a configuration example of communication systems in an on-vehicle system in which the communication systems are connected in a ring form. FIG. 84 is a block diagram illustrating a configuration example of communication systems in an on-vehicle system in which the communication systems are connected in a star form.

In the on-vehicle system illustrated in FIG. 83, four control boxes 2036-1, 2036-2, 2036-3 and 2036-4 are connected to each other via a communication trunk line 2036-5 of a backbone, and this connection form is configured in a ring shape.

In other words, a signal transmitted from the control box 2036-1 reaches the next control box 2036-2 via the communication trunk line 2036-5, and the signal relayed inside the control box 2036-2 is transmitted from the control box 2036-2 to the communication trunk line 2036-5 and reaches the next control box 2036-3. Similarly, the signal which is received and relayed by the control box 2036-3 is transmitted to the communication trunk line 2036-5, and reaches the next control box 2036-4. The signal which is received and relayed by the control box 2036-4 is transmitted to the communication trunk line 2036-5, and reaches the next control box 2036-1. In the above-described way, the signal on the communication trunk line 2036-5 is sequentially transmitted while being relayed along the ring-shaped path.

Therefore, the same communication function as that of the on-vehicle system illustrated in FIG. 53 can be realized. If a path of the communication trunk line 2036-5 is duplicated, even in a case where abnormality occurs in one communication path, a communication path can be secured by using the remaining normal path, and thus reliability is increased. A communication speed can be doubled by using the two paths together.

On the other hand, in the on-vehicle system illustrated in FIG. 84, five control boxes 2037-1, 2037-2, 2037-3, 2037-4 and 2037-5 are connected to communication trunk lines 2037-5a and 2037-5b, and this connection form is configured in a star shape. In other words, the single control box 2037-1 is centered, and the other four control boxes 2037-2 to 2037-5 are connected thereto via separate paths.

In the configuration illustrated in FIG. 84, each communication path is duplicated. For example, the control box 2037-1 and the control box 2037-3 are connected to each other via the two communication trunk lines 2037-5a and 2037-5b which are independent from each other.

Each of the duplicated communication paths may be used separately depending on, for example, priority, importance, and a security level difference of communication. Specifically, a communication path having high priority is used for communication related to traveling of a vehicle, and a communication path having low priority is used for other general communication. In a case where a communication failure occurs, one of duplicated communication paths may be used as a backup path. A security level may be divided into, for example, private and public.

The control box 2037-1 at the center of the star shape selectively determines a transmission destination of a packet to be transmitted next from among the four control boxes 2037-2 to 2037-5, and determines a communication path along which the packet is to be transmitted of the communication paths of two systems.

When determining the priority in communication for the on-vehicle system, the priority is generally determined in advance for each component, and thus information handled by, for example, an engine ECU is treated as information having high priority. However, actually, there are many cases where information having low priority is handled by the engine ECU.

Therefore, an ID indicating importance is given to each piece of information, the importance of information is identified on the basis of the ID, and a communication path is automatically selected. In other words, information having high importance is transmitted along the communication trunk line 2037-5a of the duplicate communication trunk lines of the backbone, and information having low importance is transmitted along the communication trunk line 2037-5b thereof.

<Technique Using Wireless Communication in System on Vehicle>

Figure 85A:
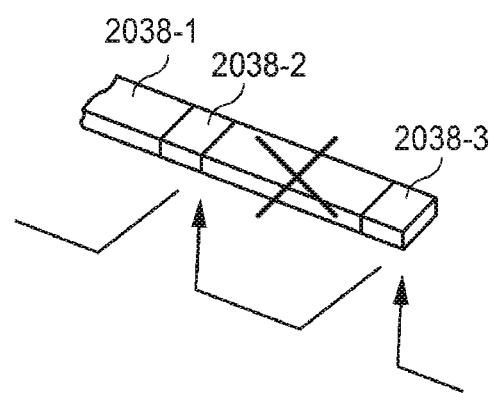
Figure 85B:
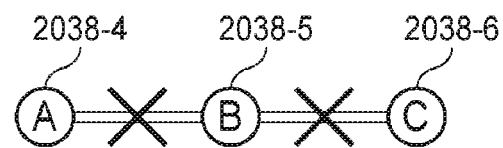
Figure 85C:
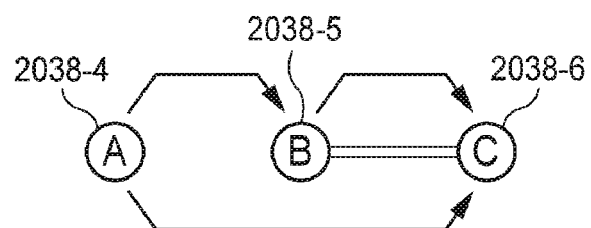

FIGS. 85(a), 85(b) and 85(c) illustrate communication connection states between apparatuses in different situations, in which FIG. 85(a) is a perspective view, and FIGS. 85(b) and 85(c) are block diagrams.

For example, in a case where a communication line is included in a backbone trunk line 2038-1 illustrated in FIG. 85(a), wired communication can be performed between a plurality of control boxes 2038-2 and 2038-3 connected to the backbone trunk line 2038-1. However, the backbone trunk line 2038-1 may be damaged during vehicle crash or the like, and thus the communication line may be disconnected.

Therefore, in order to provide redundancy to a communication path, a short-range wireless communication function is installed in each of the control boxes 2038-2 and 2038-3. Consequently, in a configuration illustrated in FIG. 85(a), even in a case where the communication line between the control boxes 2038-2 and 2038-3 is disconnected, a communication path between the plurality of control boxes 2038-2 and 2038-3 can be secured via a wireless communication line. In a location where disconnection does not occur, a communication path between the control boxes is secured via the communication line of the backbone trunk line 2038-1.

As illustrated in FIG. 85(b), even in a case where a communication line between control boxes 2038-4 and 2038-5 is disconnected, and a communication line between control boxes 2038-5 and 2038-6 is also disconnected, communication paths can be secured by using wireless communication. Therefore, as illustrated in FIG. 85(c), communication can be performed between the control boxes 2038-4 and 2038-5, between the control boxes 2038-5 and 2038-6, and between control boxes 2038-4 and 2038-6. Consequently, reliability of a communication path can be secured.

<Technique Regarding Diameter Reduction of Backbone Trunk Line>

Figure 86:
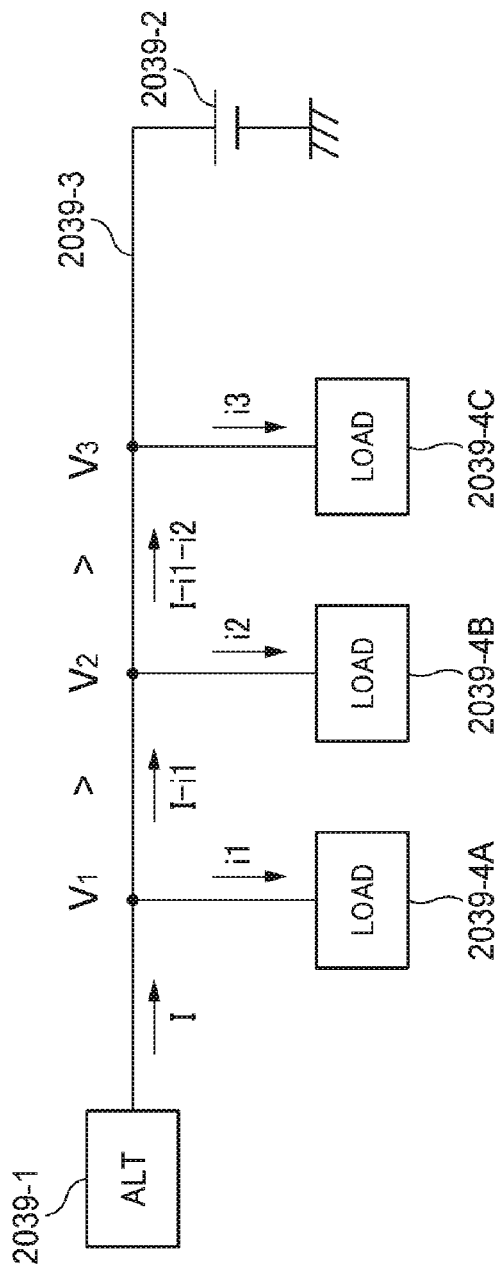
FIG. 86 is an electrical circuit diagram illustrating a configuration example of a power source system in an on-vehicle system.

FIG. 86 is an electrical circuit diagram illustrating a configuration example of a power source system in an on-vehicle system.

In the on-vehicle system illustrated in FIG. 86, an alternator (generator: ALT) 2039-1 is connected to one end (for example, a front side in a vehicle body) of a backbone trunk line 2039-3, and a main battery 2039-2 is connected to the other end (for example, a rear side in the vehicle body) of the backbone trunk line 2039-3.

Loads 2039-4A, 2039-4B and 2039-4C are connected to respective locations of an intermediate portion of the backbone trunk line 2039-3 via predetermined branch line sub-harnesses. In FIG. 86, voltages of the backbone trunk line 2039-3 at the respective connection locations of the loads 2039-4A, 2039-4B and 2039-4C are indicated by V1, V2 and V3.

Typically, a DC output voltage of the alternator 2039-1 is higher than a voltage between terminals of the main battery 2039-2. Therefore, as illustrated in FIG. 86, a relationship of "V1>V2>V3" is satisfied. Here, a case is assumed in which there is no influence of the main battery 2039-2, and load currents i1, i2 and i3 respectively flow through the loads 2039-4A, 2039-4B and 2039-4C. In this case, as illustrated in FIG. 86, an output current I of the alternator 2039-1 flows toward the right through the backbone trunk line 2039-3, and the current is divided to flow at the connection points of the respective loads. Therefore, as illustrated in FIG. 86, the currents "I", "I-i1", and "I-i1-i2" flow at respective positions on the backbone trunk line 2039-3. Voltage drops due to the currents occur on the backbone trunk line 2039-3, and thus the relationship of "V1>V2>V3" is satisfied. Thus, the influence of the voltage drop increases at the position of the load 2039-4C which is far away from the alternator 2039-1. Therefore, it is necessary to make the backbone trunk line 2039-3 thick in order to reduce a resistance value. In a case where a power source line is routed by using a general wire harness, voltage drops can be reduced by routing a power source line which branches into a plurality of electric wires at the root of a power source to independent loads, but the number of electric wires increases.

However, in the configuration illustrated in FIG. 86, since the main battery 2039-2 is connected to the right end side of the backbone trunk line 2039-3, a current can be made to flow through the load 2039-4C from the main battery 2039-2. In this case, since a distance between the main battery 2039-2 and the load 2039-4C is short, power can be supplied from the main battery 2039-2 to the load 2039-4C without causing a large voltage drop. At least some power required by the load 2039-4C or the like is supplied from the main battery 2039-2 side, and thus the current I which flows from the alternator 2039-1 toward the right through the backbone trunk line 2039-3 can be reduced. Consequently, it is possible to reduce a voltage drop occurring at each position on the backbone trunk line 2039-3, and thus to reduce a diameter of the backbone trunk line 2039-3.

Even in a case where power is supplied to a load requiring a large current from both of the alternator 2039-1 and the main battery 2039-2, it is possible to prevent concentration of the current on the same location on the backbone trunk line 2039-3 since a current from the alternator 2039-1 and a current from the main battery 2039-2 pass through different locations. As a result, the maximum rated value of a current flowing through each portion of the backbone trunk line 2039-3 is reduced, and thus it is possible to reduce a diameter of a bus bar or the like of a power source line of the backbone trunk line 2039-3.

<Technique Regarding Arrangement Form of a Plurality of Loads>

Figure 87:
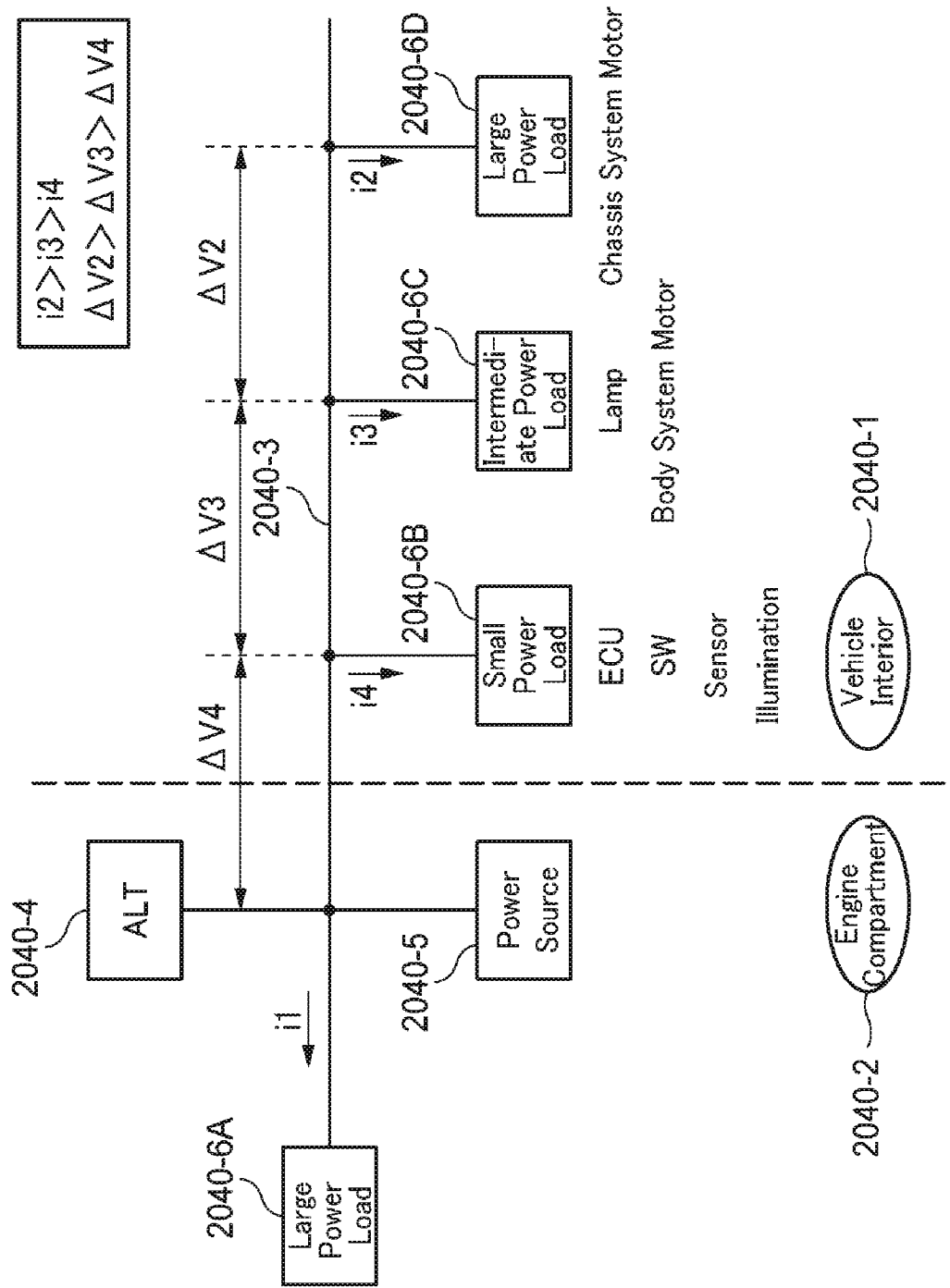
FIG. 87 is an electrical circuit diagram illustrating a configuration example of a power source system in an on-vehicle system.

FIG. 87 is an electrical circuit diagram illustrating a configuration example of a power source system in an on-vehicle system.

In the on-vehicle system illustrated in FIG. 87, a backbone trunk line 2040-3 is linearly routed from an engine compartment (engine room) region 2040-2 of a vehicle body to a vehicle interior region 2040-1. The backbone trunk line 2040-3 is connected to an alternator (ALT) 2040-4 which is a main power source, and a power source 2040-5 formed of a main battery.

Various kinds of loads 2040-6A, 2040-6B, 2040-6C and 2040-6D on a vehicle are connected to respective portions on the backbone trunk line 2040-3 via predetermined branch line sub-harnesses.

In this example, the load 2040-6A consumes large power. The load 2040-6B consumes small power, such as an ECU, a switch, a sensor, or an illumination. The load 2040-6C consumes intermediate power, such as a lamp, or an electric motor provided in a body system. The load 2040-6D consumes large power, such as an electric motor provided in a chassis system.

As illustrated in FIG. 87, in this configuration, the small-power load 2040-6B is connected to a position close to the power source 2040-5, and the large-power load 2040-6D is connected to a position far away from the power source 2040-5. Each load is connected on the basis of this positional relationship, and thus it is possible to reduce a voltage drop at an end of the backbone trunk line 2040-3.

In other words, as illustrated in FIG. 87, if currents flowing through the loads 2040-6A, 2040-6D, 2040-6C and 2040-6B are respectively indicated by i1, i2, i3 and i4, a relationship of "i2>i3>i4" is established. As illustrated in FIG. 87, if voltage drops on the backbone trunk line 2040-3 at respective sections of the loads 2040-6D, 2040-6C and 2040-6B, and the power source are respectively indicated by ΔV2, ΔV3 and ΔV4, a relationship of "ΔV2>ΔV3>ΔV4" is established.

<Technique Regarding Prevention of Illegal Apparatus Connection>

In a case where versatile connection ports for connection of various apparatuses, for example, connection ports based on a USB standard are present in the above-described control box CB or the like more than necessary, an illegal apparatus may be connected to an unoccupied port which is not used among the connection ports. For example, a third party may intrude into a vehicle when a user of the vehicle does not aware thereof, and connects an illegal apparatus to an unoccupied port.

Therefore, a function of preventing an intruder from connecting an illegal apparatus to an unoccupied port is provided. Specifically, an intrusion sensor is mounted on a vehicle, and an action is taken so that an illegally connected apparatus is not operated under the control of a microcomputer provided in the control box CB or the like when the intrusion is detected. In other words, the microcomputer performs control so that a power source and a communication line corresponding to an unoccupied port are automatically interrupted.

The microcomputer can identify whether a port is in use or is an unoccupied port, for example, by monitoring a conduction current for each port. Connection verification of each connection port is performed whenever an ignition switch of a vehicle is turned on, and thus it is possible to identify whether or not the port is in use.

<Technique Regarding Backup and Fuse of Power Source>

Figure 88:
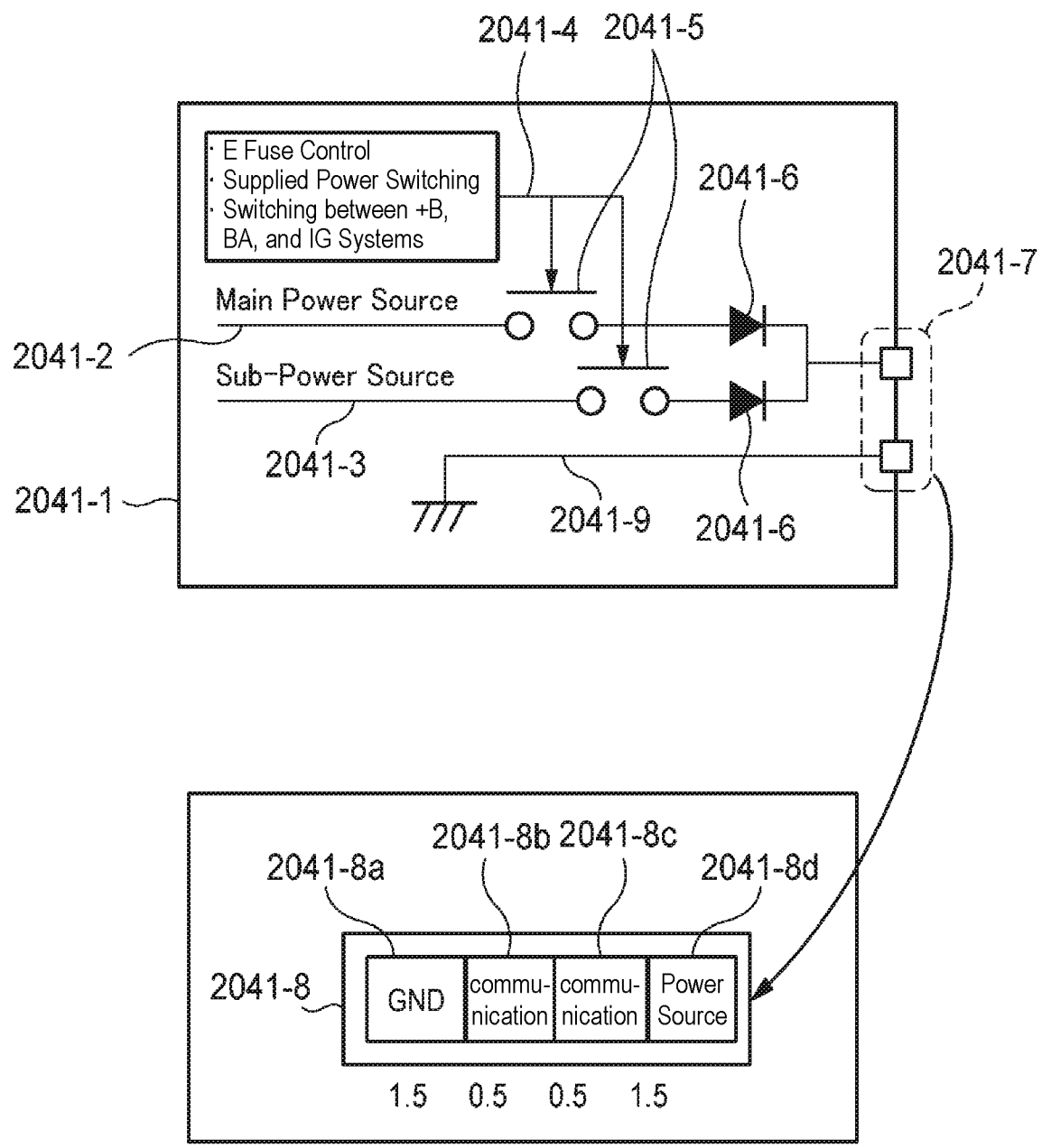
FIG. 88 is an electrical circuit diagram illustrating a configuration example of a backup power source circuit.

FIG. 88 is an electrical circuit diagram illustrating a configuration example of a backup power source circuit.

A backup power source circuit 2041-1 illustrated in FIG. 88 is provided in the control box CB, and may be used to supply power to most kinds of accessories. As illustrated in FIG. 88, the circuit is provided with a main power source line 2041-2, a sub-power source line 2041-3, two switching elements 2041-5, two diodes 2041-6, a power source output portion 2041-7, and an earth line 2041-9. The power source output portion 2041-7 is connected to a part of a connector 2041-8 of the control box CB provided for connection of a predetermined branch line sub-harness.

The connector 2041-8 is provided with four terminals 2041-8a, 2041-8b, 2041-8c and 2041-8d. The terminals 2041-8a and 2041-8d are respectively connected to an earth (GND) line and a power source line of the power source output portion 2041-7. The terminals 2041-8b and 2041-8c are connected to two communication lines. The respective sizes of the terminals 2041-8a, 2041-8b, 2041-8c and 2041-8d are assumed to be 1.5, 0.5, 0.5, and 1.5.

DC power from a main battery or the like of a vehicle is supplied to the main power source line 2041-2 of the backup power source circuit 2041-1 via a backbone trunk line. DC power from a predetermined sub-battery or the like is supplied to the sub-power source line 2041-3 via the backbone trunk line or the like. Power from a high-voltage battery pack used to drive a vehicle may be stepped down by a DC/DC converter so as to be supplied to at least one of the sub-power source line and the main power source line of the backbone trunk line as sub-power.

A control signal 2041-4 for controlling turning-on and turning-off of the two switching elements 2041-5 is supplied from a microcomputer (not illustrated) provided in the control box CB. The microcomputer appropriately controls the control signal 2041-4, and can thus realize functions shown in the following (1), (2) and (3).

(1) Electronic fuse function: The magnitude of a load current is monitored, and a conduction path is automatically disconnected in a case where conduction of an excessive current of a predetermined level or higher is detected. The conduction path is connected again in a case where returning of a normal state is detected.

(2) Automatic switching function between main power source and sub-power source: For example, power is supplied to a load side only from the main power source line 2041-2 side during normal times, and switching automatically occurs so that power is supplied to the load from the sub-power source line 2041-3 side in a case where a failure or the like of the main power source line 2041-2 is detected. In other words, the sub-power source line 2041-3 is used as a power supply path for backup. In a case where a load having relatively large power consumption is connected, power is supplied to the same load from both of the main power source line 2041-2 and the sub-power source line 2041-3. This makes it possible to compensate for the shortage of power capacity on the power source side.

(3) Switching function between power source types (+B, +BA, IG, and the like): The microcomputer automatically switches between the types of power which is supplied to the power source output portion 2041-7 from the backup power source circuit 2041-1. The types of power include "+B", "ACC", "IG", "+BA", "IGP", "IGR", and the like.

"+B" indicates power of a system to which power is normally supplied from a battery. "ACC" indicates power of a system to which power is supplied in conjunction with turning-on and turning-off of an accessory (ACC) switch of a vehicle. "IG" indicates power of a system to which power is supplied in conjunction with turning-on and turning-off of an ignition (IG) switch of a vehicle. "+BA" indicates power of a system which is turned on when a user comes close to a vehicle, and to which power is supplied. "IGP" indicates power of a system which is turned on when ignition switch is brought into an ON state, and then an engine is in a full state, and to which power is supplied. "IGR" indicates a system which indicates a system supplying necessary power during emergency, and to which power is supplied when wheels rotate.

The microcomputer performs a process so as to control turning-on and turning-off of each of the two switching elements 2041-5 depending on situations, and thus the various types of power can be supplied to a load side.

<Technique Regarding Power Source Circuit for Power Load>

Figure 89:
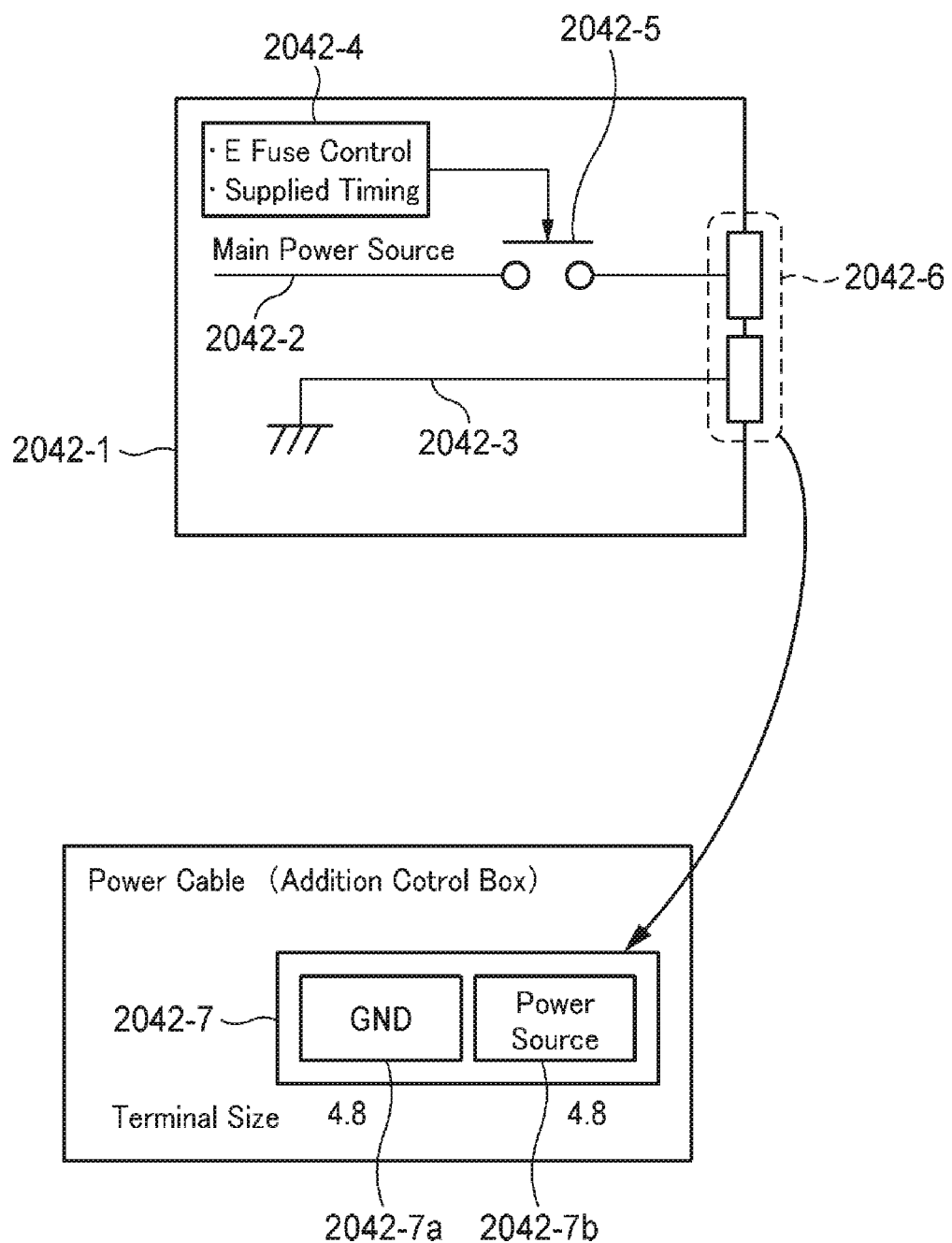
FIG. 89 is an electrical circuit diagram illustrating a configuration example of a power source circuit for power load.

FIG. 89 is an electrical circuit diagram illustrating a configuration example of a power source circuit for power load.

A power source circuit 2042-1 for power load illustrated in FIG. 89 is provided in each control box CB, and may be used to supply power to, for example, a load requiring particularly large source power. As illustrated in FIG. 89, the circuit is provided with a main power source line 2042-2, a switching element 2042-5, a power source output portion 2042-6, and an earth line 2042-3. The power source output portion 2042-6 is connected to a connector 2042-7 of the control box CB provided for connection of a predetermined branch line sub-harness.

The connector 2042-7 is provided with two terminals 2042-7a and 2042-7b. The terminals 2042-7a and 2042-7b are respectively connected to an earth (GND) line and a power source line of the power source output portion 2042-6. The respective sizes of the terminals 2042-7a and 2042-7b are all assumed to be 4.8. For example, a blower motor of the vehicle is connected to the connector 2042-7 via a predetermined power cable.

DC power from a main battery or the like of the vehicle is supplied to the main power source line 2042-2 of the power source circuit 2042-1 for power load via a backbone trunk line. The earth line 2042-3 is connected to an earth line of the backbone trunk line or a body ground of the vehicle.

A control signal 2042-4 for controlling turning-on and turning-off of the switching element 2042-5 is supplied from a microcomputer (not illustrated) provided in the control box CB. The microcomputer appropriately controls the control signal 2042-4, and can thus realize the above-described "electronic fuse function". A timing for supplying power to a load can be appropriately controlled. For example, a control timing may be determined by reflecting a power residual capacity of the main battery, or timing control for power saving may be performed.

<Technique for Coping with a Plurality of Communication Protocols>

FIG. 91 is a block diagram illustrating a configuration example of a control box which can switch between a plurality of communication protocols.

In a communication system on a vehicle, for example, a plurality of kinds of communication interfaces suitable for a standard such as Controller Area Network (CAN) or Clock Extensible Peripheral Interface (CXPI) may be used. If a standard employed by a communication interface of a communication partner differs, a communication specification or a communication protocol differs, and thus communication cannot be performed between each other. Therefore, a communication system is required to be configured so that communication interfaces based on the same standard are connected to each other.

Thus, not only the communication interface but also different components are required to be prepared for respective communication standards with respect to a connector or a connection cable, and this leads to an increase in the number of components or an increase in manufacturing cost.

Therefore, control boxes 2044-1 and 2044-2 illustrated in FIG. 91 enable common use of a component and automatic switching between protocols in order to cope with protocols based on standards of both of CAN and CXPI.

The control box 2044-1 illustrated in FIG. 91 has functions of four PHY circuits, two network switches (Switch), and a gateway (GW), controlled by a microcomputer. The gateway copes with communication protocols based on both of the CAN-FD standard and the CXPI standard.

A communication interface based on the CAN-FD standard and a communication interface based on the CXPI standard are built in the control box 2044-1, and four independent connectors are provided in a connection portion 2044-1a of the control box 2044-1. One control box 2044-1 further includes a wireless PHY circuit.

Each connector of the connection portion 2044-1a has a switching circuit 2044-4 built therein. A CAN connection portion 2044-4a of the switching circuit 2044-4 is connected to the communication interface based on the CAN-FD standard, and can handle a set of communication signals of "+side" and "−side" based on the CAN-FD standard. A CXPI connection portion 2044-4b of the switching circuit 2044-4 is connected to the communication interface based on the CXPI standard, and can handle a single communication signal based on the CXPI standard. Signal paths of the CAN connection portion 2044-4a and the CXPI connection portion 2044-4b of the switching circuit 2044-4 are connected to two terminals of a common connection portion 2044-4c via internal controllable switches. The switches are controlled by the internal gateway (GW).

Each of the control boxes 2044-1 and 2044-2 is provided with a common connector including four terminals including the two terminals of the common connection portion 2044-4c, a power source line and an earth line.

A modular cable 2044-5 illustrated in FIG. 91 includes four terminals for "GND", "CAN FD−", "CAN FD+", and "power source", and four electric wires in order to cope with a signal based on the CAN standard. A modular cable 2044-6 includes four terminals for "GND", "CXPI", "GND", and "power source", and four electric wires in order to cope with a signal based on the CXPI standard. In other words, the two modular cables 2044-5 and 2044-6 have the same number of terminals and the same number of electric wires, and can thus be used as a common component.

The modular cable 2044-5 or the modular cable 2044-6 having the common configuration is connected to the common connector of the control box 2044-1, and can thus cope with any communication based on the CAN-FD standard and the CXPI standard.

Actually, under the control of a microcomputer in the control box 2044-1, communication based on the CAN-FD standard is selected in an initial state, and automatic switching to communication based on the CXPI standard occurs in a case where a communication apparatus based on the CXPI standard is connected to a partner side. Specifically, when the communication apparatus of the partner side is connected via the modular cable 2044-5 or 2044-6, the microcomputer performs signal scanning so as to recognize a request from the partner. In a case where communication cannot be established by using a protocol based on the CAN standard, communication is tried to be established through switching to a protocol based on the CXPI standard. At this time, the microcomputer changes a switch of the switching circuit 2044-4 so as to switch signal paths in the switching circuit 2044-4, and can thus change a form of a signal flowing through each terminal of the connector to the CXPI form (single signal line) from the CAN form (two signal lines).

<Technique Regarding Arrangement of Control Box and ECU>

Figure 90:
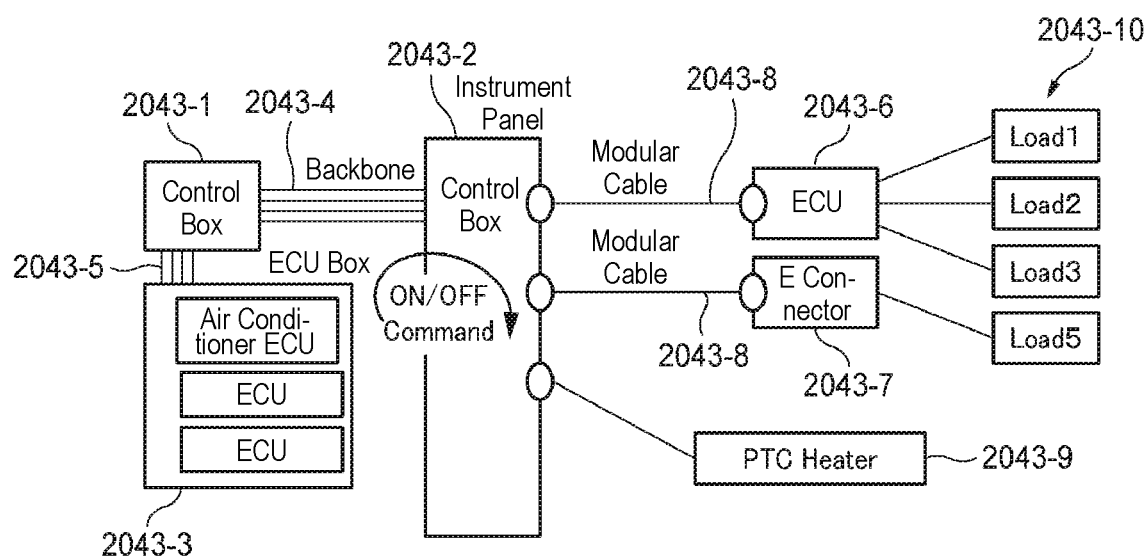
FIG. 90 is a block diagram illustrating a configuration example of an on-vehicle system.

FIG. 90 is a block diagram illustrating a configuration example of an on-vehicle system.

In the on-vehicle system illustrated in FIG. 90, two control boxes 2043-1 and 2043-2 are connected to each other via a backbone trunk line 2043-4. An ECU box 2043-3 is connected to the control box 2043-1 via a backbone trunk line 2043-5.

An electronic control unit (ECU) for controlling an air conditioner and a plurality of other ECUs are built in the ECU box 2043-3. The control box 2043-1 is provided in, for example, an instrument panel portion of a vehicle.

An ECU 2043-6 and a connector 2043-7 are connected to and under the control of the control box 2043-2 via two modular cables 2043-8 which are branch lines. A PTC heater 2043-9 is also connected to and under the control of the control box 2043-2 via another branch line. A plurality of loads 2043-10 are connected to output terminals of the ECU 2043-6. The connector 2043-7 has an electronic circuit built therein, and has a function of communicating with the control box 2043-2 and a function of controlling conduction of a load.

In the on-vehicle system illustrated in FIG. 90, in a case where an air conditioner as the load 2043-10 is connected to and under the control of the control box 2043-2, a microcomputer in the control box 2043-2 may perform control of the air conditioner instead of an ECU for controlling the air conditioner in the ECU box 2043-3. In this case, the ECU for controlling the air conditioner in the ECU box 2043-3 may be omitted.

On the other hand, in the on-vehicle system illustrated in FIG. 82, the control box 2035-2A is connected to the ECU box 2035-3 via the communication line 2035-6 based on the Ethernet (registered trademark) standard. For example, ten ECUs which are independent from each other can be built in the ECU box 2035-3. Therefore, a plurality of ECUs can be disposed at a single location in a concentration manner. Various loads may be connected to and under the control of each ECU in the ECU box 2035-3.

The ECU box 2035-3 is provided with a communication interface based on the CAN-FD standard, a gateway (GW), and a PHY circuit. Therefore, each ECU in the ECU box 2035-3 can communicate with various apparatuses on the vehicle via the control boxes 2035-2A to 2035-2E. Each ECU built in the ECU box 2035-3 is attachable and detachable, and may be replaced as necessary. It is also possible to change the mounting position of each ECU.

<Technique Regarding Duplication of Communication System>

Figure 93A:
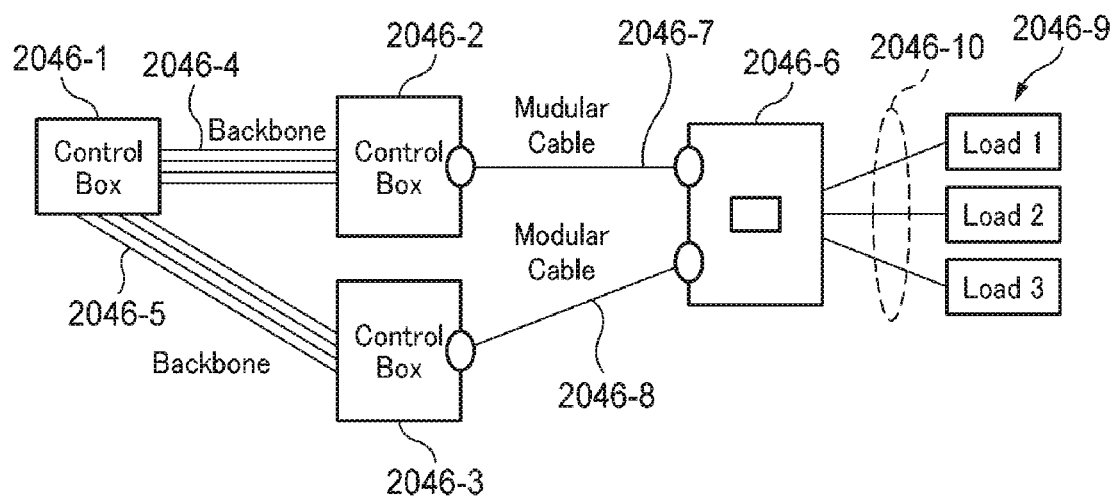
FIGS. 93A and 93B are block diagrams illustrating a configuration example of an on-vehicle system.
Figure 93B:
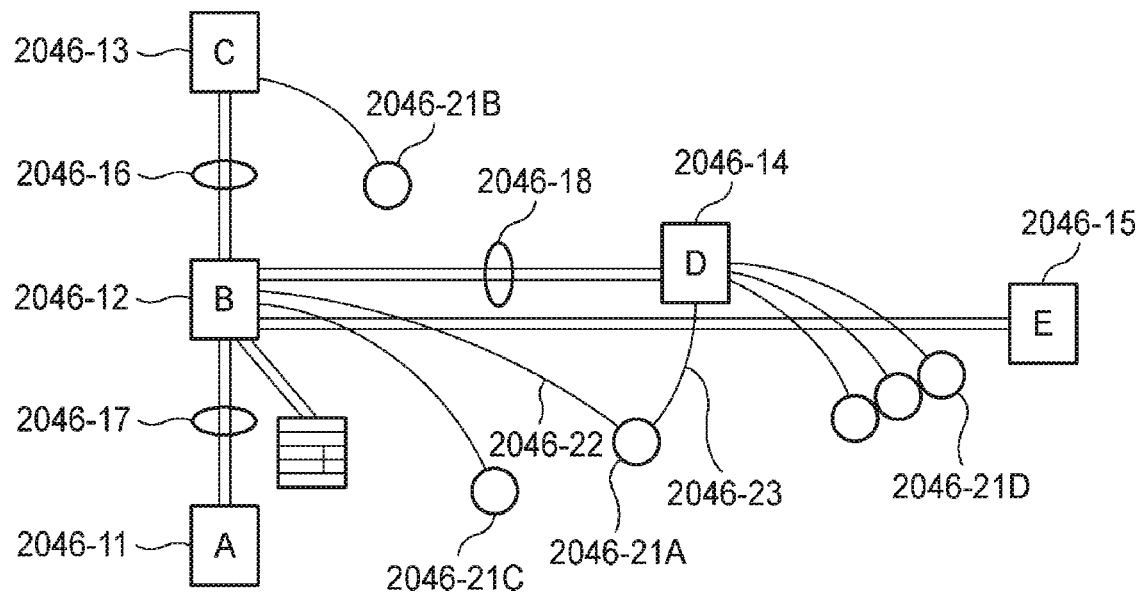

FIGS. 93(*a*) and 93(*b*) are block diagrams illustrating a configuration example of an on-vehicle system.

In a case where a failure occurs, or a communication line is disconnected due to vehicle crash, communication cannot be performed between apparatuses. However, for example, in a case where a technique such as automatic driving is installed in a vehicle, high reliability is required in a communication system, and thus consideration is required for a communication path not to be disconnected.

Therefore, in the on-vehicle system illustrated in FIGS. 93(*a*) and 93(*b*), a power supply path and a communication path are configured to be duplicated for at least a location having high importance in order to increase reliability.

In a configuration illustrated in FIG. 93(*a*), a control box 2046-1 and a control box 2046-2 are connected to each other via a backbone trunk line 2046-4, and the control box 2046-1 and a control box 2046-3 are connected to each other via a backbone trunk line 2046-5. Although not illustrated in FIG. 93, each of the backbone trunk lines 2046-4 and 2046-5 includes a power source line, an earth line, and a communication line, and each of the power source line and the communication line has line paths of two systems which are independent from each other.

A control unit 2046-6 is connected to and under the control of the control box 2046-2 via a module cable 2046-7 which is a branch line. The control unit 2046-6 is connected to and under the control of the control box 2046-3 via a module cable 2046-8 which is a branch line. A plurality of loads 2046-9 are connected to and under the control of the control unit 2046-6 via a branch line sub-harness 2046-10.

Each of the module cables 2046-7 and 2046-8 includes power source lines of two systems, an earth line, and communication lines of two systems. The earth line may be formed of two systems.

For example, a communication path and a power supply path in a case where an instruction is given to the control unit 2046-6 from the control box 2046-1 via the backbone trunk line 2046-4, the control box 2046-2, and the module cable 2046-7 are duplicated. A communication path and a power supply path in a case where an instruction is given to the control unit 2046-6 from the control box 2046-1 via the backbone trunk line 2046-5, the control box 2046-3, and the module cable 2046-8 are duplicated.

Thus, for example, even in a case where a communication line of one system in one of the backbone trunk lines 2046-4 and 2046-5 or one of the module cables 2046-7 and 2046-8 is disconnected, a communication path can be secured by using a communication line of the other system which is not disconnected.

For example, even in a case where communication lines of two systems in the backbone trunk line 2046-4 or the module cable 2046-7 are simultaneously disconnected, switching to the communication path passing through the backbone trunk line 2046-5, the control box 2046-3, and the module cable 2046-8 from the control box 2046-1 occurs, and thus a communication path required to control the control unit 2046-6 can be secured.

On the other hand, in the on-vehicle system illustrated in FIG. 93(*b*), a central control box 2046-12 is connected to a plurality of control boxes 2046-11, 2046-13, 2046-14 and 2046-15 via independent backbone trunk lines 2046-17, 2046-16 and 2046-18. A control unit or a load is connected to and under the control of each control box via a branch line.

For example, a control unit 2046-21A is connected to the central control box 2046-12 via the branch line 2046-22, and the control unit 2046-21A is connected to the control box 2046-14 via a branch line 2046-23.

Therefore, in a case where the control box 2046-12 gives an instruction to the to control unit 2046-21A, either one of a communication path passing through the branch line 2046-22 and a communication path passing through the backbone trunk line 2046-18, the control box 2046-14, and the branch line 2046-23 may be used. In other words, even if one of the plurality of paths is disconnected, a necessary communication path can be secured by using remaining normal communication lines.

<Technique Regarding Connection Form of Modularized Apparatus>

Figure 94:
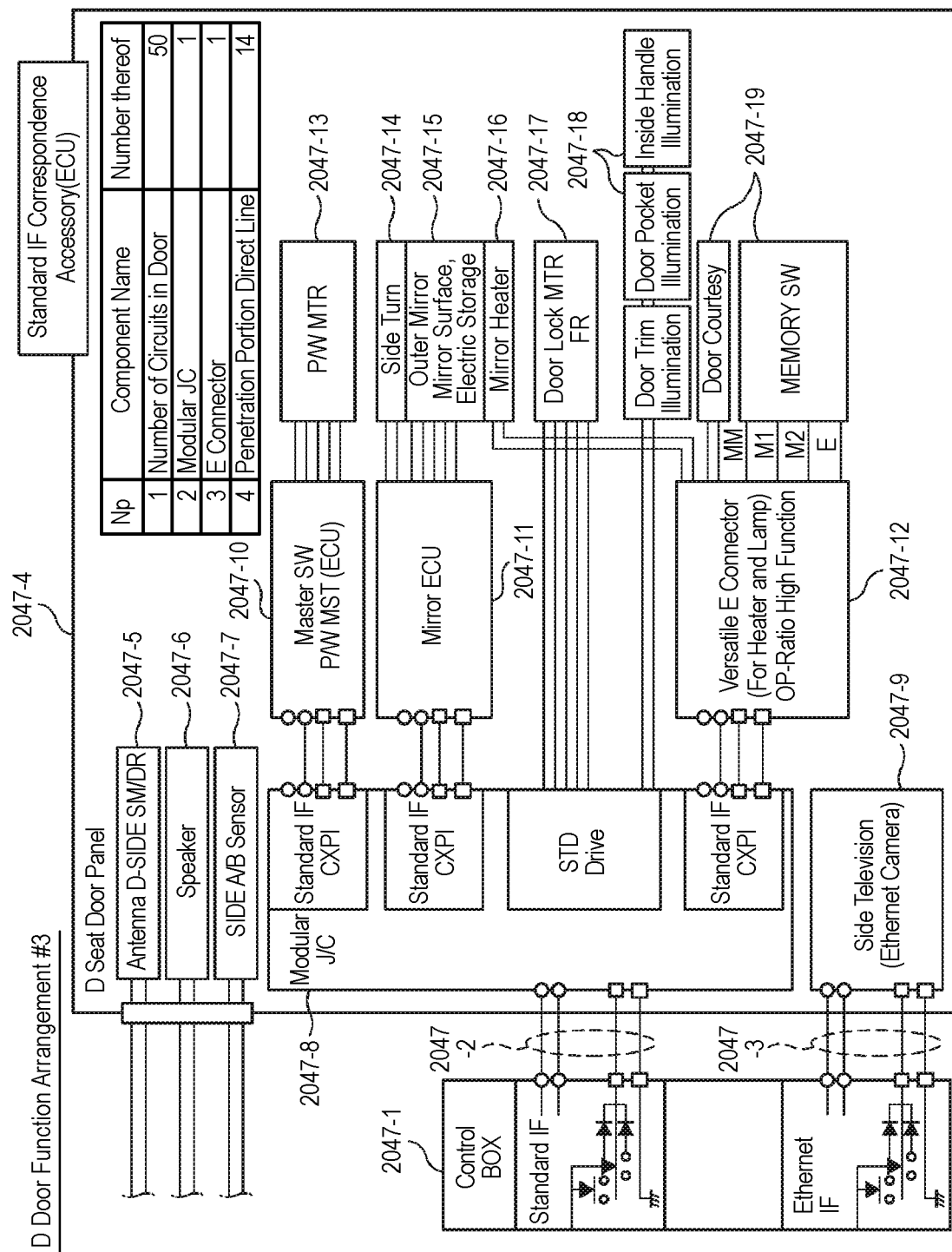
FIG. 94 is a block diagram illustrating a configuration example of a circuit module provided in a driver seat door panel.

FIG. 94 is a block diagram illustrating a configuration example of a circuit module provided in a driver seat door panel.

A circuit module 2047-4 illustrated in FIG. 94 is disposed in a driver seat door panel, and is connected to a control box 2047-1 provided on a vehicle body side via branch line sub-harnesses 2047-2 and 2047-3. The branch line sub-harnesses 2047-2 and 2047-3 are routed so as to penetrate through a partition wall at a location where the vehicle body is connected to the driver seat door.

A communication line of the branch line sub-harness 2047-2 is connected to a standard communication interface (CXPI or the like), and a communication line of the branch line sub-harness 2047-3 is connected to a communication interface based on Ethernet (registered trademark).

The circuit module 2047-4 is provided with not only a modular connection connector 2047-8 but also a plurality of electronic control units (ECUs) 2047-10 and 2047-11 and a side television 2047-9 as accessories having standard interfaces. An antenna 2047-5, a speaker 2047-6, a sensor 2047-7, a versatile communication connector 2047-12, and the like are also provided.

The modular connection connector 2047-8 has three standard communication interfaces based on the CXPI standard and a standard (STD) drive circuit built therein. Each standard communication interface in the modular connection connector 2047-8 has a function of allowing a received signal to just pass therethrough and sending the signal to an output side.

The electronic control units 2047-10 and 2047-11 and the versatile communication connector 2047-12 are respectively connected to the standard communication interfaces of the modular connection connector 2047-8. The versatile communication connector 2047-12 has an electronic circuit built therein, and can perform communication, control on a load, and inputting of a signal by using the electronic circuit. Output terminals of the standard drive circuit of the modular connection connector 2047-8 are connected to a door lock motor 2047-17, and various illumination apparatuses 2047-18 in the door.

The electronic control unit 2047-10 includes a microcomputer performing a process required to control a power window, and an output terminal thereof is connected to an electric motor (P/W MTR) of the power window.

The electronic control unit 2047-11 includes a microcomputer having a function of controlling an outer mirror provided in the door. Output terminals of the electronic control unit 2047-11 are connected to constituent elements 2047-14 and 2047-15 of the mirror. Output terminals of the versatile communication connector 2047-12 are connected to a mirror heater 2047-16, and a memory switch 2047-19 and the like.

Figure 95:
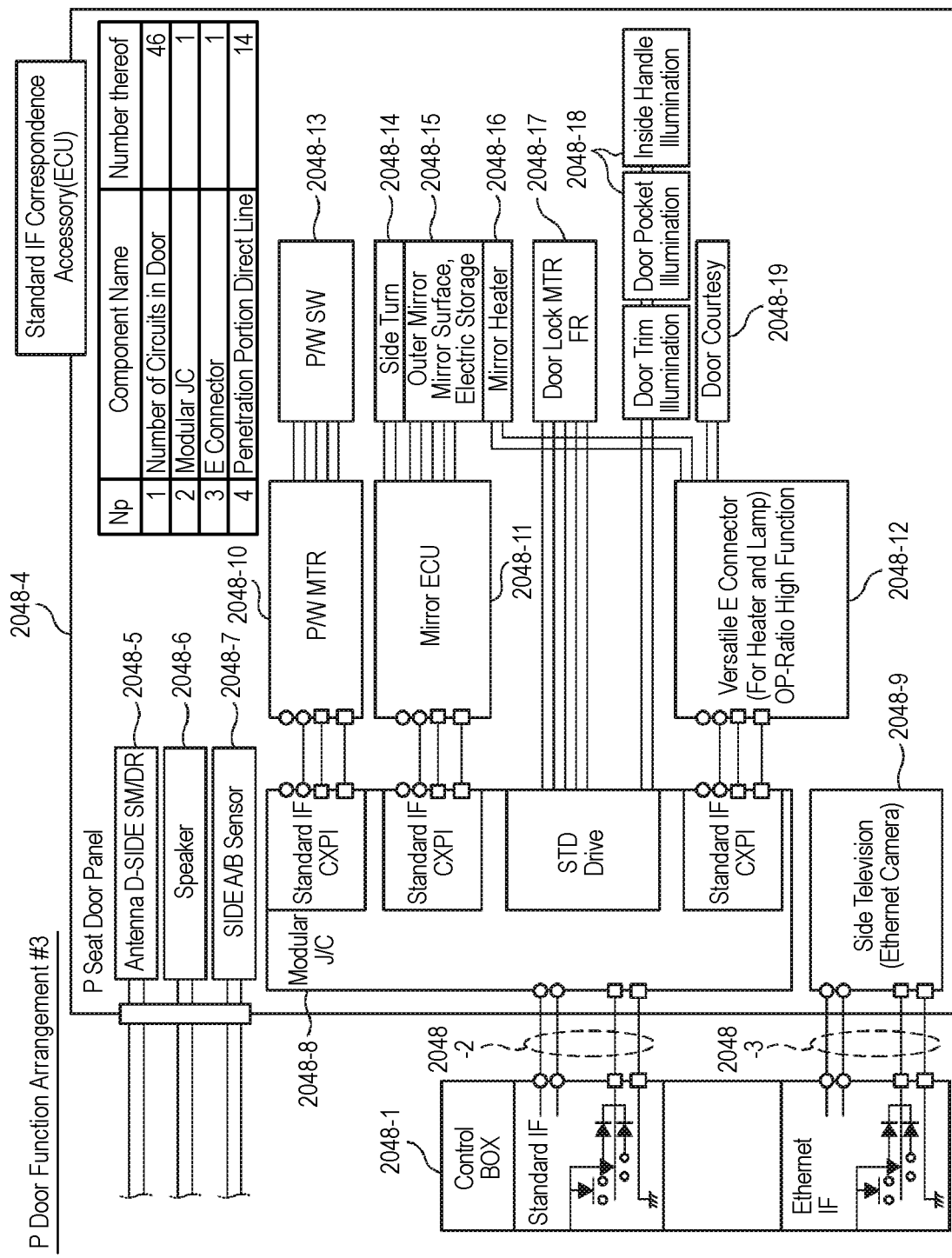
FIG. 95 is a block diagram illustrating a configuration example of a circuit module provided in a passenger seat door panel.

FIG. 95 is a block diagram illustrating a configuration example of a circuit module provided in a passenger seat door panel.

A circuit module 2048-4 illustrated in FIG. 95 is disposed in a passenger seat door panel, and is connected to a control box 2048-1 provided on a vehicle body side via branch line sub-harnesses 2048-2 and 2048-3. The branch line sub-harnesses 2048-2 and 2048-3 are routed so as to penetrate through a partition wall at a location where the vehicle body is connected to the passenger seat door.

A communication line of the branch line sub-harness 2048-2 is connected to a standard communication interface (CXPI or the like), and a communication line of the branch line sub-harness 2048-3 is connected to a communication interface based on Ethernet (registered trademark).

The circuit module 2048-4 is provided with not only a modular connection connector 2048-8 but also a plurality of electronic control units (ECUs) 2048-10 and 2048-11 and a side television 2048-9 as accessories having standard interfaces. An antenna 2048-5, a speaker 2048-6, a sensor 2048-7, a versatile communication connector 2048-12, and the like are also provided.

The modular connection connector 2048-8 has three standard communication interfaces based on the CXPI standard and a standard (STD) drive circuit built therein. The electronic control units 2048-10 and 2048-11 and the versatile communication connector 2048-12 are respectively connected to the standard communication interfaces of the modular connection connector 2048-8. The versatile communication connector 2048-12 has an electronic circuit built therein, and can perform communication, control on a load, and inputting of a signal by using the electronic circuit. Output terminals of the standard drive circuit of the modular connection connector 2048-8 are connected to a door lock motor 2048-17, and various illumination apparatuses 2048-18 in the door.

The electronic control unit 2048-10 includes a microcomputer performing a process required to control a power window, and an output terminal thereof is connected to an electric motor (P/W MTR) of the power window.

The electronic control unit 2048-11 includes a microcomputer having a function of controlling an outer mirror provided in the door. Output terminals of the electronic control unit 2048-11 are connected to constituent elements 2048-14 and 2048-15 of the mirror. Output terminals of the versatile communication connector 2048-12 are connected to a mirror heater 2048-16, and a lamp 2048-19.

Figure 96:
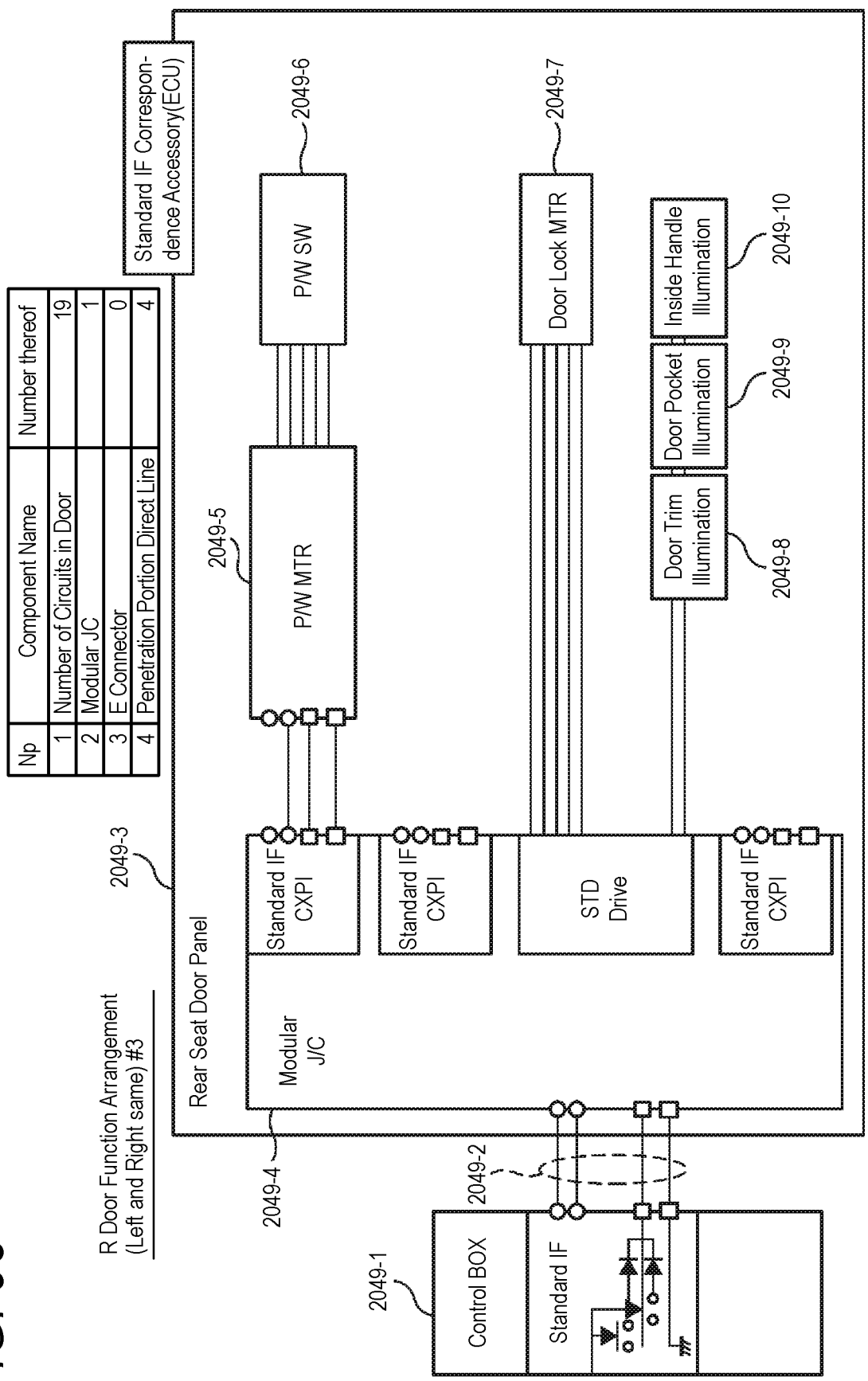
FIG. 96 is a block diagram illustrating a configuration example of a circuit module provided in a rear seat door panel.

FIG. 96 is a block diagram illustrating a configuration example of a circuit module provided in a rear seat door panel. The left and right rear seat door panels have the same configuration.

A circuit module 2049-3 illustrated in FIG. 96 is disposed in a rear seat door panel (each of the left and right door panels), and is connected to a control box 2049-1 provided on a vehicle body side via a branch line sub-harness 2049-2. The branch line sub-harness 2049-2 is routed so as to penetrate through a partition wall at a location where the vehicle body is connected to the rear seat door. A communication line of the branch line sub-harness 2049-2 is connected to a standard communication interface (CXPI or the like).

The circuit module 2049-3 is provided with not only a modular connection connector 2049-4 but also an electronic control unit (ECU) 2049-5 and the like as accessories having standard interfaces. The modular connection connector 2049-4 has three standard communication interfaces based on the CXPI standard and a standard (STD) drive circuit built therein. The electronic control unit 2049-5 is connected to the standard communication interfaces of the modular connection connector 2049-4.

Output terminals of the standard drive circuit of the modular connection connector 2049-4 are connected to a door lock motor 2049-7, and various illumination apparatuses 2049-8, 2049-9 and 2049-10 in the door.

The electronic control unit 2049-5 includes a microcomputer performing a process required to control a power window, and an output terminal thereof is connected to an electric motor (P/W MTR) 2049-6 of the power window.

Figure 97:
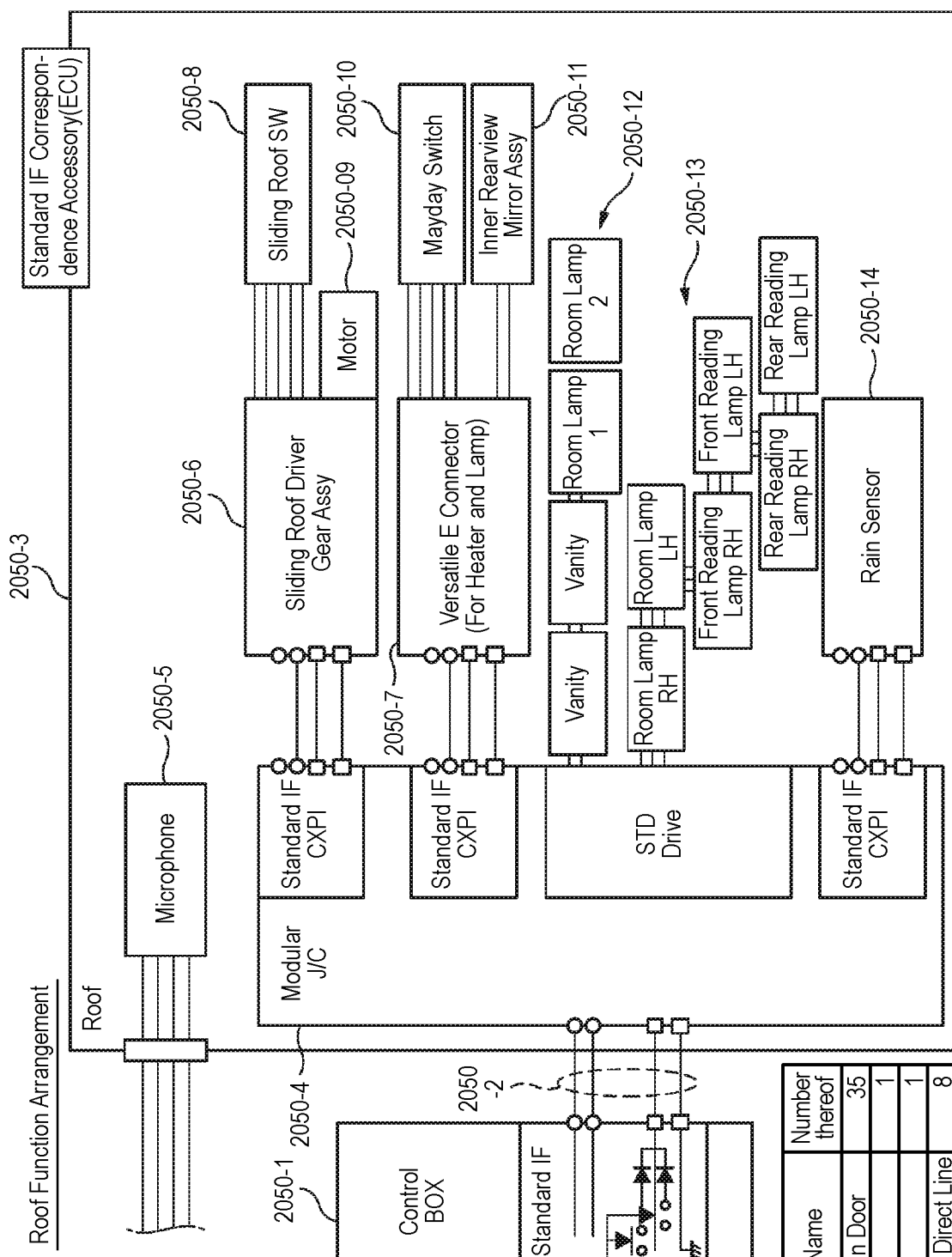
FIG. 97 is a block diagram illustrating a configuration example of a circuit module provided in a vehicle's roof.

FIG. 97 is a block diagram illustrating a configuration example of a circuit module provided in a vehicle's roof.

A circuit module 2050-3 illustrated in FIG. 97 is disposed in a roof portion of a vehicle body, and is connected to a control box 2050-1 provided on a vehicle interior side via a branch line sub-harness 2050-2. The branch line sub-harness 2050-2 is routed so as to penetrate through a partition wall at a location where the vehicle body is connected to the roof. A communication line of the branch line sub-harness 2050-2 is connected to a standard communication interface (CXPI or the like).

The circuit module 2050-3 is provided with not only a modular connection connector 2050-4 but also an electronic control unit (ECU) 2050-6, a rain sensor 2050-14 and the like as accessories having standard interfaces. A microphone 2050-5, a versatile communication connector 2050-7, and the like are also provided.

The modular connection connector 2050-4 has three standard communication interfaces based on the CXPI standard and a standard (STD) drive circuit built therein. Each standard communication interface in the modular connection connector 2050-4 has a function of allowing a received signal to just pass therethrough and sending the signal to an output side.

The electronic control unit 2050-6, the rain sensor 2050-14, and the versatile communication connector 2050-7 are respectively connected to the standard communication interfaces of the modular connection connector 2050-4. The versatile communication connector 2050-7 has an electronic circuit built therein, and can perform communication, control on a load, and inputting of a signal by using the electronic circuit. Output terminals of the standard drive circuit of the modular connection connector 2050-4 are connected to various lamp loads 2050-12 and 2050-13.

The electronic control unit 2050-6 includes a microcomputer performing a process required for drive control such as closing and opening of a sliding roof, and output terminals thereof are connected to a sliding roof switch 2050-8 and a drive electric motor 2050-9. Output terminals of the versatile communication connector 2050-7 are connected to a Mayday switch 2050-10 and an inner rearview mirror 2050-11.

Figure 98:
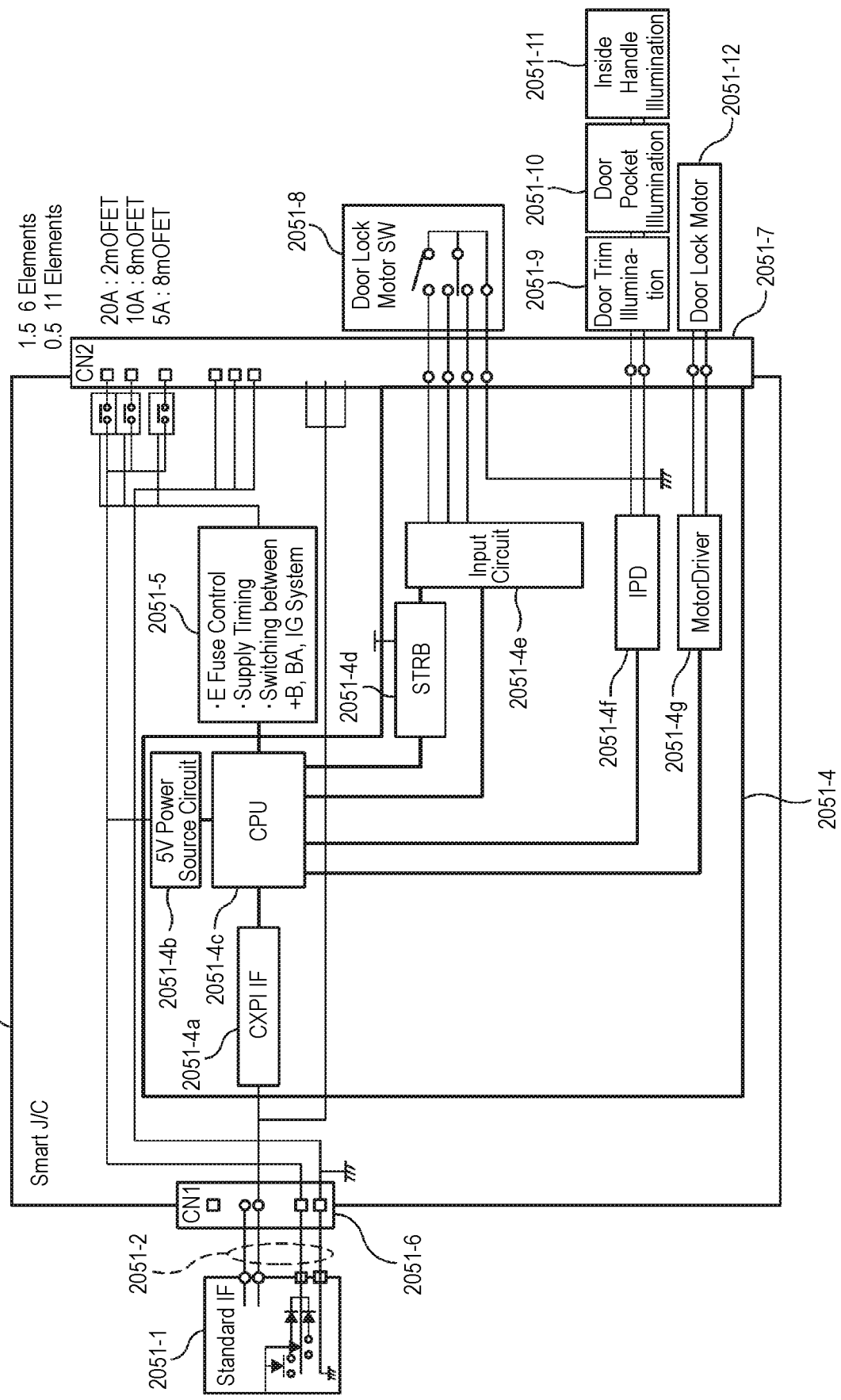
FIG. 98 is a block diagram illustrating a configuration example of a smart connection connector.

FIG. 98 is a block diagram illustrating a configuration example of a smart connection connector.

A smart connection connector 2051-3 illustrated in FIG. 98 is an element providing a joint function which can be used at various locations on a vehicle in a versatile manner, and may be connected to a desired control box via a branch line sub-harness 2051-2 and a standard interface 2051-1.

As illustrated in FIG. 98, an output side connector 2051-7 of the smart connection connector 2051-3 may be connected to a door lock motor switch 2051-8, various illumination apparatuses 2051-9, 2051-10 and 2051-11, a door lock motor 2051-12, and the like.

A control circuit 2051-4 is provided in the smart connection connector 2051-3. The control circuit 2051-4 includes a standard communication interface 2051-4a, a power source circuit 2051-4b, a microcomputer (CPU) 2051-4c, a signal processing circuit (STRB) 2051-4d, an input circuit 2051-4e, an intelligent power device (IPD) 2051-4f, and a motor driver 2051-4g.

The output side connector 2051-7 of the smart connection connector 2051-3 is provided with terminals for outputting various types of source power, a communication terminal, a terminal for a signal to be input to the input circuit 2051-4e, a terminal for connection of a load driven by the IPD 2051-4f, and a terminal for connection of an electric motor.

Source power output from the output side connector 2051-7 is used to operate an electronic fuse or to switch between the types of power (+B, +BA, IG, and the like) through processing in the microcomputer 2051-4c. In order to perform this control, switching elements are connected between respective terminals of the output side connector 2051-7 and an input side power source line. Turning-on and turning-off of the switching elements are controlled by the microcomputer 2051-4c.

<Technique for Adding Function by Adding New Unit>

In the present embodiment, control of a system side is assumed in a case where a function is added by connecting a new unit to a common interface of an on-vehicle system. For example, in the system illustrated in FIG. 49, a case is assumed in which a new accessory AE is connected to the connector of the connection portion Cnx of each control box CB via the branch line sub-harness LS. However, the newly connected unit cannot be said to be a legal unit, and thus it is necessary to perform special control in order to ensure the security of the entire system.

Although not illustrated, specific examples of procedures performed in this case are as follows.

Step S50: In a dealer or the like of a vehicle, a worker or the like connects a corresponding new unit (accessory) to the connection portion Cnx of the control box CB via the branch line sub-harness LS.

Step S51: In the dealer or the like of the vehicle, the worker or the like connects a diagnosis tool (for example, "TaSCAN") dedicated to a vehicle, provided by a vehicle manufacturer or the like to a system on the vehicle, and executes a command for scanning in order to diagnose the connected unit.

Step S52: The microcomputer of the control box CB starts a scanning process in response to the command from the diagnosis tool. First, power is supplied to a first standard interface which is initially connected to the connection portion Cnx, and the microcomputer automatically identifies whether or not the CAN standard communication can be performed with respect to communication using the standard interface.

Step S53: In a case where the CAN standard communication is not established in step S52, the microcomputer switches a communication specification to CXPI from CAN, and identifies whether or not the CXPI standard communication can be performed.

Step S54: In a case where neither of the CAN standard communication and the CXPI standard communication is established in steps S52 and S53, the microcomputer stops the supply of power to the standard interface.

Step S55: In a case where the CAN or CXPI standard communication is established in steps S52 and S53, communication is performed among the diagnosis tool, the microcomputer of the control box CB, and the accessory (the new unit or the like) which is a connection destination, and the diagnosis tool performs a predetermined process so as to perform an authentication process on the accessory. The content of the authentication process is standardized in advance.

Step S56: In a case where the authentication is successful in step S55, the microcomputer of the control box CB registers conditions of supplying source power to the accessory based on the standard interface in a storage device of the microcomputer. For example, it is automatically identified that the kind of power to be supplied is any one of "+B, +BA, IG, and IGP" on the basis of the kind of the accessory proved through the authentication, or ID information, and the identification result is registered.

Step S57: The processes in steps S52 to S56 are sequentially performed on second and subsequent standard interfaces repeatedly.

Step S58: After the scanning process on all of the standard interfaces is completed, the diagnosis tool or the microcomputer of the control box CB displays a message or the like so that a user (or a worker) can confirm addition of a function with respect to the added new unit. This display is performed by using, for example, a display portion of the meter unit on the vehicle.

Step S59: The microcomputer of the control box CB stores, in the storage device thereof, information for transfer to the function confirmed by the user in step S58 to an environment in which the function can be actually used.

Therefore, for example, even if an illegal apparatus which is not allowed by a vehicle manufacturer or the like is tried to be connected to the on-vehicle system by a user or a third party, the illegal apparatus cannot perform communication with the legal on-vehicle system, and cannot be supplied with power via a communication connector either, and thus the illegal apparatus cannot operate at all.

<Technique Regarding Connection Form of Communication System in On-Vehicle System>

Figure 99A:
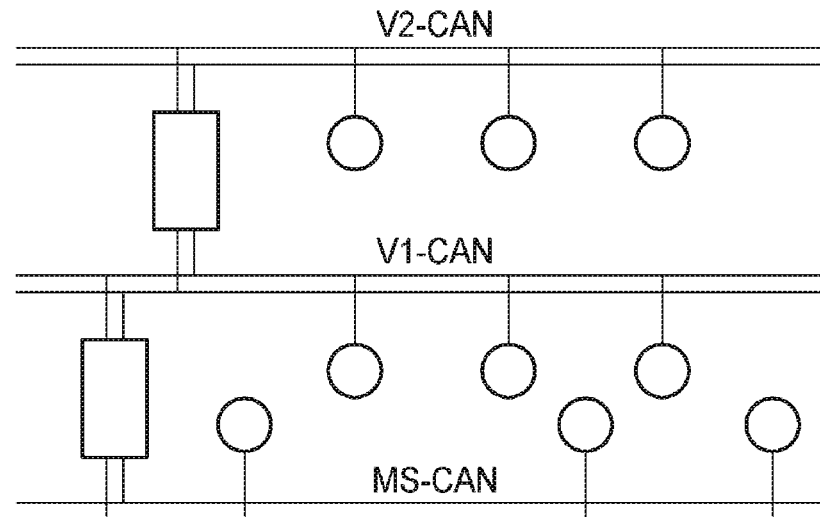
FIGS. 99A and 99B are block diagrams respectively illustrating configuration examples of communication systems in different on-vehicle systems.
Figure 99B:
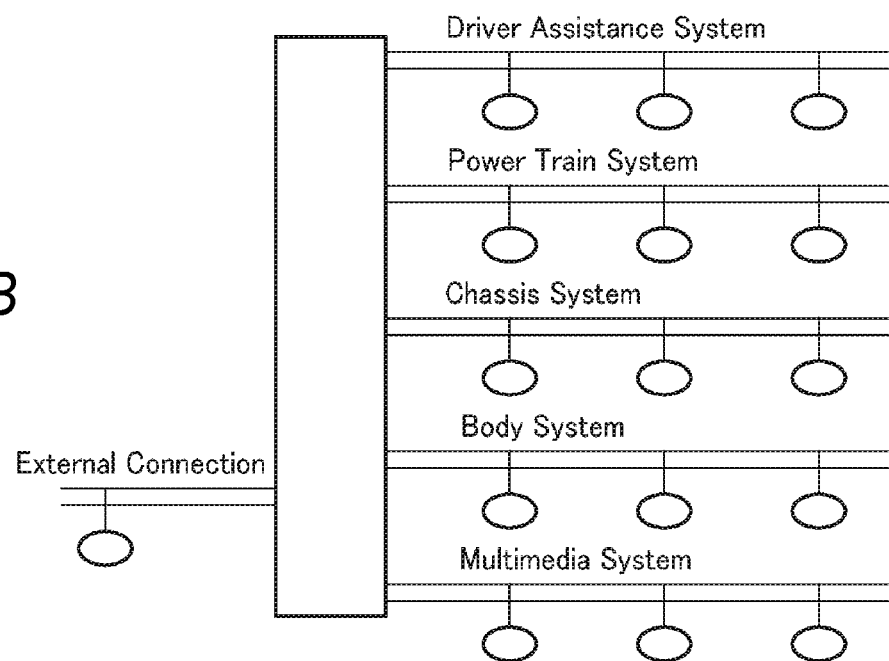
Figure 100:
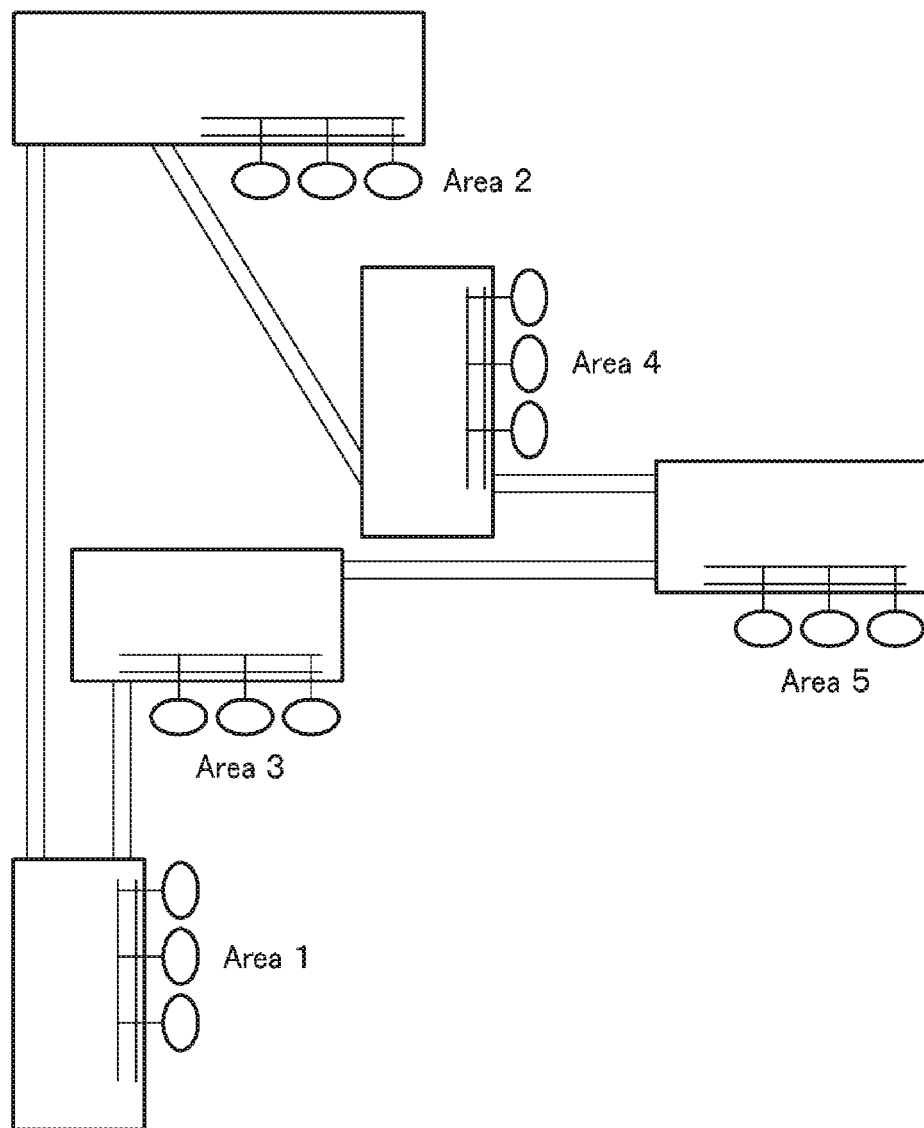
FIG. 100 is a block diagram illustrating a configuration example of a communication system in an on-vehicle system.

FIGS. 99(a) and 99(b) and FIG. 100 are block diagrams respectively illustrating configuration examples of communication systems in different on-vehicle systems.

An on-vehicle system illustrated in FIG. 99(a) includes communication networks V2-CAN, V1-CAN, and MS-CAN of three systems, which are connected to each other to via a gateway. The communication network V2-CAN is allocated to apparatuses of an engine compartment (engine room), the communication network V1-CAN is allocated to apparatuses (including a meter unit) of an engine system, and the communication network MS-CAN is allocated to apparatuses (doors, power seats, and the like) of a body system.

The communication network MS-CAN is disposed in the entire vehicle as a domain, and each of the communication networks V1-CAN and V2-CAN is divided for area on a vehicle body. Various accessories are connected to and under the control of each of the communication networks MS-CAN, V1-CAN and V2-CAN.

In an on-vehicle system illustrated in FIG. 99(b), a plurality of communication networks respectively in charge of a plurality of domains which are respectively allocated to a driving assistance system, a power train system, a chassis system, a body system, and a multimedia system are connected to each other. Each communication network employs a communication interface based on the CAN standard. These sets of communication networks are routed to extend in parallel to each other in the entire region of the vehicle.

In an on-vehicle system illustrated in FIG. 100, a domain is divided for each area such as an "area 1", an "area 2", an "area 3", an "area 4", and an "area 5", and a communication network is formed in each area. An optical communication network is used for a trunk line connecting the respective areas to each other in order to enable high-speed communication.

By using the optical communication network, high-speed communication of, for example, about 1 Gbps can be performed between the areas. A communication capacity of the optical communication network is distributed to a plurality of systems in the communication network of each area, so as to be allocated to communication of various accessories. The priority of communication is determined on the basis of specific ID information allocated to each of apparatuses such as accessories in advance.

<Technique Regarding Internal Configuration of Control Box>

Figure 92:
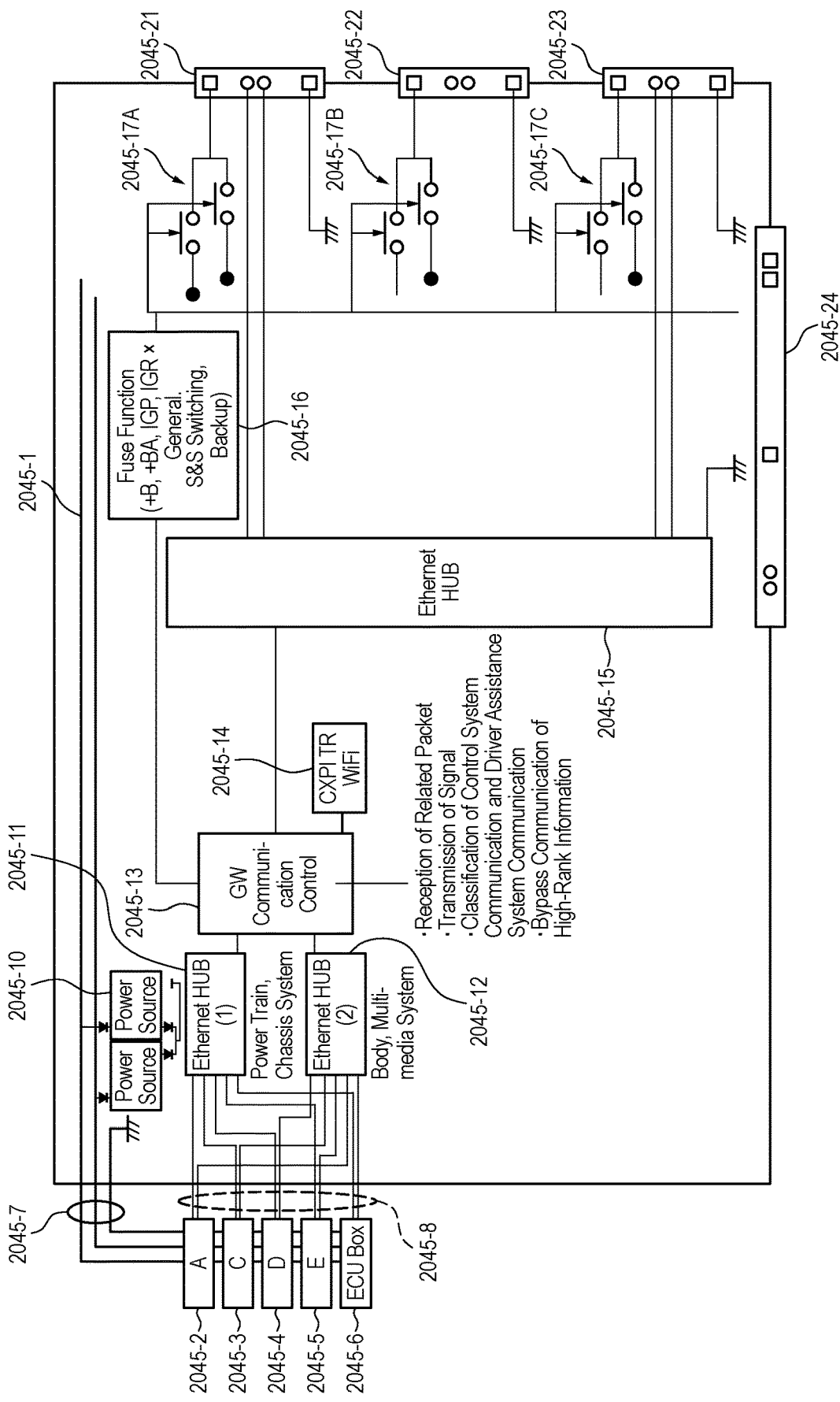
FIG. 92 is a block diagram illustrating a configuration example of a control box.

FIG. 92 is a block diagram illustrating a configuration example of a control box.

An on-vehicle system illustrated in FIG. 92 includes five control boxes 2045-1, 2045-2, 2045-3, 2045-4 and 2045-5 connected to each other via backbone trunk lines 2045-7 and 2045-8, and an ECU box 2045-6.

As illustrated in FIG. 92, the backbone trunk line 2045-7 includes power source lines of two systems and an earth line. The backbone trunk line 2045-8 includes communication lines of two systems.

The control box 2045-1 is provided with power source portions 2045-10 of two systems, two sets of network (Ethernet: registered trademark) hubs 2045-11 and 2045-12, a communication control unit 2045-13 of a gateway (GW), a WiFi communication module 2045-14, a network (Ethernet: registered trademark) hub 2045-15, a power control unit 2045-16, switching circuits 2045-17A, 2045-17B and 2045-17C, and connectors 2045-21, 2045-22, 2045-23 and 2045-24.

Of the communication lines of two systems included in the backbone trunk line 2045-8, one communication line is connected to the network hub 2045-11, and the other communication line is connected to the network hub 2045-12. The communication system of the network hub 2045-11 side is allocated for use in a power train system and a chassis system of a vehicle, and the communication system of the network hub 2045-12 side is allocated for use in a body system and a multimedia system of the vehicle.

The communication control unit 2045-13 of the gateway (GW) is a functional unit realized under the control of a microcomputer (not illustrated) provided in the control box 2045-1, and has the following functions.

(1) Interconnection between a plurality of networks based on different standards such as protocols
(2) Reception of related packet
(3) Transmission of signal
(4) Classification of communication of a control system and communication of a driving assistance system
(5) Bypass communication of high-rank information The WiFi communication module 2045-14 is used for wirelessly connecting the control box 2045-1 to other apparatuses mounted on the vehicle or an apparatus carried by a user.

The network hub 2045-15 has a function of dividing one communication path from the communication control unit 2045-13 for connection to any one of communication paths of the connectors 2045-21, 2045-22 and 2045-23.

The power control unit 2045-16 is a functional portion realized under the control of the microcomputer (not illustrated) provided in the control box 2045-1, and has source power control functions as described below.

(1) Electronic fuse function of blocking path when overcurrent flows;
(2) Function of controlling the kinds of power such as "+B, +BA, IGP, and IGR";
(3) Function of backing up power source of an important system by properly using power source lines of two systems when abnormality occurs in power source; and
(4) Stop & start (S & S) switching function.

Each of the switching circuits 2045-17A, 2045-17B and 2045-17C includes two controllable switching elements for respectively connecting the power source lines of two systems to power source lines of the connectors 2045-21, 2045-22 and 2045-23. The switching elements are separately controlled to be turned on and off according to control signals output from the microcomputer which realizes each function of the power control unit 2045-16.

Each of the connectors 2045-21, 2045-22 and 2045-23 includes four terminals such as a power source line terminal, an earth line terminal, and two communication line terminals. Various kinds of accessories can be connected to and under the control of the connectors 2045-21, 2045-22 and 2045-23 via predetermined branch line sub-harnesses.

As mentioned above, according to the vehicular circuit body of the present invention, it is possible to easily add a new electric wire by simplifying a structure for electrical connection between various electric components and a power source on a vehicle and between the electric components, particularly, a configuration of a trunk line portion.

<Configuration Example of Control Box>

Figure 105:
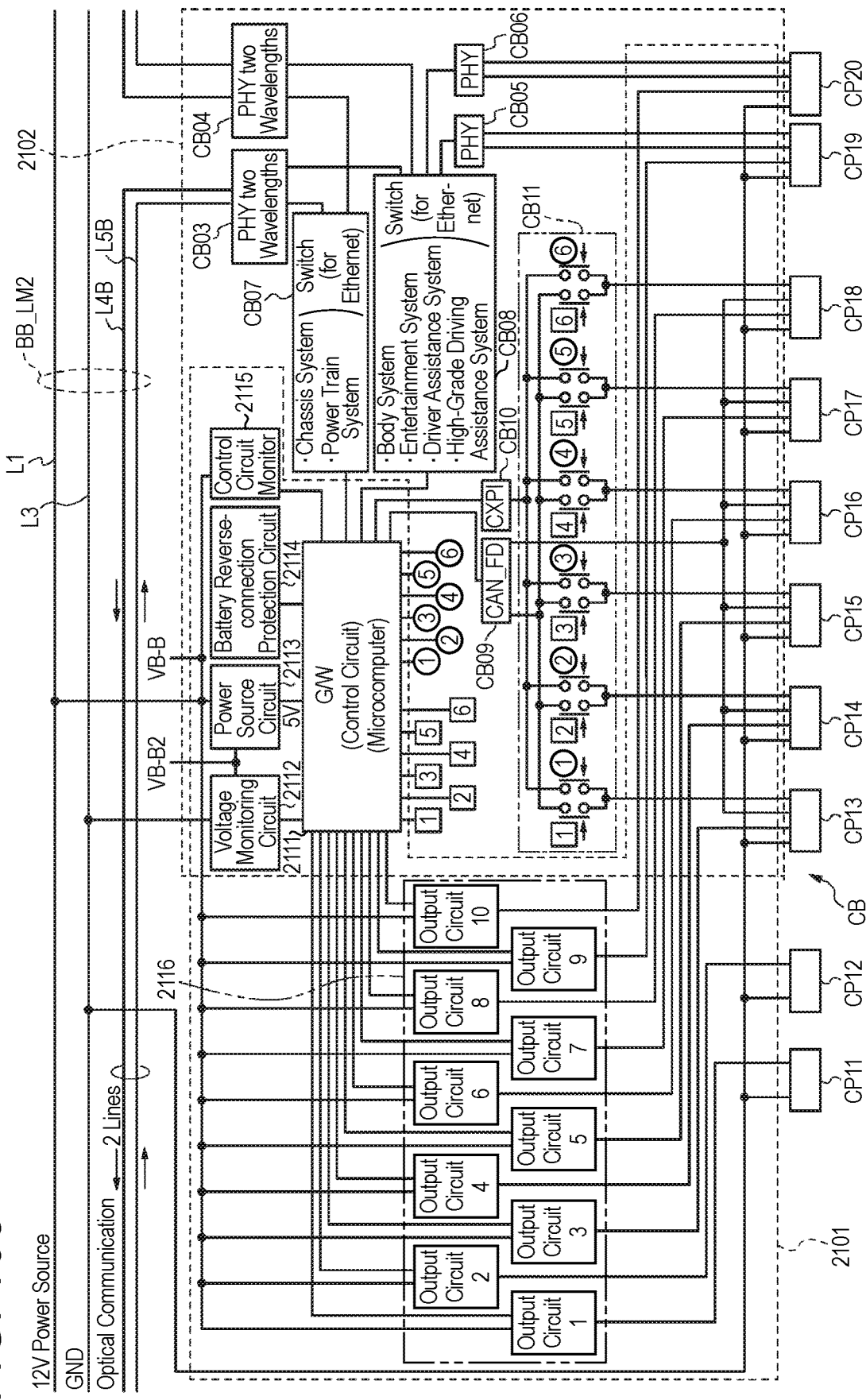
FIG. 105 is a block diagram illustrating a configuration example of the inside of a control box.

FIG. 105 is a block diagram illustrating a configuration example of the inside of a control box. A configuration illustrated in FIG. 105 is a modification example of the configuration illustrated in FIGS. 57 and 58, and, in FIG. 105, the common constituent elements are given the same reference numerals. The common constituent elements described above will not be described below.

The control box CB illustrated in FIG. 105 is connected to a backbone trunk line BB_LM2. The backbone trunk line BB_LM2 is configured by a power source line L1 and an earth line L3 of one system, and communication lines L4B and L5B. Each of the power source line L1 and the earth line L3 is a long conductor such as a bus bar, and the communication lines L4B and L5B are optical fibers.

The control box CB illustrated in FIG. 105 includes a power source control unit 2101 and a communication control unit 2102. Power source connectors CP11 and CP12 of two systems and communication port connectors CP13 to CP20 of eight systems are provided on an output side of the control box CB.

The communication control unit 2102 can provide communication functions respectively corresponding to two kinds of communication standards CAN_FD and CXPI to each of the communication port connectors CP13 to CP18 of six systems. Actually, two kinds of communication standards CAN_FD and CXPI may be selectively used in accordance with a specification of an apparatus connected to each connector. The communication control unit 2102 can provide a communication function based on the Ethernet (registered trademark) standard to each of the communication port connectors CP19 and CP20 of two systems. The communication control unit 2102 can also provide an optical communication function based on the Ethernet (Trademark) standard to the communication lines L4B and L5B of the backbone trunk line BB_LM2.

Each of the power source connectors CP11 and CP12 is provided with two terminals for the supply of power, that is, a power source terminal and a ground terminal. The two terminals of each of the power source connectors CP11 and CP12 have a sufficiently large sectional area so that relatively large power can be supplied. Each of the communication port connectors CP13 to CP20 of eight systems is provided with a power source terminal and a ground terminal for the supply of power and two terminals for communication.

The power source control unit 2101 includes a gateway control circuit 2111, a power source circuit 2112, a voltage monitoring circuit 2113, a battery reverse-connection protection circuit 2114, a control circuit monitor 2115, and a power source output circuit portion 2116.

The gateway control circuit 2111 includes an electrical circuit mainly formed of a microcomputer, and realizes various control functions which are necessary as a gateway in the control box CB under the control of the microcomputer.

The power source circuit 2112 generates stable DC power of 5 V which is required to operate a circuit such as the gateway control circuit 2111 on the basis of DC power (+12 V) from the power source line L1.

The voltage monitoring circuit 2113 monitors a voltage of the power source circuit 2112, and generates a signal for resetting an operation of the gateway control circuit 2111 when power is supplied or the voltage is abnormal. The battery reverse-connection protection circuit 2114 has a function of protecting a circuit such as the gateway control circuit 2111 in a case where a battery on the vehicle is connected in reverse polarities due to work mistake or the like. The control circuit monitor 2115 has a function of monitoring an operation error such as runaway of the microcomputer of the gateway control circuit 2111.

The power source output circuit portion 2116 has ten output circuits which can individually control ON and OFF of the supply of source power to each of power source terminals of ten systems corresponding to the power source connectors CP11 and CP12 and the communication port connectors CP13 to CP20. These output circuits supply source power from the power source line L1 to the respective power source terminals in response to control signals output from the gateway control circuit 2111. Therefore, it is possible to supply source power to only a necessary system in accordance with apparatuses which are actually connected to the power source connectors CP11 and CP12 and the communication port connectors CP13 to CP20.

<Function for Supplying Power to Apparatus Required by User During Power Supply Failure>

Figure 106:
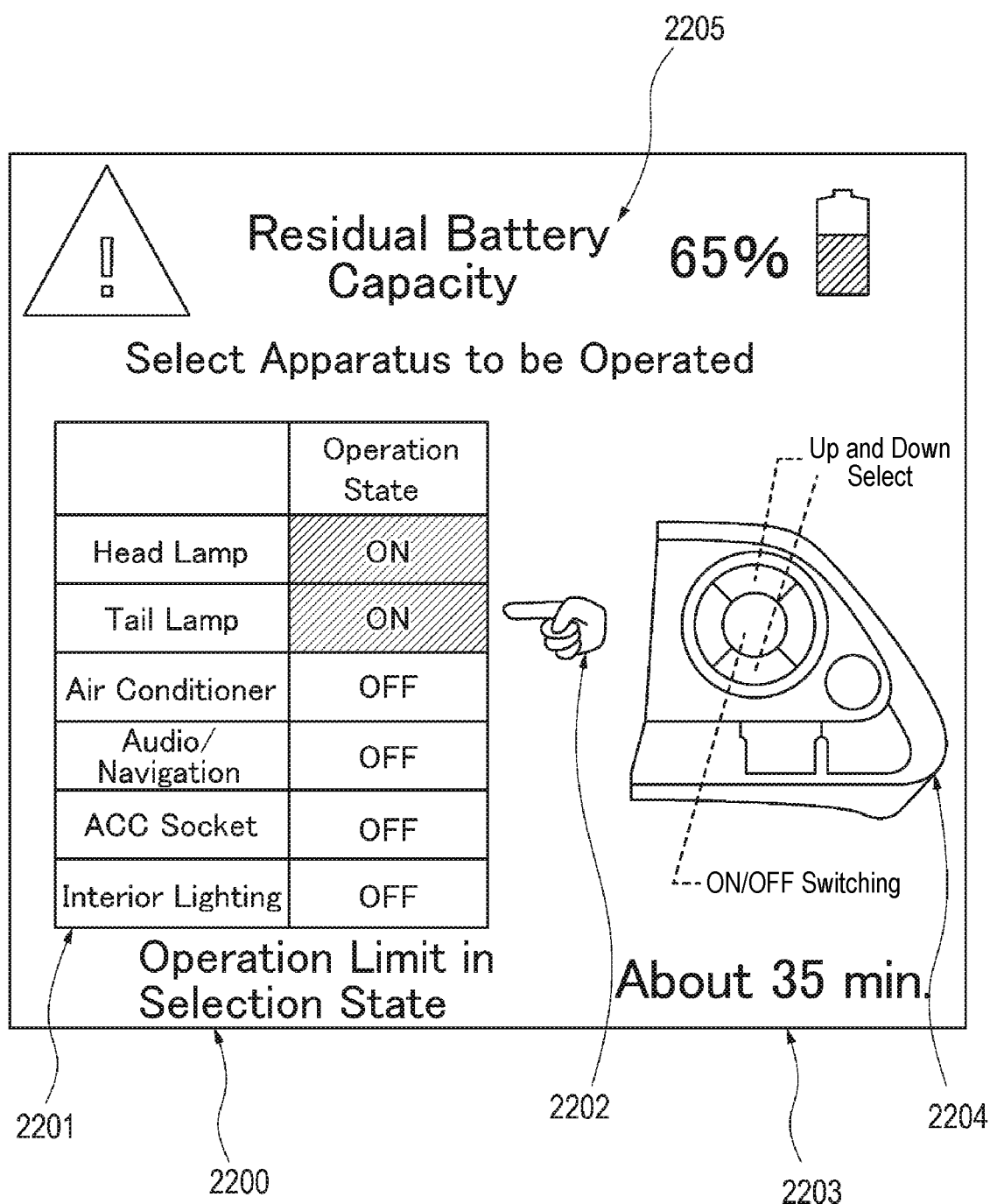
FIG. 106 is a front view illustrating a specific example of a screen displayed during a power supply failure.
Figure 107:
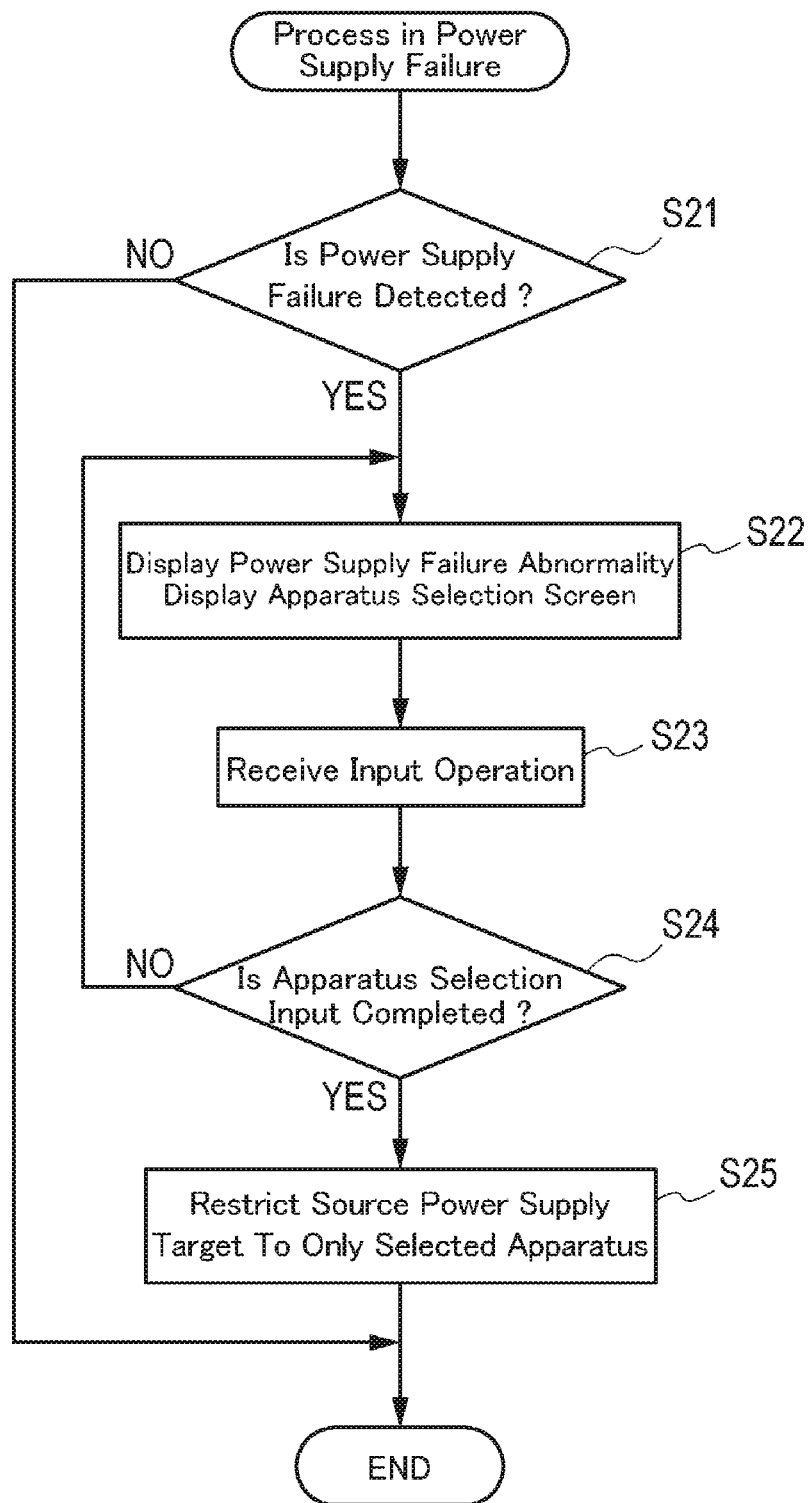
FIG. 107 is a flowchart illustrating an example of a process in which a user selects an apparatus to be used during a power supply failure.

FIG. 106 illustrates a specific example of a screen displayed during a power supply failure. FIG. 107 illustrates an example of a process in which a user selects an apparatus to be used during a power supply failure.

In a vehicle, there is a probability that a power supply failure may occur in various situations. For example, there are cases where stoppage of output from a power generation system, a failure in a main battery, a failure in a sub-battery, disconnection of a power source line, and the like occur. In these cases, if the same control as during normal time is performed, all apparatuses on the vehicle may stop operations, or the whole of restricted power which can be supplied may be consumed in a short time.

However, in a case where a power supply failure occurs during traveling of a vehicle, it is necessary to secure source power in order to maintain functions of a steering system, a braking system, and the like until the vehicle safely stops. It is necessary to secure source power for operating an apparatus performing an emergency notification. For example, in a case where such a failure occurs in a country road or the like where there is no street light at midnight, since various lighting functions on the vehicle do not operate, it is difficult for other vehicles to see the vehicle, and thus a traffic accident such as rear end collision easily occurs.

Therefore, in the present embodiment, in a case where a certain power supply failure occurs on the vehicle, necessary power is supplied from a sub-battery or the like to apparatuses of the steering system, the braking system, and the like during traveling of the vehicle at least until the vehicle safely stops. Source power for operating the apparatus performing an emergency notification is also secured. There is a user selection function for selectively supplying source power remaining on the vehicle to an apparatus required by a user in a state in which the vehicle has stopped due to a failure.

The on-vehicle system including the control box CB performs a process illustrated in FIG. 107 so as to realize the user selection function. In this user selection function, a screen as illustrated in FIG. 106 is displayed in order to facilitate a user's input operation. A display screen 2200 illustrated in FIG. 106 may be displayed by using, for example, a display in a meter unit normally provided on the vehicle, or a display disposed at a center console of the vehicle.

In a case of using the display in the meter unit, a control unit (microcomputer) of the meter unit performs communication with a control unit (for example, the gateway control circuit 2111 in FIG. 105) of the control box CB. The process illustrated in FIG. 107 is performed by an operation of either one or both of the control unit of the meter unit and the control unit of the control box CB.

In the example illustrated in FIG. 106, a target apparatus list display portion 2201, a cursor display portion 2202, an operation limit display portion 2203, an operation guidance display portion 2204, and a residual battery capacity display portion 2205 are displayed on the display screen 2200.

The target apparatus list display portion 2201 is a region in which a list of apparatuses of which ON and OFF of operations can be individually designated by a user and a current operation state (discrimination between ON and OFF) of each apparatus are displayed. In the example illustrated in FIG. 106, head lamps, tail lamps, an air conditioner, an audio/navigation, an ACC socket, and interior lighting lamps are displayed in a list of the apparatuses which can be designated by the user. Operation states of the head lamps and the tail lamps are designated as an "ON" state, and operation states of the air conditioner, the audio/navigation, the ACC socket, and interior lighting lamps are designated as an "OFF" state.

The cursor display portion 2202 indicates a position of an apparatus currently selected by the user with a mark simulating a hand from the list of apparatuses displayed in the target apparatus list display portion 2201. In the example illustrated in FIG. 106, a display position of the cursor display portion 2202 indicates that the "tail lamps" are selected as target apparatuses.

The operation limit display portion 2203 indicates a limit of time left in which an operation of each apparatus can last in the current user designation state displayed in the target apparatus list display portion 2201. In the example illustrated in FIG. 106, the head lamps and the tail lamps can be operated only for about 35 minutes from this point with the residual power source capacity.

The operation guidance display portion 2204 displays operation guidance with a graphic image simulating operation portions which are to be operated by the user in order to change designation in the target apparatus list display portion 2201. In this example, since a case of using steering switches disposed in the vicinity of a steering wheel of the vehicle is assumed, explanation using an image indicating an exterior of the steering switches and text is displayed in the operation guidance display portion 2204. The steering switches include switches for moving a selection position in a vertical direction, and a switch for alternately switching between ON and OFF of a selected apparatus.

The residual battery capacity display portion 2205 indicates the current residual power capacity of a battery in the entire power source system on the vehicle with a ratio (65%) relative to a reference value (100%). Therefore, in a case where a failure occurs, a user driving the vehicle can select an operation of each apparatus so as to be able to sufficiently use the minimum apparatuses required by the user while checking the content of the operation limit display portion 2203 and the residual battery capacity display portion 2205 displayed on the display screen 2200.

In a case where a residual battery capacity is very small, control may be performed so that an apparatus having large current consumption cannot be selected, or is excluded in advance from display targets in the target apparatus list display portion 2201. Consequently, it is possible to prevent source power consumption in a short period of time due to a user's wrong determination and selection operation.

In step S21 illustrated in FIG. 107, the control unit of the control box CB or the control unit of the meter unit identifies whether or not a power supply failure occurs. If the power supply failure is detected, the flow proceeds to the subsequent step S22.

In step S22, the control unit of the control box CB or the control unit of the meter unit displays the power supply failure abnormality, and also displays the display screen 2200 with the content as illustrated in FIG. 106. The user can operate the steering switches in a state in which the display screen 2200 illustrated in FIG. 106 is displayed.

The control unit of the control box CB or the control unit of the meter unit detects the user's input operation on the steering switches in step S23, and updates the display content of the display screen 2200 according to the detected input operation. In other words, a display position of the cursor display portion 2202 is moved up or down, or alternative switching between ON and OFF of an apparatus state at a selection position in the target apparatus list display portion 2201 is performed. In a case where a user operation indicating completion of apparatus selection input is detected, the flow proceeds to step S25 from step S24.

In step S25, the control unit of the control box CB or the control unit of the meter unit reflects the user's input operation performed on the target apparatus list display portion 2201 on actual control. In other words, the supply of power is selectively performed so that source power is supplied to an apparatus whose operation state is designated as an "ON" state, and source power is not supplied to an apparatus whose operation state is designated as an "OFF" state in the target apparatus list display portion 2201.

For example, in the control box CB illustrated in FIG. 105, the power source output circuit portion 2116 can individually turn on and off the supply of power to each of the connectors CP11 to CP20 for each system. Therefore, the gateway control circuit 2111 controls ON and OFF of the power source output circuit portion 2116 for each system so that a state selected by the user is reflected, and thus source power is controlled to be supplied to only an apparatus required by the user.

<Configuration Example of Backbone Trunk Line>

Figure 108A:
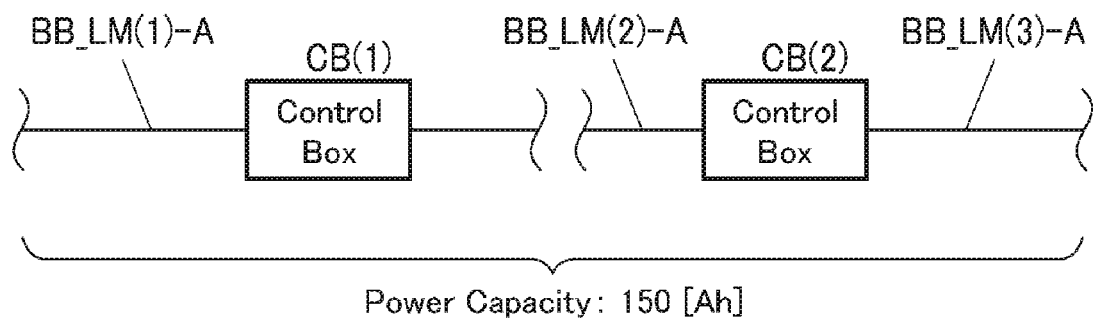
FIGS. 108A, 108B and 108C are block diagrams respectively illustrating configurations of three backbone trunk lines corresponding to different grades.
Figure 108B:
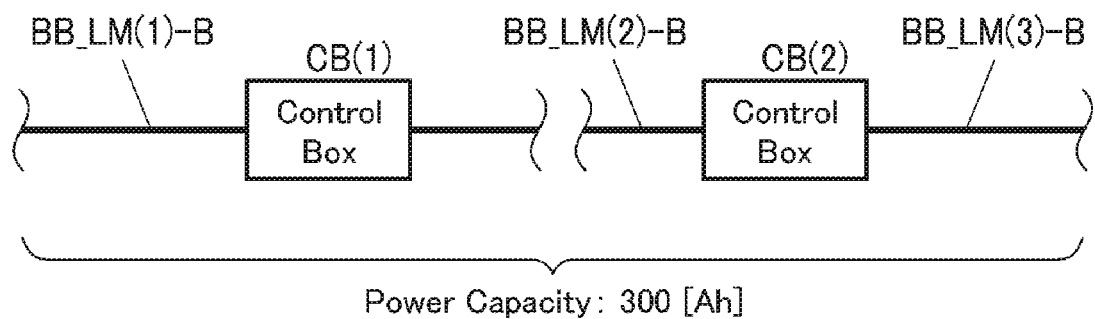
Figure 108C:
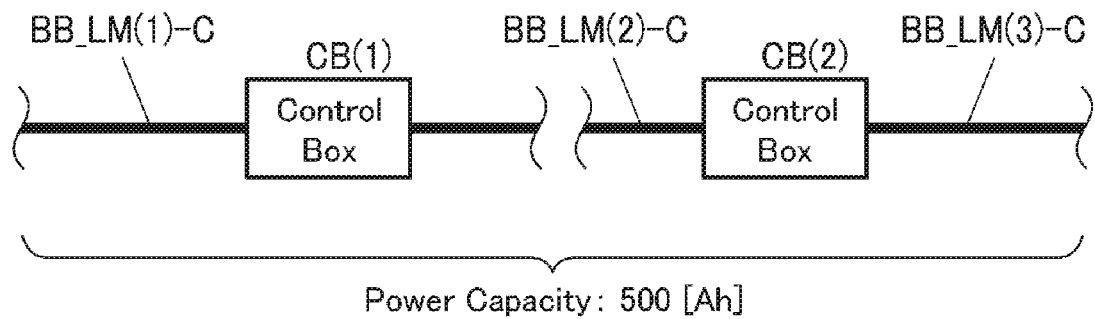

FIGS. 108(a), 108(b) and 108(c) are block diagrams respectively illustrating configurations of three backbone trunk lines corresponding to different grades.

Vehicular circuit bodies illustrated in FIGS. 108(a), 108(b) and 108(c) are configured to respectively satisfy specifications of power capacities of 150 Ah, 300 Ah, and 500 Ah.

The vehicular circuit body illustrated in FIG. 108(a) is formed of three backbone trunk lines BB_LM(1)-A, BB_LM(2)-A and BB_LM(3)-A, and control boxes CB(1) and CB(2) connecting the backbone trunk lines to each other. The vehicular circuit body illustrated in FIG. 108(b) is formed of three backbone trunk lines BB_LM(1)-B, BB_LM(2)-B and BB_LM(3)-B, and control boxes CB(1) and CB(2) connecting the backbone trunk lines to each other. The vehicular circuit body illustrated in FIG. 108(c) is formed of three backbone trunk lines BB_LM(1)-C, BB_LM(2)-C and BB_LM(3)-C, and control boxes CB(1) and CB(2) connecting the backbone trunk lines to each other.

The backbone trunk lines BB_LM(1)-A, BB_LM(2)-A and BB_LM(3)-A include a power source line (L1) and an earth line (L3) having a thickness corresponding to the power capacity of 150 Ah. The backbone trunk lines BB_LM(1)-B, BB_LM(2)-B and BB_LM(3)-B include a power source line (L1) and an earth line (L3) having a thickness corresponding to the power capacity of 300 Ah. The backbone trunk lines BB_LM(1)-C, BB_LM(2)-C and BB_LM(3)-C include a power source line (L1) and an earth line (L3) having a thickness corresponding to the power capacity of 500 Ah.

In other words, in the three kinds of vehicular circuit bodies illustrated in FIGS. 108(a), 108(b) and 108(c), forms and configurations thereof are the same as each other, but thicknesses of the power source lines and the earth lines of the backbone trunk lines BB_LM are different from each other. Therefore, three kinds of backbone trunk lines BB_LM including the power source lines and the earth lines having different thicknesses are prepared in advance, only the thickness is selectively changed, and thus it is possible to form a vehicular circuit body which can be employed in each of a plurality of kinds of vehicles whose grades are different from each other, or each of a plurality of types of vehicles.

For example, in a case of a vehicle with a basic grade, the number of 3o connected electric components is small, and power consumption of each electric component is also small. Thus, as illustrated in FIG. 108(a), it is possible to sufficiently satisfy a required specification by using the vehicular circuit body having the power capacity of 150 Ah. In a case of a vehicle with an intermediate grade, the number of connected electric components increases, and power consumption of each electric component slightly increases. Thus, as illustrated in FIG. 108(b), it is possible to sufficiently satisfy a required specification by using the vehicular circuit body having the power capacity of 300 Ah.

In a case of a vehicle with a high grade, the number of connected electric components further increases, power consumption of each electric component also increases, and an electric component such as an automatic driving system which is newly developed may be added. Thus, as illustrated in FIG. 108(c), it is possible to sufficiently satisfy a required specification by using the vehicular circuit body having the power capacity of 500 Ah.

In the examples illustrated in FIGS. 108(a), 108(b) and 108(c), it is assumed that only thicknesses of the power source line and the earth line of the backbone trunk line BB_LM are changed depending on a difference in a grade, and only one kind of the control box CB is used.

However, a plurality of kinds of control boxes CB may be prepared, and one control box may be selected from among the plurality of kinds of control boxes depending on a difference in a grade. In this case, components of the control boxes CB can be used in common by employing, for example, the technique shown in FIG. 61. In a case where a specification for a power capacity is not changed, coping may be performed by changing the kind of the control box CB without changing a thickness of the backbone trunk line BB_LM. Consequently, it is possible to cope with a change in the number of electric components mounted on a vehicle or a change in a communication specification (transmission speed).

<Power Source System Supplying Stable Voltage>
<Description of Configuration>

Figure 109A:
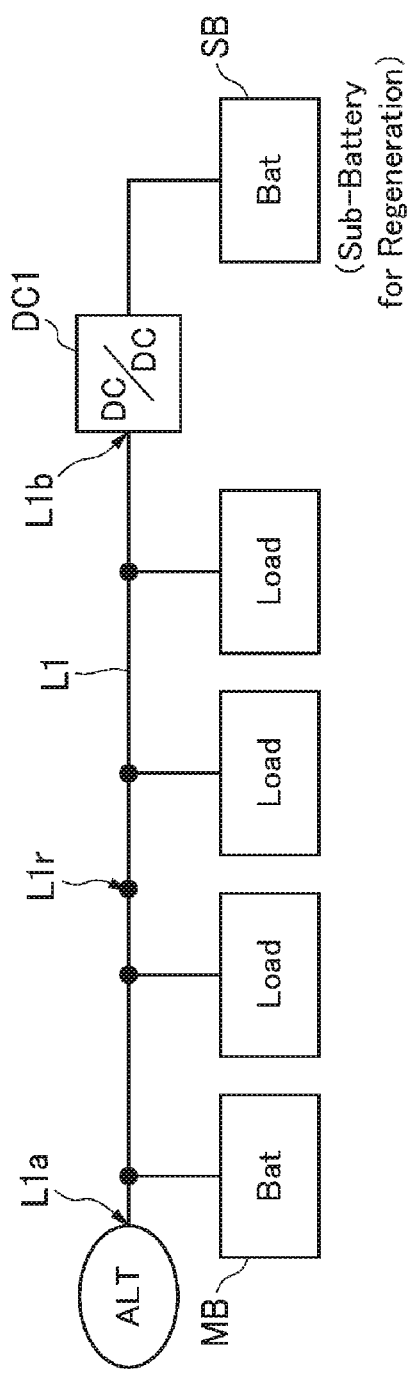
FIGS. 109A and 109B are block diagrams respectively illustrating configuration examples of different on-vehicle systems.
Figure 109B:
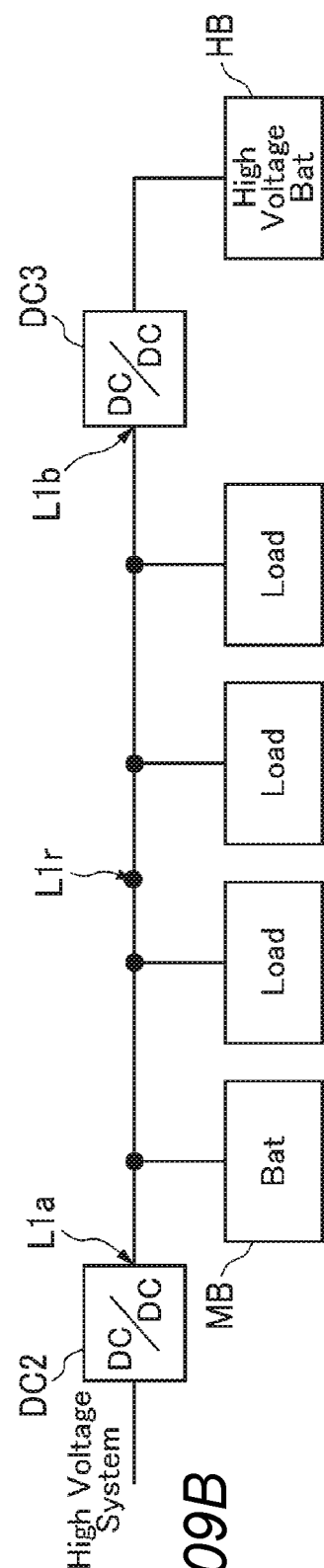

FIGS. 109(a) and 109(b) respectively illustrate configuration examples of two kinds of on-vehicle systems. The on-vehicle system illustrated in FIG. 109(a) has a configuration appropriate for a general vehicle having only a low voltage system as a power source. The on-vehicle system illustrated in FIG. 109(b) has a configuration appropriate for a hybrid vehicle having a low voltage system and a high voltage system as a power source.

In the on-vehicle system illustrated in FIG. 109(a), one end L1a of the power source line L1 included in the above-described backbone trunk line BB_LM is connected to an alternator ALT and a main battery MB. The other end L1b of the power source line L1 is connected to an output side of a DC/DC converter DC1. An input side of the DC/DC converter DC1 is connected to a sub-battery SB which accumulates regenerative power.

The alternator ALT is a generator and can automatically adjust a DC voltage which is output to one end L1a of the power source line L1. The DC/DC converter DC1 can convert a voltage of DC power supplied from the sub-battery SB and output the voltage to the other end L1b of the power source line L1. The DC/DC converter DC1 can automatically adjust an output DC voltage.

In the example illustrated in FIG. 109(a), a plurality of loads are connected to an intermediate portion between one end L1a and the other end L1b of the power source line L1 in a distribution manner. Source power required by each of the loads may be supplied from the alternator ALT via the power source line L1, and may be supplied from the DC/DC converter DC1 via the power source line L1.

On the other hand, in the on-vehicle system illustrated in FIG. 109(b), one end L1a of the power source line L1 included in the above-described backbone trunk line BB_LM is connected to an output side of a DC/DC converter DC2 and a main battery MB. An input side of the DC/DC converter DC2 is connected to a high voltage power source system. The other end L1b of the power source line L1 is connected to an output side of a DC/DC converter DC3. An input side of the DC/DC converter DC3 is connected to a battery HB of a high voltage power source system.

The DC/DC converter DC2 converts a high voltage supplied from the high voltage power source system into a low voltage of, for example, about 12 V, and supplies the voltage to one end L1a of the power source line L1 and the main battery MB. The DC/DC converter DC3 converts a high voltage supplied from the battery HB into a low voltage of, for example, about 12 V, and supplies the voltage to the other end L1b of the power source line L1. Each of the DC/DC converters DC2 and DC3 has a function of automatically adjusting an output voltage.

In the example illustrated in FIG. 109(b), a plurality of loads are connected to an intermediate portion between one end L1a and the other end L1b of the power source line L1 in a distribution manner. Source power required by each of the loads may be supplied from the output side of the DC/DC converter DC2 via the power source line L1, and may be supplied from the output side of the DC/DC converter DC3 via the power source line L1.

<Description of Fundamental Operation>

In both of the on-vehicle systems illustrated in FIGS. 109(a) and 109(b), different power sources are respectively connected to one end L1a and the other end L1b of the power source line L1. Therefore, allocation between a power source current flowing through each load from the power source on one end L1a side and a power source current flowing through each load from the power source on the other end L1b side is appropriately adjusted, and thus it is possible to prevent an increase in a current flowing through each portion of the power source line L1 and thus to reduce a voltage drop in the power source line L1. Thus, it is also possible to reduce a sectional area of the power source line L1.

However, if current consumption in each load fluctuates due to a change in an operation state of each load connected to the power source line L1, the allocation between a power source current flowing through each load from the power source on one end L1a side and a power source current flowing through each load from the power source on the other end L1b side also changes. If a distance between a power source supplying a relatively large current and a load consuming a large current increases, a voltage drop in a corresponding portion of the power source line L1 increases. In order to prevent the increase of the voltage drop, characteristic control described below is performed.

<Characteristic Control of Power Source System>

In both of the on-vehicle systems in FIGS. 109(a) and 109(b), a control reference point L1r is provided at a specific position close to the center of the power source line L1.

In the on-vehicle system illustrated in FIG. 109(a), automatic control is performed so that a voltage Vxr appearing at the control reference point L1r on the power source line L1 due to power output from the alternator ALT is the same as a voltage Vyr appearing at the control reference point L1r on the power source line L1 due to power output from the DC/DC converter DC1, that is, a balance state occurs. This control may be realized by adjusting either an output voltage from the alternator ALT or an output voltage from the DC/DC converter DC1, or both of the output voltages.

Actually, the voltage Vxr may be estimated through computation on the basis of an output voltage from the alternator ALT, a position of the control reference point L1r, a connection position of each load, an operation state of each load, and the like. The voltage Vyr may be estimated through computation on the basis of an output voltage from the DC/DC converter DC1, a position of the control reference point L1r, a connection position of each load, an operation state (current consumption) of each load, and the like. Therefore, the output voltage from the alternator ALT or the output voltage from the DC/DC converter DC1 is automatically adjusted so that the estimated voltage Vxr and voltage Vyr are brought into a balance state.

In the on-vehicle system illustrated in FIG. 109(b), automatic control is performed so that a voltage Vxr appearing at the control reference point L1r on the power source line L1 due to power output from the DC/DC converter DC2 is the same as a voltage Vyr appearing at the control reference point L1r on the power source line L1 due to power output from the DC/DC converter DC3, that is, a balance state occurs.

This control may be realized by adjusting either an output voltage from the DC/DC converter DC2 or an output voltage from the DC/DC converter DC3, or both of the output voltages.

Actually, the voltage Vxr may be estimated through computation on the basis of an output voltage from the DC/DC converter DC2, a position of the control reference point L1r, a connection position of each load, an operation state of each load, and the like. The voltage Vyr may be estimated through computation on the basis of an output voltage from the DC/DC converter DC3, a position of the control reference point L1r, a connection position of each load, an operation state of each load, and the like. Therefore, the output voltage from the DC/DC converter DC2 or the output voltage from the DC/DC converter DC3 is automatically adjusted so that the estimated voltage Vxr and voltage Vyr are brought into a balance state.

The characteristic control is performed as described above, and thus a voltage drop in each portion of the power source line L1 can be prevented. Thus, even in a case where various kinds of loads are connected, it is possible to reduce a diameter of the backbone trunk line BB_LM including the power source line L1.

<Backup Control on Trunk Line Power Source>

Figure 110:
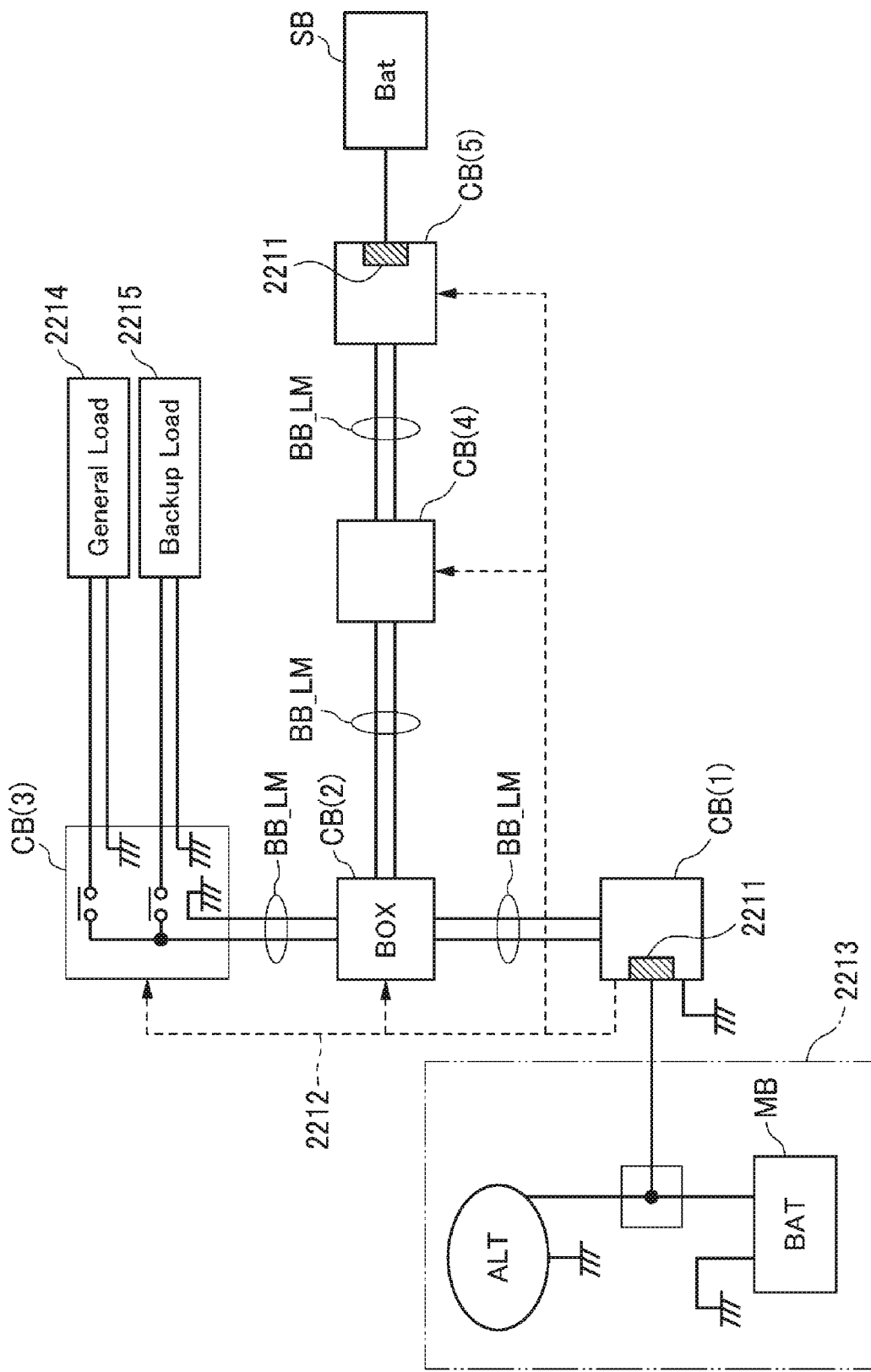
FIG. 110 is a block diagram illustrating a configuration example of an on-vehicle system.

FIG. 110 illustrates a configuration example of an on-vehicle system. A power source trunk line of the on-vehicle system illustrated in FIG. 110 is formed of a plurality of control boxes CB(1) to CB(5), and a backbone trunk line BB_LM connecting the control boxes to each other.

As illustrated in FIG. 110, an output side of a main power source portion 2213 including an alternator ALT and a main battery MB is connected to the control box CB(1) disposed in a front portion of a vehicle. A sub-battery SB disposed in a rear portion of the vehicle is connected to the control box CB(5).

The control box CB(1) includes a power source abnormality detection unit 2211 which detects an abnormality of a voltage or the like due to a power supply failure in the main power source portion 2213, that is, short-circuit or disconnection. The control box CB(5) includes a power source abnormality detection unit 2211 which detects an abnormality such as a power supply failure in the sub-battery SB.

In the configuration illustrated in FIG. 110, an output side of the control box CB(3) is connected to a general load 2214 and a backup load 2215. The control box CB(3) is provided with a switch which switches between ON and OFF of the supply of source power to the general load 2214 and a switch which switches between ON and OFF of the supply of source power to the backup load 2215.

The general load 2214 is a load which is defined in advance so as to be used in a case where the entire system is normally operated. The backup load 2215 is a load which is defined in advance so as to preferentially secure source power required for an operation in a case where a certain power supply failure occurs in the system.

In the on-vehicle system illustrated in FIG. 110, for example, if the power source abnormality detection unit 2211 of the control box CB(1) detects a power supply failure in the main power source portion 2213, the control box CB(1) transmits a predetermined control signal 2212 to all of the remaining control boxes CB(2) to CB(5). In response to the control signal 2212, for example, the control box CB(3) stops the supply of power to the general load 2214, and distributes source power supplied from the backbone trunk line BB_LM to only the backup load 2215. The other control boxes CB(2), CB(4) and CB(5) similarly distribute power to backup loads connected thereto and under the control thereof.

For example, if the power source abnormality detection unit 2211 of the control box CB(5) detects a power supply failure in the sub-battery SB, the control box CB(5) transmits a predetermined control signal 2212 to all of the remaining control boxes CB(1) to CB(4). Also in this case, each control box CB stops the supply of power to the general load 2214 connected thereto and under the control thereof, and distributes source power from the backbone trunk line BB_LM to only the backup load 2215.

For example, in a case where a power supply failure occurs in the main power source portion 2213, source power from the sub-battery SB can be used, but the power supply performance of the entire power source system is considerably lower than during normal time. Similarly, in a case where a power supply failure occurs in the sub-battery SB, source power from the main power source portion 2213 can be used, but the power supply performance of the entire power source system is reduced if the sub-battery SB is assumed to be used. In this case, through the above-described control, the supply of power to the general load 2214 is stopped, power is supplied to only the backup load 2215, and thus it is possible to maintain a necessary function by effectively using restricted source power.

<Technique of Changing Trunk Line Diameter for Each Branch>

Figure 111:
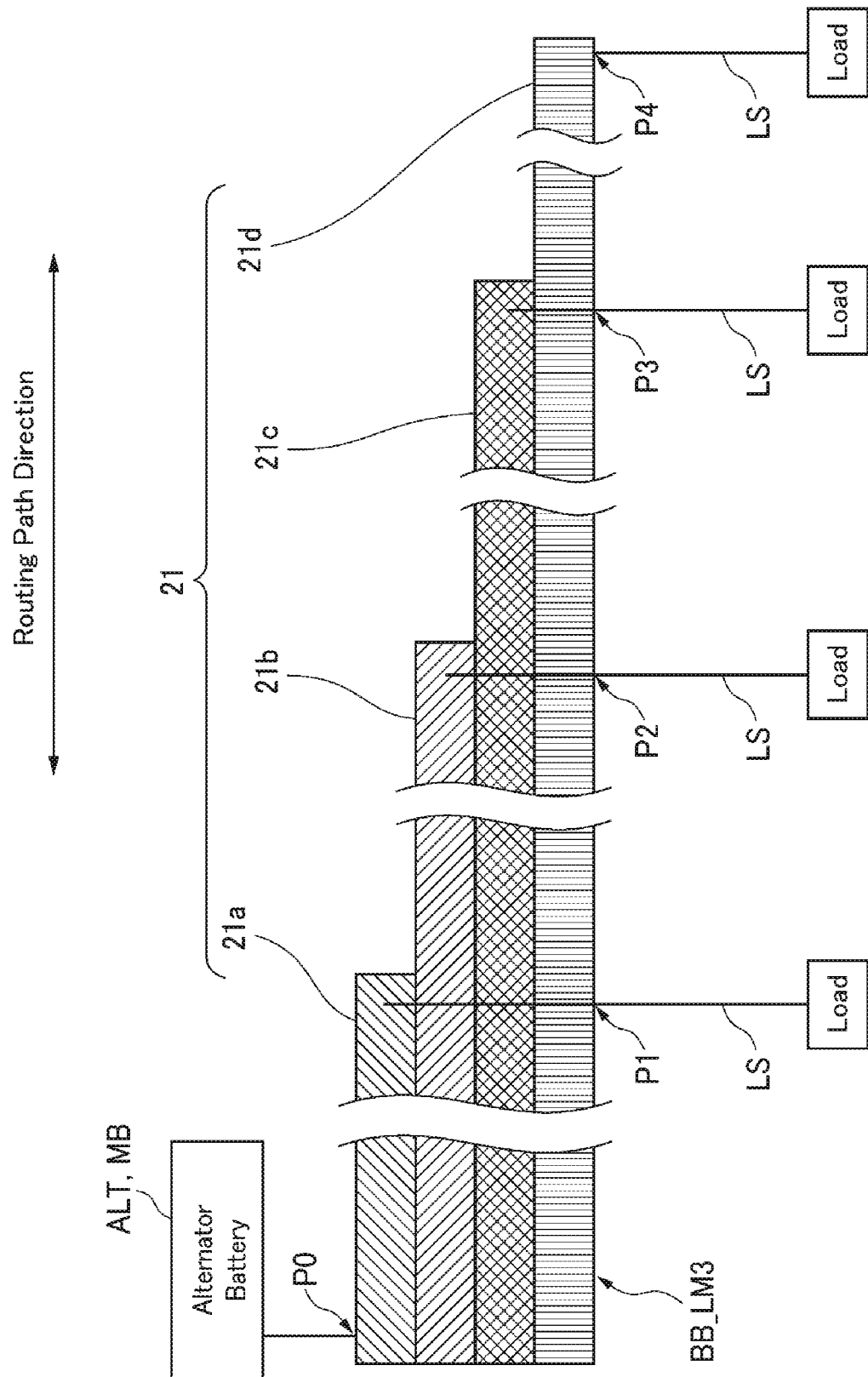
FIG. 111 is a block diagram illustrating examples of a configuration of a power source line included in a backbone trunk line and a connection state of each apparatus.

FIG. 111 illustrates examples of a configuration of a power source line included in a backbone trunk line and a connection state of each apparatus. In a configuration illustrated in FIG. 111, a thickness (sectional area) of a power source line 21 included in a backbone trunk line BB_LM is configured to be changed stepwise according to a difference in a location on the backbone trunk line BB_LM.

Specifically, the power source line 21 is formed by stacking a plurality of thin tabular routing materials (conductive materials) 21a, 21b, 21c and 21d in a thickness direction, and the number of stacked thin tabular routing materials 21a to 21d is configured to be changed for each branch location on the backbone trunk line BB_LM.

In the configuration illustrated in FIG. 111, a connection point P0 provided at an end of the power source line 21 on an upstream side is connected to an alternator ALT and a main battery MB. Each position of connection points P1, P2, P3 and P4 on the power source line 21 is branched so as to respectively connect to a load via a branch line sub-harness LS.

The power source line 21 is formed by stacking four thin tabular routing materials 21a, 21b, 21c and 21d between the connection point P0 on the most upstream side and the next connection point P1. The power source line 21 is formed by stacking three thin tabular routing materials 21b, 21c and 21d between the connection point P1 and the next connection point P2. The power source line 21 is formed by stacking two thin tabular routing materials 21c and 21d between the connection point P2 and the next connection point P3. The power source line 21 is formed of only a single thin tabular routing material 21d between the connection point P3 and the next connection point P4.

In the configuration illustrated in FIG. 111, currents of all four loads flow in a section between the connection point P0 and the connection point P1. Currents of three loads flow in a section between the connection point P1 and the connection point P2; currents of two loads flow in a section between the connection point P2 and the connection point P3; and a current of only one load flows in a section between the connection point P3 and the connection point P4.

In other words, currents flow in a concentrated manner at the positiion on the upstream side close to the alternator ALT and the main battery MB. A voltage drop occurring in each section is proportional to the magnitude of a flowing current, and thus a voltage drop more easily occurs as a position comes closer to the upstream side of the power source line 21. However, as illustrated in FIG. 111, if the thickness of the power source line 21 is large on the upstream side, resistivity per unit length is reduced, and thus it is possible to reduce a voltage drop. Since a current value is relatively reduced on the downstream side of the power source line 21, a voltage drop does not increase even if the thickness of the power source line 21 is small.

As mentioned above, since the thickness of the power source line 21 is changed depending on a difference in a location by taking into consideration the magnitude of a flowing current, it is possible to reduce a thickness or a weight of the backbone trunk line BB_LM as a whole without increasing a voltage drop. Although not illustrated, a thickness of an earth line of the backbone trunk line BB_LM is also preferably configured to be changed depending on a location in the same manner as that of the power source line 21.

<Wireless Communication Technique for Stable Communication>

Figure 112:
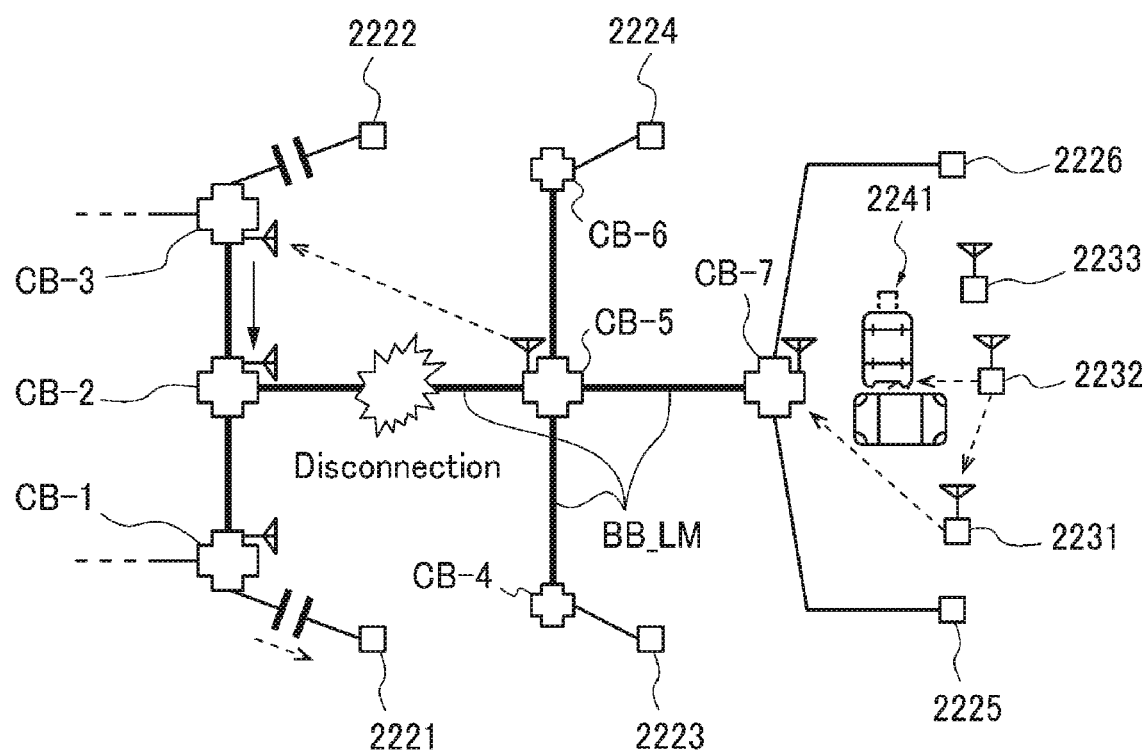
FIG. 112 is a block diagram illustrating a configuration example of an on-vehicle system.

FIG. 112 illustrates a configuration example of an on-vehicle system.

In an on-vehicle system illustrated in FIG. 112, seven control boxes CB-1, CB-2, CB-3, CB-4, CB-5, CB-6 and CB-7 which are disposed in a state of being distributed to respective portions of a vehicle body are connected to each other via a backbone trunk line BB_LM. The backbone trunk line BB_LM includes a power source line, an earth line, and a communication line as described above.

Each of the control boxes CB-1 to CB-7 illustrated in FIG. 112 has a wireless communication function. Communication terminals 2221, 2222, 2223, 2224, 2225 and 2226 are provided at respective portions of four doors of the vehicle body, and the left and right of a luggage room rear portion of the vehicle body. A plurality of communication terminals 2231, 2232 and 2233 having a relay function are provided in the luggage room rear portion.

Each of the communication terminals 2221 to 2226 and each of the control boxes CB-1, CB-3, CB-4, CB-6 and CB-7 are mounted with electrical circuits using a proximity wireless technique, and can perform the supply of power and communication in a noncontact manner. Each of the communication terminals 2231 to 2233 having a relay function has a wireless communication function, and also has a relay function.

In the on-vehicle system illustrated in FIG. 112, communication among the control boxes CB-1 to CB-7 is normally performed via the communication line of the backbone trunk line BB_LM.

For example, even in a case where a wireless communication path between the control box CB-7 and the communication terminal 2232 having a relay function is blocked by luggage 2241, the communication terminal 2232 having a relay function can perform wireless communication with the communication terminals 2231 and 2233 having a relay function disposed near the left and right thereof. Therefore, for example, as indicated by a dotted line in FIG. 112, wireless communication lines are established between the communication terminals 2232 and 2231 having a relay function, and between the communication terminal 2231 having a relay function and the control box CB-7, and the communication terminal 2231 having a relay function is used as a wireless relay station. In other words, a wireless communication line is established along a path from the communication terminal 2232 having a relay function to the control box CB-7 via the communication terminal 2231 having a relay function.

Actually, there is a variation in the communication performance due to the influence of a difference in cost of each terminal, a difference between kinds of the terminals, a difference between manufacturers of the terminals, and a difference between the individual terminals, and thus there is a probability that a difference may occur in a communication state with a direct or indirect communication partner. In FIG. 112, for example, in a case where it is difficult to perform communication due to a difference in terminal performance although communication is desired to be performed from the communication terminal 2232 having a relay function to the control box CB-2 in a wireless manner, communication is temporarily performed from the communication terminal 2232 having a relay function to the control box CB-5, and then communication is performed from the control box CB-5 to the control box CB-2 in a wired or wireless manner. Therefore, for example, whether or not communication can be actually performed is sequentially examined with respect to available communication line paths on the basis of the predefined priority, and an optimal path is automatically selected. In a case where communication is interrupted in the middle, a communication failure is detected, and execution of relay or a communication path is automatically changed.

For example, as illustrated in FIG. 112, the backbone trunk line BB_LM may be disconnected between the control boxes CB-2 and CB-5 (including disconnection of only a communication path). In a case where communication cannot be performed due to such disconnection of the wired path, a necessary communication line is secured by using the wireless communication function of each of the control boxes CB-1 to CB-7. For example, in a case where the backbone trunk line BB_LM is disconnected between the control boxes CB-2 and CB-5, as indicated by a dotted line in FIG. 112, a wireless communication line is secured between control boxes CB-3 and CB-5, and a communicable state between the control boxes CB-2 and CB-5 is maintained by using a wired line between the control boxes CB-3 and CB-2.

On the other hand, for example, since a door of a vehicle is opened and closed, in a case where a wire harness is used to connect an electric component disposed in the door to a vehicle interior of the vehicle body, the wire harness tends to be disconnected due to the influence of deformation or the like caused by opening and closing of the door.

In the on-vehicle system illustrated in FIG. 112, the control box CB-1 and the communication terminal 2221 are connected to each other by using a proximity wireless technique. Similarly, the control box CB-3 and the communication terminal 2222, the control box CB-4 and the communication terminal 2223, the control box CB-6 and the communication terminal 2224, and the control box CB-7 and the communication terminals 2225 and 2226 are also connected to each other by using the proximity wireless technique. Therefore, since it is not necessary to provide a wire harness in a movable portion, and there is no concern about disconnection, it is possible to increase reliability of the supply of power and communication.

However, in a case where the luggage 2241 is disposed in the luggage room of the vehicle body, electric waves may be blocked by the luggage 2241, and thus wireless communication cannot be performed if wireless communication is performed in the vicinity thereof.

For example, in the on-vehicle system illustrated in FIG. 112, a case is assumed in which the control box CB-7 and the communication terminals 2231, 2232 and 2233 having a relay function are connected to each other via wireless communication lines and perform communication with each other, but the wireless communication lines may be interrupted due to the influence of the luggage 2241 or a passenger. However, each of the communication terminals 2231 to 2233 having a relay function has a relay function using wireless communication, and can thus continuously perform communication by securing other wireless communication lines.

As described above, in the on-vehicle system illustrated in FIG. 112, since the control boxes CB-1 to CB-7 which can perform wireless communication or the communication terminals 2231 to 2233 having a relay function are disposed at various locations of the vehicle body, various apparatuses having a wireless communication function can be easily connected to the on-vehicle system through post-installation. Even in a case where a failure such as disconnection occurs in the wired communication paths connecting the control boxes CB-1 to CB-7 to each other, it is possible to secure a necessary communication line by using wireless communication. Since the proximity wireless technique is used in a movable portion such as a door, it is not necessary to use a wire harness, and there is no concern about disconnection. Therefore, it is possible to perform stable wireless communication and the supply of power.

Fourth Embodiment

Figure 113:
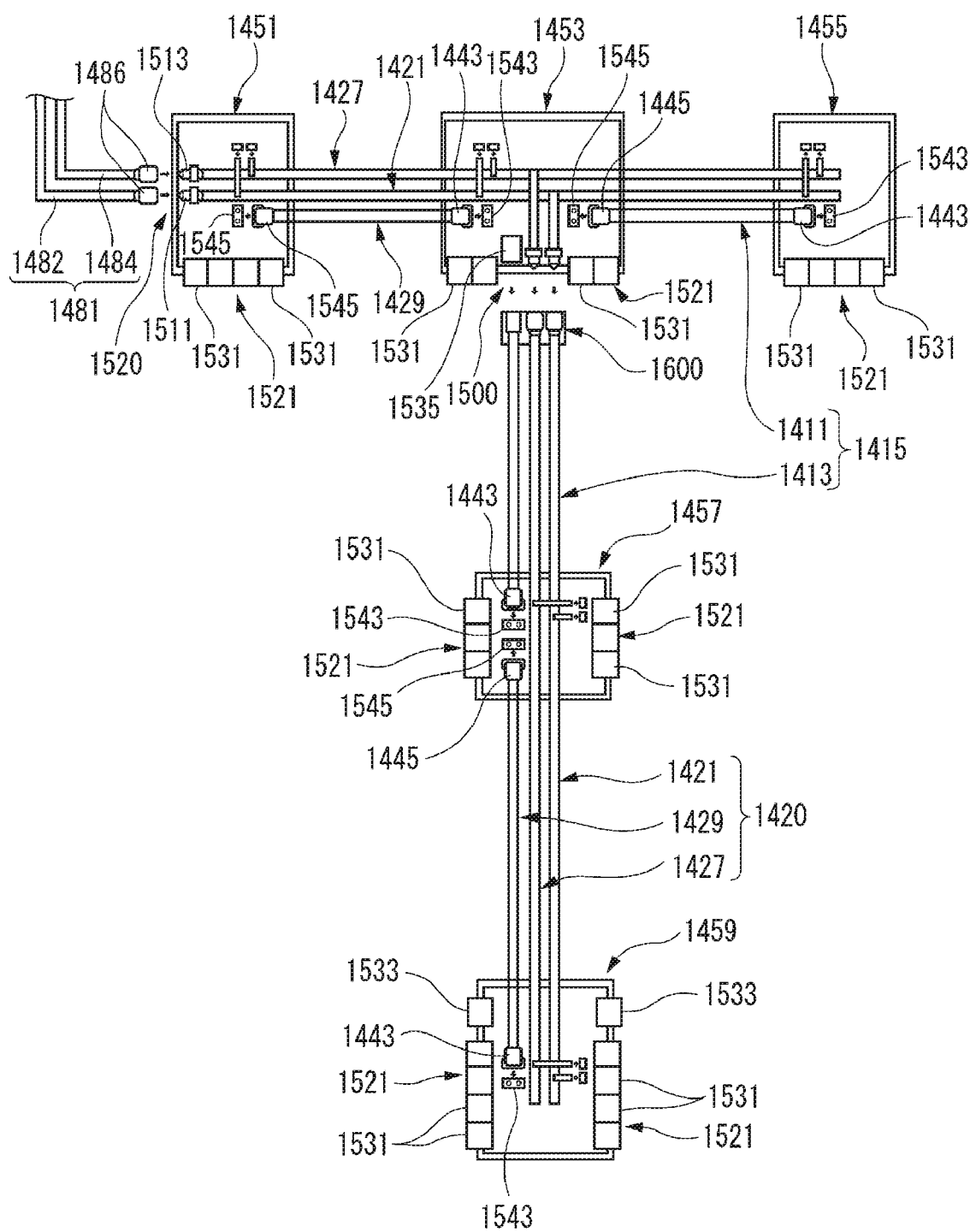
FIG. 113 is a schematic plan view illustrating a layout of a backbone trunk line portion according to a vehicular circuit body of a fourth embodiment of the present invention.

FIG. 113 is a schematic plan view illustrating a layout of a backbone trunk line portion according to a vehicular circuit body of a fourth embodiment of the present invention.

In the same manner as the vehicular circuit body 10 according to the first embodiment, a vehicular circuit body according to the fourth embodiment includes, as fundamental constituent elements, a trunk line (backbone trunk line portion 1415) routed in a vehicle body and having a power source line 1421, an earth line 1427, and a communication line 1429; branch lines (not illustrated) connected to electric components at respective vehicle body locations; and a plurality of control boxes (a supply side control box 1451, a branch control box 1453, an intermediate control box 1457, and control boxes 1455 and 1459) disposed along the trunk line in a distribution manner and having a control unit for distributing power from the power source line 1421 supplied to the trunk line and signals from the communication line 1429 to the branch lines connected to the trunk line.

(Backbone Trunk Line Portion)

The backbone trunk line portion 1415 illustrated in FIG. 113 is a trunk line which includes the power source line 1421, the earth line 1427, and the communication line 1429, and is routed in a vehicle body, and is broadly divided into an instrument panel backbone trunk line portion 1411 which is linearly disposed in a leftward-and-rightward direction so as to be substantially in parallel to a reinforcement (not illustrated) of the vehicle body, and a floor backbone trunk line portion 1413 which is disposed to extend in a front-and-rear direction of the vehicle body substantially at the center of the vehicle body in the leftward-and-rightward direction along a vehicle interior floor.

The floor backbone trunk line portion 1413 linearly extends in an upward-and-downward direction at the location along the surface of the dash panel 50 (refer to FIG. 1) so that a tip end thereof is connected to an intermediate part of the instrument panel backbone trunk line portion 1411. Connection portions of the instrument panel backbone trunk line portion 1411 and the floor backbone trunk line portion 1413 are in a state of being attachable and detachable via a connector portion 1500 of the branch control box 1453 and a multi-connector 1600 of the floor backbone trunk line portion 1413, which will be described later.

The backbone trunk line portion 1415 is configured in a shape similar to a T shape due to the instrument panel backbone trunk line portion 1411 and the floor backbone trunk line portion 1413.

The instrument panel backbone trunk line portion 1411 is connected to a main power source cable 1481 of the engine compartment sub-harness 61 (refer to FIG. 1) via the supply side control box 1451 which is disposed on the left of the vehicle body which is an upstream side of the backbone trunk line portion 1415.

In the same manner as the vehicular circuit body 10 according to the first embodiment, principal constituent elements of the vehicular circuit body according to the fourth embodiment, that is, the instrument panel backbone trunk line portion 1411, the floor backbone trunk line portion 1413, the supply side control box 1451, the branch control box 1453, the intermediate control box 1457, and the control boxes 1455 and 1459 are all disposed in a space on the vehicle interior 43 side. The main power source cable 1481 connected to the supply side control box 1451 provided at the left end of the instrument panel backbone trunk line portion 1411 is connected to the engine compartment sub-harness 61 inside the engine room 41. Consequently, power from the main power source can be supplied to the supply side control box 1451.

The power supplied to the supply side control box 1451 from the main power source is supplied to the branch control box 1453, the intermediate control box 1457, and the control boxes 1455 and 1459 via the backbone trunk line portion 1415. The power is supplied to various sub-harnesses (branch lines) connected to electric components (accessories) at the respective vehicle body locations via module connectors MC (refer to FIG. 116(*a*)) connected to branch line connection portions 1521 of the respective control boxes.

The module connectors MC can collectively connect power of the power sources and the ground and signals to the control boxes so as to efficiently transmit power and signals to the backbone trunk line portion 1415 and the respective accessories.

(Routing Material)

Figure 114A:
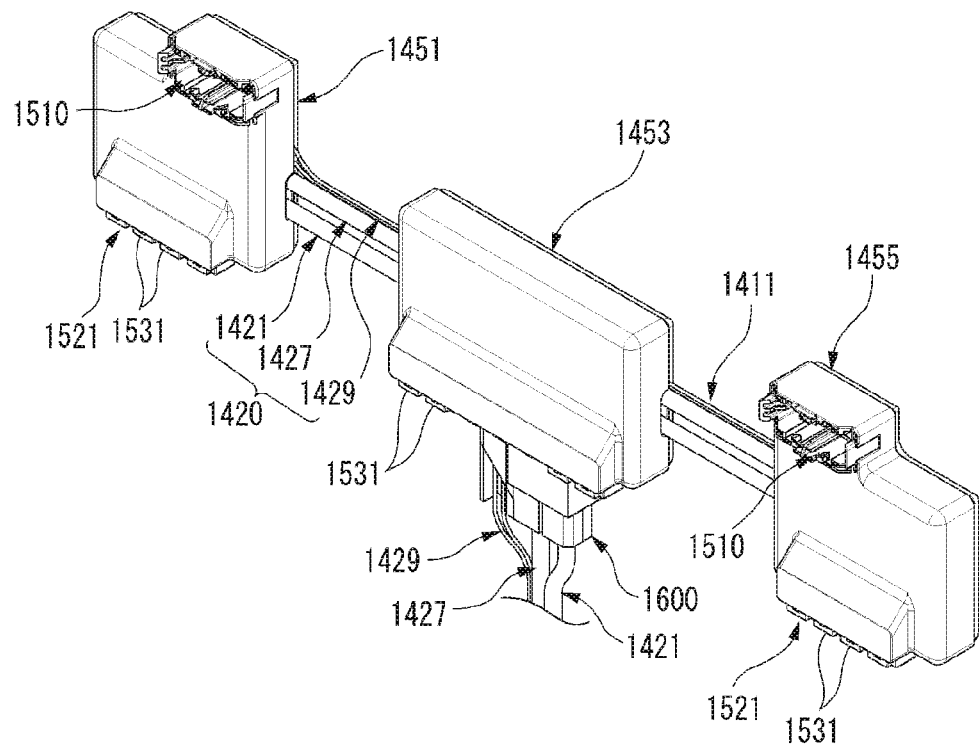
FIG. 114A is a principal portion perspective view illustrating an instrument panel backbone trunk line portion of the backbone trunk line portion illustrated in FIG. 113.
Figure 114B:
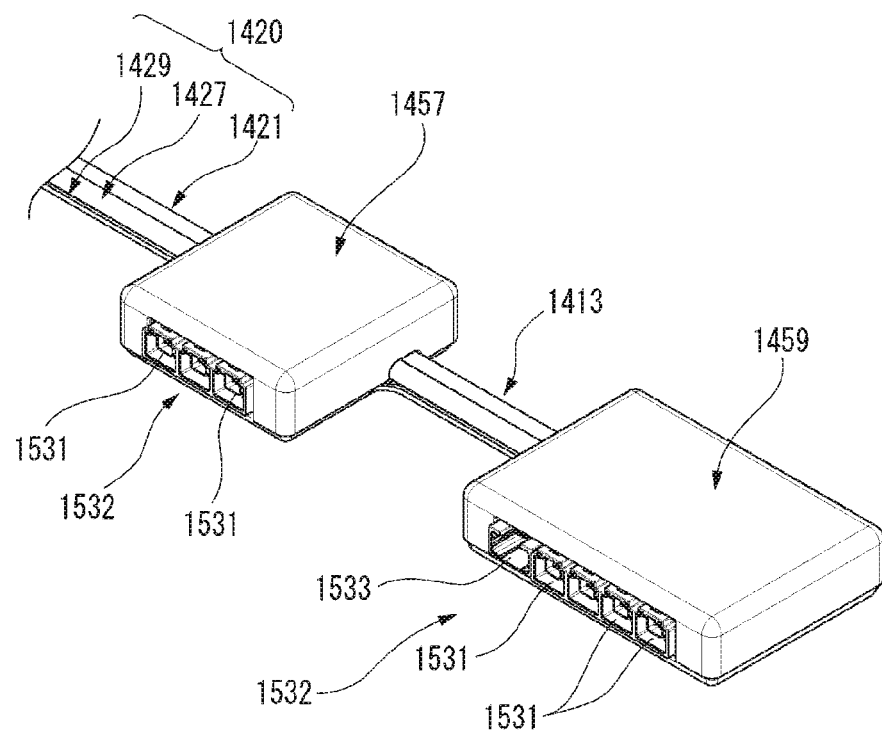
FIG. 114B is a principal portion perspective view illustrating a floor backbone trunk line portion of the backbone trunk line portion illustrated in FIG. 113.

The backbone trunk line portion 1415 of the vehicular circuit body according to the fourth embodiment is formed of a routing material 1420 having the power source line 1421, the communication line 1429, and the earth line 1427 as illustrated in FIGS. 113 and 114. The power source line 1421 and the earth line 1427 employ a round bar conductor 403 made of a metal material (for example, a copper alloy or aluminum) whose sectional shape is a circular shape, and peripheries thereof are covered with an insulating coat 110. The communication line 1429 employs two plastic optical fibers forming a forward route and a backward route. The routing material 1420 formed of the power source line 1421, the earth line 1427, and the communication line 1429 are integrally held by, for example, clamps 455 (refer to FIG. 23) which are molded at a predetermined interval along a longitudinal direction.

Consequently, the routing material 1420 allows a large current to pass therethrough, and thus communication which is resistant to noise can be performed.

The power source line 1421 of the backbone trunk line portion 1415 requires a large sectional area in order to secure a predetermined current capacity, but the power source line 1421 of the present embodiment is formed of the routing material 1420 having the round bar conductor 403 whose sectional shape is a circular shape so as to be able to be freely bent in all directions, and thus work for routing along a predetermined routing path is facilitated.

(Control Boxes)

As illustrated in FIG. 114, the vehicular circuit body according to the fourth embodiment is provided with five control boxes such as the supply side control box 1451 disposed at an upstream end (the left end of the instrument panel backbone trunk line portion 1411) of the backbone trunk line portion 1415, the branch control box 1453 disposed in a branch portion (a connection portion between the instrument panel backbone trunk line portion 1411 and the floor backbone trunk line portion 1413) in the middle of the backbone trunk line portion 1415, the intermediate control box 1457 disposed in the middle (an intermediate portion of the floor backbone trunk line portion 1413) of the backbone trunk line portion 1415, and the control boxes 1455 and 1459 disposed at downstream ends (the right end of the instrument panel backbone trunk line portion 1411 and the rear end of the floor backbone trunk line portion 1413) of the backbone trunk line portion 1415.

As illustrated in FIGS. 115(*a*) to 115(*c*), the supply side control box 1451 is provided with a main power source connection portion 1520 which connects the main power source cable 1481 to the instrument panel backbone trunk line portion 1411, a branch line connection portion 1521 which connects front door branch line sub-harness 63 or a sub-harness 71 (refer to FIG. 1) thereto, and an instrument panel connection portion 1510 which transmits power and signals to a plurality of accessories mounted on an instrument panel such as a meter panel. The supply side control box 1451 can connect power source systems, earth systems, and communication systems of respective circuits to each other among the main power source cable 1481, the instrument panel backbone trunk line portion 1411, the front door branch line sub-harness 63, the sub-harness 71, and the meter panel.

The supply side control box 1451 accommodates a circuit board (not illustrated) in a case formed of a lower case 1522 and an upper case 1524. The power source line 1421, the earth line 1427, and the communication line 1429 in the instrument panel backbone trunk line portion 1411 are electrically branch-connected to a plurality of board connectors 1531 provided at one edge of the circuit board or connectors of the instrument panel connection portion 1510 in order to form the branch line connection portion 1521, via circuits or bus bars formed on the board.

The main power source connection portion 1520 includes a terminal connection part 1511 connected to a power source line 1482 of the main power source cable 1481, and a terminal connection part 1513 connected to an earth line 1484 thereof.

As illustrated in FIG. 113, the terminal connection part 1511 formed at a tip end of the round bar conductor 403 in the power source line 1421 is fitted and connected to a round terminal 1486 provided at an end of the power source line 1482. The terminal connection part 1513 formed at a tip end of the round bar conductor 403 in the earth line 1427 is fitted and connected to a round terminal 1486 provided at an end of the earth line 1484. In the above-described way, the main power source cable 1481 can be connected and fixed to the instrument panel backbone trunk line portion 1411. The communication line 1429 is connected to the circuit board via, for example, a board connector (not illustrated).

In the same manner as in the circuit board 125 of the supply side control box 51 according to the first embodiment, the circuit board of the supply side control box 1451 is mounted with a control unit which distributes power from the power source line 1421 and signals from the communication line 1429 to branch lines such as the engine compartment sub-harness 61, the front door branch line sub-harness 63, or the sub-harness 71. The circuit board is mounted with a plurality of electric components (accessories), and switch circuits each including an FPGA device and a circuit module, as constituent elements which are required to switch between connection states of the electric components.

The board connectors 1531 of the branch line connection portion 1521 are connector-connected to the instrument panel branch line sub-harness 31, the front door branch line sub-harness 63, and the module connector MC (refer to FIG. 116) connected to an end of the sub-harness 71. The module connectors MC can transmit power from the power source line 1421 and the earth line 1427 and signals from the communication line 1429 to respective electric components.

Figure 116A:
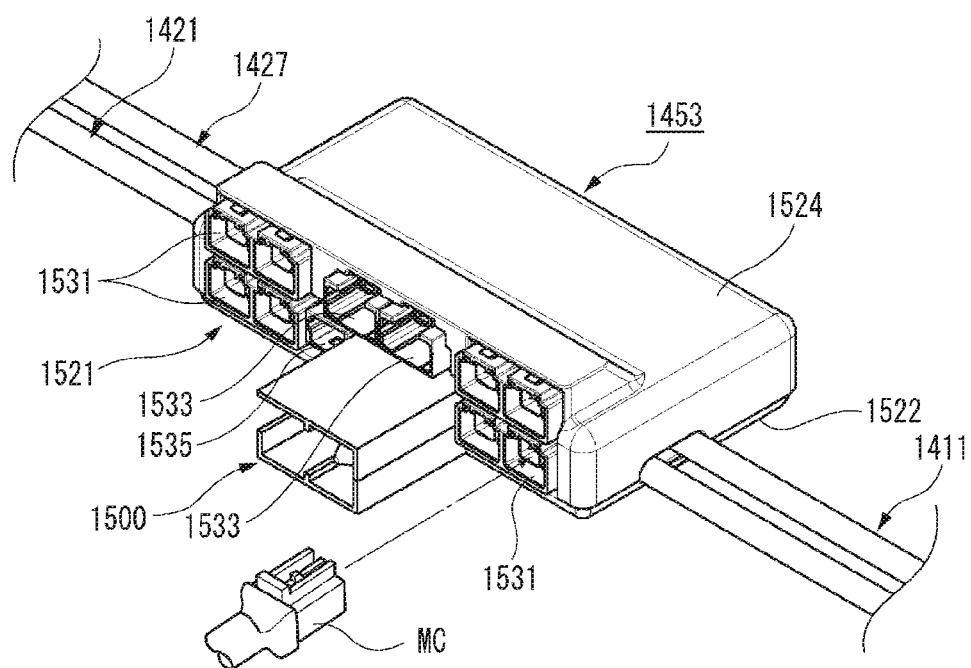
FIGS. 116A and 116B are a perspective view and a bottom view of a branch control box illustrated in FIG. 114A viewed from a bottom side.
Figure 116B:
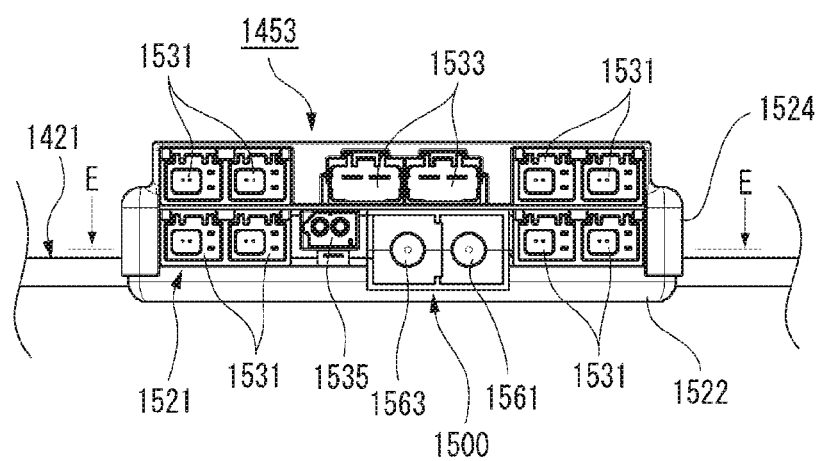

As illustrated in FIG. 113, the branch control box 1453 is disposed in the branch portion in the middle of the backbone trunk line portion 1415, which is the connection portion between the instrument panel backbone trunk line portion 1411 and the floor backbone trunk line portion 1413. As illustrated in FIGS. 116(a) and 116(b), the branch control box 1453 is provided with the branch line connection portion 1521 for connection to a sub-harness (branch line) connected to an electric component (not illustrated), and the connector portion 1500 for connection to the floor backbone trunk line portion 1413. The branch control box 1453 can connect power source systems, earth systems, and communication systems of respective circuits to each other among the sub-harness, the instrument panel backbone trunk line portion 1411, and the floor backbone trunk line portion 1413.

In the same manner as the supply side control box 1451, the branch control box 1453 accommodates a circuit board 1525 in a case formed of a lower case 1522 and an upper case 1524.

Figure 117:
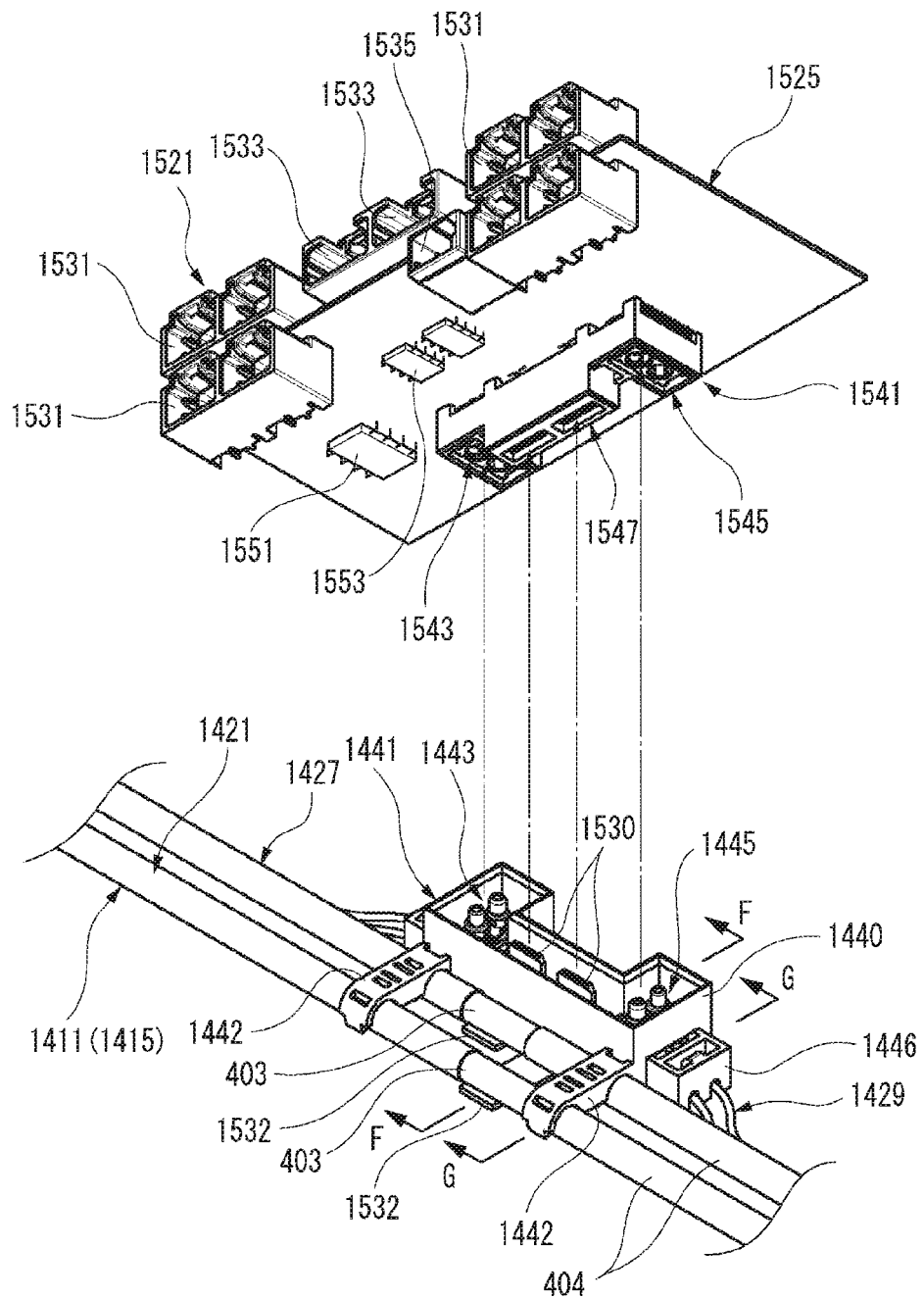
FIG. 117 is a principal portion exploded perspective view for explaining a connection structure example between an instrument panel backbone trunk line portion and a floor backbone trunk line portion in the branch control box illustrated in FIG. 116.
Figure 118A:
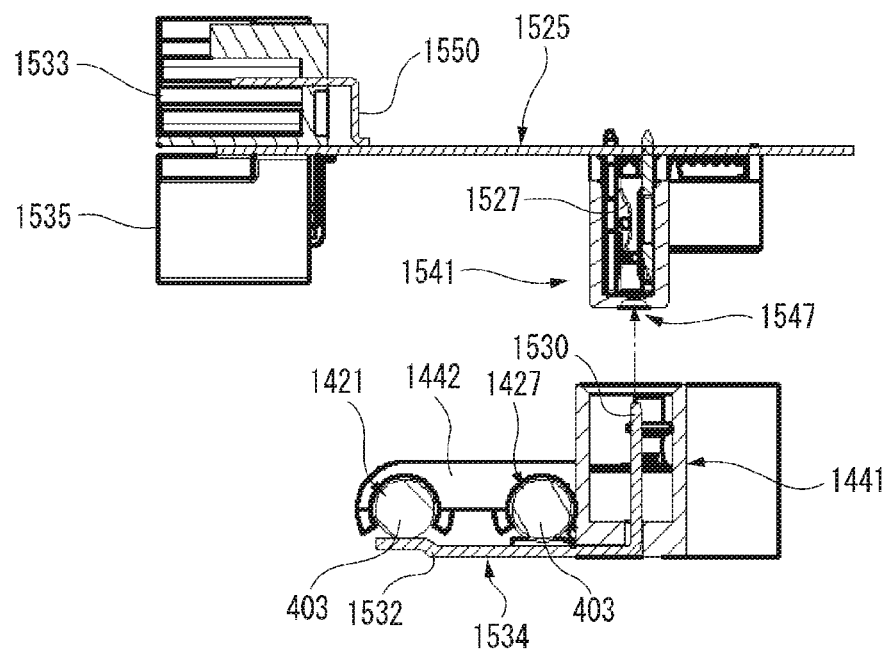
FIG. 118A is a sectional view taken along a line F-F in FIG. 117.
Figure 118B:
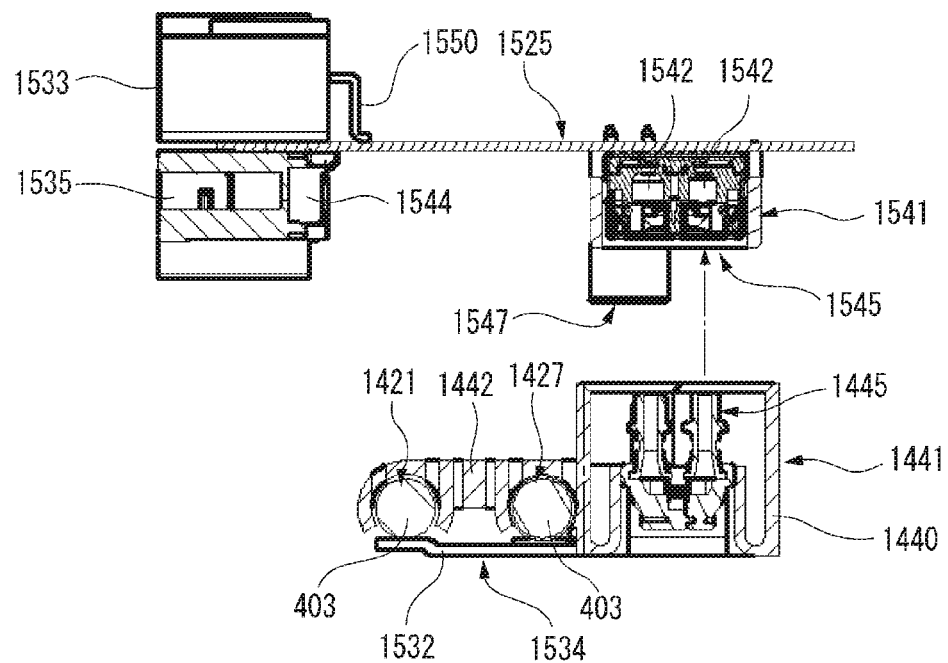
FIG. 118B is a sectional view taken along a line G-G in FIG. 117.

As illustrated in FIG. 117 and FIGS. 118(a) and 118(b), a board connection connector 1441 connected to the power source line 1421, the earth line 1427, and the communication line 1429 in the instrument panel backbone trunk line portion 1411 is fitted to the trunk line connection connector 1541 mounted on the circuit board 1525.

The power source line 1421, the earth line 1427, and the communication line 1429 in the instrument panel backbone trunk line portion 1411 are electrically branch-connected to a plurality of board connectors 1531 provided at one edge of the circuit board 1525 in order to form the branch line connection portion 1521, via the trunk line connection connector 1541 and the circuit or the bus bar formed on the board. The board connector 1533 forming the branch line connection portion 1521 is, for example, a connector for connection to a sub-harness for a power load for supplying source power to an electric component requiring considerably large source power, and the power source line 1421 and the earth line 1427 in the instrument panel backbone trunk line portion 1411 are electrically branch-connected thereto via the trunk line connection connector 1541 and the bus bar 1550 formed on the board.

A pair of fiber optic transceivers (FOTs) 1544 (refer to FIG. 118(b)) optically connected to the communication line 1429 of the floor backbone trunk line portion 1413 is mounted on the circuit board 1525 in an optical connector portion 1535 provided at one edge of the circuit board 1525 to form the connector portion 1500.

A control unit 1551 for distributing power from the power source line 1421 and signals from the communication line 1429 to a plurality of electric components (accessories) is mounted on the circuit board 1525. The circuit board 1525 is mounted with a plurality of electric components (accessories), and a switching circuit 1552 including a field-programmable gate array (FPGA) device and a circuit module as a constituent element required to switch between connection states of the electric components.

The trunk line connection connector 1541 includes a female connector portion 1547 in which a pair of female terminals 1527 (refer to FIG. 118(a)) which are respectively electrically connected to the power source line 1421 and the earth line 1427 are mounted on the circuit board 1525, and optical connector portions 1543 and 1545 in which a pair of FOTs 1542 (refer to FIG. 118(b)) which are respectively optically connected to the communication lines 1429 on the upstream side and the downstream side are mounted on the circuit board 1525.

The FOTs 1542 and 1544 convert an electrical signal and an optical signal into each other, and transmit and receive the signals. Therefore, optical signals received by the FOTs 1542 and 1544 are converted into electrical signals and then electrically branch via circuits of the circuit board 1525, and electrical signals which are input to the FOTs 1542 and 1544 are converted into optical signals and then transmitted to the communication line 1429.

The board connection connector 1441 fixed to the lower case 1522 includes a pair of bus bars 1534 which are respectively electrically connected to the power source line 1421 and the earth line 1427 in a housing main body 1440, and two sets of optical plug connectors 1443 and 1445 which are respectively optically connected to the communication lines 1429 on the upstream side and the downstream side.

A pair of arm portions 1442 protrude on one side surface along a longitudinal direction of the housing main body 1440, and hold the power source line 1421 and the earth line 1427 in parallel to each other. Optical connector fixing portions 1446 are provided on both end surfaces of the housing main body 1440 in the longitudinal direction, and the optical connectors connected to the ends of the communication lines 1429 on the upstream side and the downstream side are fixed thereto and are optically connected to the respective sets of optical plug connectors 1443 and 1445.

Each of the bus bars 1534 includes, as illustrated in FIG. 118(a), a conductor connection portion 1532 which extends in a direction orthogonal to the power source line 1421 and the earth line 1427, and a male terminal 1530 suspended from one end of the conductor connection portion 1532. Each conductor connection portion 1532 is electrically connected, through welding or the like, to the round bar conductors 403 which are exposed by peeling off an insulating coat 404 at predetermined locations of the power source line 1421 and the earth line 1427.

As illustrated in FIGS. 120(a) and 120(b), a pair of terminal connection portions 1561 and 1563 forming the connector portion 1500 are fixed to one side surface of the lower case 1522 corresponding to one edge of the circuit board 1525 provided with the optical connector portion 1535 via a housing 1560. Basal ends 1562 and 1564 of the terminal connection portions 1561 and 1563 whose tip ends are connected to the power source line 1421 and the earth line 1427 of the floor backbone trunk line portion 1413 are electrically connected to the round bar conductors 403 of the power source line 1421 and the earth line 1427 of the instrument panel backbone trunk line portion 1411 through welding or the like.

As illustrated in FIGS. 118(a) and 118(b), the male terminals 1530 and the optical plug connectors 1443 and 1445 of the board connection connector 1441 are respectively fitted to the female terminals 1527 and the optical connector portions 1543 and 1545 in the trunk line connection connector 1541, so that the circuit board 1525 is fixed to the lower case 1522.

Figure 119A:
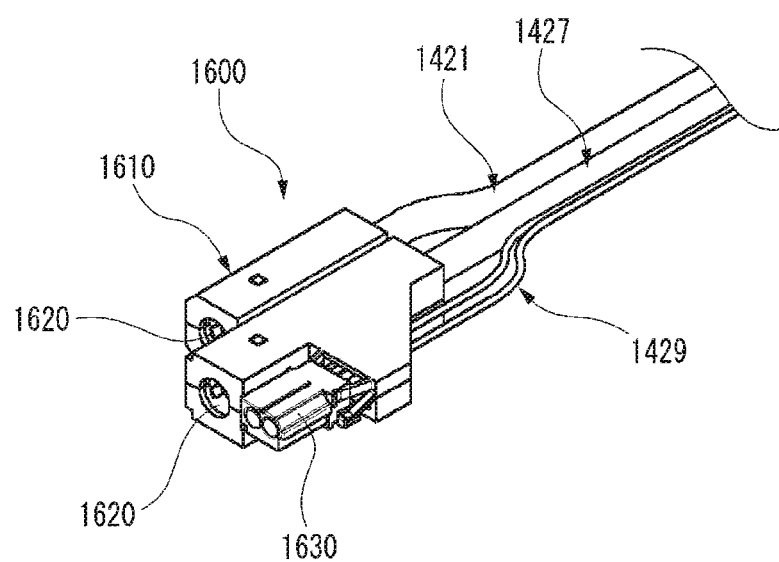
FIGS. 119A and 119B are a perspective view and a front view of a multi-connector illustrated in FIG. 114A.
Figure 119B:
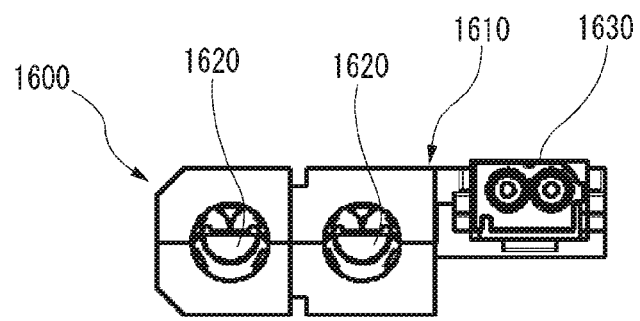

As illustrated in FIGS. 119(a) and 119(b), the multi-connector 1600 is connected to the end of the floor backbone trunk line portion 1413. The multi-connector 1600 is provided with a housing 1610 having a terminal accommodation room in which round terminals 1620 connected to the ends of the power source line 1421 and the earth line 1427 are accommodated (refer to FIG. 120(a)). The housing 1610 integrally holds an optical connector 1630 connected to the end of the communication line 1429.

Figure 121:
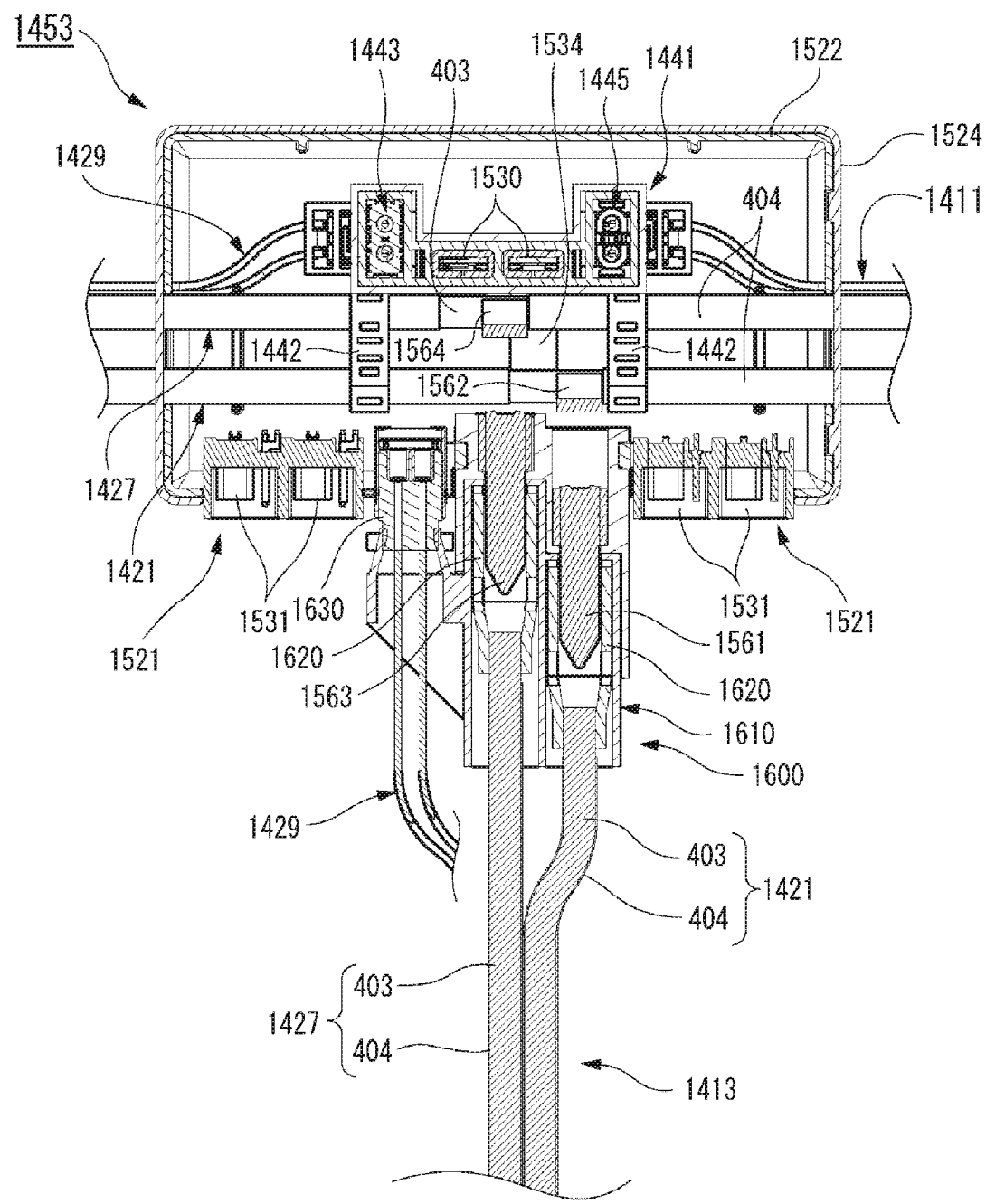

Therefore, as illustrated in FIG. 121, if the multi-connector 1600 is fitted to the connector portion 1500 of the branch control box 1453, tip ends of the respective terminal connection portions 1561 and 1563 are inserted into and electrically connected to round terminals 1620, and the optical connector 1630 is inserted into and optically connected to the optical connector portion 1535. As mentioned above, the multi-connector 1600 can collectively connect the power source line 1421, the earth line 1427, and the communication line 1429 to the connector portion 1500 of the branch control box 1453.

As a result, the branch control box 1453 can branch-connect the power source line 1421, the earth line 1427, and the communication line 1429 in the instrument panel backbone trunk line portion 1411 to the power source line 1421, the earth line 1427, and the communication line 1429 in the floor backbone trunk line portion 1413, and can also supply power and signals to each electric component via the module connector C connected to the branch line connection portion 1521.

In the instrument panel backbone trunk line portion 1411 and the floor backbone trunk line portion 1413, the connection portions are made attachable and detachable via the connector portion 1500 and the multi-connector 1600, and thus workability during routing in a vehicle body considerably improves.

Figure 122A:
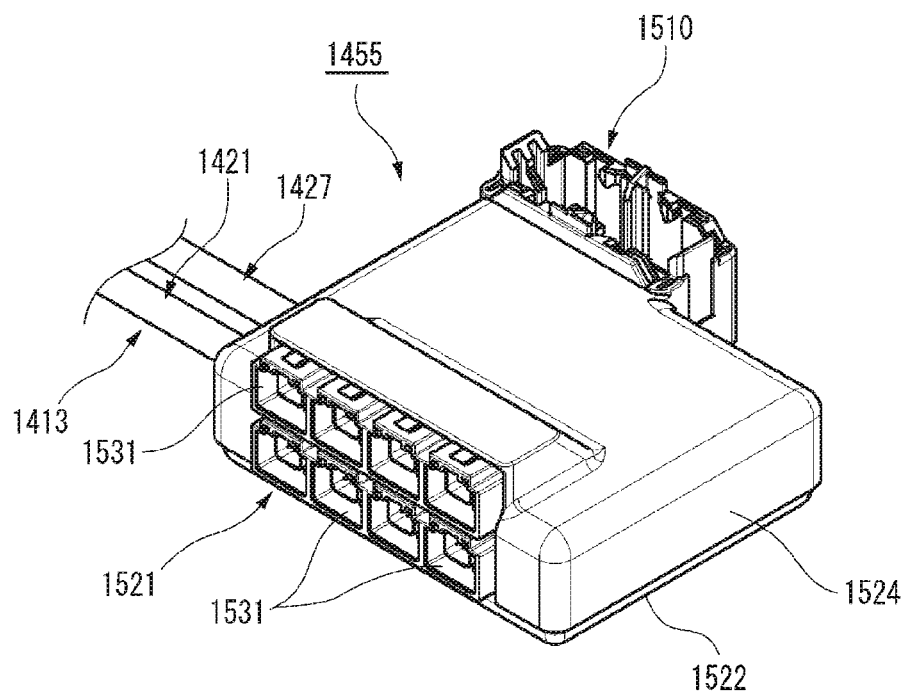
Figure 122B:
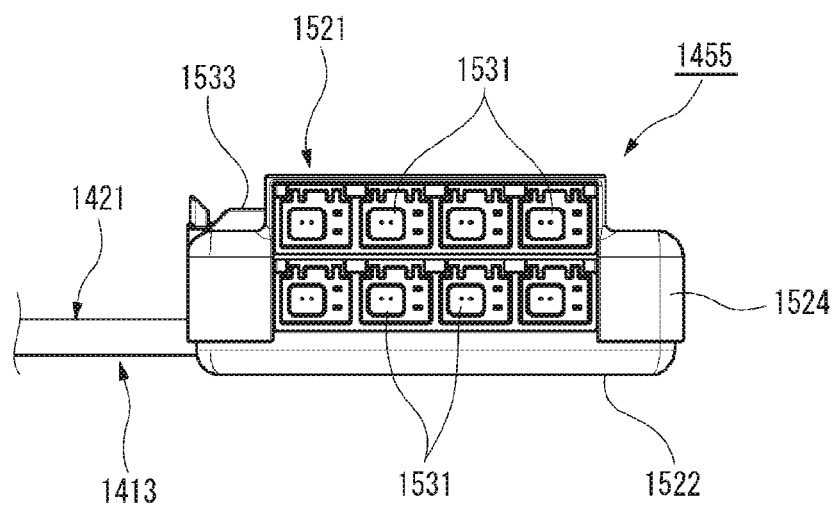

As illustrated in FIGS. 122(a) and 122(b), the control box 1455 is disposed at the downstream end of the backbone trunk line portion 1415 corresponding to the right end of the instrument panel backbone trunk line portion 1411, and includes the branch line connection portion 1521 for connecting the front door branch line sub-harness 63 or a sub-harness 73 (refer to FIG. 1), and an instrument panel connection portion 1510 for transmitting power and signals to a plurality of accessories mounted on an instrument panel such as the meter panel. The control box 1455 can connect power source systems, earth systems, and communication systems of respective circuits to each other among the instrument panel backbone trunk line portion 1411, the front door branch line sub-harness 63, and the sub-harness 73.

In the same manner as the supply side control box 1451, the control box 1455 accommodates a circuit board (not illustrated) in a case formed of a lower case 1522 and an upper case 1524. The power source line 1421, the earth line 1427, and the communication line 1429 in the instrument panel backbone trunk line portion 1411 are electrically branch-connected to a plurality of board connectors 1531 provided at one edge of the circuit board or the connectors of the instrument panel connection portion 1510 in order to form the branch line connection portion 1521, via circuits or bus bars formed on the board.

Figure 123:
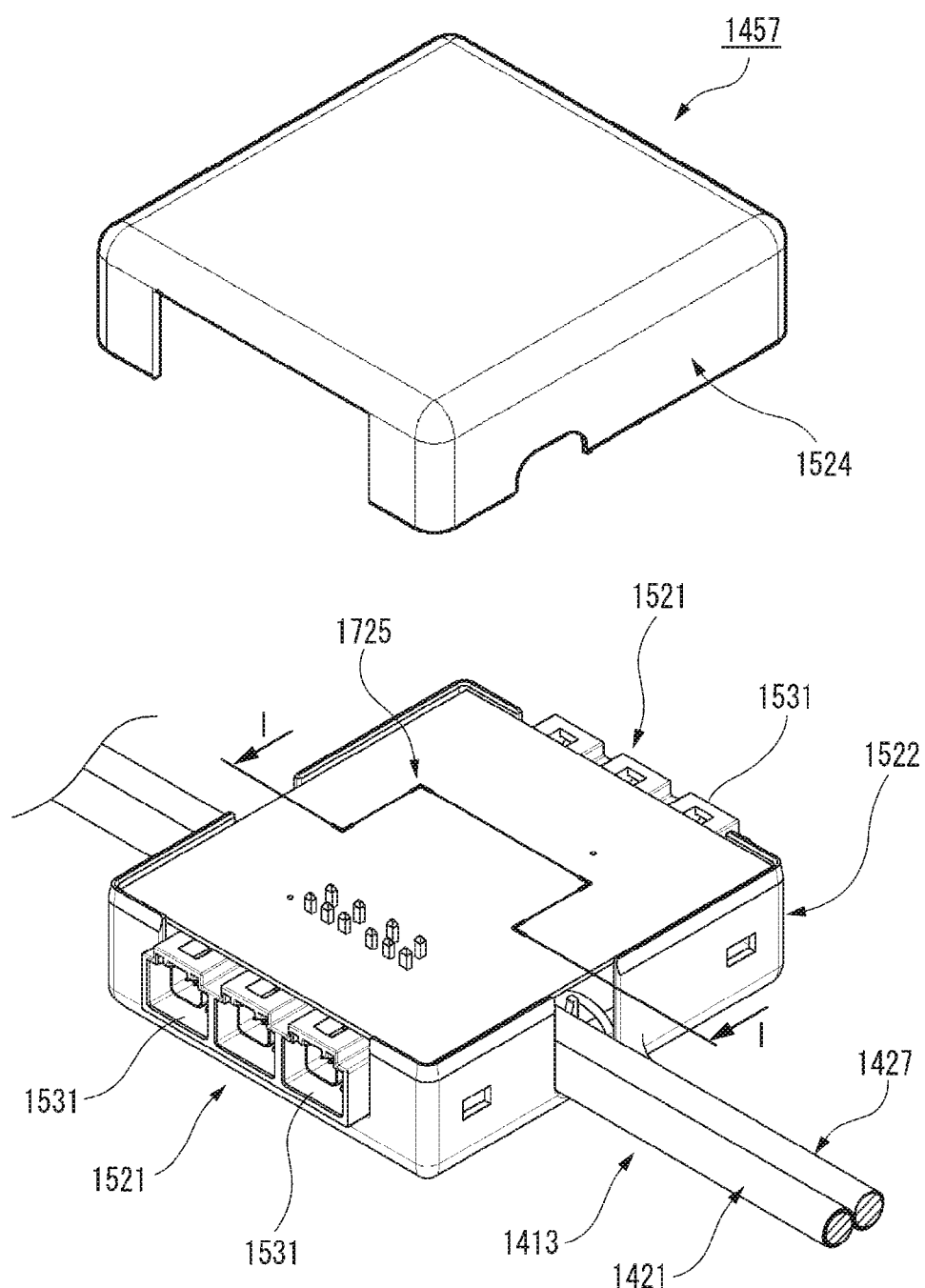

As illustrated in FIG. 123, the intermediate control box 1457 is disposed in the middle of the backbone trunk line portion 1415, which is an intermediate portion of the floor backbone trunk line portion 1413, and includes a branch line connection portion 1521 for connection to the rear door branch line sub-harnesses 65, the center console branch line sub-harness 66, the front seat branch line sub-harnesses 67, and the rear seat branch line sub-harnesses 68 (refer to FIG. 1). The intermediate control box 1457 can connect power source systems, earth systems, and communication systems of respective circuits to each other among the floor backbone trunk line portion 1413, the rear door branch line sub-harnesses 65, the center console branch line sub-harness 66, the front seat branch line sub-harnesses 67, and the rear seat branch line sub-harnesses 68.

In the same manner as the branch control box 1453, the intermediate control box 1457 accommodates a circuit board 1725 in a case formed of a lower case 1522 and an upper case 1524.

Figure 124:
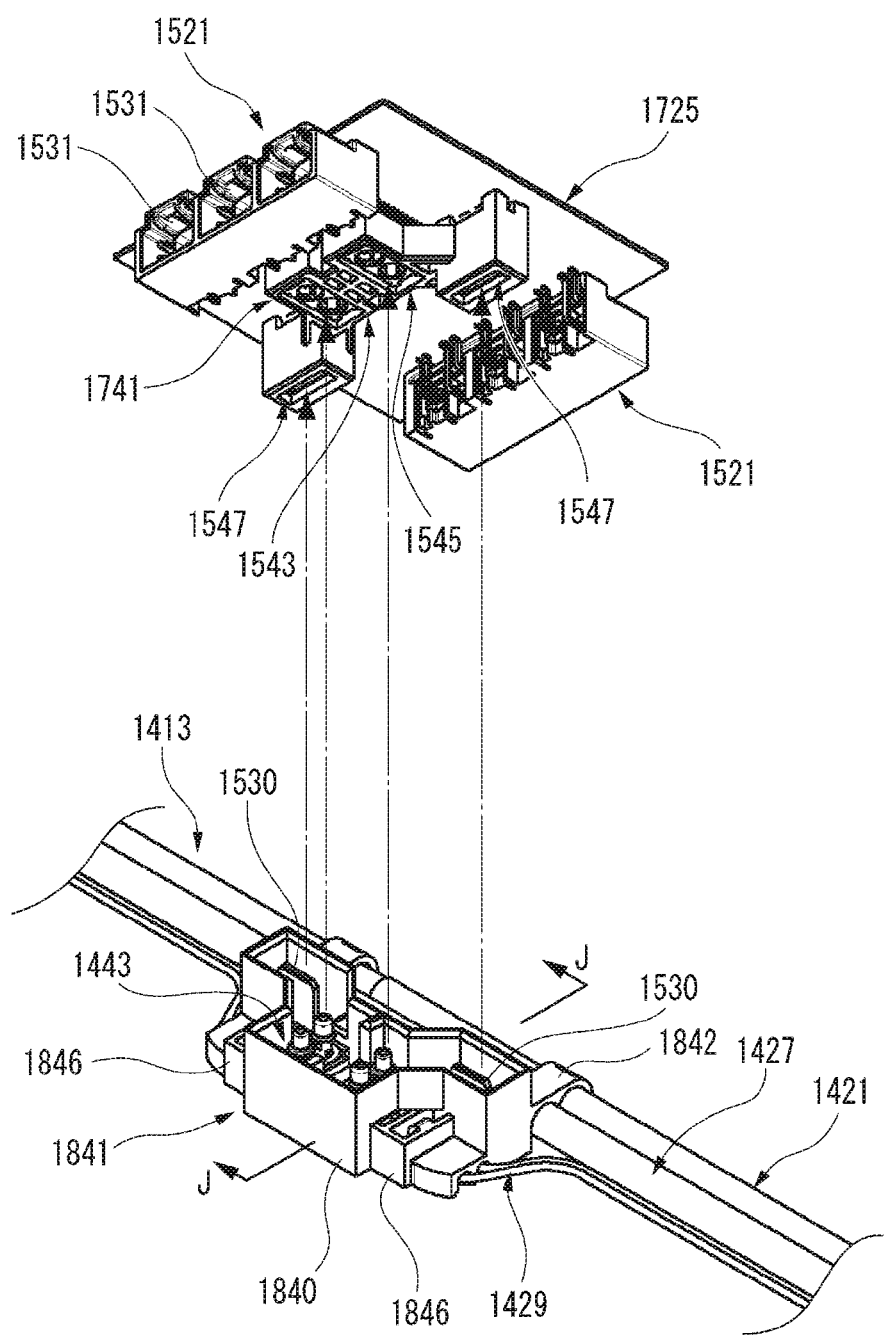
Figure 125:
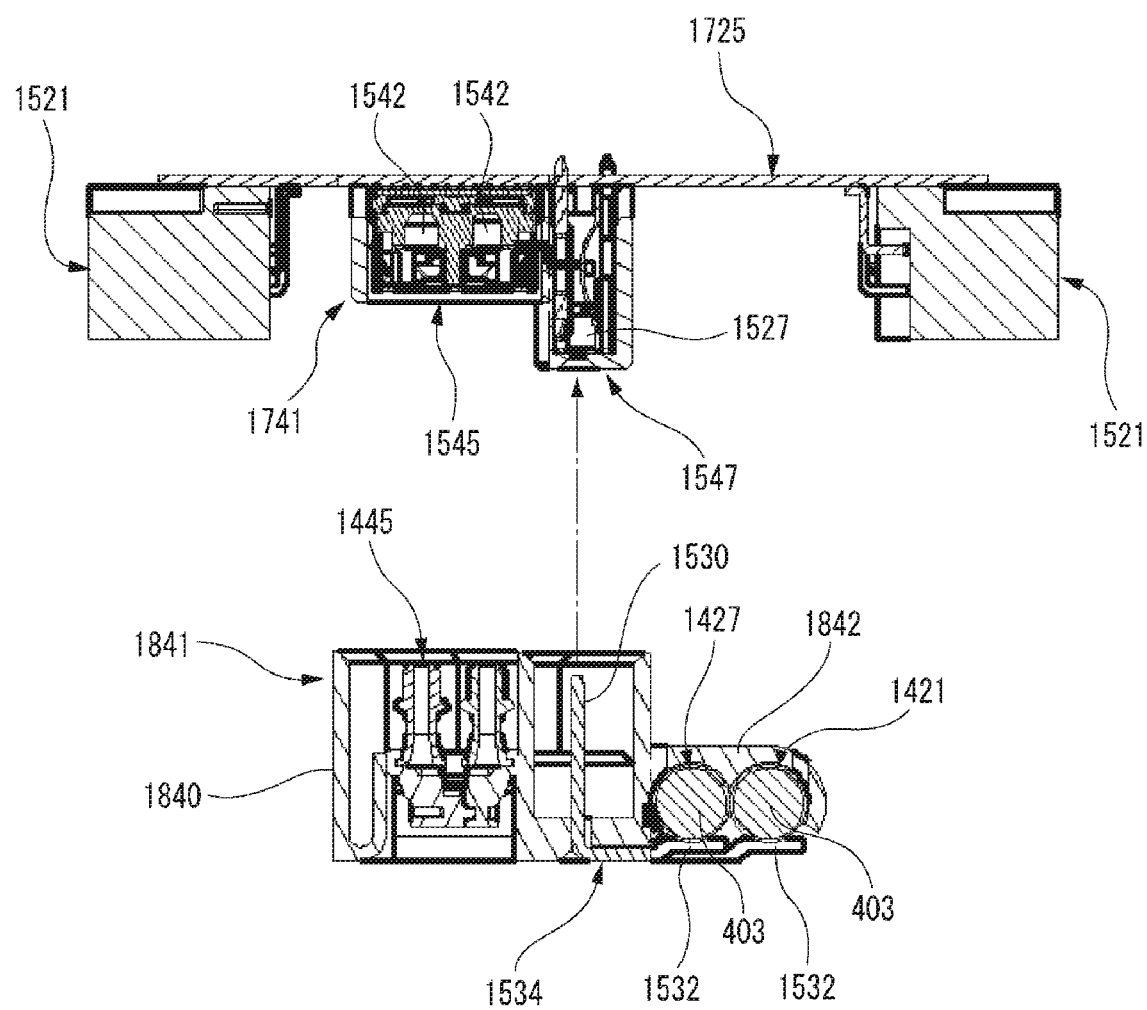

As illustrated in FIGS. 124 and 125, a board connection connector 1841 connected to the power source line 1421, the earth line 1427, and the communication line 1429 in the floor backbone trunk line portion 1413 is fitted to the trunk line connection connector 1741 mounted on the circuit board 1725.

The power source line 1421, the earth line 1427, and the communication line 1429 in the floor backbone trunk line portion 1413 are electrically branch-connected to a plurality of board connectors 1531 provided at both edges of the circuit board 1725 in order to form the branch line connection portion 1521, via the trunk line connection connector 1741 and the circuit or the bus bar formed on the board.

In the same manner as on the circuit board 1525, the control unit 1551 and the switching circuit 1553 are mounted on the circuit board 1725.

The trunk line connection connector 1741 includes a female connector portion 1547 in which a pair of female terminals 1527 (refer to FIG. 125) which are respectively electrically connected to the power source line 1421 and the earth line 1427 are mounted on the circuit board 1725, and optical connector portions 1543 and 1545 in which a pair of FOTs 1542 (refer to FIG. 125) which are respectively optically connected to the communication lines 1429 on the upstream side and the downstream side are mounted on the circuit board 1725.

The board connection connector 1841 fixed to the lower case 1522 includes a pair of bus bars 1534 which are respectively electrically connected to the power source line 1421 and the earth line 1427 in a housing main body 1840, and two sets of optical plug connectors 1443 and 1445 which are respectively optically connected to the communication lines 1429 on the upstream side and the downstream side.

A pair of arm portions 1842 protrude on one side surface along a longitudinal direction of the housing main body 1840, and hold the power source line 1421 and the earth line 1427 in parallel to each other. Optical connector fixing portions 1846 are provided on both end surfaces of the housing main body 1840 in the longitudinal direction, and the optical connectors connected to the ends of the communication lines 1429 on the upstream side and the downstream side are fixed thereto and are optically connected to the respective sets of optical plug connectors 1443 and 1445.

Each of the bus bars 1534 includes, as illustrated in FIG. 125, a conductor connection portion 1532 which extends in a direction orthogonal to the power source line 1421 and the earth line 1427, and a male terminal 1530 suspended from one end of the conductor connection portion 1532. Each conductor connection portion 1532 is electrically connected, through welding or the like, to the round bar conductors 403 which are exposed by peeling off an insulating coat 404 at predetermined locations of the power source line 1421 and the earth line 1427.

Figure 126A:
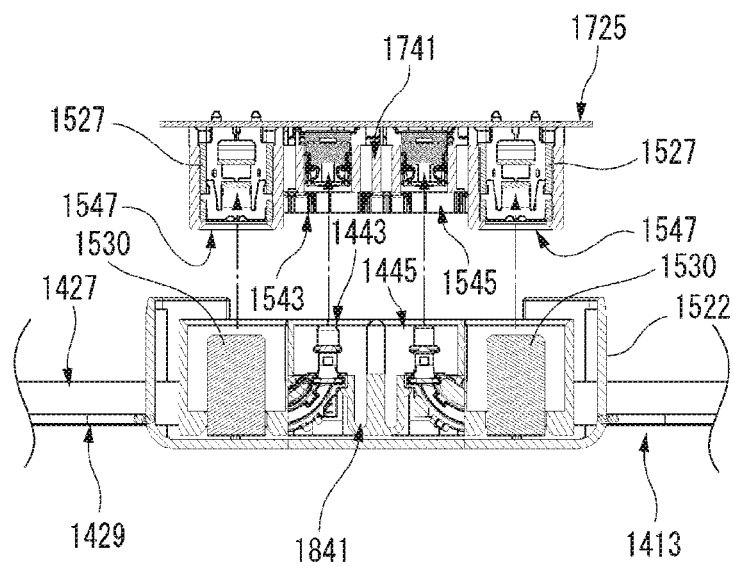
Figure 126B:
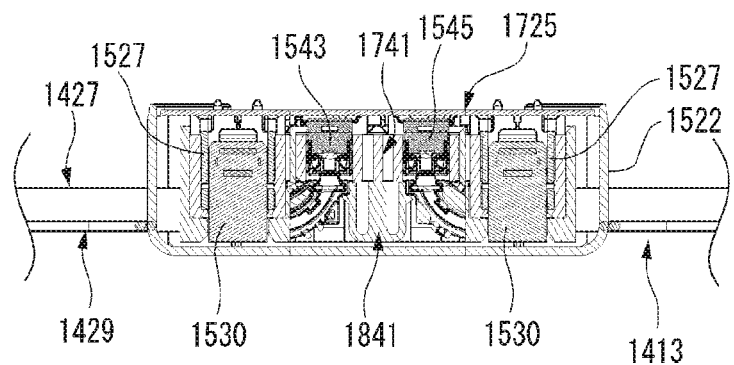

As illustrated in FIGS. 126(a) and 126(b), the male terminals 1530 and the optical plug connectors 1443 and 1445 of the board connection connector 1841 are respectively fitted to the female terminals 1527 and the optical connector portions 1543 and 1545 in the trunk line connection connector 1741, so that the circuit board 1725 is fixed to the lower case 1522.

As a result, the intermediate control box 1457 can supply power and signals from the power source line 1421, the earth line 1427, and the communication line 1429 in the floor backbone trunk line portion 1413 to each electric component via the module connector C connected to the branch line connection portion 1521.

In the intermediate control box 1457, the power source line 1421 and the earth line 1427 of the floor backbone trunk line portion 1413 penetrate therethrough, but the power source line 1421 and the earth line 1427 may be configured to be divided inside the intermediate control box 1457, and are electrically connected to electric components via the bus bars formed on the circuit board 1525. Consequently, since the floor backbone trunk line portion 1413 on the upstream and downstream sides of the intermediate control box 1457 is shortened, each end thereof is attachable to and detachable from the intermediate control box 1457, and workability during routing in a vehicle body further improves.

As illustrated in FIG. 114, the control box 1459 disposed at the rear end of the floor backbone trunk line portion 1413 has the substantially same configuration as that of the control box 1455 except that the instrument panel connection portion 1510 is not provided.

In the communication line 1429 of the above-described floor backbone trunk line portion 1413, two plastic optical fibers forming a forward route and a backward route are connected in parallel between the branch control box 1453 and the intermediate control box 1457, and between the intermediate control box 1457 and the control box 1459. In contrast, one plastic optical fiber may be configured to penetrate through the intermediate control box 1457, and the communication line 1429 may be connected in a loop form among the branch control box 1453, the intermediate control box 1457, and the control box 1459.

The above-described respective control boxes (the supply side control box 1451, the branch control box 1453, the intermediate control box 1457, and the control boxes 1455 and 1459) can cope with most vehicle models by appropriately changing a plurality of kinds of circuit boards 1525 and 1725 having the branch line connection portions 1521 corresponding to a grade or a target specification of an attachment target vehicle, and thus it is possible to reduce the number of components by using a component in common.

The circuit boards 1525 and 1725 can be accommodated in a common case formed of a lower case 122 and an upper case 124.

(Effects of Vehicular Circuit Body)

As described above, according to the vehicular circuit body of the fourth embodiment, it is possible to provide a vehicular circuit body with a simple structure by using the backbone trunk line portion 1415 which has a predetermined current capacity and a predetermined communication capacity and is routed in the vehicle body; and the branch lines (the instrument panel branch line sub-harnesses 31, the front door branch line sub-harnesses 63, the rear door branch line sub-harnesses 65, the center console branch line sub-harness 66, the front seat branch line sub-harnesses 67, the rear seat branch line sub-harnesses 68, the luggage branch line sub-harnesses 69, and the like) which connect electric components at respective vehicle body locations to the backbone trunk line portion 1415 via the five control boxes (the supply side control box 1451, the branch control box 1453, the intermediate control box 1457, and the control boxes 1455 and 1459) disposed in a distribution manner along the backbone trunk line portion 1415.

It becomes easier to manufacture the backbone trunk line portion 1415 which has a simple shape as a whole and in which the connection portions of the instrument panel backbone trunk line portion 1411 extending in the leftward-and-rightward direction of the vehicle body and the floor backbone trunk line portion 1413 extending the front-and-rear direction of the vehicle body substantially at the center of the vehicle body are attachable and detachable.

Figure 127:
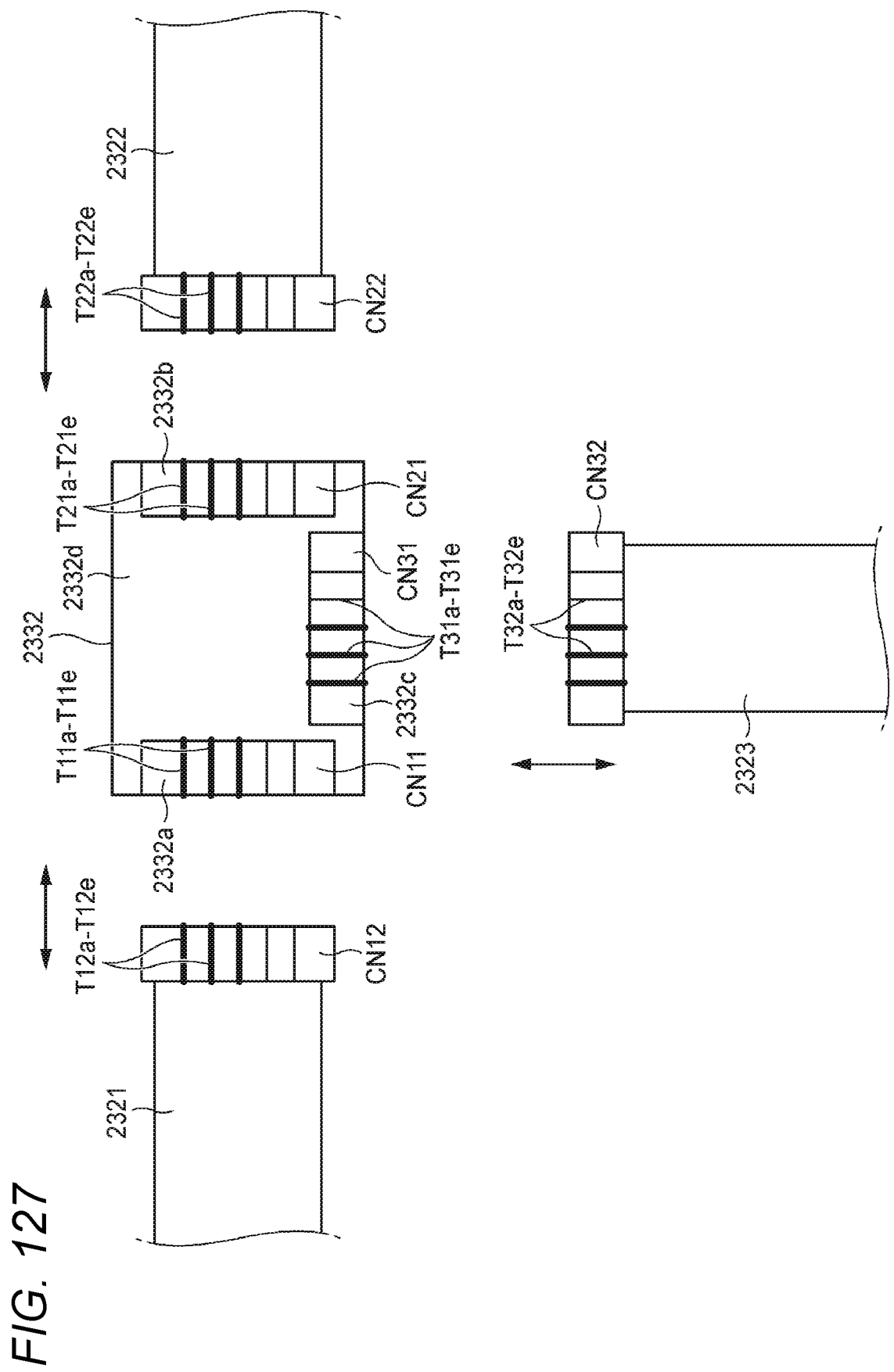

Another configuration of a backbone control box 2332 and the vicinity thereof is shown in FIG. 127. As shown in FIG. 127, the backbone control box 2332 includes a trunk line connecting portion 2332a provided at a left end side, a trunk line connecting portion 2332b at a right end side, and a trunk line connecting portion 2332c provided at a lower end side. A right end of a backbone trunk line portion 2321 is connectable to the trunk line connecting portion 2332a. A left end of a backbone trunk line portion 2322 is connectable to the backbone connecting portion 2332b. A leading end of a backbone trunk line 2323 is connectable to the trunk line connecting portion 2332c.

Specifically, a connector CN11 provided on the trunk line connecting portion 2332a and a connector CN12 provided on the right end of the backbone trunk line portion 2321 are configured to be detachably connectable with each other. Similarly, a connector CN21 provided on the trunk line connecting portion 2332b and a connector CN22 provided on the left end of the backbone trunk line portion 2322 are configured to be detachably connectable with each other. In addition, a connector CN31 provided on the trunk line connecting portion 2332c and a connector CN32 provided on the left end of the backbone trunk line portion 2323 are configured to be detachably connectable with each other.

Two systems of power source lines, an earth line, and a communication line including two signal lines are provided in each of the backbone trunk line portion 2321, 2322, 2323.

The two systems of power source lines, the earth line, and the two signal lines of the communication line of the backbone trunk line portion 2321 are connected to respective five terminals $T12a$ to $T12e$ arranged in positions so as to be adjacent to each other in the connector CN12. Similarly, the two systems of power source lines, the earth line, and the two signal lines of the communication line of the backbone trunk line portion 2322 are connected to respective five terminals $T22a$ to $T22e$ arranged in positions so as to be adjacent to each other in the connector CN22. Moreover, the two systems of power source lines, the earth line, and the two signal lines of the communication line of the backbone trunk line portion 2323 are connected to respective five terminals $T32a$ to $T32e$ arranged in positions so as to be adjacent to each other in the connector CN32.

In an inside of the connector CN 11 of the backbone control box 2332, five terminals $T11a$ to $T11e$ which are capable of being engaged with respective terminals $T12a$ to $T12e$ in the connector CN12 in male/female relation are arranged to align in positions so as to be adjacent to each other. Similarly, in an inside of the connector CN 21, five terminals $T21a$ to $T21e$ which are capable of being engaged with respective terminals $T22a$ to $T22e$ in the connector CN22 are arranged to align in positions so as to be adjacent to each other. Moreover, in an inside of the connector CN 31, five terminals $T31a$ to $T31e$ which are capable of being engaged with respective terminals $T32a$ to $T32e$ in the connector CN32 are arranged to align in positions so as to be adjacent to each other.

A printed board configuring a relay circuit 2332d is provided in the inside of the backbone control box 2332. The terminals $T11a$ to $T11e$ of the connector C11, the terminals $T21a$ to $T21e$ of the connector C21, and the terminals $T31a$ to $T31e$ in the connector C31 are respectively connected to the relay circuit 2332d.

The relay circuit 2332d includes a circuit for mutually connecting the power source lines, the earth lines and the communication lines of the backbone trunk line portions 2321, 2322, 2323 connected to the backbone control box 2332. Functions for intercepting the connection in the circuit, functions for limiting power supply and so on may be mounted on the relay circuit 2332d, if necessary. Further, although not shown in FIG. 127, a branch line connecting portion to which a branch line sub harness is connected is provided in the backbone control box 2332.

As shown in FIG. 127, it becomes easy to detach and connect the backbone trunk line portions 2321, 2322, 2323 with the backbone control box 2332, by providing the connectors CN11, CN12, CN21, CN22, CN31, CN32. Accordingly, when it is difficult to arrange them on a desired route on the vehicle body in a condition they are connected to each other, by detaching the backbone trunk line portions 2321, 2322, 2323 and the backbone control box 2332 from each other as shown in FIG. 127 as one example, operations such as transferring and positioning the respective members become relatively easy.

In addition, the terminals T11a to T11e of the connector CN11, the terminals T12a to T12e of the connector CN12, the terminals T21a to T21e of the connector CN21, the terminals T22a to T22e of the connector CN22, the terminals T31a to T31e of the connector CN31, the terminals T32a to T32e of the connector CN32 are arranged to align in positions that they are adjacent to each other. That is, various connecting portions (respective terminals) which are detachable and connectable arranged so as to be concentrated within a relatively narrow space.

Accordingly, in assembling operations for unifying the backbone trunk line portions 2321, 2322, 2323 and backbone control box 2332, detaching operations for disassembling them, inspecting operations of the respective connecting portions, replacing operations of parts and so on, the operations can be done only in the relatively narrow space. Therefore, for example during a maintenance, it is unnecessary for an operator to move around in order to look for various inspecting portions, and the operator can carry out the operations for specific connecting portions such as the vicinity of the backbone control box 2332. In addition, the operations can be carried out only by opening a part of a cover covering a subject portion for the operations, the cover which is openable and closable can be small sized.

Figure 128:
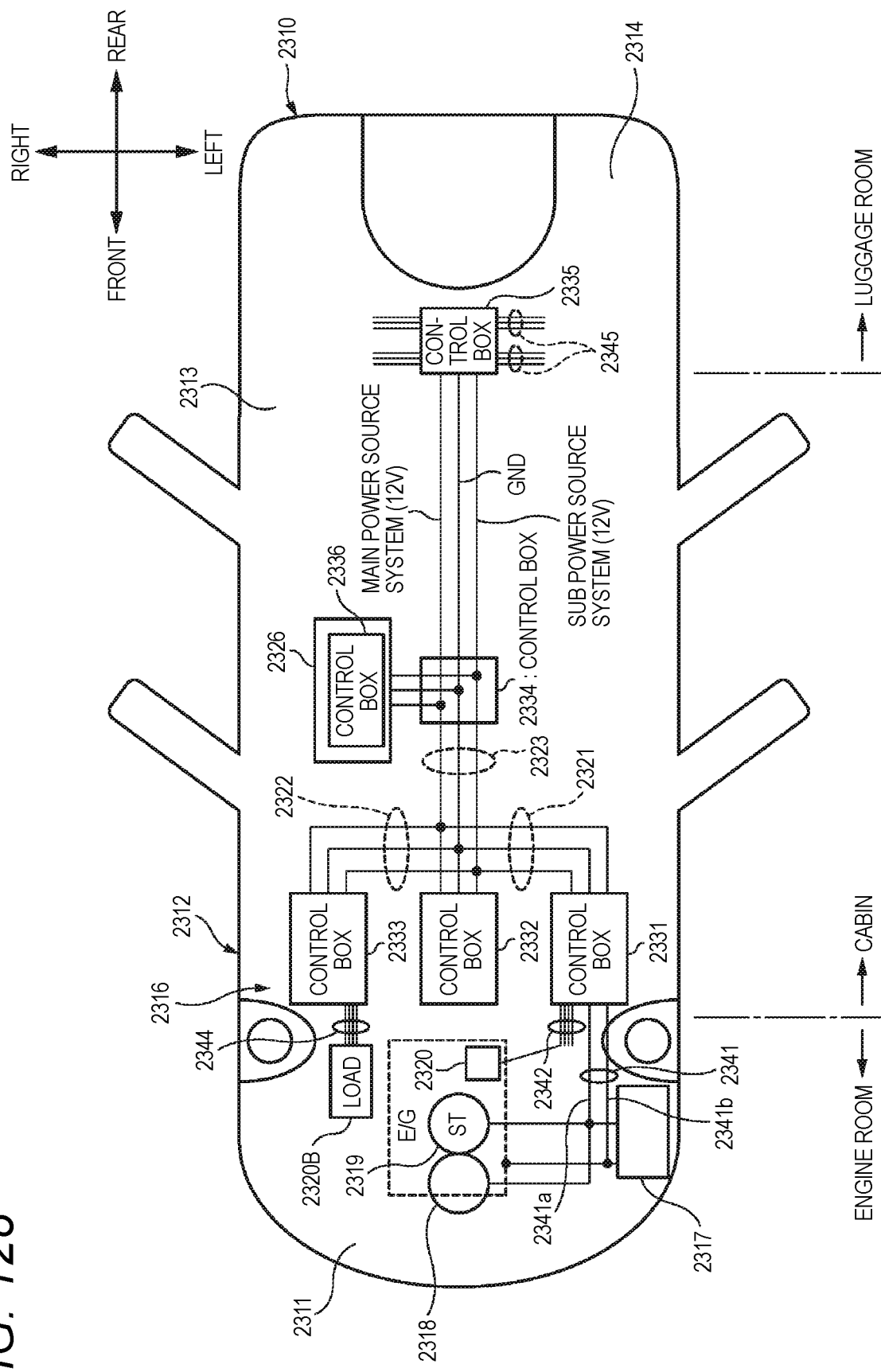

Another configuration of a principle part of on-vehicle devices including the vehicular circuit body is shown in FIG. 128. As shown in FIG. 128, a vehicle body 2310 of a vehicle is configured by three segments of an engine room 2311, a cabin 2313, a luggage room 2314. A dash panel 2316 is provided on a boundary part between the engine room 2311 and the cabin 2313.

An engine E/G, a main battery 2317, an alternator (ALT) 2318, a starter (ST) 2319, electric components 2320 2320B and so on are mounted in the engine room. The main battery 2317, the alternator 2318 and so on correspond to a main power source of the vehicle. As a backup of the main power source, a sub battery 2326 is mounted in the cabin 2313.

In the configuration shown in FIG. 128, backbone control boxes 2331, 2332, 2333 and backbone trunk line portions 2321, 2322, 2323 are provided in an instrument panel portion 2312 in a cabin 2313, and they are electrically connected to each other. Moreover, a tail end of the backbone trunk line portion 2323 extends to a luggage room 2314 and is connected to a backbone control box 2335. In addition, a backbone control box 2334 is provided at an intermediate portion of the backbone trunk line portion 2323. A backbone control box 2336 and a sub battery 2326 are connected to a branch line divided from the backbone control box 2334. Various electric components in the luggage room 2314 are connected to the backbone control box 2335 through a branch line sub harness 2345.

According to the configuration of FIG. 128, since it is assumed that there is the sub battery 2326, a main power source system and a sub power source system (backup power source system) are included in each of the backbone trunk line portions 2321, 2322, 2323. That is, two systems of the power source lines are provided in the respective backbone trunk line portions 2321, 2322, 2323.

Accordingly, when some trouble is occurred and a power supply is stopped from the main power source, it is possible to supply electric power of the sub battery 2326 to electric components having high importance through the backbone trunk line portions 2321, 2322, 2323. Therefore, it is possible to minimize operation halts of various on-vehicle components in abnormal occurrences, and to realize a high reliability required for example in a vehicle in which autonomous driving function is mounted.

In the configuration shown in FIG. 128, the backbone control box 2331 in the cabin 2313, the main battery 2317 as the main power source in the engine room 2311, and the alternator 2318 are connected to each other through a main power source cable 2341. Accordingly, the main power source cable 2341 is arranged so as to penetrate through the dash panel 2316.

Moreover, a part of a branch line sub harness 2342 connected to the backbone control box 2331 disposed in the cabin 2313 penetrates through the dash panel 2316 and is connected to the electric component 2320. In addition, a part of a branch line sub harness 2342 connected to the backbone control box 2333 disposed in the cabin 2313 penetrates through the dash panel 2316 and is connected to the electric component (load) 2320B.

<Advantage of the Vehicular Circuit Body>

As shown in FIG. 127, the terminals T11a to T11e, T12a to T12e, T21a to T21e, T22a to T22e, T31a to T31e, T32a to T32e are arranged to align to be adjacent to each other, in the respective connecting portions between the backbone control box 2332 and the backbone trunk line portions 2321, 2322, 2323. Accordingly, when an operator carries out connecting operations, disassembly operations, inspecting operations, part replacing operations and so on, the operations can be carried out only in a specific area centralized as operation portions.

Furthermore, since the connectors CN11, CN 12, CN21, CN22, CN31, CN32 are used in the connecting portions as shown in FIG. 127, detachments and attachments of the respective portions are easy to be carried out. Accordingly, for example in assembling the vehicular circuit body to the vehicle body, the respective backbone control box 2332 and the backbone trunk line portions 2321, 2322, 2323 can be individually moved and positioned as independent parts separated from each other. Therefore, workability is better compared to the case in which the backbone control box 2332 and the backbone trunk line portions 2321, 2322, 2323 are integrated in advance.

Moreover, by using the vehicular circuit body having a structure which is simplified like a spine, manufacturing costs for devices, costs for routing operations can be reduced. In addition, regardless of an existence of optional electric components and additional new electric components, a basic configuration of the vehicular circuit body is unrequired to be changed. Thus, communalization of parts and structures become easy.

Although FIG. 128 shows an example of a configuration in which the backbone trunk line portions are structured to have T-shape in FIG. 128, the vehicular circuit body may be structured to have another shapes. For example, the vehicular circuit body may have I-shape structure configured only by the backbone control box 2332, 2335 and the backbone trunk line portion 2323.

Aspects of the vehicular circuit body in accordance with the embodiments of the invention disclosed in the above are briefly summarized and respectively listed in [1] to [5] as follows:

[1] A vehicular circuit body, comprising:
a trunk line (backbone trunk line portion 1415) that includes a power source line (1421) having a predetermined current capacity and a communication line (1429) having a predetermined communication capacity, and that is routed in a vehicle body; and
a plurality of control boxes (supply side control box 1451, branch control box 1453, intermediate control box 1457, control box 1455, 1459) that are disposed in a distribution manner along the trunk line,
wherein the trunk line includes a first trunk line portion (floor backbone trunk line portion 1413) extending in a front-and-rear direction of the vehicle body and a second trunk line portion (instrument panel backbone trunk line portion 1411) extending in a leftward-and-rightward direction of the vehicle body, and
wherein the plurality of control boxes include a branch control box (1453) that connects the first trunk line portion and the second trunk line portion, and distributes power from one of the first trunk line portion and the second trunk line portion to the other one.

[2] The vehicular circuit body according to [1],
wherein the first trunk line portion is disposed along a vehicle interior floor of a vehicle, and
wherein the second trunk line portion is disposed in an instrument panel of the vehicle.

[3] The vehicular circuit body according to [1] or [2], further comprising:
a branch line with one end connected to any one of the plurality of control boxes and the other end directly or indirectly connected to an accessory.

[4] The vehicular circuit body according to any one of [1] to [3],
wherein the trunk line is formed of a routing material having at least one kind of conductor among a flat conductor, a round bar conductor, and a stranded wire.

[5] The vehicular circuit body according to any one of [1] to [4],
wherein the trunk line further includes an earth line (1427) having a predetermined current capacity.

While the present invention is described in detail by referring to the specific embodiments, it is to be understood to a person with ordinary skill in the art that various changes or modifications may be made without deviating from the spirit and scope of the present invention.

What is claimed is:

1. A vehicular circuit body comprising:
a plurality of control boxes disposed in a distribution manner along a vehicle body and including a first control box, a branch control box and a second control box;
a first trunk line that includes a power source line having a predetermined current capacity and a communication line having a predetermined communication capacity, the first trunk line is routed in the vehicle body to extend in a front-and-rear direction of the vehicle body;
a second trunk line that includes a power source line having a predetermined current capacity and a communication line having a predetermined communication capacity, the second trunk line is routed in a vehicle body to extend in a leftward-and-rightward direction of the vehicle body, and a routing material that constitutes the power source line of the second trunk line includes a first end that terminates at the first control box and a second end that terminates at the second control box, and the routing material of power source line of the second trunk line extends through the branch control box from the first end to the second end in the leftward-and-rightward direction;
a power source;
a main power source cable extending from the power source to one of the control boxes; and
a rising portion extending from the first trunk line to the branch control box, and a routing material constituting the rising portion includes a first end that terminates at the branch control box,
wherein the first trunk line extends from one of the control boxes in the front-and-rear direction, and
wherein the branch control box distributes power from one of the first trunk line and the second trunk line to the other one.

2. The vehicular circuit body according to claim 1,
wherein the first trunk line portion is disposed substantially at a center of the vehicle body in the leftward-and-rightward direction.

3. The vehicular circuit body according to claim 1,
wherein the branch control box is connected to the intermediate part of the second trunk line portion, and
wherein the first trunk line portion extends from the branch control box and through a third one of the control boxes, and the first trunk line portion includes a second end that is connected to and terminates at a fourth one of the control boxes.

4. The vehicular circuit body according to claim 1,
wherein the routing material that constitutes the second trunk portion also constitutes the power source line of the second trunk portion, and
wherein the communication line of the second trunk line portion includes a first communication line routing material that terminates at each of the first control box and the branch control box and a second communication line routing material that terminates at each of the second control box and the branch control box.

5. The vehicular circuit body according to claim 1,
wherein the first trunk line includes a routing body that terminates at a third control box and a fourth control box, and
wherein the branch control box is spaced above the first trunk line at a location relative to the front-and-rear direction that is between the third and fourth control boxes.

6. The vehicular circuit body according to claim 1, wherein the first trunk line portion is disposed along a vehicle interior floor of a vehicle, and wherein the second trunk line portion is disposed in an instrument panel of the vehicle.

7. The vehicular circuit body according to claim 1, further comprising:
a branch line with one end connected to any one of the plurality of control boxes and the other end directly or indirectly connected to an accessory.

8. The vehicular circuit body according to claim 1, wherein the trunk line is formed of a routing material having at least one kind of conductor among a flat conductor, a round bar conductor, and a stranded wire.

9. The vehicular circuit body according to claim 1, wherein the trunk line further includes an earth line having a predetermined current capacity.

10. The vehicular circuit body according to claim 1, wherein the first trunk line portion and the second trunk line portion are configured in a T shape.

* * * * *